(12) United States Patent
Maciocci et al.

(10) Patent No.: US 9,384,594 B2
(45) Date of Patent: Jul. 5, 2016

(54) ANCHORING VIRTUAL IMAGES TO REAL WORLD SURFACES IN AUGMENTED REALITY SYSTEMS

(75) Inventors: Giuliano Maciocci, Duxford (GB); Andrew J. Everitt, Milton (GB); Paul Mabbutt, Werrington (GB); David T. Berry, Impington (GB)

(73) Assignee: QUALCOMM Incorporated, San Diego, CA (US)

( * ) Notice: Subject to any disclaimer, the term of this patent is extended or adjusted under 35 U.S.C. 154(b) by 879 days.

(21) Appl. No.: 13/434,317

(22) Filed: Mar. 29, 2012

(65) Prior Publication Data

US 2012/0249741 A1   Oct. 4, 2012

Related U.S. Application Data

(60) Provisional application No. 61/468,937, filed on Mar. 29, 2011.

(51) Int. Cl.
*H04N 13/04* (2006.01)
*G06T 19/00* (2011.01)
(Continued)

(52) U.S. Cl.
CPC .............. *G06T 19/006* (2013.01); *G06F 3/011* (2013.01); *G06F 3/017* (2013.01); *G06F 3/0425* (2013.01);
(Continued)

(58) Field of Classification Search
CPC ....... G06F 3/011; G06F 3/017; G06F 3/0425; G06T 15/503; G06T 17/05; G06T 19/006; G06T 2215/16; G06T 2219/024; H04N 9/3173
See application file for complete search history.

(56) References Cited

U.S. PATENT DOCUMENTS 6,771,294 B1   8/2004   Pulli et al.
6,930,715 B1   8/2005   Mower
(Continued)

FOREIGN PATENT DOCUMENTS

CN         1746822 A      3/2006
CN       101243392 A      8/2008
(Continued)

OTHER PUBLICATIONS

Schmalstieg D et al: "The Studierstube Augmented Reality Project", Presence, Cambridge, MA, US, vol. 11, No. 1, Feb. 1, 2002, pp. 33-54.*

(Continued)

*Primary Examiner* — Mohammed Rahaman
(74) *Attorney, Agent, or Firm* — James T. Hagler; Scott A. Barker

(57) ABSTRACT

A head mounted device provides an immersive virtual or augmented reality experience for viewing data and enabling collaboration among multiple users. Rendering images in a virtual or augmented reality system may include capturing an image and spatial data with a body mounted camera and sensor array, receiving an input indicating a first anchor surface, calculating parameters with respect to the body mounted camera and displaying a virtual object such that the virtual object appears anchored to the selected first anchor surface. Further operations may include receiving a second input indicating a second anchor surface within the captured image that is different from the first anchor surface, calculating parameters with respect to the second anchor surface and displaying the virtual object such that the virtual object appears anchored to the selected second anchor surface and moved from the first anchor surface.

108 Claims, 46 Drawing Sheets

(51) Int. Cl.
*G06F 3/01* (2006.01)
*G06F 3/042* (2006.01)
*G06T 15/50* (2011.01)
*G06T 17/05* (2011.01)
*H04N 9/31* (2006.01)

(52) U.S. Cl.
CPC .............. *G06T 15/503* (2013.01); *G06T 17/05* (2013.01); *H04N 9/3173* (2013.01); *G06T 2215/16* (2013.01); *G06T 2219/024* (2013.01)

(56) References Cited

U.S. PATENT DOCUMENTS

| | | | |
|---|---|---|---|
| 7,532,224 | B2 | 5/2009 | Bannai |
| 7,728,852 | B2 | 6/2010 | Suzuki et al. |
| 7,874,681 | B2 | 1/2011 | Huebner |
| 8,230,367 | B2 | 7/2012 | Bell et al. |
| 8,275,617 | B1 | 9/2012 | Morgan et al. |
| 8,339,525 | B2 | 12/2012 | Chuang et al. |
| 2002/0060648 | A1 | 5/2002 | Matsui et al. |
| 2002/0075201 | A1 | 6/2002 | Sauer et al. |
| 2002/0095265 | A1* | 7/2002 | Satoh et al. .............. 702/94 |
| 2003/0137639 | A1 | 7/2003 | Yang |
| 2003/0137641 | A1 | 7/2003 | Yaniv |
| 2004/0046711 | A1 | 3/2004 | Triebfuerst |
| 2006/0279528 | A1 | 12/2006 | Schobben et al. |
| 2007/0285338 | A1 | 12/2007 | Yanagisawa |
| 2008/0170130 | A1 | 7/2008 | Ollila et al. |
| 2008/0266323 | A1 | 10/2008 | Biocca et al. |
| 2009/0033588 | A1 | 2/2009 | Kajita et al. |
| 2009/0128564 | A1 | 5/2009 | Okuno |
| 2009/0207322 | A1 | 8/2009 | Mizuuchi et al. |
| 2010/0039353 | A1 | 2/2010 | Cernasov |
| 2010/0128228 | A1 | 5/2010 | Matsuo et al. |
| 2010/0156836 | A1 | 6/2010 | Katayama |
| 2010/0188397 | A1 | 7/2010 | Tsai et al. |
| 2010/0199232 | A1 | 8/2010 | Mistry et al. |
| 2010/0208033 | A1 | 8/2010 | Edge et al. |
| 2010/0277474 | A1 | 11/2010 | Ishihara |
| 2010/0303289 | A1 | 12/2010 | Polzin et al. |
| 2010/0325563 | A1 | 12/2010 | Goldthwaite et al. |
| 2011/0007962 | A1 | 1/2011 | Johnson et al. |
| 2011/0018903 | A1 | 1/2011 | Lapstun et al. |
| 2011/0019156 | A1 | 1/2011 | Chang et al. |
| 2011/0043627 | A1 | 2/2011 | Werling et al. |
| 2011/0140994 | A1 | 6/2011 | Noma |
| 2011/0228175 | A1 | 9/2011 | Nicoli et al. |
| 2012/0086729 | A1 | 4/2012 | Baseley et al. |
| 2012/0105473 | A1 | 5/2012 | Bar-Zeev et al. |
| 2012/0249416 | A1 | 10/2012 | Maciocci et al. |
| 2012/0249544 | A1 | 10/2012 | Maciocci et al. |
| 2012/0249590 | A1 | 10/2012 | Maciocci et al. |
| 2012/0249591 | A1 | 10/2012 | Maciocci et al. |
| 2013/0335301 | A1 | 12/2013 | Wong et al. |

FOREIGN PATENT DOCUMENTS

| | | |
|---|---|---|
| CN | 100426218 C | 10/2008 |
| CN | 101387908 A | 3/2009 |
| CN | 101479659 A | 7/2009 |
| CN | 101520904 A | 9/2009 |
| CN | 101727182 A | 6/2010 |
| CN | 101802873 A | 8/2010 |
| CN | 201576164 U | 9/2010 |
| CN | 101911127 A | 12/2010 |
| EP | 1213686 A2 | 6/2002 |
| EP | 1710002 A1 | 10/2006 |
| GB | 2470072 A | 11/2010 |
| JP | 2000215022 A | 8/2000 |
| JP | 2001216527 A | 8/2001 |
| JP | 2001282456 A | 10/2001 |
| JP | 2002149581 A | 5/2002 |
| JP | 2002157606 A | 5/2002 |
| JP | 2002247602 A | 8/2002 |
| JP | 2005084969 A | 3/2005 |
| JP | 2006293604 A | 10/2006 |
| JP | 2006295779 A | 10/2006 |
| JP | 2007057961 A | 3/2007 |
| JP | 2008090807 A | 4/2008 |
| JP | 2009505268 A | 2/2009 |
| JP | 2009080181 A | 4/2009 |
| JP | 2009104429 A | 5/2009 |
| JP | 2009116506 A | 5/2009 |
| JP | 2009134693 A | 6/2009 |
| JP | 2009146435 A | 7/2009 |
| JP | 2009251257 A | 10/2009 |
| JP | 2009290412 A | 12/2009 |
| JP | 2010145861 A | 7/2010 |
| JP | 2010186335 A | 8/2010 |
| JP | 2010217719 A | 9/2010 |
| KR | 20050110667 A | 11/2005 |
| WO | 2006030613 A1 | 3/2006 |
| WO | 2007020591 A2 | 2/2007 |
| WO | 2010062481 A1 | 6/2010 |
| WO | 2011109126 A1 | 9/2011 |
| WO | 2011129907 A1 | 10/2011 |
| WO | 2011132373 A1 | 10/2011 |

OTHER PUBLICATIONS

Point Grey Research: "Real-Time Immersive Experiences",Point Grey Case Study, Apr. 2009.*

Kolsch, M. et al.: "Touching the Visualized Invisible: Wearable AR with a MultimodalInterface", Center for Information Technology and Society, 2005, pp. 1-24.*

Campbell, "Gesture-based computing takes a serious turn (Hands-on with the next generation of computer interfaces)", New Scientist, Reed Business Information, Surrey, Aug. 14, 2010, p. 26, vol. 207, No. 2773, XP008153594, ISSN: 0262-4079, DOI: 10.1016/S0262-4079(10)61962-8 [retrieved on 200-08-13].

International Search Report and Written Opinion—PCT/US2012/031301, International Search Authority—European Patent Office, Jul. 19, 2012.

Kato, et al., "Virtual Object Manipulation on a Table-Top AR Environment", Augmented Reality, 2000. (ISAR 2000). Proceedings. IEEE and ACM International Symposium on., vol., No., pp. 111-119, 2000 doi: 10.1109/ISAR.2000.880934 URL: http://ieeexplore.ieee.org/stamp/stamp.jsp"tp=&arnumber=88093.

Kiyokawa, et al., "An occlusion-capable optical see-through head mount display for supporting co-located collaboration", Proceedings Second IEEE and ACM International Symposium on Mixed and Augmented Reality. Oct. 7-10, 2003. Tokyo, Japan. pp. 133-141.

Kolsch M. et al., "Touching the Visualized Invisible: Wearable AR with a Multimodal interface",Center for Information Technology and Society, 2005, pp. 1-24, XP002679519, University of California at Santa Barbara Retrieved from the Internet: URL:http://www.cs.ucsb.edu/holl/pubs/kolsch-2004-mmj.pdf [retrieved on Jul. 9, 2012] sections "Introduction", "Manipulation of Virtual Objects", "System Description","Hand Gesture Recognition", "Speech Recognition", figures 1, 6 table 2.

Ladurner, F., "Proseminar: Anwendungen fur Augmented Reality SS 2005",Vorlesungsverzeichnis Tu Munchen Sommersemester 2005, pp. 1-13, XP002679521,TU Munchen, p. 12, line 14-p. 13, line 2.

Mistry, P. et al., "SixthSense: A Wearable Gestural Interface", Proc. of Siggraph Asia, Dec. 16, 2009, p. 1, XP002680195, Yokohama, JP Retrieved from the Internet: URL: http://delivery.acm.org/10.1145/167000 0/1667160/all-mistry.pdf?ip=145.64.134.24&acc=ACTIVE%20SERVICE&CFID=96370255&CFTOKEN=33176710&_acm_=1342542382_a89677de3e661 ffcf76410f3155b35a6b [retrieved on Jul. 17, 2012.

Point Grey Research, "Real-Time Immersive Experiences ", Point Grey Case Study, [Online] Apr. 1, 2009, pp. 1-3, XP002679520, Retrieved from the Internet : URL: http://www.ptgrey.com/news/casestudies/pdf/ioTracker.pdf> [ retrieved on Jul. 9, 2012] section "Affordable and Accurate Cameras".

Reitmayr G., et al., "Scalable Techniques for Collaborative Outdoor Augmented Reality", proceedings of 15th ISMAR Conference, Oct. 2004, pp. 1-10, XP002679155.

(56) References Cited

OTHER PUBLICATIONS

Schmalstieg D., et al., "The Studierstube Augmented Reality Project", Presence, vol. 11 (1), Feb. 2002, pp. 33-54.
Schmalstieg et al., "Distributed applications for collaborative three-dimensional workspaces", Presence: Teleoperators and Virtual Environments, Feb. 2003, pp. 52-67, vol. 12, No. 1, MIT Press, XP002678534, ISSN: 1054-7460.
Sghmalstieg et al., "The studierstube augmented reality project", Presence: Teleoperators and Virtual Environments, Feb. 1, 2002, pp. 33-54, vol. 11, No. 1, XP002487626, ISSN: 1054-7460, DOI: 10.1162/105474602317343640, Retrieved from the Internet: URL:http://www.ims.tuwien.ac.at/media/documents/publications/schmalstieg_studierstube.pdf> [retrieved on .Dec. 31, 2002].
Thomas B., et al., "First Person Indoor/Outdoor Augmented Reality Application: ARQuake", Personal and Ubiquitous Computing, 2002, pp. 75-86, vol. 6, No. 1, Springer-Verlag , XP002679218, ISSN: 1617-4909.
Weiss M., et al., "BendDesk: Dragging Across the Curve", Proceeding of International Conference on Interactive Tabletops and Surfaces, [Online] Nov. 7, 2010-Oct. 10, 2010, pp. 1-10, XP002680194, SaarbrUcken, Germany Retrieved from the Internet: URL: http://hci.rwth-aachen.de/materials/publications/weiss2010d.pdf [retrieved on Jul. 17, 2012].
Zuras M., "Light Touch Pico Projector Creates Touchscreen Out of Anything", Switched—Aol Original, Jan. 8, 2010, pp. 1-6, XP002680193, Retrieved from the Internet: URL: http://www.switched.com/2010/01/08/light-touch-pico-projector-creates-touchscreen-out-of-anything/ [retrieved on Jul. 17, 2012].
Mistri P. et al., "WUW—Wear Ur World—A Wearable Gestural Interface," CHI 2009, Apr. 4-9, 2009, Boston, MA, USA, 6 pages.
Kato T., et al., "Development of Augmented Reality Interactive System Using Hands," Technical Report of IEICE. PRMU 105(533), Jan. 12, 2006, pp. 13-18.
Matsushita M., et al., "A Face-to-face Collaboration Support System that Optimizes Direction of Projected Information to Each Stakeholder," Information Processing Society of Japan, Jul. 2005, vol. 46, No. 7, pp. 1603-1617.
Minatani S., et al., "Remote Collaborative Tabletop Mixed-Reality by Using Deformed Billboard Technique," Transactions of Virtual Reality Society of Japan, Sep. 30, 2008, vol. 13, No. 3, pp. 363-373.
Bannai Y., et al., "Remote Collaborative Mixed Reality Using Tangible Objects", Journal of Information Processing, Japan, Information Processing Society of Japan, Jul. 15, 2007, vol. 48, No. 7, pp. 2465-2476.
Hiura S., et al., "Overview and Research Trends of Projector/Camera Systems", IPSJ SIG Technical Reports, Japan, Information Processing Society of Japan, Nov. 10, 2006, vol. 2006, No. 115, pp. 49-60.
Kurada T., et al., "Explanation Interface, Image Lab", Japan, Japan Industrial Publishing, Co., Ltd., Feb. 10, 2011, vol. 22, No. 2, pp. 35-42.

* cited by examiner understand# ANCHORING VIRTUAL IMAGES TO REAL WORLD SURFACES IN AUGMENTED REALITY SYSTEMS

CROSS REFERENCE TO RELATED PATENT APPLICATIONS

This patent application claims the benefit of priority to U.S. Provisional Patent Application Ser. No. 61/468,937 entitled "Systems and Methods for Gesture Driven Interaction for Digitally Augmented Physical Spaces" filed on Mar. 29, 2011, the entire contents of which are hereby incorporated by reference for all purposes.

This patent application is also related to U.S. patent application Ser. No. 13/434,258 entitled "Modular Mobile Connected Pico Projectors For A Local Multi-User Collaboration" filed on Mar. 29,2012, U.S. patent application Ser. No. 13/434,434 entitled "Cloud Storage Of Geotagged Maps" filed on Mar. 29, 2012, U.S. patent application Ser. No. 13/434,488 entitled "Selective Hand Occlusion Over Virtual Projections onto Physical Surfaces Using Skeletal Tracking" filed on Mar. 29, 2012, U.S. patent application Ser. No. 13/434,533 entitled "System For The Rendering Of Shared Digital Interfaces Relative To Each User's Point Of View" filed on Mar. 29, 2012.

FIELD OF THE INVENTION

The present application relates to an augmented or virtual reality system using a head mounted display, or other mobile devices such as smartphones or tablets, that can place a virtual object or interface on a selected physical surface so that a single user or multiple users can collaborate to, view and interact with the virtual object on the physical surface.

BACKGROUND

Increasingly, people are collaborating around the globe on a variety of media, including presentations, documents, videos, graphs and photographs. Generally, large flat panel displays in a conference room are an excellent source to view media including Microsoft® PowerPoint® presentations. Additionally, some furniture may include touch screen input devices so users can view video directly on the surface of a table top. Often such large items are very expensive and provide limited support for collaboration between users in remote locations. Individuals would benefit from being able to break free from these restrictions and gain a big screen virtual or augmented reality experience that is shared between both co-located users and remote users.

SUMMARY OF THE INVENTION

The various embodiments include methods of rendering virtual images in an augmented reality system, including capturing an image with a body mounted camera, capturing spatial data with a body mounted sensor array, recognizing an object within the captured image, receiving a first user input indicating a first anchor surface in the captured image that corresponds to a first surface located in the image, calculating parameters including distance and orientation with respect to the body mounted camera that correspond to the first anchor surface, displaying a virtual object so the virtual object appears anchored to the selected first anchor surface, receiving a second input indicating a second anchor surface within the captured image that is different from the first anchor surface, in which the second anchor surface corresponds to a second surface located in the image and the first and second surfaces may be different, calculating parameters including distance and orientation with respect to the body mounted camera that corresponds to the second anchor surface, and displaying the virtual object so the virtual object appears to the user to be anchored to the selected second anchor surface and moved from the first anchor surface. In an embodiment, the method may include continuously updating the display of the generated virtual object so the virtual object appears anchored to the selected first or second anchor surface as the user turns his/her head and moves with respect to the selected first or second anchor surface.

In a further embodiment, displaying the virtual object may include displaying the virtual object on a head mounted display, and the method may further include outputting video images as if appearing on the head mounted display anchored to the selected first or second anchor surface. In a further embodiment, displaying the generated virtual object so the virtual object appears to the user to be anchored to the selected second anchor surface and moved from the first anchor surface may include generating the virtual object as a rectangular shaped virtual object that resembles a flat screen display, and displaying the generated virtual object on a semitransparent display with the virtual object superimposed on a real world surface visible through the semitransparent display. In a further embodiment, the first or second anchor surface may include a wall in a room, and the virtual object remains anchored on the wall in the room as the user moves about in the room. In a further embodiment, displaying the generated virtual object so the virtual object appears anchored to the selected first or second anchor surface may include generating the virtual object so that it appears to be contacting the first or second anchor surface and so that the first or second anchor surface appear to be a rigid point of support for the anchored virtual object. In a further embodiment, displaying the generated virtual object so the virtual object appears anchored to the selected anchor surface may include generating the virtual object so that it appears to be spaced apart from the first or second anchor surface but hovering in a fixed position and spaced relative to the first or second anchor surface. In a further embodiment, the method may include transmitting data including the captured spatial data, the generated virtual object and the image to a second head mounted display.

In a further embodiment, the method may include receiving audio from the user utilizing a microphone, applying a detection algorithm to the received audio to detect a predetermined audio signal, and implementing the predefined user input when the predetermined audio signal is detected. In a further embodiment, applying a detection algorithm to the received audio to detect a predetermined audio signal may include applying a detection algorithm to the received audio to detect a predetermined audio signal spoken by the user corresponding to a predefined user input. In a further embodiment, the predefined user input corresponding to the detected predetermined audio signal may be one of the first input, the second input or a confirmation of one of the first and second inputs. In a further embodiment, the method may include capturing the image with the body mounted camera that is mounted and disposed together with a head mounted display, and displaying the virtual object on the head mounted display. In a further embodiment, the body mounted camera and head mounted display include a body mounted device, the method further including establishing a wireless data link between the body mounted device and a second body mounted device, receiving audio data from the second body mounted device via the wireless data link, and using the received audio data to output audio to the user.

In a further embodiment, the method may include receiving video data via the wireless data link, and using the received video data to output video images on the head mounted display received from the second body mounted device, in which the video displays an anchored virtual object. In a further embodiment, receiving video data via the wireless data link may include receiving one or more of a three dimensional model data for a virtual object, three dimensional data for an anchoring surface, three dimensional data for an anchoring point, three dimensional depth data, and three dimensional distance data. In a further embodiment, the method may include receiving a third input indicating a standby location for the virtual object, in which the standby location may be different from the first and the second anchor surfaces, calculating parameters including distance and orientation with respect to the body mounted camera that corresponds to the standby location, and displaying the virtual object at the standby location. In a further embodiment, the standby location may be displayed as free floating on a display, in which the virtual object appears on the display as movable and unconnected to surfaces in the image as the user turns his/her head and moves.

In a further embodiment, capturing an image with a body mounted camera may include capturing video data by a full-color video camera, and capturing spatial data with a body mounted sensor array may include capturing spatial data utilizing a distance sensor to determine distances to objects in the image. In a further embodiment, capturing spatial data with a body mounted sensor array may include capturing distance information of objects in the image using an infrared laser and an infrared sensor. In a further embodiment, the method may include building a three dimensional map based on the captured video data and the calculated spatial data.

In a further embodiment, the method may include tracking movements of the user utilizing the body mounted camera, applying a detection algorithm to the tracked user movements to detect a predetermined gesture, and executing a command corresponding to the predetermined gesture when the predetermined gesture is detected. In a further embodiment, the detected predetermined gesture may be selected from the group consisting of an "OK" sign, a fist, an open hand, pointing with one finger, pointing with two fingers, pointing with three or four fingers, an outstretched hand, a hand rotation, a wave, a movement of one or more fingers, a movement of a body part or a foot, and any combination thereof. In a further embodiment, the predetermined gesture may be retrieved from a gesture dictionary. In a further embodiment, the gesture dictionary may define one or more of a poke gesture, a pat gesture, or a tap gesture for target selection or toggling, a push gesture for guiding a screen object across a screen, a flick gesture for imparting momentum to the screen object, a turn gesture for rotating the screen object, a grab gesture or a pull gesture for zoom operations, a two hand move gesture for panning operations, a drawing hands apart gesture for resizing the screen object, and a swipe gesture for horizontal scrolling or shuttling through media. In a further embodiment, receiving the first input indicating a first anchor surface in the captured image may include detecting a first predetermined gesture made by the wearer corresponding to a command to designate a surface within the captured image as an anchor surface and applying the command, and receiving the second input to anchor the virtual object in the image may include detecting a second predetermined gesture made by the wearer corresponding to a command to move the anchor surface to another surface in the captured image and applying the command. In a further embodiment, either of the first or second detected predetermined gestures may include the user pointing to a surface in the captured image. In a further embodiment, the method may include continuing tracking movements of the user after the first input is received, applying a detection algorithm to the tracked movements to detect a third predetermined gesture corresponding to a user input confirming the first input, and anchoring the virtual object to the selected anchor surface in response to the third predetermined gesture.

Further embodiments include a system that may include a first head or body mounted device that may include a first head or body mounted camera, a first head or body mounted display, a first transceiver, and a first head or body mounted device processor coupled to the first camera, first display and first transceiver; and a second head or body mounted device comprising a second head or body mounted camera, a second head or body mounted display, a second transceiver, and a second head or body mounted device processor coupled to the second camera, second display and second transceiver. In further embodiments, the first and second head or body mounted device may be configured with processor-executable instructions to perform various operations corresponding to the method operations discussed above. Further embodiments may include a server that may include a memory and a server processor coupled to the memory, the server processor being configured with server-executable instructions to perform operations corresponding to the various methods discussed above and/or for transmitting information to the first or second head or body mounted devices via a network.

Further embodiments include a computing device that may include a processor configured with processor-executable instructions to perform various operations corresponding to the methods discussed above. Further embodiments include a computing device that may include various means for performing functions corresponding to the method operations discussed above. Further embodiments include a non-transitory processor-readable storage medium having stored thereon processor-executable instructions configured to cause a processor to perform various operations corresponding to the methods discussed above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device" and "handheld device" refer to any one of cellular telephones, smartphones, tablet computers, personal data assistants (PDA's), wireless electronic mail receivers, multimedia Internet enabled cellular telephones, Global Positioning System (GPS) receivers, wireless gaming controllers, netbooks, and similar personal electronic devices that include a programmable processor and memory, are configured to communicate with a wireless communication network, and have a web browser.

As used herein, the terms "computer," "personal computer" and "computing device" refer to any programmable computer system that is known or that will be developed in the future. In a preferred embodiment a computer will be coupled to a network such as described herein. A computer system may be configured with processor-executable software instructions to perform the processes described herein.

As used herein, the term "component," "module," and "system," is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution and a component may be localized on one computer and/or distributed between two or more computers.

Figure 16:
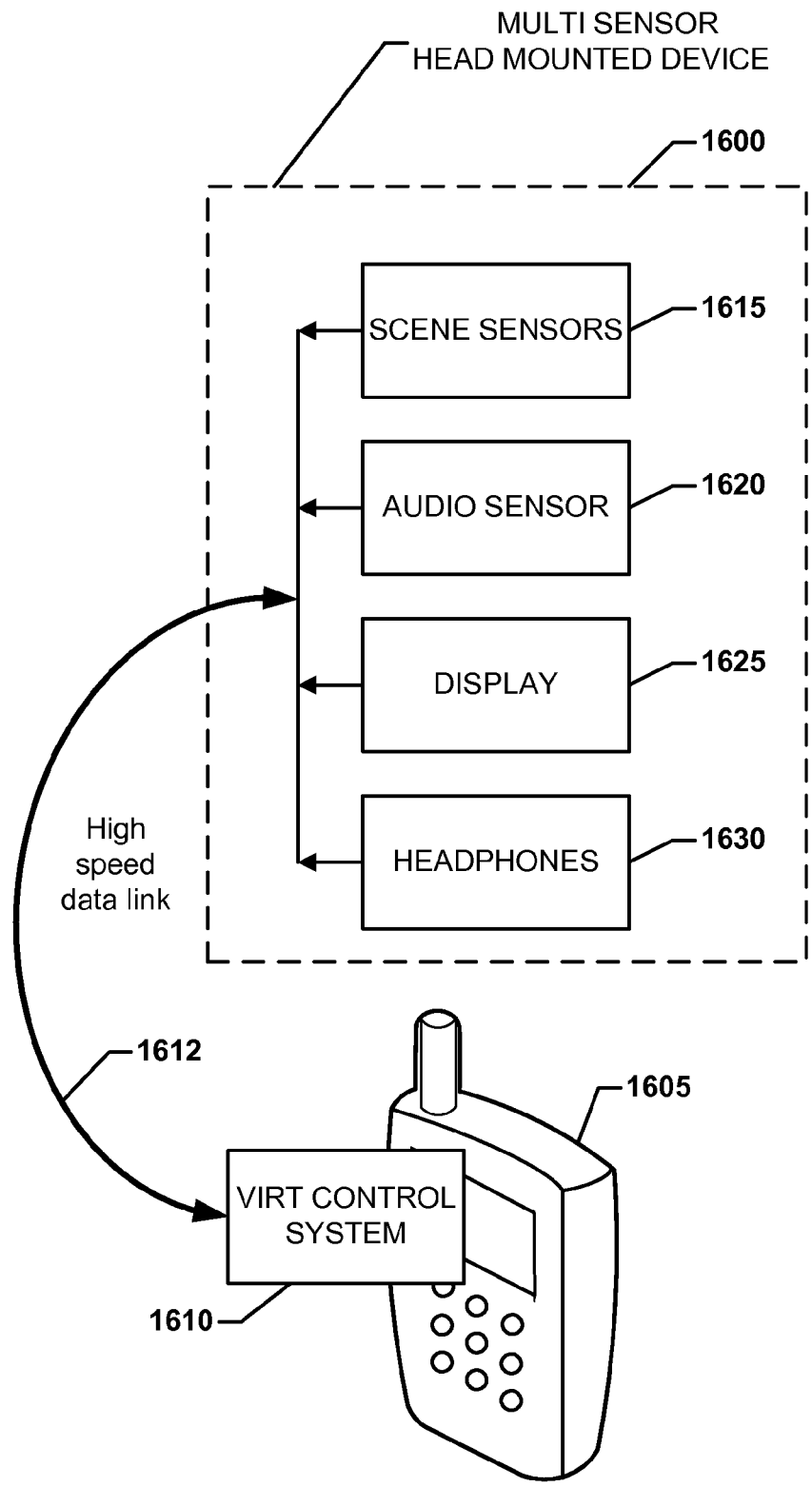
FIG. 16 is a side view of a head mounted device communicating with a mobile communication device via a high speed wireless data link so software is executed on the mobile communication device while the sensors capture data at the head mounted device.

As used herein, the term "head mounted device" (HMD) refers to a device that captures distance sensor data and has a display capability linked to a mobile processor, which may be a separate device relative to the head mounted device and as shown in FIG. 16. In an embodiment, the head mounted device 10 may be an accessory for a mobile device CPU (e.g., the processor of a cell phone, tablet computer, smartphone, etc.) with the main processing of the head mounted devices control system 1610 ("VIRT control system" in the figures) being performed on the processor of mobile device 1605. In another embodiment, the head mounted device may comprise a processor, a memory, a display and a camera. In an embodiment, head mounted device 10 may be a mobile device (e.g., smartphone, etc.) that includes one or more sensors (e.g., a depth sensor, camera, etc.) for scanning or collecting information from an environment (e.g., room, etc.) and circuitry for transmitting the collected information to another device (e.g., server, second mobile device, etc.).

In another embodiment, the head mounted device may include a wireless interface for connecting with the Internet, a local wireless network, or another computing device. In another embodiment, a pico-projector may be associated in the head mounted device to enable projection of images onto surfaces. The head mounted device is preferably lightweight and constructed to avoid use of heavy components, which could cause the device to be uncomfortable to wear. The head mounted device may also be operable to receive audio/gestural inputs from a user. Such gestural or audio inputs may be spoken voice commands or a recognized user gesture, which when recognized by a computing device may cause that device to execute a corresponding command.

The term "peer-to-peer network" is intended to encompass any form of peer-to-peer network technology known or that may be developed in the future. While some embodiments refer to peer-to-peer networks that make use of hypertext transfer protocol (HTTP) messaging, such references are intended merely to serve as examples, and not to limit the scope of the claims to any particular networking technology.

For ease of reference, examples illustrating the functioning of various embodiments may refer to networks as first and second networks or users, or to networks and users A and B. For example, a first user may be referred to as "user A" and a second user may be referred to as "user B." Such references in the figures and the descriptions are arbitrary and used to simplify network and user references, and thus are not intended to limit the scope of the claims to just two networks or just two users, or to limit particular users to particular networks, as the various embodiments support any number of networks and users.

Various embodiments will be presented in terms of systems that may include a number of components, and modules. It is to be understood and appreciated that the various systems may include additional components, modules, etc., and may not include all of the components, modules, etc. discussed in connection with the figures. A combination of these approaches may also be used.

Figure 1:
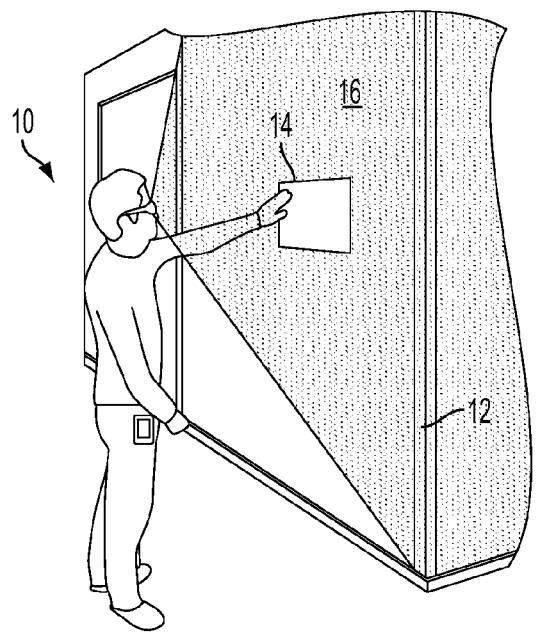
FIG. 1 is an illustration of a head mounted device with a virtual object anchored on a physical surface suitable for use with various embodiments.

Turning to FIG. 1, the various embodiments enable a head mounted device 10 to render a virtual object 14 displayed on an anchored surface 16 in order to provide an augmented reality experience that can facilitate interactions with a computing device and collaborations with other users. The various embodiments may include capturing an image with a camera that is head mounted or body mounted (e.g., on the neck, shoulder or arms of a user, or hand held). For ease of reference, the term "body mounted" as used herein and in the claims encompasses head mounted. In an embodiment, this camera may be a head or body mounted stereo camera, which can generate image data that a processor can analyze to estimate distances to objects in the image through trigonometric analysis of stereo images. Alternatively or in addition, the head mounted device may include one or more distance measuring sensors (e.g., a laser or sonic range finder) that can measure distances to various surfaces within the image. As discussed in more detail below, in the various embodiments a variety of different types of distance measuring sensors and algorithms may be used an imaged scene to measure for measuring distances to objects within a scene viewed by a user. Also, more than one sensor and type of sensor may be used in a head mounted device. Therefore, for ease of description and consistency, the various assemblages and types of distance measuring sensors that may be included on a head mounted device are referred to herein collectively or individually as "distance sensors."

Further, the head mounted device 10 may include orientation sensors, such as accelerometers, gyroscopes, magnetic sensors, optical sensors, mechanical or electronic level sensors, and inertial sensors which alone or in combination can provide data to the device's processor regarding the up/down/level orientation of the device (e.g., by sensing the gravity force orientation) and thus the user's head position/orientation (and from that viewing perspective). Further, the head mounted device may include rotational orientation sensors, such as an electronic compass and accelerometers, that can provide data to the device's processor regarding left/right orientation and movement. Collectively, sensors (including accelerometers, gyroscopes, magnetic sensors, optical sensors, mechanical or electronic level sensors, inertial sensors, and electronic compasses) configured to provide data regarding the up/down and rotational orientation of the head mounted device (and thus the user's viewing perspective) are referred to herein as "orientation sensors."

The system may be configured to recognize user inputs, which may be made through gestures that may be imaged by the camera, and identify surfaces or locations for positioning virtual objects within the imaged scene. A distance to the recognized object within the image may be determined from data gathered from a stereo image and/or a distance sensor. The head mounted device 10 may provide image and distance sensor data to and receive display information from a mobile processor which may be separate from the head mounted device, such as in a smartphone or other mobile device, as discussed in more detail below with reference to FIG. 16. This process of orienting the head mounted device with respect to the surroundings, and determining a distance to and orientation of various surfaces may be accomplished by each device being worn by a number of users so that a displayed virtual object is seen by each user from the perspective appropriate for each user. Further, this process may be accomplished continuously so that each head mounted device can triangulate its own position and angle of view as it moves in space by constantly referencing the shifts in the topography of scanned three-dimensional (3D) environment, thus performing Simultaneous Location and Mapping (SLAM) operations.

In an embodiment, the head mounted device 10 may receive a first user input indicating a first anchor surface 16 in a captured image. This input may be any of a variety of user inputs, such as in the form of a button press, a recognizable gesture performed in view of the head-mounted camera, a focused gaze by the user recognized as an image that remains relatively still for a predetermined period of time, or other recognizable input. The first anchor surface 16 may correspond to a first surface located in the image obtained by the camera of the head mounted device 10. A processor coupled to or within the head mounted device 10 may generate a virtual object 14 and calculate display-relevant parameters, including distance and orientation with respect to the head mounted or body mounted camera that correspond to a display location of the virtual object 14. When the user elects to display the virtual object 14 anchored to a designated anchor surface, the processor coupled to or within the head mounted device 10 may render the virtual object 14 on a display (or through a projector) so that the virtual object appears to be on the first anchor surface 16 when viewed through the display. The virtual object 14 may be any virtual object 14, including, for example, text, graphics, images and 3D shapes. When presented in this manner, the projection of virtual objects positioned at/on designated locations within the surrounding environment can create the experience of virtual reality and enable user interactions with the virtual object. The various embodiments enable natural interactions with virtual objects and digital assets (documents, pictures, videos, etc.). Such natural interactions with virtual objects and digital assets may include gesture controls, touch manipulations, highlighting of touched portions of the virtual object, etc. Recognizable gestures may be stored or organized in the form of a gesture dictionary accessible by head mounted devices. Such a gesture dictionary may store movement data or patterns for recognizing gestures that may include pokes, pats, taps, pushes, guiding, flicks, turning, rotating, grabbing and pulling, two hands with palms open for panning images, drawing (e.g., finger painting), forming shapes with fingers (e.g., an "OK" sign), and swipes, all of which may be accomplished on, in close proximity to, or addressing the direction of (in relation to the user) the apparent location of a virtual object in a generated display. In this manner, the various embodiments enable natural interactions with virtual objects, which may include gesture controls or other suitable control input methods.

The various embodiments may be implemented using different types of head mounted displays. Some head mounted displays may be semitransparent enabling the user to view the scene beyond the display, with projected images appearing superimposed upon the background scene. In other embodiments, the head mounted display completely blocks the user's view of the room. In this embodiment, the head mounted display provides a virtual or augmented reality experience. In order to see the objects in the room, images obtained by a camera or cameras worn by the user may be used to project a view of the room onto the head mounted display. In this embodiment, virtual objects may be added to the images projected on head mounted display, thereby appearing as real as the actual images obtained by the cameras.

In embodiments in which the head mounted display is nontransparent (i.e. fully occluded), the head mounted device 10 may display images of the scene in front of the user with virtual objects at 14 included in the display so that they appear anchored to the selected anchor surface 16. In this embodiment, the imaging sensors and head mounted device project onto the nontransparent display an image of the scene in front of the user. In order for the user to navigate to that scene, the user views the images obtained from the head mounted cameras on the head mounted display. This may include rendering into the display images of the user's hands, particularly when the user is moving his or her hands as part of a control gesture. If the virtual object 14 is anchored to a particular surface, the virtual object will not appear in the display when the user is looking away from the anchor surface. Since the head mounted display presents images generated by the head mounted device, including images obtained from body-mounted cameras, the system may display portions of the scene so virtual objects appear in front of the background. Thus, in this implementation, if a virtual image is presented on the head mounted display in front of the user's hands, the user's hands would not be visible to the user. As a result the virtual object may appear to be solid and nontransparent. This embodiment provides a virtual or augmented reality experience that includes displaying real images obtained by user-worn cameras combined with virtual objects presented on the same display.

In embodiments in which the head mounted display is semitransparent (i.e., user can see the background scene through the display), the head mounted device 10 may display the generated virtual object so the virtual object appears anchored to the first anchor surface 16 as seen by the user through the display. In this manner, the user may view a scene with a partially transparent head mounted display where real world objects, like a desk, a table and walls, are partially visible through the head mounted display which also places virtual objects within the visible scene. Visible virtual objects 14 may be anchored to or connected to real world objects 16. This embodiment provides an augmented reality experience in which the display is see-through or video see-through, allowing the user to see the real world through the display with virtual objects appearing to be fixed in real locations or on real surfaces.

For example, a virtual object 14 may resemble a flat screen television and may be connected to or "anchor" to a real world object or a real world wall 16, as illustrated in FIG. 1. As the user moves his or her head, the virtual object 14 normally would move on the display 10 with the user's field of vision. However, in this embodiment the virtual object 14 appears to remain on the anchor surface 16, similar to how a real world flat panel display would remain on a surface if the user turned his or her head.

Figure 2:
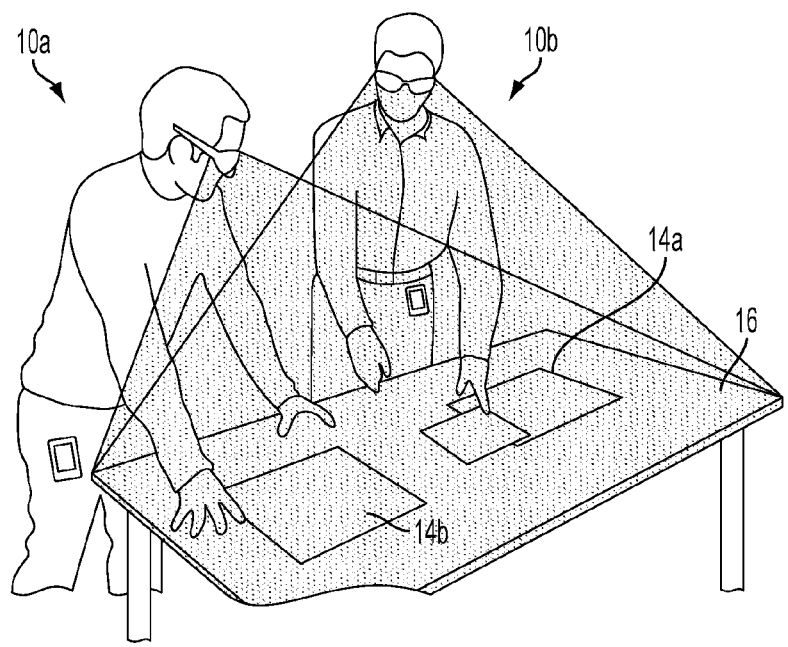
FIG. 2 is an illustration of two users standing at a table side by side from one another and wearing two head mounted devices for interacting with a virtual object.

In an embodiment, users may move the anchor surface 16 in a manner similar to how the user selected the first anchor surface. The user may discover that for a certain task that a different anchor surface will be preferable. The head mounted device 10 may receive a second input (gesture, audio, from an input device, etc.) indicating a new or a second anchor surface 16 within the image that is different from the first anchor surface 16. The second anchor surface 16 may correspond to a second different surface located in the image. Further, the first and second anchor surfaces may not be adjacent and the first surface may not be in view of the head mounted device cameras when the second/alternative surface is designated. For example, one surface might be a desktop 16 as shown in FIG. 2, while another surface may be a horizontal wall 16 or a ceiling as shown in FIG. 1. For example, a first user may select a first anchor surface 16 for personal usage and then select a second anchor surface 16 for a second user in a different geographic location. In an embodiment, the user inputs may be voice inputs, inputs provided using a tangible input device (keyboard or mouse), detected gestures, or may be provided by different users. A processor within or coupled to the head mounted device 10 may calculate parameters, including distance and orientation with respect to the head mounted or body mounted camera that corresponds to the second anchor surface 16. The processor within or coupled to the head mounted device 10 may then display the generated virtual object 14 so the virtual object appears to the user to be anchored to the selected second anchor surface 16. In another embodiment, instead of or in addition to a head mounted device 10, a pico projector may be used to project a virtual object 14 onto the selected anchor surface 16. The pico projector may be a separate modular device, and or may be included within the head mounted device 10.

FIG. 1 illustrates a user using a head mounted device 10. The head mounted device 10 may enable the user to designate nearby surfaces, such as a wall 12, as a virtual "flat panel screen" 16. The user may identify a nearby surface 16 using an input command. When multiple users are equipped with head mounted devices 10 connected to a common network or database, some or all of those users may see the same virtual object 14 at the same time, which enables collaboration and group discussions regarding the virtual object as if it were a real world object.

The processor driving the display on the head mounted device 10 may continuously update the displayed image of the generated virtual object 14 so that the virtual object 14 appears anchored to the anchor surface 16 as the user turns his/her head and moves with respect to the selected anchor surface 16. Thus, as the user moves and walks around the room, the virtual object 14 may appear to remain fixed on the physical surface 16. As part of maintaining this impression, the processor may modify the appearance of the virtual object 14 so that its shape, size and orientation match the user's viewing perspective of the anchor surface. Adjusting the shape, size and orientation of virtual objects may help to provide an immersive virtual or augmented reality experience. Unless the user enters a predefined specific input to move the virtual object 14 to another anchor surface, the virtual object 14 may remain static and seemingly adhered to the anchor surface. This may be beneficial for collaboration among a group of users, because the virtual object 14 may be a collaborative focal point for a conversation regardless of the location and viewing perspective of each user. For example, a first user may read media on the anchor surface or watch a presentation given by a second user. This will give the first user the appearance that the virtual object 14 is a real world or physical object similar to a flat panel screen, except that the first user may change the anchor surface 16 to a different surface or object in the room without disruption.

In a non-limiting example, the virtual object 14 may be a display output of a software application intended for collaboration. For example, the virtual object 14 may include text, media, television channels, movies, document word processing applications, email, video, telephone calls, social network postings, RSS feeds, etc. Such objects may be presented on the display to appear fixed to or on an anchor surface, similar to how the objects might appear on a conventional flat panel display, except that any surface may serve as the display. Additionally, the size of the virtual object anchored to a selected surface may be controlled by the user to enable the displayed object to be made larger or smaller. In another embodiment, the virtual object 14 may have a different appearance, such as being rendered on non-planar and non-rectangular surfaces, or rendered with a spherical or a seemingly three-dimensional shape. The presentation of the virtual object 14 on the head mounted display allows users to view and interact with the object as if it were a part of the physical environment. In an embodiment, the virtual object 14 may look different to each user.

In an embodiment, the virtual object 14 may be a three-dimensional model that is not anchored to a physical surface 16. In this embodiment, the virtual object 14 may be a three-dimensional model that appears floating in space. In this embodiment, the user may view the displayed virtual object 14 in free space with the virtual object 14 anchored to a selected three-dimensional position in free space which may be relative to walls, floors, furniture etc. In this embodiment, when the virtual object 14 is anchored to a particular location in space, the object will not appear to move as the user moves his/her head and moves around the anchor location, and thus around the virtual object. For example, the virtual object 14 may be presented on the partially transparent display so that it appears anchored in free space at a predetermined 3-D coordinate. In this embodiment, the display may display a prompt for the user to input a place or coordinates at which the system should display the virtual object 14 as free floating.

The processor may recognize an input command via a detected gesture (e.g., a finger pointing to a point in space) or may recognize an audio command to place the virtual object 14 as free floating in free space. The processor may display the virtual object 14 anchored to the indicated spatial point, or may connect the virtual object 14 to a position of the head mounted display so the virtual object 14 has the illusion of floating in space. As the user moves relative to the virtual object 14 in free space, the perspective, size, and orientation of the virtual object 14 may also change accordingly. For example, the virtual object 14 may be anchored to empty space located adjacent to the wall or outside floating above the ground and outside of a window. In this manner, users may inspect all sides of the virtual object 14 by walking around the free floating virtual object 14 in the room.

In the various embodiments, the input to anchor the virtual object 14 on a selected anchor surface or point in space may be provided in a number of different ways. For example, the camera associated with the head mounted device 10, or a second camera operatively connected to the head mounted device 10 may also track movements of the user. The processor may receive the images and may apply a detection algorithm to the tracked movements to detect a predetermined gesture made by the user. For example, the user may point to a surface, which the system may interpret as a specific input to the processor.

For example, the user may indicate with a gesture that a particular real world surface in the room is intended to be an anchor surface. The processor may execute a command corresponding to the predetermined gesture when the predetermined gesture is detected. For example, the processor may detect that a user is pointing to a particular surface. The processor may detect the surface and determine an angle of the surface with respect to the line of sight of the user, and anchor the virtual object 14 on the particular surface where the user pointed with an orientation and perspective consistent with the determined angle of the surface.

For example, the user may point to a desktop surface. The processor may be tracking the user's movements and may apply a detection algorithm to the tracked images. When the system images the user's arm outstretched with the index finger pointing and the remaining digits forming a fist, the processor may recognize such an image as user gesture and apply a corresponding command to anchor the virtual object 14 on the desktop where the user is pointing. For example, if the end of a user's finger contacts a surface to identify it as the anchor surface, the head mounted device may display the virtual object 14 as anchored to that surface.

In another example, a user may desire to move the virtual object 14 to "place" it on a different anchor surface 16. To accomplish this, the user may provide or execute a second predetermined gesture that a processor coupled to the head mounted device 10 may recognize. The second predetermined gesture may be the same as that used to designate the first anchor surface, such as a general command to designate a surface within the captured image as an anchor surface 16, or may be a different gesture. Many different gestures can be made and are within the scope of the present disclosure. For example, the detected predetermined gesture may be an "OK" sign, a fist, an open hand, pointing with one finger, pointing with two fingers, pointing with three or four fingers, an outstretched hand, a hand rotation, a wave, a movement of one or more fingers, a movement of a body part (e.g., movement of a foot), or other arbitrary movements.

Also, designation of an anchor surface 16 and other inputs or commands may be provided verbally with the input received by a microphone on or coupled to the head mounted device 10 or coupled to the processor in turn coupled to the head mounted device. The processor within or coupled to the head mounted device may receive audio signals from the microphone, and may process such signals using speech recognition processes. The processor may compare received audio signals to audio patterns of one or more commands stored in a memory in order to recognize a spoken command. For example, the processor may monitor audio inputs for a few predetermined command words. In this manner, the user may speak with colleagues and other networked users, such as to discuss virtual objects, without saying a command keyword. The processor may apply a detection algorithm to the received audio so that it only responds to particular predefined audio commands, or commands proceeded by a predefined attention command (e.g., "computer" or "execute" etc.). For example, the user may say "anchor image on desk" to cause the processor to anchor the virtual object to a desk within the field of view of the head mounted device camera. The processor within or coupled to the head mounted device 10 may recognize these spoken words as a command input, and implement corresponding actions to anchor the virtual object 14 "on" the desk or anchor surface 16.

In another embodiment, the processor may be programmed to detect command inputs, but then wait for a confirmation prior to implementing any command. This confirmation may be advantageous to avoid inadvertently moving a virtual object 14 by an unintentional gesture or by an inadvertent audio command during a group collaboration regarding the object. In this embodiment, the virtual object 14 will not be placed, moved or anchored to a surface in response to a command unless a confirmation or confirming command is received. For example, the processor may process images from a camera to identify gesture commands and/or audio signals received from a microphone to identify spoken commands, such as a single word or a sentence. When a gesture or spoken command is recognized, the processor may prompt the user to confirm the command and await confirmation input, which may be in the form of a button press, a spoken word, a physical gesture, or combinations thereof. When the processor recognizes the appropriate confirmation or confirming command, it may execute the command associated with the first recognized gesture or audible command. If the confirmation command is not received, the processor may ignore the detected gesture or audible command.

In another embodiment, a mobile computing device, such as a smartphone with camera may operate as a 'magic lens' for users that are not wearing a head mounted display. In this embodiment, a user with a computing device connected to a system via a wireless data link may view the virtual objects on the device's display. This allows those users without a head mounted device to view the virtual objects and structures in the image, such as the anchor surface, in a manner similar to the way it appears on head mounted displays. For example, a first user may view a virtual object 14 connected to a wall on a head mounted display which communicates the image data to a second user's smartphone or PDA display so the second user may view the virtual object 14 as it appears anchored on a wall or other surface. In another embodiment, modular pico projectors may be linked to a mobile device and used to project images of virtual objects.

In various embodiments, the head mounted devices 10 include wireless communication capabilities which enable exchanging of data between two or more devices to enable two or more users to interact with and collaborate on documents, files and virtual objects. In this manner, the head mounted devices 10 can facilitate collaboration by multiple users over virtual objects, such as providing a virtual or augmented reality experience enabling users to interact with and view three-dimensional virtual objects from various perspectives. To enable such a collaboration experience, the head mounted devices 10 may transmit to each other three-dimensional virtual object models and/or data sets for rendering on their respective displays. The head mounted devices 10 may also receive data files, such as coordinate maps and three-dimensional virtual object models and/or data sets from other computing devices, such as network servers. Also, image data generated by one or more of the head mounted devices involved in a collaboration may be transmitted to and displayed on head mounted devices or other mobile devices such as smartphones or tablet computers used by non-participants, enabling others to view the collaboration in a virtual or augmented reality experience. Others viewing a collaboration session wearing head mounted devices or using another mobile device such as a smartphone or tablet may not only see the virtual objects and user interactions with them, but have limited interaction capabilities with the virtual augmentations seen by one of the head mounted device users. This limited interaction may include touching the augmentation to cause an effect, defining an interactive area or anchor point on the physical surface (effectively adding a new augmentation to the shared experience), and interacting with the shared mixed reality scene via gestural and/or audio inputs. Any of such changes in the virtual experience may be reflected in the head mounted displays worn by the other users.

FIG. 2 illustrates two users using first and second head mounted devices 10a, 10b to view virtual objects anchored to a surface, such as a desk table top 16. In the illustrated example, the anchor surface 16 corresponds to the desk top surface 16, which is located within the image displayed by the first head mounted device 10a. The head mounted device 10a may generate a virtual object 14a, which is shown as a virtual screen in this illustration, and display the virtual object 14a as if it were connected to the desk top surface 16. If the first user looks to the left, to the right or rearward, the virtual object 14a will not travel within the field of view of the head mounted device 10a, and instead will remain displayed on the desktop surface 16 anchored in place. For example, the virtual object 14a will no longer appear within the head mounted device screen if the first user looks away from the anchor surface 16. Also, the virtual object 14a may be presented to the first user in the orientation, shape and size, as it would appear if the anchor surface 16 were a flat panel display. Thus, the virtual object 14a may be displayed with a shape and size resulting from projecting the object's shape onto the anchor surface from the user's perspective. To accomplish this, the processor within or coupled to the head mounted device 10a may calculate shape parameters including distance and orientation with respect to the head mounted or body mounted camera 10a and distance sensors in order the generate a virtual object image at or on the anchor surface. Such calculations may implement well known vector projection algorithms to yield the image that is presented in the head mounted display. By applying vector processing of the image consistent with normal experience (e.g., normal Euclidean geometric projections) and presenting the resulting virtual object 14b on a semitransparent display that also enables the user to see objects beyond the display, the result can fool the senses of the user so the virtual objects appear to behave as real objects.

For collaborative purposes, a second user may wear a second head mounted device 10b to view the same virtual object within the same physical space. The processor within or coupled to the second head mounted device 10b may render the virtual object on a user-selected anchor surface 16. The second head mounted device 10b may display the virtual object 14b on the same anchor surface or position as designated for the first head mounted device 10a. The second user may also designate a different position or anchor surface for rendering the virtual object 14b as seen through the second head mounted device 10b. In order to enable the second head mounted device 10b to properly render the virtual object 14b on the anchor surface from the second user's perspective, the data transmitted from the first head mounted device to the second head mounted device may include the shape or object data. This data may enable the second head mounted device processor to render a displayed image of the virtual object corresponding to the second user's viewing perspective. The virtual object data may be in the form of a geometric model, coordinates and fill data, or similar rendering data that may be used in a three-dimensional object rendering module implemented in a processor within the second head mounted device 10b.

In some implementations or situations, the second head mounted device 10b may receive image data from the first head mounted device 10a showing the virtual object anchored to the anchor surface 16. In such cases, the processor within or coupled to second head mounted device 10a may receive video data generated by the first head mounted device 10a via a wireless data link, and simply display the received video data as output video images. In this application, the second user views the scene and the anchored virtual object 14a on the second head mounted display from the first user's perspective. Thus, in this implementation the second user may experience the first user's viewing experience like a movie or TV video. This first-user-perspective may be very useful in some situations, such as when the first user is showing the second user how to do something for training or the second user is supervising the activities of the first user. In this situation, the data sent over the data link may be a simple video and audio stream, and the second head mounted device may simply project the received image onto the head mounted display with further processing or rendering of virtual objects. As described below, the video and image data from the first head mounted device may also be transmitted (e.g., via a network, server or peer-to-peer wireless data link) to other computing devices, such as smartphones, tablet computers, laptop computers or large video displays, to enable others to view and share in the virtual/augmented reality experience of the first user.

The second head mounted device 10b may display the virtual object 14b on the desk top surface 16. Alternatively, the second user may designate another anchor surface on which the virtual object 14 should be displayed. When the virtual object 14a is displayed on the first anchor surface 16, the second head mounted device 10b may modify the size and shape of the object so that it appears appropriate for the second user's perspective. For example, if two users are viewing the same object on either side of a table or desk, the object may appear upside down to one of the users, just as if it were a real object. Alternatively, both users may view the same object in the same manner, so that both view the object right side up.

For example, if the second user 10b moves closer to the desktop anchor surface 16, the virtual object 14b may become larger. If the second user 10b moves further from the desktop anchor surface 16, the virtual object 14b may become smaller. Further, if the second user 10b rotates the display relative to the horizontal, the virtual object 14b may similarly compensate for the rotation to appear anchored to the desktop anchor surface 16. As a further example, the user may move with his/her arms and hands in a manner that appears to interact with the object 14b in order to close it or remove it from the display, such as sweeping an arm as if to brush the virtual object aside, closing fingers around the virtual object, or punching the virtual object 14b. As a further example, a second user 10b may execute gestures that attempt to pull or push the virtual object 14b and this pulling or pushing can be interpreted as an input command. As mentioned above, recognizable gestures may be stored in a gesture dictionary which may store movement data or patterns for recognizing gestures that may include pokes, pats, taps, pushes, guiding, flicks, turning, rotating, grabbing and pulling, two hands with palms open for panning images, drawing (e.g., finger painting), forming shapes with fingers (e.g., an "OK" sign), and swipes, all of which may be accomplished on or in close proximity to the apparent location of a virtual object in a generated display. In this manner, users may interact with a virtual object 14b anchored to a surface 16 using gestures that would be suitable for a real world object, thereby making interactions with virtual objects intuitive and easy to learn.

In an embodiment described in more detail below, the head mounted displays may be replaced by projectors so that the images are projected onto a surface. In such an embodiment, the operations and experience of the users may be similar to using head mounted displays as discussed above. Also, as new image presentation technologies are developed, such technologies may be implemented with the various embodiments to render virtual objects in conjunction with real world anchor surfaces and viewed by user from their perspectives.

Figure 3:
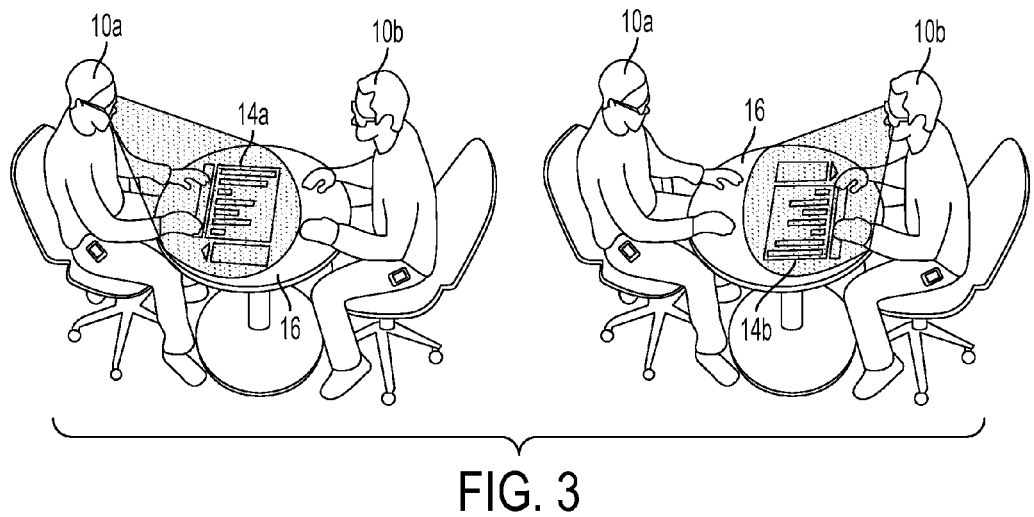
FIG. 3 is an illustration of two users sitting at a table across from one another and wearing two head mounted devices for interacting with a virtual object and with the virtual object being correctly oriented for each user.

FIG. 3 illustrates the virtual object 14a presented to two users wearing head mounted devices 10a, 10b so the virtual object appears to each user upside up (i.e., not upside down) even though the two users are facing each other. This self-orientation of the virtual object allows both users to view the object data (e.g., a bar chart) correctly.

As mentioned above, this presentation of the virtual object 14a, 14b may be accomplished by the head mounted device 10a capturing an image of the table 16 utilizing a head mounted or body mounted camera. The image may be displayed in the head mounted display 10a, or the table may be viewed through a semi-transparent display. The virtual object 14a for a first user may be displayed on the head mounted device 10a. The first user may formulate a signal using the first head mounted device 10a indicating that a second virtual object 14b should be generated for a second user. The first user may also provide an input indicating the anchor surface 16 in the captured image. The processor within or coupled to the head mounted device 10a may calculate parameters including distance and orientation with respect to the head mounted or body mounted camera 10a that corresponds to the anchor desk top surface 16 that was selected by the first user. The head mounted device 10a displays the generated virtual object 14a so the virtual object 14a is anchored to the anchor surface 16 and include the first orientation. The first virtual object 14a may then be displayed by the display on the first head mounted display 10a as if connected to the first anchor surface 16a.

In FIG. 3, a second user wearing a second head mounted device 10b sits across from the first user. The second head mounted device 10b may either receive an input to select the desktop to be the anchor surface 16 or may receive data from the first head mounted device 10a identifying the selected anchor surface 16. Using this information the second head mounted device 10b may generate a display of the virtual object 14b reoriented to appear right side up and with the proper perspective for the second user. To generate this display, the second head mounted device 10b may receive data regarding the virtual object to be rendered, such as its content and data regarding its general shape and orientation. The second head mounted device 10b may use the anchor surface selected by the first user (or another anchor surface selected by the second user) to determine a location, orientation and perspective for displaying the virtual object. This may include determining a proper top of the object, and an angle of projection of the object to match the anchor surface that results in the proper perspective of the rendered object. Thus, as illustrated in FIG. 3, the second user views the same virtual object 14b anchored to the desk top surface 16 but right side up from the second user's perspective.

In an alternative embodiment, first head mounted device 10a or another computing device in communication with both head mounted device may determine the proper orientation and perspective of the virtual object 14b for the second head mounted device 10b. In this case, the first head mounted device 10a may receive information sufficient to enable the device to determine an orientation of the second user or of the second head mounted device 10b. For example, images of the second user may be captured by cameras on the first head mounted device and processed using anatomical models to determine the second user's position and viewing perspective. The first head mounted device 10a may then transmit the virtual object data to the second head mounted device in a manner that correctly orients the virtual object 14b for the second user 10b based on the determined user orientation.

In various embodiments, the second user may provide inputs to the second head mounted device 10b to control or change the orientation, size, and shape (e.g., perspective) of the virtual object 14b. For example, the second user utilizing a detected gesture input command may drag the corners of the virtual object 14b to make it larger or smaller. As another example, the second user may minimize the virtual object 10b and open a new application or virtual object.

Figure 4:
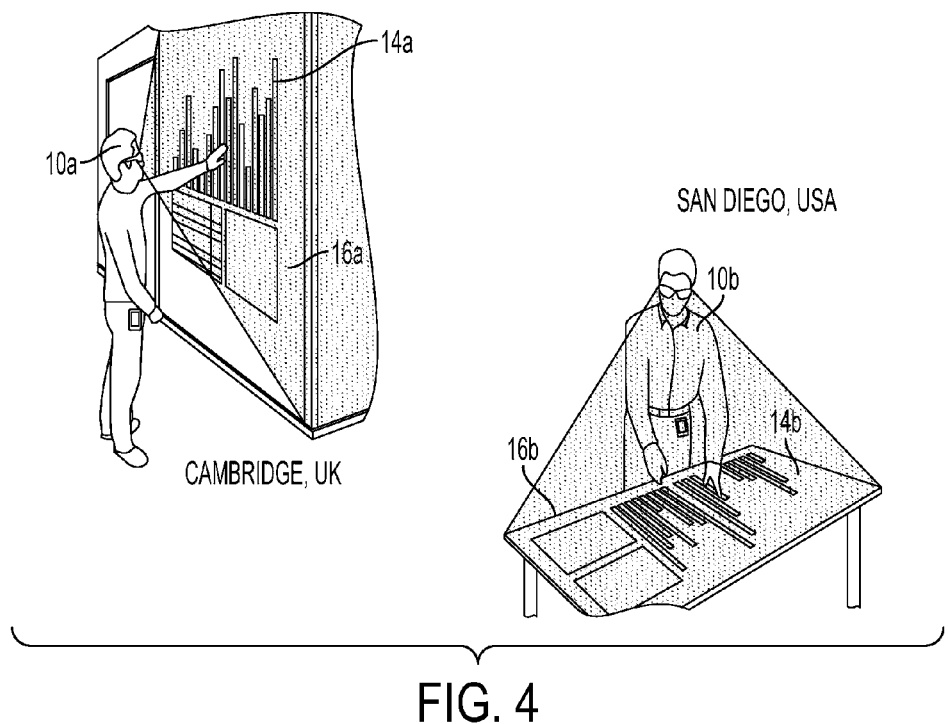
FIG. 4 is an illustration of two users at two different remote locations wearing two head mounted devices and collaborating and studying the same virtual object, which is correctly oriented for each user.

As illustrated in FIG. 4 two users viewing the same virtual object need not be in the same room. For example, a first user wearing a first head mounted device 10a at a first location, for example, Cambridge, United Kingdom, may view a virtual object 14a (e.g., a presentation or graph) anchored on a first anchor surface 16a (e.g., a wall) and collaborate regarding the virtual object with a second user wearing a second head mounted device 10b at a second location, for example, San Diego, Calif., who may view the virtual object 14b anchored to a very different anchor surface 16b, such as a table top. The head mounted device 10a may communicate with the second head mounted device 10b via any computer network known in the art that interconnects the devices 10a and 10b and that allows users to share resources by wired and wireless communication links.

For example, the first head mounted device 10a may transmit via a communication network a signal correctly orienting the second virtual object 14b for the second head mounted device 10b and a signal generating the oriented second virtual object 14b for the second user 10b. The second head mounted device 10b may receive the signal from the communication network and may generate the second virtual object 14b for the second user 10b.

In another embodiment, images of the first and/or second users can be captured over time by the head mounted or body mounted camera and used to determine an appropriate orientation for virtual objects. An anatomical analysis can be applied to the captured images to determine the current posture and orientation of the user, such as with respect to a designated anchor surface. For example, the images may be compared to anatomical data stored in memory to detect a body part within the images and determine an orientation of the user. The second virtual object 14b for the second head mounted device 10b may be oriented correctly based on the detected body part in the images of either the first user (i.e., to present the image to the second user in the manner it appears to the first user) or the second user (i.e., to present the image in a manner suitable for the second user's posture). For example, images of the second user may be captured, tracked and compared to anatomical data stored in memory where the second user's head, shoulders, arms, torso, legs or any other body part or a portion thereof may be detected. The second head mounted device 10b may orient the virtual object based on the detected body parts. The second virtual object 14b may be oriented in the first orientation and displayed.

A time period later, the second user may move and the first orientation may not be appropriate based on the different orientation and the user's new location. For example, parameters may be calculated including distance and orientation with respect to the second head mounted or body mounted camera 10b that correspond to the second anchor surface 16b with the recognized object located in the image. An image size and an orientation may be determined that correspond to the determined orientation for the second virtual object 14b after such a movement. The second head mounted device 10b may then display the generated second virtual object 14b so the second virtual object 14b appears anchored and connected to the second anchor surface 16b. For example, the detected body part may be utilized to determine where the second user is looking and the second virtual object 14b may be oriented correctly based on where the second user is looking.

In another embodiment, the detected body parts may be utilized to determine whether the second user is sitting or standing. Based on the determination, the second virtual object 14b may be generated to be anchored to and oriented on a planar surface adjacent to the second user. If it is determined based on the detected body part that the second user is standing, the second virtual object 14b may be generated on a vertical surface adjacent to the second user.

In the illustration of FIG. 4, the anchor surface 16a is a wall located within the image displayed by the head mounted device 10a. For the first user, the head mounted device 10a may generate a virtual object 14a and display the virtual object 14a as though fixed or connected to the wall surface 16 and oriented so that it is right side up for the first user. The head mounted device 10a processor may calculate parameters for rendering the virtual object including distance and orientation from the head mounted device 10a to the wall 16 selected by the first user as the anchor surface. The head mounted device 10a may include or be coupled to a mobile CPU that is coupled to a transceiver configured to communicate with a router to communicate data via a network, such as the Internet, to the second head mounted device 10b. Similarly, the second head mounted device 10b may also include a transceiver to communicate with a network to send/receive data via a network, such as the Internet, an intranet, a wireless network, or any other appropriate telecommunications network.

Either of the first and second head mounted devices 10a, 10b may initiate a collaboration session and send a request for such a session to the other via a network, such as the Internet, such as by sending messages to the IP address associated with the other head mounted device. In another embodiment, the head mounted device 10a may communicate with the second head mounted device 10b via a server that includes program instructions to execute a service to share resources among the two devices 10a and 10b.

As an example, a collaboration session between a first and second user both equipped with head mounted devices may proceed as follows. When an asset or virtual object is added or anchored to a surface by one user, that user's head mounted device may transmit a message to the other user's head mounted device indicating a preferred placement of the new asset or object in a manner that is relative to an existing asset or virtual object already displayed on a previously selected anchor surface. This preferred placement of the new asset or object may then be overridden by the system automatically or users through user inputs (e.g., recognized movement gestures) if there is inadequate space for both objects on the original anchor surface. Also or alternatively, one or both of the users may execute an input or gesture in order to manually reposition the new asset or virtual object to position or surface of their preference.

In another embodiment, the first head mounted device 10a may deliver a message to the second head mounted device 10b data indicating a preferred or suggested placement of the virtual object 14b. For example, the first user may indicate that the preferred placement of the virtual object 14b should occur on a desk 16b or on a wall. For example, a message may be sent from the first head mounted device 10a indicating "Wall Surface Preferred" or "Desktop Surface Preferred" to the second head mounted device 10b. The second head mounted device 10b may generate a second virtual object 14b on the display. The message may also include one or more program instructions to correctly orient the virtual object 14 for the second user. The second head mounted device 10b may receive an input to select the desktop as the anchor surface 16b or may receive data from the first head mounted device 10a that the anchor surface 16 is selected as a wall. In the case of the latter alternative, a processor within or coupled to the second head mounted device 10b may detect a comparable wall within images obtained by a camera on the device. Program instructions may also be communicated to the processor for the user to accept or reject the suggested anchor surface from another user. The head mounted display 10b may receive an input command from the second user in the form of a spoken audio signal to accept or to reject the suggested anchor surface. The second head mounted device 10b may receive the message indicating a preferred placement of the second virtual object 14b and the second user may provide an input to the second head mounted device 10b confirming or rejecting the preferred placement of the second virtual object 14b. For example, the second user may provide an input indicating a desire to rotate and reorient the second virtual object 14b. The processor may determine distance and orientation based on the input for the second virtual object 14 and may generate the second virtual object 14b with the desired orientation.

The second head mounted device 10b may display the virtual object 14b on the desk top surface 16b at the second location. The second user may further provide inputs to change the orientation, size, and shape of the virtual object 10b to suit the anchor surface 16b. The virtual object 14b appears the same virtual object 14a and collaboration may occur between the users. Changes made at one location by one user may update and be shown at both the first and the second locations, i.e., changes to virtual object 14a in one location will be reflected in the virtual object 14b displayed in the other location. For example, the second user may delete a bar chart on the virtual object 14b and the same bar chart on the virtual object 10a may also be deleted at the first location.

In yet another embodiment, a third user wearing a third head mounted device may join in the collaboration and anchor a displayed virtual object on a surface selected by the third user or suggested by either of the first or second users. Also, as described above, image data generated by one or more of the head mounted devices involved in a collaboration may be transmitted to and displayed on other head mounted devices or other computing devices, such as smartphones or tablets used by non-participants. This embodiment enables others to view the collaboration in a virtual or augmented reality experience. Others viewing a collaboration session wearing head mounted devices or using another mobile device such as a smartphone or tablet computer may not only see the virtual objects and user interactions with them, but have limited interaction capabilities with the virtual augmentations seen by one of the head mounted device users. This limited interaction may include touching the augmentation to cause an effect, defining an interactive area or anchor point on the physical surface (effectively adding a new augmentation to the shared experience), and interacting with the shared mixed reality scene via gestural and/or audio inputs. Any of such changes in the virtual experience may be reflected in the head mounted displays worn by the other users.

In an embodiment, the second user wearing the second head mounted device 10b may provide an input to summon a new virtual object from a personal data space (e.g., cloud or mobile device) and add the new virtual object to a shared display so the first user also sees it in the first head mounted device 10a. In an embodiment, the first head mounted device 10a may receive a prompt which informs the user that a third virtual object is present and requests a user input or command to accept and display the third virtual object. The user may select a new physical surface to anchor the new virtual object to, or may accept the anchor surface selected by the second user.

In an embodiment, the processor within or coupled to the head mounted device 10a may receive an input indicating a standby location for a virtual object 14. The standby location may be a location where an initial condition of the virtual object 14 can be displayed as not anchored or fixed to a real world surface. The standby location may be a location where the virtual object 14 is "free floating" on the display unconnected to a real world object. Alternatively, the standby location can be a different anchor surface 16 located in the image, for example, on a ceiling, or a repeated and familiar location for the user. The standby location may be a place or surface where the object can be "stored" until the user takes further action to anchor the virtual object 14 to an anchor surface. The processor within or coupled to the head mounted device 10a may calculate parameters including distance and orientation with respect to the head mounted or body mounted camera that corresponds to the standby location and the processor may display the virtual object 14 with the proper perspective for the standby location. The standby location may be displayed as free floating and may appear to be movable and unconnected to surfaces in the image as the user turns his/her head and moves about the room.

In an embodiment, the processor within or coupled to the head mounted device 10a may capture an image with a head mounted or body mounted camera or cameras which may be full-color video cameras. Distances to objects within the imaged scene may be determined via trigonometric processing of two (or more) images obtained via a stereo camera assembly. Alternatively or in addition, the head mounted device may obtain spatial data (i.e., distances to objects in the images) using a distance sensor which measures distances from the device to objects and surfaces in the image. In an embodiment, the distance sensor may be an infrared light emitter (e.g., laser or diode) and an infrared sensor. In this embodiment, the head mounted device may project infrared light as pulses or structured light patterns which reflect from objects within the field of view of the device's camera. The reflected infrared laser light may be received in a sensor, and spatial data may be calculated based on a measured time or phase shift between the emitted and received light. In another embodiment, the distance sensor may be an ultrasound emitter and receiver. In this embodiment, the head mounted device may emit ultrasound pulses, which reflect from objects within the field of view of the device's camera. An ultrasound receiver senses reflected ultrasound, and calculates spatial data based on a measured time between sound emissions and received reflected ultrasound. In a third embodiment, distances to objects may be estimated by measuring changes in angles in subsequent images in a video stream as the user's head moves and applying trigonometric analyses to the sequence of images. By including motion and/or relative position sensors in the head mounted device, changes in viewing angle may be correlated to changes in camera position, from which object/surface distances and locations may be calculated using trigonometric algorithms. Any combination of these distance-measuring methods may be combined to further refine the distance measurements obtained by the head mounted device.

In an embodiment, the processor within or coupled to the head mounted device 10 may store the spatial data in memory and may build a three-dimensional map of objects and surfaces within the vicinity of the device based on the captured video and the measured or calculated spatial data. This three-dimensional map may be shared with other head mounted devices within the vicinity or connected via a network, and/or uploaded to a server. Sharing such three-dimensional map data may assist other head mounted devices 10b (or more specifically the processors within or coupled to the other head mounted devices) to render virtual objects anchored to a designated anchor surface without having to image and process the room. Sharing of such three-dimensional map data may also enable multiple head mounted devices to collaboratively create an overall map of the vicinity of the multiple users, and reduce the workload imposed on any one head mounted device by avoiding the need to scan the same environment multiple times (i.e., the three-dimensional map only needs to be generated once). In a further application, the sharing of image and spatial data, such as a three-dimensional map of objects in the vicinity of a first user, may enable other users to view the same images as the first user even when they are located far away. For example, a second device may utilize the map where data can be transmitted that corresponds to captured spatial data so another user wearing a second head mounted device may display the virtual object 14 in the same manner as the first user.

As explained above, the display associated with the head mounted device 10a or 10b may be partially transparent or may substantially occlude all or a portion of the user's view. In another embodiment, the head mounted device 10a display may be positioned over only one eye so that it occludes only a portion of the user's vision, such as in the form of a monocular display so one user's eye is able to view the room unobstructed. In another embodiment, the head mounted device 10a or 10b may output the virtual object 14a or 14b content to a computing device display so that the images obtained by the head or body mounted cameras and any virtual objects may be viewed together on a conventional computer display.

As mentioned above, the head mounted displays may be replaced by projectors that project images onto a surface, or by other image generation technologies that may be developed. In such an embodiment, the operations and experience of the users may be similar to that using head mounted displays as discussed above.

Figure 5A:
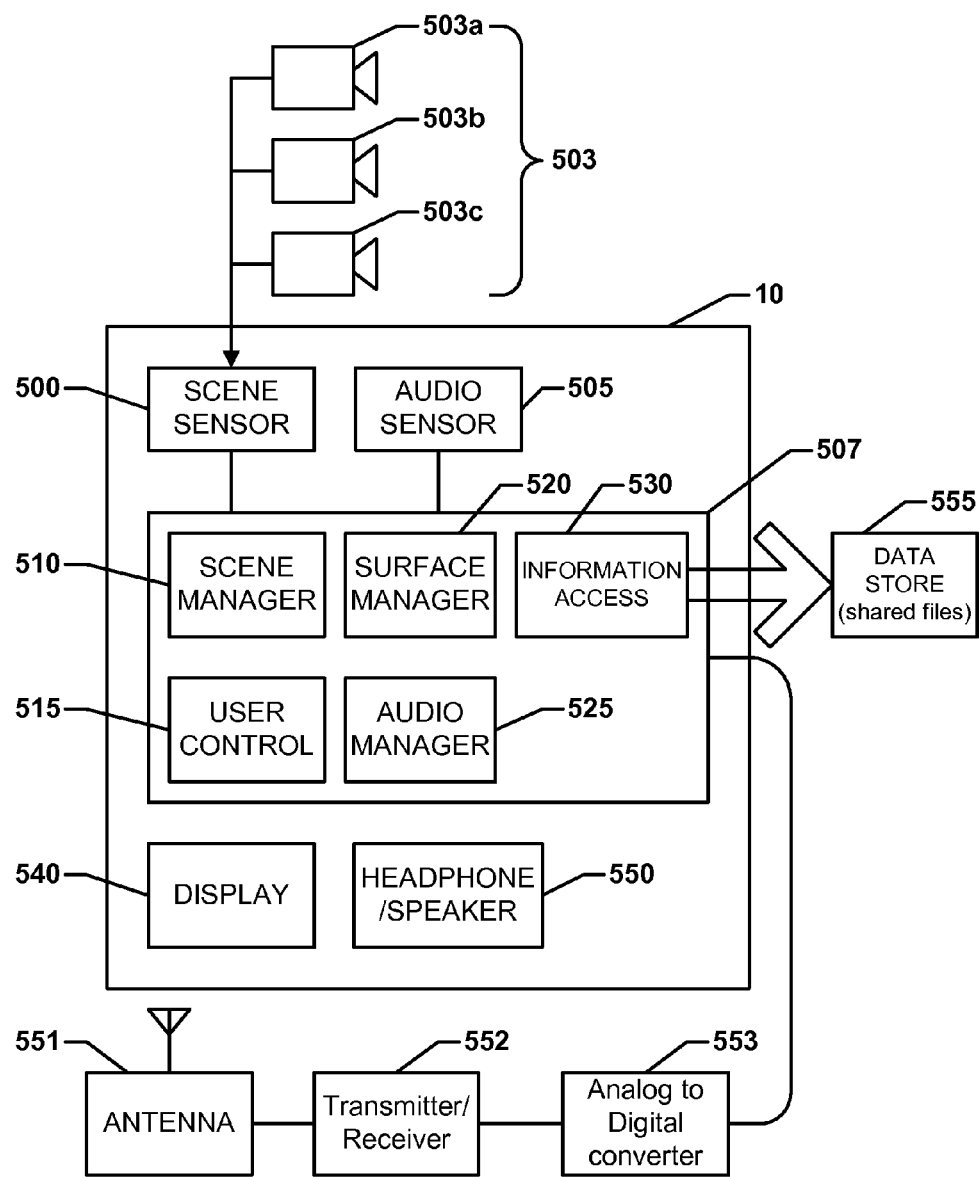
FIG. 5A is a high level component block diagram of a number of components of a head mounted device to interact with and to generate a virtual object.
Figure 5B:
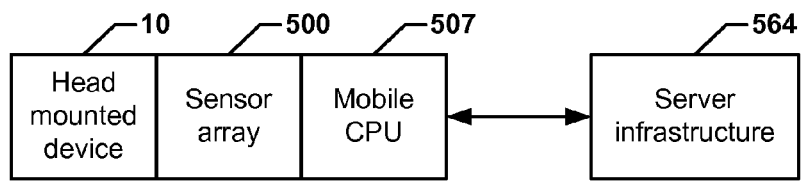
FIG. 5B is a high level component block diagram of a system that enables users wearing a head mounted device to communicate with a server according to another embodiment.

FIG. 5A illustrates components that may be included in embodiments of head mounted devices 10. FIG. 5B illustrates how head mounted devices 10 may operate as part of a system in which a sensor array 500 may provide data to a mobile processor 507 that performs operations of the various embodiments described herein, and communicates data to and receives data from a server 564. It should be noted that the processor 507 head mounted device 10 may include more than one processor (or a multi-core processor) in which a core processor may perform overall control functions while a coprocessor executes applications, sometimes referred to as an application processor. The core processor and applications processor may be configured in the same microchip package, such as a multi-core processor, or in separate chips. Also, the processor 507 may be packaged within the same microchip package with processors associated with other functions, such as wireless communications (i.e., a modem processor), navigation (e.g., a processor within a GPS receiver), and graphics processing (e.g., a graphics processing unit or "GPU").

The head mounted device 10 may communicate with a communication system or network that may include other computing devices, such as personal computers and mobile devices with access to the Internet. Such personal computers and mobile devices may include an antenna 551, a transmitter/receiver or transceiver 552 and an analog to digital converter 553 coupled to a processor 507 to enable the processor to send and receive data via a wireless communication network. For example, mobile devices, such as cellular telephones, may access the Internet via a wireless communication network (e.g., a Wi-Fi or cellular telephone data communication network). Such wireless communication networks may include a plurality of base stations coupled to a gateway or Internet access server coupled to the Internet. Personal computers may be coupled to the Internet in any conventional manner, such as by wired connections via an Internet gateway (not shown) or by a wireless communication network.

Referring to FIG. 5A, the head mounted device 10 may include a scene sensor 500 and an audio sensor 505 coupled to a control system processor 507 which may configured with a number of software modules 510-550. In an embodiment, the processor 507 or scene sensor 500 may apply an anatomical feature recognition algorithm to the images to detect one or more anatomical features. The processor 507 associated with the control system may review the detected anatomical features in order to recognize one or more gestures and process the recognized gestures as an input command. For example, as discussed in more detail below, a user may execute a movement gesture corresponding to an input command, such as pointing a finger at the virtual object to close the virtual object. In response to recognizing this example gesture, the processor 507 may remove the virtual object from the display. As another example, the user may touch the forefinger to the thumb on one hand to form the "OK" sign in order to confirm an instruction or option presented on the display.

The scene sensor 500, which may include stereo cameras, orientation sensors (e.g., accelerometers and an electronic compass) and distance sensors, may provide scene-related data (e.g., images) to a scene manager 510 implemented within the processor 507 which may be configured to interpret three-dimensional scene information. In various embodiments, the scene sensor 500 may include stereo cameras (as described below) and distance sensors, which may include infrared light emitters for illuminating the scene for an infrared camera. For example, in an embodiment illustrated in FIG. 5A, the scene sensor 500 may include a stereo red-green-blue (RGB) camera 503a for gathering stereo images, and an infrared camera 503b configured to image the scene in infrared light which may be provided by a structured infrared light emitter 503c. As discussed below, the structured infrared light emitter may be configured to emit pulses of infrared light that may be imaged by the infrared camera 503b, with the time of received pixels being recorded and used to determine distances to image elements using time-of-flight calculations. Collectively, the stereo RGB camera 503a, the infrared camera 503b and the infrared emitter 503c may be referred to as an RGB-D (D for distance) camera 503.

The scene manager module 510 may scan the distance measurements and images provided by the scene sensor 500 in order to produce a three-dimensional reconstruction of the objects within the image, including distance from the stereo cameras and surface orientation information. In an embodiment, the scene sensor 500, and more particularly an RGB-D camera 503, may point in a direction aligned with the field of view of the user and the head mounted device 10. The scene sensor 500 may provide a full body three-dimensional motion capture and gesture recognition. The scene sensor 500 may have an infrared light emitter 503c combined with an infrared camera 503c, such as a monochrome CMOS sensor. The scene sensor 500 may further include stereo cameras 503a that capture three-dimensional video data. The scene sensor 500 may work in ambient light, sunlight or total darkness and may include an RGB-D camera as described herein. The scene sensor 500 may include a near-infrared (NIR) pulse illumination component, as well as an image sensor with a fast gating mechanism. Pulse signals may be collected for each pixel and correspond to locations from which the pulse was reflected and can be used to calculate the distance to a corresponding point on the captured subject.

In another embodiment, the scene sensor 500 may use other distance measuring technologies (i.e., different types of distance sensors) to capture the distance of the objects within the image, for example, ultrasound echo-location, radar, triangulation of stereoscopic images, etc. As discussed above, in an embodiment, the scene sensor 500 may include a ranging camera, a flash LIDAR camera, a time-of-flight (ToF) camera, and/or a RGB-D camera 503, which may determine distances to objects using at least one of range-gated ToF sensing, RF-modulated ToF sensing, pulsed-light ToF sensing, and projected-light stereo sensing. In another embodiment, the scene sensor 500 may use a stereo camera 503a to capture stereo images of a scene, and determine distance based on a brightness of the captured pixels contained within the image. As mentioned above, for consistency any one or all of these types of distance measuring sensors and techniques are referred to herein generally as "distance sensors." Multiple scene sensors of differing capabilities and resolution may be present to aid in the mapping of the physical environment, and accurate tracking of the user's position within the environment.

The head mounted device 10 may also include an audio sensor 505 such as a microphone or microphone array. An audio sensor 505 enables the head mounted device 10 to record audio, and conduct acoustic source localization and ambient noise suppression. The audio sensor 505 may capture audio and convert the audio signals to audio digital data. A processor associated with the control system may review the audio digital data and apply a speech recognition algorithm to convert the data to searchable text data. The processor may also review the generated text data for certain recognized commands or keywords and use recognized commands or keywords as input commands to execute one or more tasks. For example, a user may speak a command such as "anchor virtual object" to anchor the displayed virtual object on a selected surface. For example, the user may speak "close application" to close an application displayed on the display.

The head mounted device 10 may also include a display 540. The display 540 may display images obtained by the camera within the scene sensor 500 or generated by a processor within or coupled to the head mounted device 10. In an embodiment, the display 540 may be a micro display. The display 540 may be a fully occluded display. In another embodiment, the display 540 may be a semitransparent display that can display images on a screen that the user can see through to view the surrounding room. The display 540 may be configured in a monocular or stereo (i.e., binocular) configuration. Alternatively, the head-mounted device 10 may be a helmet mounted display device, worn on the head, or as part of a helmet, which may have a small display 540 optic in front of one eye (monocular) or in front of both eyes (i.e., a binocular or stereo display). Alternatively, the head mounted device 10 may also include two display units 540 that are miniaturized and may be any one or more of cathode ray tube (CRT) displays, liquid crystal displays (LCDs), liquid crystal on silicon (LCos) displays, organic light emitting diode (OLED) displays, Mirasol displays based on Interferometric Modulator (IMOD) elements which are simple micro-electro-mechanical system (MEMS) devices, light guide displays and wave guide displays, and other display technologies that exist and that may be developed. In another embodiment, the display 540 may comprise multiple micro-displays 540 to increase total overall resolution and increase a field of view.

The head mounted device 10 may also include an audio output device 550, which may be a headphone and/or speaker collectively shown as reference numeral 550 to output audio. The head mounted device 10 may also include one or more processors that can provide control functions to the head mounted device 10 as well as generate images, such as of virtual objects 14. For example, the device 10 may include a core processor, an applications processor, a graphics processor and a navigation processor. Alternatively, the head mounted display 10 may be coupled to a separate processor, such as the processor in a smartphone or other mobile computing device. Video/audio output may be processed by the processor or by a mobile CPU, which is connected (via a wire or a wireless network) to the head mounted device 10. The head mounted device 10 may also include a scene manager block 510, a user control block 515, a surface manager block 520, an audio manager block 525 and an information access block 530, which may be separate circuit modules or implemented within the processor as software modules. The head mounted device 10 may further include a local memory and a wireless or wired interface for communicating with other devices or a local wireless or wired network in order to receive digital data from a remote memory 555. Using a remote memory 555 in the system may enable the head mounted device 10 to be made more lightweight by reducing memory chips and circuit boards in the device.

The scene manager block 510 of the controller may receive data from the scene sensor 500 and construct the virtual representation of the physical environment. For example, a laser may be used to emit laser light that is reflected from objects in a room and captured in a camera, with the round trip time of the light used to calculate distances to various objects and surfaces in the room. Such distance measurements may be used to determine the location, size and shape of objects in the room and to generate a map of the scene. Once a map is formulated, the scene manager block 510 may link the map to other generated maps to form a larger map of a predetermined area. In an embodiment, the scene and distance data may be transmitted to a server or other computing device which may generate an amalgamated or integrated map based on the image, distance and map data received from a number of head mounted devices (and over time as the user moved about within the scene). Such an integrated map data made available via wireless data links to the head mounted device processors. The other maps may be maps scanned by the instant device or by other head mounted devices, or may be received from a cloud service. The scene manager 510 may identify surfaces and track the current position of the user based on data from the scene sensors 500. The user control block 515 may gather user control inputs to the system, for example audio commands, gestures, and input devices (e.g., keyboard, mouse). In an embodiment, the user control block 515 may include or be configured to access a gesture dictionary to interpret user body part movements identified by the scene manager 510. As discussed above a gesture dictionary may store movement data or patterns for recognizing gestures that may include pokes, pats, taps, pushes, guiding, flicks, turning, rotating, grabbing and pulling, two hands with palms open for panning images, drawing (e.g., finger painting), forming shapes with fingers (e.g., an "OK" sign), and swipes, all of which may be accomplished on or in close proximity to the apparent location of a virtual object in a generated display. The user control block 515 may also recognize compound commands. This may include two or more commands. For example, a gesture and a sound (e.g. clapping) or a voice control command (e.g. 'OK' detected hand gesture made and combined with a voice command or a spoken word to confirm an operation). When a user control 515 is identified the controller may provide a request to another subcomponent of the device 10.

The head mounted device 10 may also include a surface manager block 520. The surface manager block 520 may continuously track the positions of surfaces within the scene based on captured images (as managed by the scene manager block 510) and measurements from distance sensors. The surface manager block 520 may also continuously update positions of the virtual objects that are anchored on surfaces within the captured image. The surface manager block 520 may be responsible for active surfaces and windows. The audio manager block 525 may provide control instructions for audio input and audio output. The audio manager block 525 may construct an audio stream delivered to the headphones and speakers 550.

The information access block 530 may provide control instructions to mediate access to the digital information. Data may be stored on a local memory storage medium on the head mounted device 10. Data may also be stored on a remote data storage medium 555 on accessible digital devices, or data may be stored on a distributed cloud storage memory, which is accessible by the head mounted device 10. The information access block 530 communicates with a data store 555, which may be a memory, a disk, a remote memory, a cloud computing resource, or an integrated memory 555.

Figure 6:
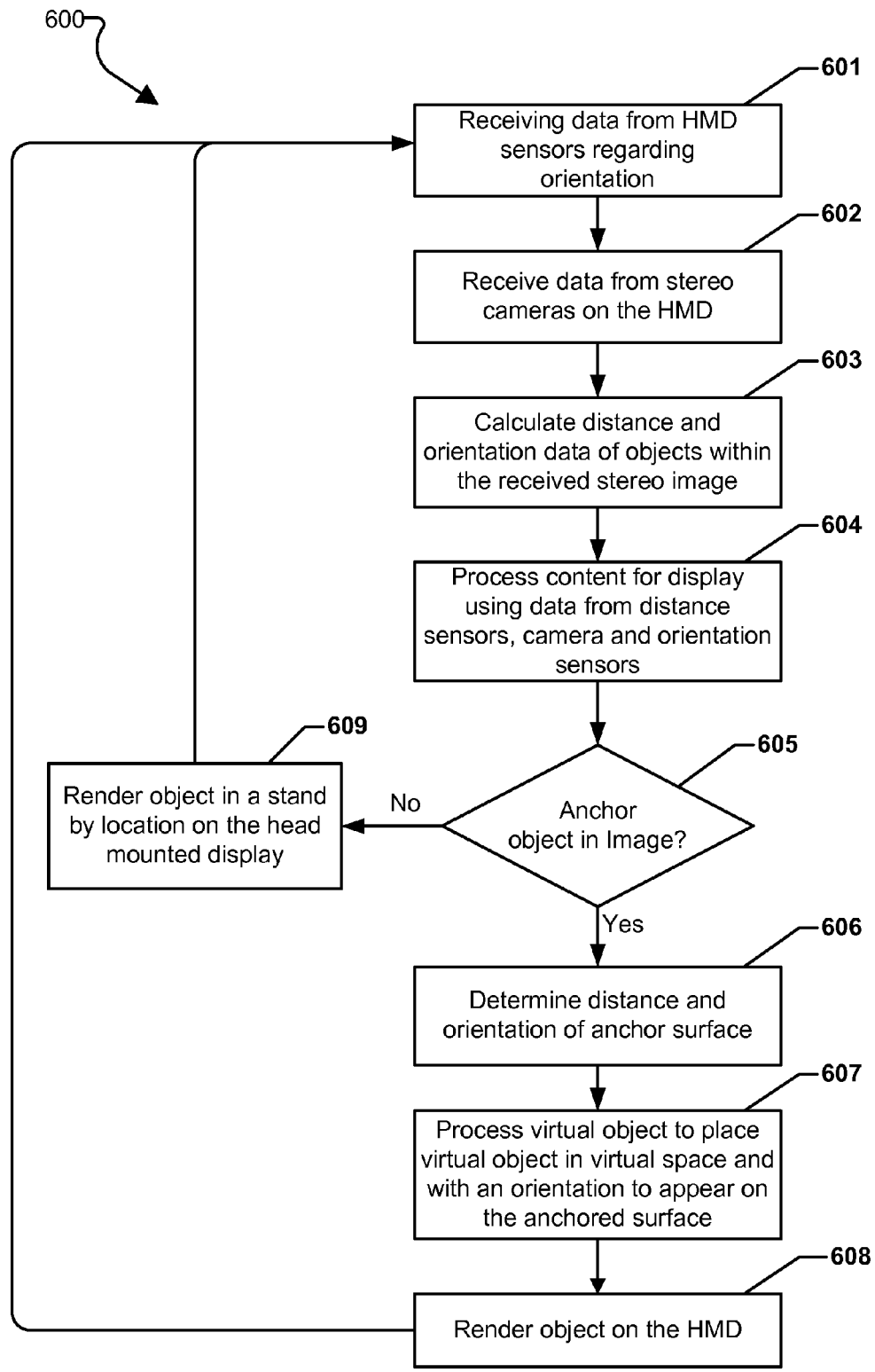
FIG. 6 is a process flow diagram of an embodiment method for using a head mounted device to anchor a virtual object on an anchor surface in which the virtual object remains fixed to the anchor surface on the head mounted display.

FIG. 6 illustrates an embodiment method 600 for rendering a virtual object on an anchored surface based on a user input. Method 600 may be implemented in a computing device having a processor configured with processor-executable instructions to perform the operations of the method 600. In method 600, the processor may commence upon receiving data from the head mounted device sensors regarding an orientation of the head mounted device in block 601. In block 602, the processor may receive data from stereo cameras on the head mounted device or on the shoulders or body of the user. In block 603, the processor may calculate distance and orientation data of objects within the received stereo image. In block 604, the processor may process the content for display using data from the distance and orientation sensors, and the camera.

In determination block 605, the processor may review user inputs or gesture commands to determine whether to anchor a virtual object in the image. For example, a user input may be received from an input device, such as a keypad or touch-screen input. As another example, a user input may be received in the form of a detected gesture recognized in a sequence of images, such as a gesture indicating a desire to anchor the virtual object on an indicated surface located within the image. A third example of a user input may be an audio command that may be received by a microphone on the head mounted device. A user input may be a command indicating that an input for anchoring the virtual object to a particular location should be received from a second user's head mounted device. For example, the input may be received from a second head mounted device 10b during a collaboration session.

If the processor determines that it has received an input to anchor the virtual object at a particular location (e.g., an anchor surface 16) (i.e., determination block 605="Yes"), the processor may determine the distance and orientation of the virtual object relative to the anchor surface from the user's position in block 606. For example, the head mounted device 10 may determine that the anchor surface 16 includes a contour and a certain distance from the user. In general, virtual objects 14 may be three-dimensional virtual objects, such as in the form of three-dimensional mathematical models (e.g., spheres, cones, cylinders, etc.), three-dimensional data sets (e.g., data tables defining vertices, dimensions, and other coordinate and material data), or combinations of both, which a processor can use to generate an image of the object. In order for the processor to be able to display the virtual object 14 connected on the anchor surface 16, the virtual object 14 may be adjusted to a size, viewing perspective and orientation to superimpose the virtual object on the anchor surface 16. For example, a three-dimensional virtual object will need to be rendered as a two-dimensional image to be presented on a conventional display, or as two slightly different two-dimensional images to be presented on 3D displays on a head mounted device.

In block 607, the processor may process the virtual object to place the virtual object in a virtual space and with a perspective, orientation and size that causes it to appear connected to the anchored surface. In block 608, the processor may render the virtual object on the head mounted device display.

For example, the display may be a semitransparent display where certain features of the image are viewable through the display. The virtual object 14 may be superimposed or added to the features of the image on the display so the virtual object 14 remains anchored to, or fixed to, the desired anchored surface as the user moves. Alternatively, the virtual object 14a may be anchored in free space. For example, the virtual object 14a may be located outside of a window, or the virtual object 14a may be suspended in midair or a distance above the ground.

If the processor determines that it has not received an input to anchor the virtual object (i.e., determination block 605="No"), which may indicate that the user is not ready or does not want to anchor the virtual object to an anchor surface, the processor may render the virtual object in a standby location. Alternatively, the user may choose not to render the virtual object 14 in block 609.

The processes of rendering the virtual object within the scene, such as on the anchor surface, may be performed continuously so that the virtual object appears stationary even as the user turns his/her head and moves about. As mentioned above, the process of orienting the head mounted device with respect to the surroundings, and determining distances to and relative orientation of various surfaces may be accomplished continuously by monitoring orientation sensors (e.g., accelerometers and gyroscopes) and triangulating its own position and angle of view as the device moves in space by constantly referencing shifts in the topography of the scanned three-dimensional (3D) environment, thus performing Simultaneous Location and Mapping (SLAM) operations.

Figure 7A:
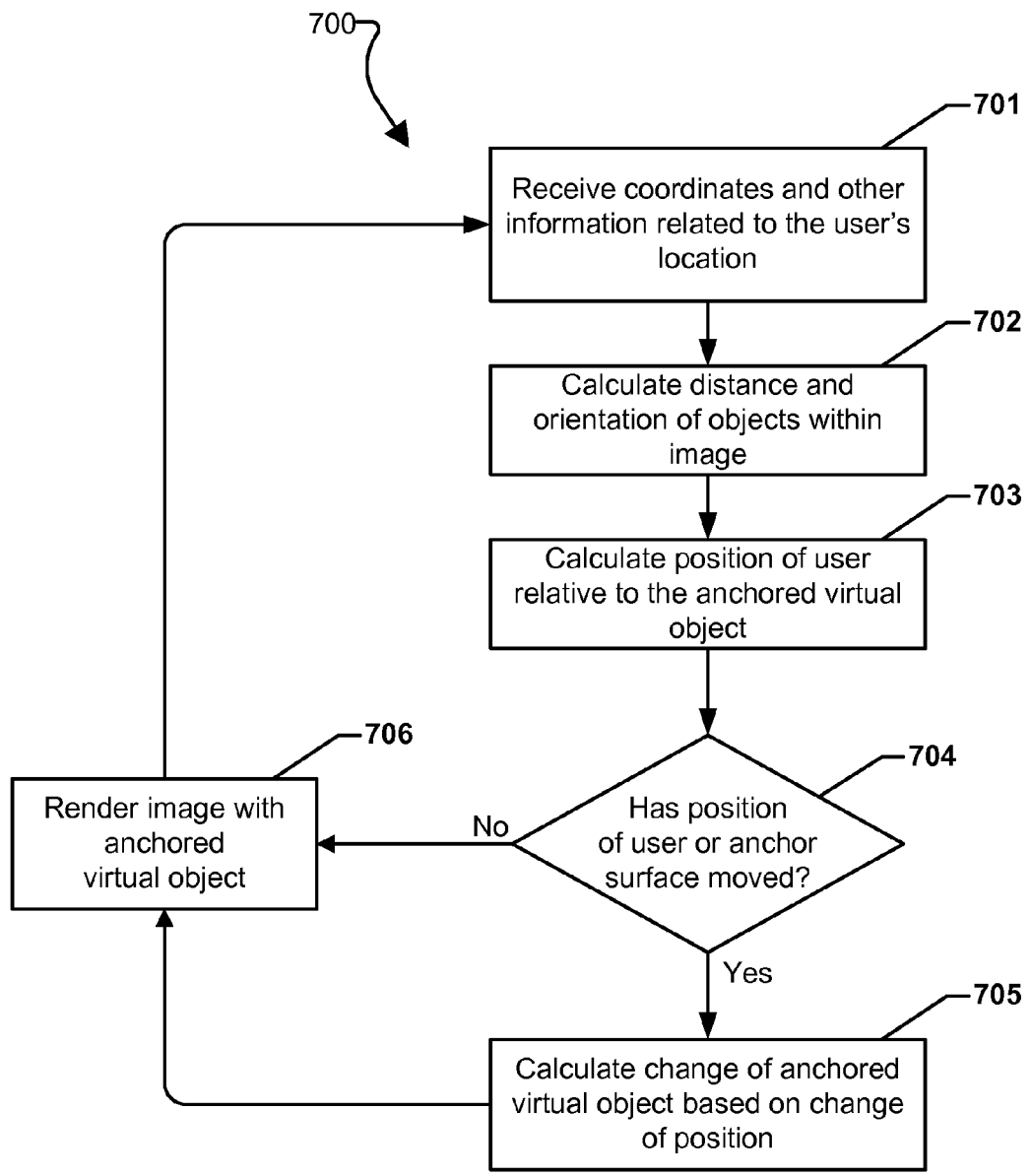
FIG. 7A is a process flow diagram of an embodiment method for anchoring a virtual object on a physical surface viewable in a display of a head mounted device.

FIG. 7A illustrates an embodiment method 700 for rendering an image with an anchored virtual object. Method 700 may be implemented in a computing device having a processor with processor-executable instructions to perform the operations of the method 700. In method 700, the virtual object 14 may be anchored as the position of the user moves through an area, such as a room. For example, the user may walk and move about in the room, but the displayed location of the virtual object on a surface in the room may remain fixed. In method 700 in block 701, the processor may commence operation by receiving user position data such as the coordinates of a user's location, information related to the user's position within a room (e.g., distances from various surfaces), and information related to an orientation of the user's head. The positional data received in block 701 may be calculated from a range of sensor data, including distance sensors (e.g., an infrared emitter/receiver configure to calculate the round trip time of emitted infrared signals bouncing off of surfaces within the viewing perspective of the user with a fast gating mechanism). Alternatively or additionally, positional data may be provided by a GPS receiver unit (which may return geographic coordinates), triangulation of RF signals from transmitters at known locations (e.g., cellular telephone towers), inputs received from a second head mounted device (e.g., providing separation distance and/or information regarding relative positions of the two users), etc. Position data may also be calculated based on scene image and distance sensor data, or downloaded from a server in a cloud computing arrangement. Alternatively or in addition, the user may input coordinates of the user's location, such as by typing in a physical address and/or a room number, or touching or clicking on a map display to indicate the user's position on the map. In block 702, the processor may calculate distance and orientation data of objects within the received camera image. In block 703, the processor may calculate the position of the user relative to the anchored virtual object.

The scene sensor 500 of FIG. 5A may feature a near-infrared (NIR) pulse illumination component. The scene sensor 500 may also have an image sensor with a fast gating mechanism. Other image sensors may also be implemented within the scene sensor 500 as described herein. Based on the known speed of the infrared pulses, the coordinates, and the timing of infrared pulse wave emissions from the illuminator with the gating of the sensor 500, a signal reflected from within a desired distance range is captured. In this embodiment, the time of arrival of infrared pulses may be collected for each pixel and used to calculate the distance from the sensor to each point in the image. Such processing of the image may be performed using a remote processor that is connected to the scene sensor 500 via a computer network. The method 700 is not limited to being implemented on a head mounted display and may be used with another computing device, such as a mobile communication device (e.g., a smartphone) or a fixed computing device (e.g., a personal computer or a server) in communication with the head mounted display or body mounted sensors.

In determination block 704, the processor may determine whether the position of the user or the anchor surface has changed. For example, the user may anchor the image on a surface such as a wall or in free space and the user may walk away from the wall during collaboration with another user, thus changing position. If the position has changed (i.e., determination block 704="Yes") which indicates the user has moved away from the anchored virtual object or the anchor surface has moved, the processor may determine and calculate a change of the anchored virtual object based on the new position in block 705. In block 706, the processor may render the image with the anchored virtual object on the head mounted display. If the processor determines that the virtual object has not moved (i.e., determination block 704="No"), the anchored virtual object may be rendered unchanged. The processor may render the virtual object in the image for the current position on the head mounted display in block 706.

Figure 7B:
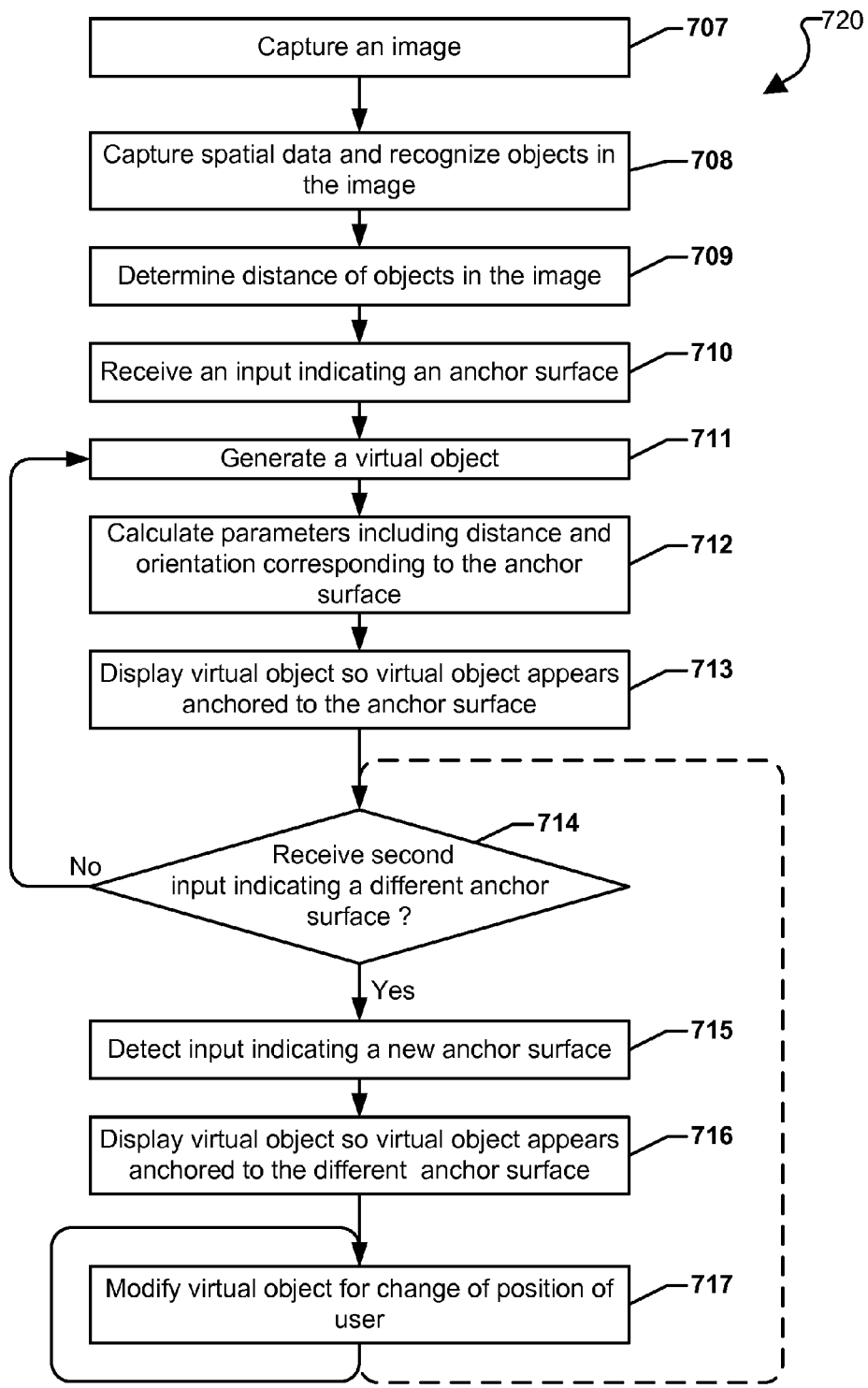
FIG. 7B is a process flow diagram of an embodiment method for moving a virtual object between at least two different anchor points or surfaces by an input command.

FIG. 7B illustrates an embodiment method 720 for moving a virtual object between anchor surfaces. Method 720 may be implemented in a computing device having a processor configured with processor-executable instructions to perform the operations of the method 720. A first input may be provided anchoring a virtual object on a first anchor surface. Later, the processor may receive a second input to anchor the virtual object on a second different anchor surface. In method 720, the processor may commence operation by capturing an image in block 707. In block 708, the processor may capture spatial data and recognize objects within the image. In block 709, the processor may determine a distance parameter of the objects in the image. In block 710, the processor may receive an input indicating an anchor surface within the image.

For example, the processor may receive an input from an input device, or may detect a gestural input, or may receive a voice command to anchor the virtual object 14 within the image. In block 711, the processor may generate the virtual object 14 that is displayed, such as by using an object model and/or an object image data set. In block 712, the processor may calculate parameters including distance and orientation corresponding to the anchor surface, and may adjust the image of the virtual object consistent with those parameters to coincide with the viewer's perspective. In block 713, the processor may display the virtual object on the head mounted display so the virtual object appears to be connected to the anchor surface.

The user may choose to change the anchor surface due to a preference or needs of the collaborative process with other users. The various embodiments enable each user to select the same or different anchor surfaces on which to view virtual objects 14. So, in determination block 714 the processor may monitor user inputs (e.g., buttons, recognized movement gestures and/or spoken commands) and determine whether a second input is received indicating a second different anchor surface for the virtual object 14. If a second input is not received (i.e., determination block 714="No"), the processor may return to block 711 to continue generating the virtual object in the image connected to the first anchor surface.

If a second input is received (i.e., determination block 714="Yes"), in block 715 the processor may detect one or more inputs that indicate a new anchor surface. When a new anchor surface is indicated, the processor may calculate parameters including distance and orientation corresponding to the new anchor surface that was selected in block 715, and in block 716, the processor may generate images presented on the head mounted display so that the virtual object 14 appears to be moved from the first anchor surface to the second new anchor surface. In block 717, the processor may modify the image of virtual object to correspond to changes of position, and thus viewing perspective, of the user. For example, if the user walks closer the virtual object image size may increase. If the user walks a distance away from the virtual object, the virtual object's image size may decrease. The processes of modifying images of the virtual object to match changes in the user's viewing perspective in block 717, as well as monitoring for user inputs in determination block 714 may continue to be performed in a continuous process throughout a collaboration session.

Figure 8A:
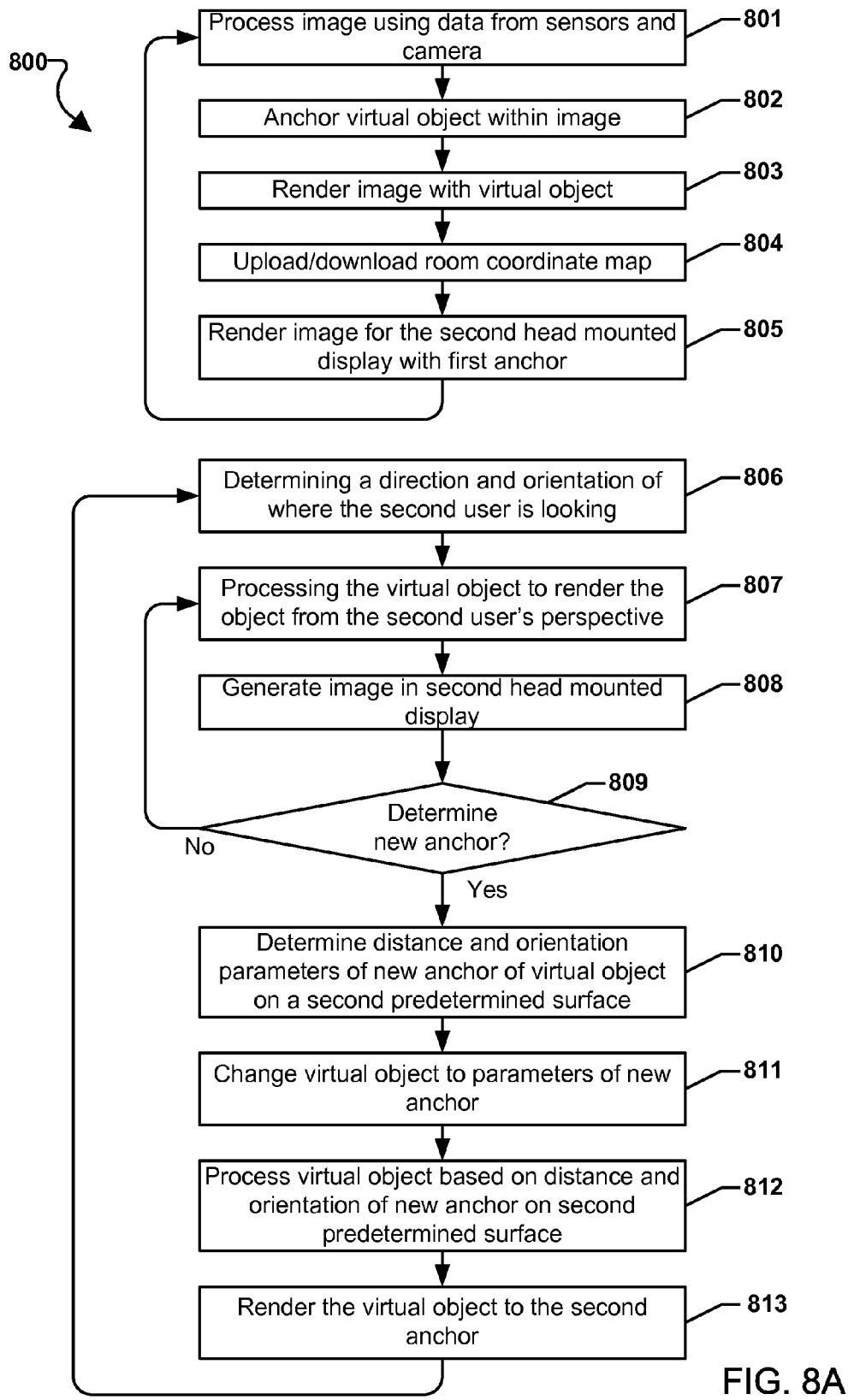
FIG. 8A is a process flow diagram of an embodiment method for a head mounted device to project a virtual object so it appears anchored on a physical surface and for projecting a second virtual object on a second head mounted device so that it appears to a second user to be anchored on a different physical surface.

FIG. 8A illustrates an embodiment method 800 for rendering an image with an anchored virtual object for two users in an area, such as, for example, a room. In this embodiment, the displayed anchored virtual object 14 remains anchored to the selected anchor surface. Method 800 may be implemented in a computing device having a processor configured with processor-executable instructions to perform the operations of the method 800.

In method 800, the processor may commence operation by processing an image using data from distance sensors, camera data and calculated distance data in block 801. In block 802, the processor may calculate parameters and may fix the virtual object to the anchor surface and fix the virtual object in the image that is presented on the head mounted display. In block 803, the processor may render the image for display with the virtual object. In block 804, the processor may control a transmitter/receiver or transceiver to transmit image and/or virtual object data to the second head mounted display. In block 804, the first head mounted device may transmit the three-dimensional model and/or three-dimensional data set defining the virtual object to the second head mounted device in a format that enables the second device to generate an image of the same virtual object. Also in block 804, the processor may transmit a map including positional coordinate information to the second head mounted device. The head mounted device may upload and/or download the room coordinate map from a server, or may transmit a map directly to a second head mounted device. In block 805, a second processor may render an image of the virtual object for projection on the second head mounted display. The image may include the virtual object anchored or fixed to the anchor surface, which was selected by the first user in block 802. For example, the first user may anchor the virtual object on a desktop surface. In block 805, the processor may render the image. In the rendered image, the virtual object will appear on the desktop surface since it was selected by the first user in block 802 by the input.

In the various embodiments, a second head mounted device may display an image of the virtual object anchored to either the same anchor surface as designated by the user of the first head mounted device, or to a different anchor surface identified by the second user. In block 806, for the second head mounted device, the second processor may determine a location and orientation where the second user is looking (which is related to the orientation of the head mounted device) in order to determine where within the displayed image an anchored virtual object should be rendered. For example, if the second user is looking at the anchor surface designated by the first user, then the second head mounted device may render an image of the virtual object in the head mounted display. However, if the second user is looking away from the anchor surface, the second head mounted device would not render an image of the virtual object since the anchor surface would be outside the user's field of view presented on the head mounted display.

Determining the orientation of the user's head and the head mounted device may be accomplished by capturing images by the cameras worn by the second user and data from orientation sensor (e.g., an inclinometer, gyroscopes and/or accelerometers) of the second user's head mounted device, and processing this information to infer the viewing angle and perspective of the second user. As discussed above, this process may be accomplished continuously such that each head mounted device can triangulate its own position and angle of view as it moves in space by constantly referencing the shifts in the topography of scanned three-dimensional (3D) environment, thus performing Simultaneous Location and Mapping (SLAM) operations. Also, if a portion of the second user's anatomy is captured in an image from the second user's head mounted or body mounted cameras, this may also include applying a detection algorithm to the captured image to recognize a body part, and from that infer where the body part's field of view is located.

In block 807, the processor may process the virtual object data to generate image data for use in rendering an image of the object. In this operation, the processor may render the virtual object appropriately from the second user's perspective and so the second user can comfortably read content and view the virtual object. In block 808, the processor may generate an image in the second head mounted display based on the location and the orientation of the anchor surface with respect to the user.

In determination block 809, the processor may determine whether the second user would like to determine a new anchor surface. The determination may be from receiving an input signal indicating a desire to anchor the virtual object 14 in the image. For example, the second user may wish to anchor the image on a different surface than a current anchor surface. For example, the image may be fixed to a wall during a collaborative process with multiple users and then moved to a desktop.

As mentioned above, the user of the second head mounted device may elect to change the anchor surface, and thus move the image of the virtual object to another surface designated by the second user. If the head mounted device processor receives a user input indicating a desire to anchor the virtual object on a new surface (i.e., determination block 809="Yes") which indicates the second user desires to determine a new anchor for the virtual object 14, the processor may determine distance and orientation parameters of a new anchor of the virtual object on a second predetermined surface in block 810. In block 811, the processor may change or modify the virtual object to the parameters of the new anchor surface. The processor may process the virtual object 14 based on a distance and an orientation in block 812. In block 813, the second processor may render the image on the head mounted display with the anchored virtual object fixed on the second anchor surface.

If the processor does not receive a user input indicating a desire to anchor the virtual object on a new surface (i.e., determination block 809="No"), the processor may process the virtual object for rendering in block 807 with no change in anchor position but rendered for the second user's perspective. In a similar manner, the first or the second user may add another virtual object and anchor the additional virtual object on a third anchor surface.

Figure 8B:
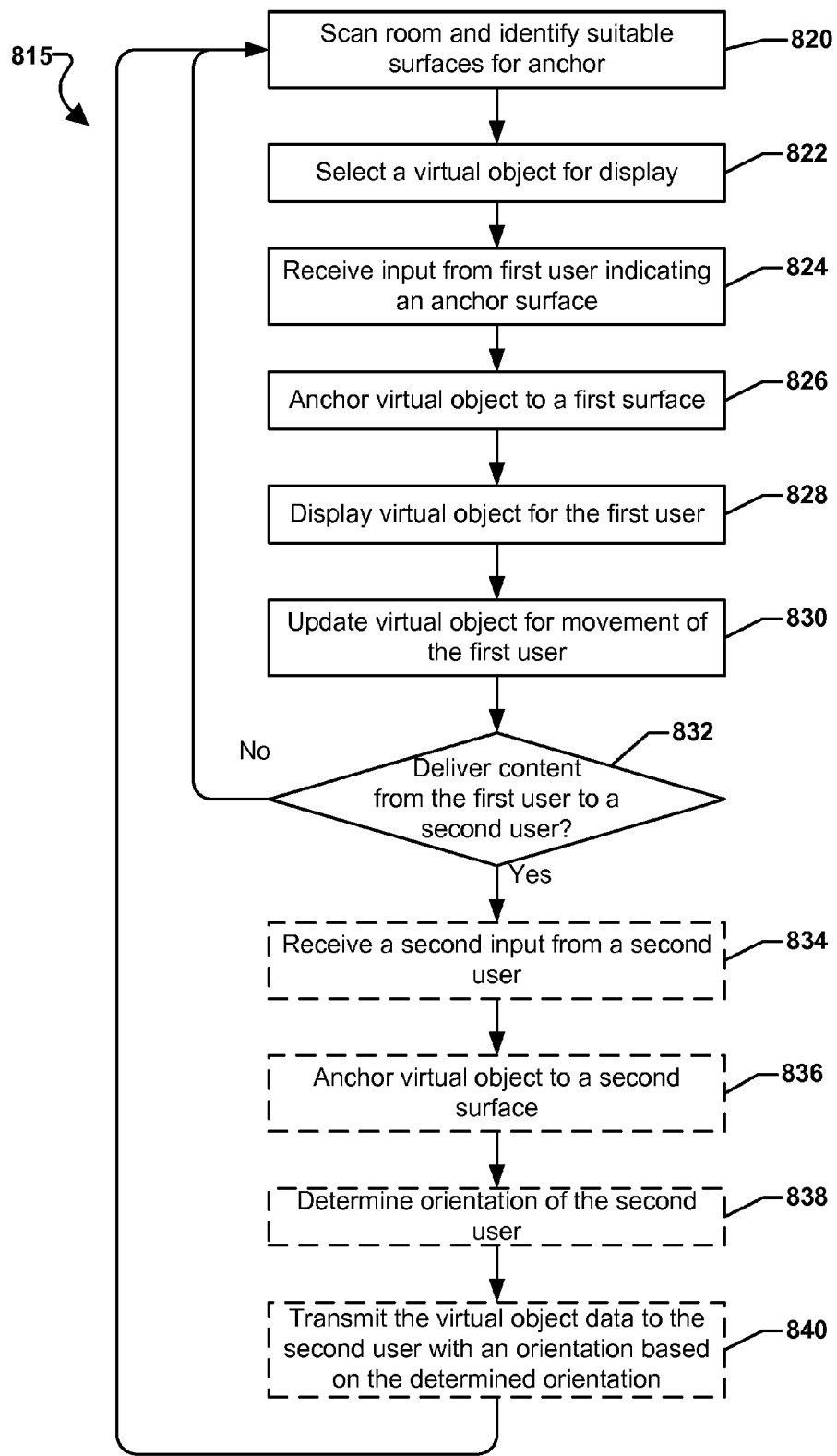
FIG. 8B is a process flow diagram of an embodiment method of rendering a shared virtual object that is oriented correctly for each user's point of view.

FIG. 8B illustrates an embodiment method 815 for correctly orienting an anchored virtual object in an image that is output on a display of a first user from the first user's point of view, and on another display for a second user's point of view. Method 815 may be implemented in a computing device having a processor configured with processor-executable instructions to perform the operations of the method. In method 815 in block 820, the processor may receive image data as the user scans a room and process the image data to identify/recognize surfaces, including surfaces suitable for serving as an anchor for virtual objects. For example, the processor may capture images from a head mounted or body mounted device. The processor of such a head or body mounted device may also receive information regarding distance and orientation of objects within the room from other types of sensors, such as a distance sensor. In block 822, the processor may select a virtual object for display on a head mounted display, such as from another computer that is generating virtual objects for rendering. In block 824, the processor may receive an input from the user indicating a surface on which to anchor the virtual object in block 824. The processor may orient the virtual object in order to anchor it to a first anchor surface in block 826, and generate an image of the virtual object on the first head mounted display in block 828. The processor may also update the location and orientation of the virtual object to compensate for movement of the user in block 830, such as to compensate or accommodate movement of the user's head.

In determination block 832, the processor of the first head mounted device may determine whether the content selected or rendered by the first head mounted device will be transmitted to a second device. If not (i.e., determination block 832="No"), the processor may return to block 820 to repeat the process in order to generate a continuous display in which the virtual object appears to remain anchored to the same surface even as the user moves or turns his/her head.

If the processor determines that the selected content generated by the first head mounted device should be shared with a second head mounted device (i.e., determination block 832="Yes"), the processor of the first head mounted device may receive a second input from a second user indicating a second anchor surface in optional block 834. In optional block 836, the processor may optionally perform calculations to determine a display position and orientation in order to anchor the virtual object to the identified second anchor surface. In optional block 838, the processor of the first or second head mounted device may determine a visual orientation of the second user, such as by using methods described herein based on sensor data and obtained images. As mentioned above, the process of orienting the head mounted device with respect to the surroundings, and determining distances to and relative orientation of various surfaces may be accomplished continuously by monitoring orientation sensors (e.g., accelerometers and gyroscopes) and triangulating its own position and angle of view as the device moves in space by constantly referencing shifts in the topography of the scanned three-dimensional (3D) environment, thus performing Simultaneous Location and Mapping (SLAM) operations.

In a further embodiment, the processor within the first head mounted device may determine the orientation of the second user based on images of the second user obtained by its own stereo cameras and using anatomical models. In optional block 840, the first head mounted device may transmit data regarding the virtual object to the second head mounted device in an orientation based on the second user's orientation determined in block 838. The second head mounted device may then render an image of the virtual object on the second head mounted display as described here. This process of determining user orientations and generating displays may continue in a loop so that the image continues to appear anchored to the selected surface while the first and second users move and turn their heads.

In various embodiments, either head mounted device may perform the calculations that enable rendering the virtual object in the proper perspective for the second user. For example, the processor of the first head mounted device may transmit data to the second head mounted device that provides the virtual object data in a manner that correctly orients the second virtual object for the second user. The process of orienting the virtual object by the first head mounted device may be based on the determined orientation of the second user that is transmitted from the second head mounted device to the first. In other words, the second head mounted device may inform the first head mounted device about its position and orientation, and the first head mounted device may use this information to orient the virtual object data. Alternatively, the first head mounted device may determine the orientation of the second head mounted device based on images of the second user, and use this determination to orient the virtual object data. For example, the processor may determine a proper orientation for the virtual object by capturing images of the second user over time and applying an anatomical analysis to the images to detect a body part within the images. Using this information, the processor of the first head mounted device may transmit data regarding the virtual object to the second head mounted device to enable its processor to render an image of the virtual object positioned at the second anchor surface consistent with the second user's perspective.

The processor may also orient the second virtual object based on the detected body part and structures in view. For example, a second user's head, neck and torso may be detected in images captured by the first head mounted device, and the processor of the first head mounted device may determine that there is a horizontal wall or vertical table close by the second user that is or has been selected by the second user as the anchor surface. As another example, the processor of the first head mounted device may recognize the second user's head, neck and torso in obtained images, and from the positions of these body parts, determine how the virtual object should be oriented so the second user can read text associated with the virtual object. For example, images of the second user's head and torso may be analyzed to define horizontal (e.g., from shoulder to shoulder) and vertical (e.g., from torso to head) coordinate axis that may then be used to determine a proper orientation for rendering the virtual object. Additionally, a viewing angle of the virtual object image may be determined, such as in terms of distances from the second user's head and torso of each pixel of the virtual object as presented on the head mounted display. This processing may include varying object brightness consistent with the view angle of various surfaces on the virtual object from the second user's perspective.

In another embodiment, the processor may capture images of the second user over time and may apply an anatomical analysis to the images to detect a body part within the images. For example, a pair of eyes (or the head mounted device) of the second user and a nose may be detected. The processor may utilize the body part and determine a location where the second user is looking and orient the second virtual object based on where the second user is looking. In yet another embodiment, the processor may determine from the captured images whether the second user is sitting or standing. The processor may generate the second virtual object as anchored to a planar surface adjacent to the second user if standing. If sitting, the processor may generate the second virtual object to appear anchored to a nearby surface adjacent to the second user.

If the processor determines not to deliver content from the first user to the second user in block 832 (i.e., determination block 832="No") the processor may display a virtual object for the first user in block 838 and may update the virtual object for the movement of the first user in block 840.

In an embodiment, the processor may communicate the signal correctly orienting the second virtual object for the second user. The processor may also communicate a signal generating the oriented second virtual object for the second user. These may be communicated to a communication network. The communication network may receive the signal and the second virtual object may be generated for the second user at a distance away from the first user. For example, the first and the second user may be located in the same room or in different cities. In yet another embodiment, the second user may provide additional inputs by way of a detected gesture or an audio command to move or reorient the virtual object. The processor may also receive an input from the second user indicating whether to confirm or reject a preferred placement of the second virtual object. The second user may also provide an input to rotate and reorient the virtual object as desired.

In addition to enabling a shared experience between two or more users wearing head mounted devices, image data generated by one or more of the head mounted devices involved in a collaboration may be transmitted to and displayed on head mounted devices or other mobile devices such as smartphones or tablet computers used by non-participants, enabling others to view the collaboration in a virtual or augmented reality experience. As described above, others viewing a collaboration session wearing head mounted devices or using another mobile device such as a smartphone or tablet may not only see the virtual objects and user interactions with them, but have limited interaction capabilities with the virtual augmentations seen by one of the head mounted device users. This limited interaction may include touching the augmentation to cause an effect, defining an interactive area or anchor point on the physical surface (effectively adding a new augmentation to the shared experience), and interacting with the shared mixed reality scene via gestural and/or audio inputs. Any such changes in the virtual experience may be reflected in the head mounted displays worn by the other users.

Figure 9A:
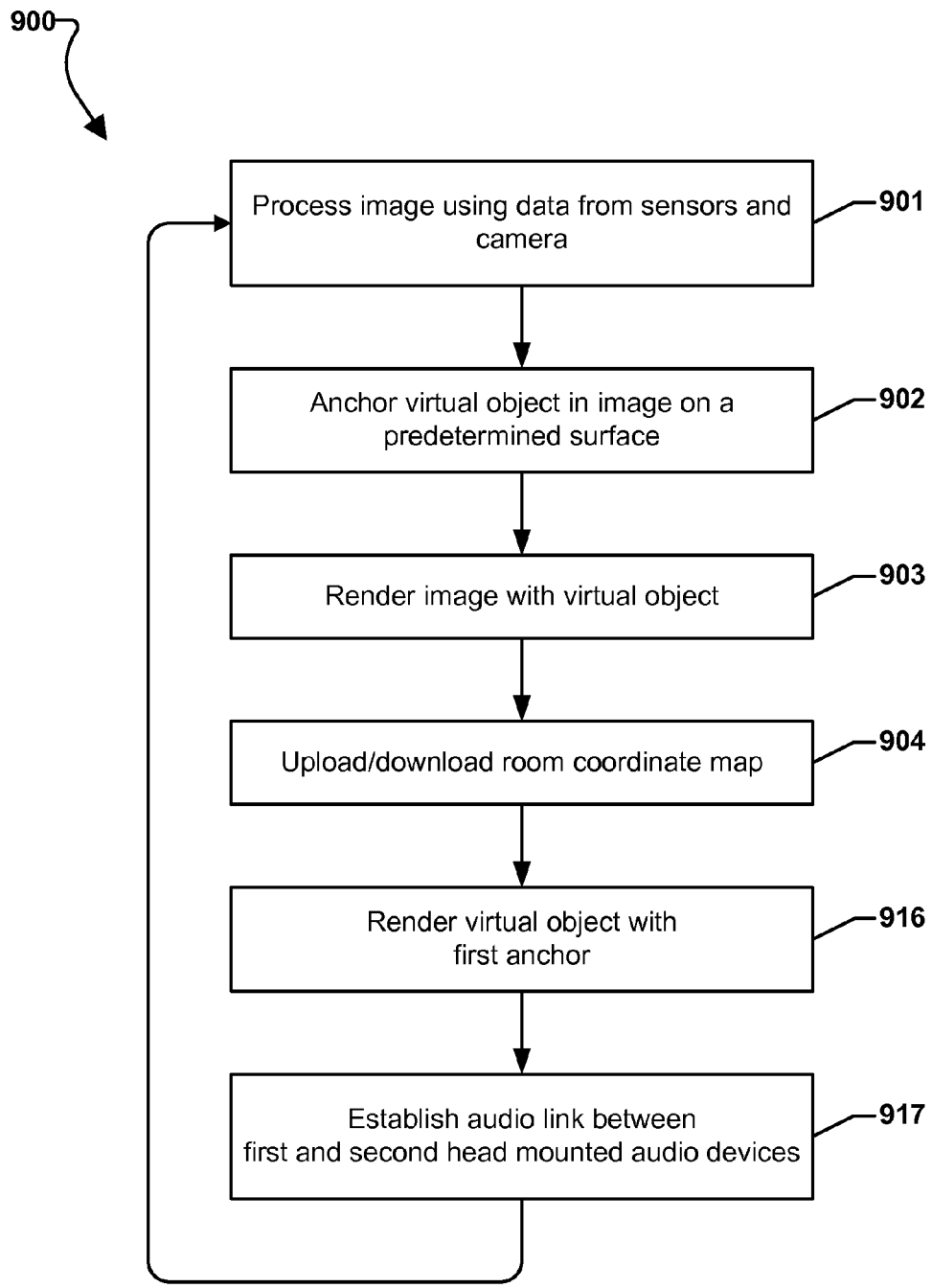
FIGS. 9A and 9B are process flow diagrams of an embodiment method for anchoring a virtual object on a physical surface and for using a second device to anchor a second virtual object on a different physical surface using a coordinate map.

FIG. 9A illustrates an embodiment method 900 for rendering images of an anchored virtual object for two users in widely separated locations. For example, one user may be located in San Diego, Calif. and a second user may be located in a second location, such as, for example, Cambridge, United Kingdom. However, in both locations, the displayed anchored virtual object 14 remains anchored to the anchor surface in each location fixed to a predetermined area of the image. In some embodiments, one user may select an anchor surface for a virtual object for multiple other users. Method 900 illustrated in FIG. 9A may be implemented in computing devices having a processor configured with processor-executable instructions to perform the operations of the method 900. In block 901 of method 900, the processor may commence operation by processing an image using data from distance sensors, camera data and calculated distance data.

The scene sensor 500 described above with reference to FIG. 5A may include a near-infrared (NIR) pulse emitter 503c and an infrared camera 503b with a fast gating mechanism capable of determining time of flight information for reflected infrared pulses. Based on the speed of light and the timing of infrared emission pulses from the illuminator 503c and the gating of the infrared camera 503b, distances to objects within the captured image may be determined based on the timing of received pulses. The pulse signal may be collected for each pixel or groups of pixels in the image and used to determine a distance from the distance sensor to the objects in the scene, which may be recorded and stored in a storage medium.

In block 902, the processor may calculate parameters to display the anchored virtual object in the image. The virtual object may be intended to be fixed to a predetermined surface after an input is received by the processor and the calculated parameters may relate to the desired surface. In block 903, the processor may render the image for display with the virtual object. In block 904, the processor may control a transmitter/receiver or transceiver to upload and/or download a room coordinate map to a server. Such a coordinate map may be any form of position defining information that enables the head mounted devices to determine locations of structures within the room within a convenient coordinate system. For example, a square room may be defined for purposes of such a room coordinate map in terms of Cartesian coordinates in which the X and Y dimensions correspond to major axes of the floor and the Z coordinate corresponds to the vertical dimension (i.e., floor to ceiling). Since the cameras and other sensors within the head mounted devices (and/or body mounted cameras) may locate the major structural dimensions of a room, such as the walls, floor and ceiling, the orientation of the room coordinates may be easily aligned to the walls and floor of the room. In this manner, the systems need not be concerned with geographic coordinates (e.g., from GPS sensors) or compass coordinates. On the other hand, when users are outside or within a space that lacks a convenient Cartesian reference frame, Cartesian coordinates may be aligned to GPS and compass coordinates.

With a coordinate frame of reference identified, structures and surfaces within view of the users may be identified or linked to the coordinate system by using distance measurements from the user (e.g., from distance sensors and/or processing of stereo images) to various coordinate defining surfaces (e.g., walls, floor and ceiling) and to various objects and surfaces in view of the head mounted display. A simple geometric coordinate translation algorithm may then be used to translate user-relative coordinates of objects and surfaces to a general room coordinate map. Thus, the result of this processing may be to generate a data set of coordinate vectors (e.g., 3 coordinate distances) for each object or surface in the room within a general reference frame. A head mounted device may use this coordinate database to determine its own location within the room. Then, knowing its own location within a coordinate database for the room, the processor can calculate distances and directions from the head mounted device to all objects and surfaces in the room using simple Cartesian coordinate transformation algorithms. In the situation of the users being outdoors, the general reference frame may be based upon geographic coordinates, which may be arbitrarily selected and tied to or determined from GPS system measurements.

In another embodiment, a room coordinate map may be stored in a local memory accessible to the head mounted device, such as in a memory coupled to a processor of the device, or in a mobile computing device (e.g., a smart phone) wirelessly coupled to the head mounted device. In block 916, the virtual object may be rendered on the display on the first anchored surface, and the processor may continue to render the virtual object on the first anchored surface as the user moves and turns the head mounted display. In block 917, an audio link may be established between the first and the second head mounted audio devices for communication and collaboration.

Figure 9B:
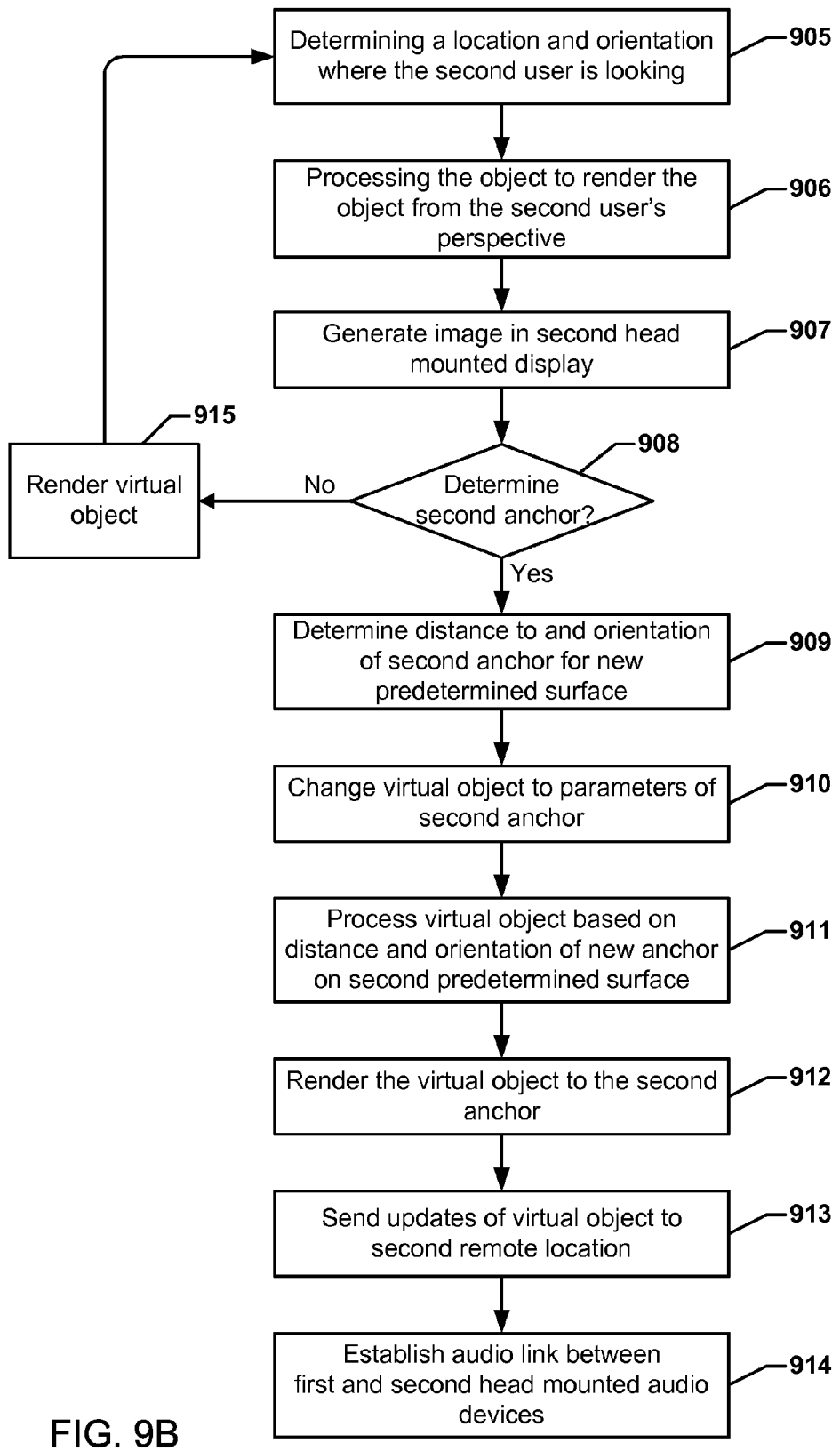

Turning to FIG. 9B, in block 905, a processor in the second head mounted device, which may be located a geographic distance away from the first user, may determine a location and viewing orientation of the second user. This may be accomplished using any of the locating methods described herein, including obtaining coordinate location data, compass data, and accelerometer data to determine a location and viewing angle of the head mounted device. In some cases the second head mounted device may determine its viewing angle by recognizing a part of the user's body present within the image, and from that infer a likely viewing perspective using an anatomical model. In another embodiment, the second user may provide an input to designate a surface on which to render a virtual object, and indicate the user's viewing perspective. In block 906, the processor may process the virtual object to render the virtual object appropriately for display from the second user's perspective. In block 907, the processor may generate an image in the second head mounted display based on the location and the orientation of the second user.

In determination block 908, the processor of the second head mounted device may determine whether the second user would like to select a new anchor surface to anchor the virtual object in the displayed image. For example, the second user may wish to anchor the image on a surface in the displayed image that may be convenient during collaboration such as a physical desk top. In an embodiment, the virtual object may be anchored on a virtual physical surface, such as, for example, a virtual table, which may appear within the rendered image.

If the processor determines that the second user desires to change the anchor surface for the virtual object (e.g., via an input) (i.e., determination block 908="Yes"), the processor may determine distance and orientation parameters of the newly designated anchor surface in block 909. In block 910, the processor may change the rendering of the virtual object based on the parameters of the anchor surface (desktop), and process the virtual object based on distance and orientation of the anchor surface of the second predetermined surface in block 911. In block 912, the second processor may render the image with the anchored virtual object on the anchor surface in the display of the second head mounted device.

In block 913, updates of the virtual object received from the user wearing the second head mounted display may be transmitted to the first head mounted display for rendering. In this manner, the users of the two head mounted displays may collaboratively interact with the virtual object during a collaboration session. These updates may be transmitted between the two head mounted devices so each device displays the updated virtual image reflecting all changes made by either user. For example, in a word processing application, the virtual object may reflect changes from both users in a collaborative manner. In block 914, an audio link may be established between the second and the first head mounted devices. The users may utilize the audio link to speak to one another, as well as other users in an audio conference format. This conference may occur at the same time as viewing the virtual object on the display in two different geographic locations. In an embodiment, the head mounted device may use video and audio conferencing software.

If the processor determines that the second user does not wish to anchor the virtual object in a new location (i.e., determination block 908="No"), the processor may render the virtual object in block 915. For example, the second user may simply select to display the virtual object on original anchor surface or in a free floating arrangement on the head mounted display. For example, the processor may display the virtual object in a "stand-by mode" in block 915.

Figure 10:
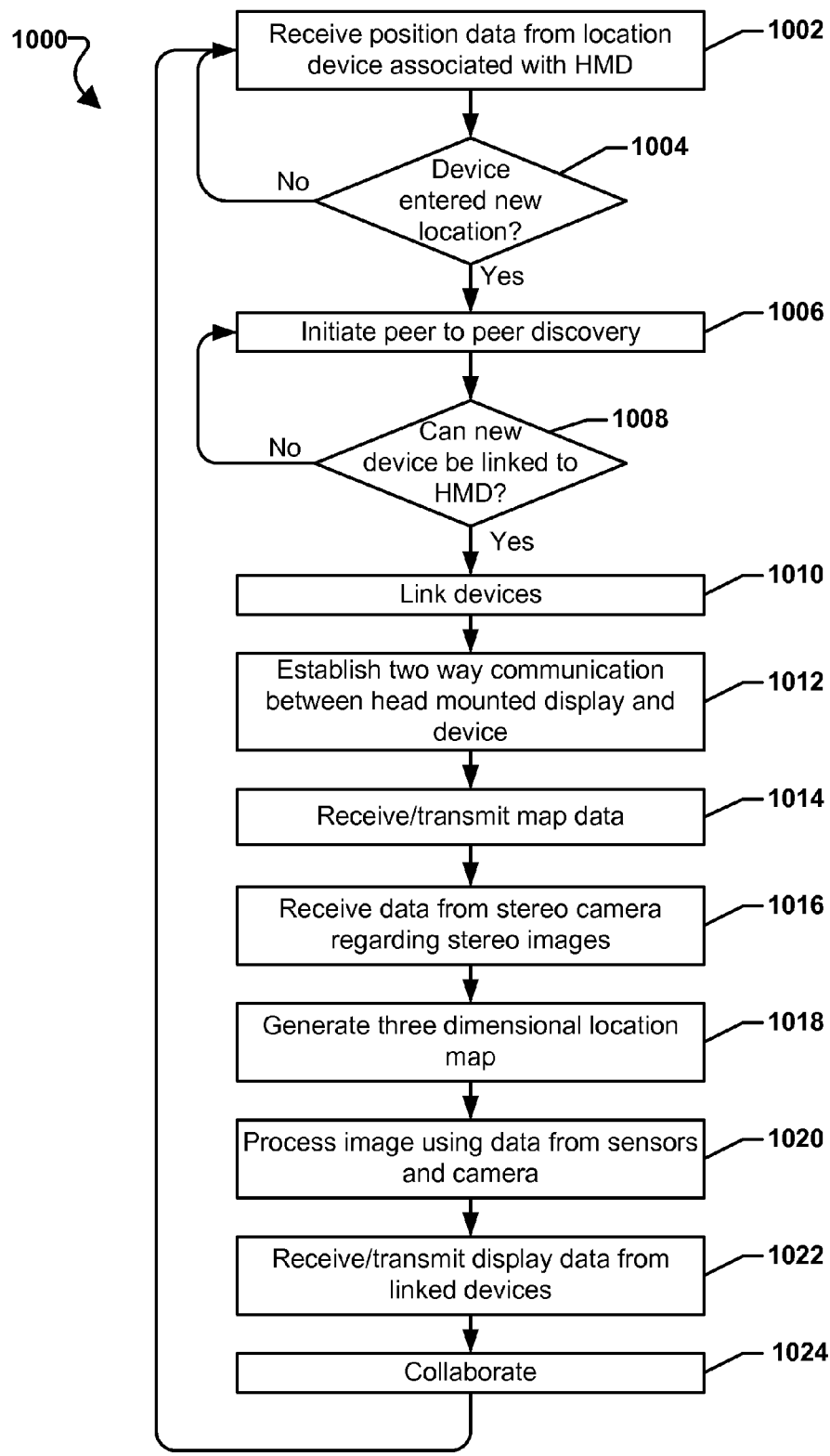
FIG. 10 is a process flow diagram of an embodiment method for discovering other head mounted devices to link and share data.

FIG. 10 illustrates an embodiment method 1000 for initiating a peer to peer discovery between a first head mounted device and a second head mounted device. Method 1000 may be implemented in a computing device having a processor configured with processor-executable instructions to perform operations of the method 1000. Once two head mounted devices are linked through a peer-to-peer communication link, the two head mounted devices may share resources and may share and exchange data between the devices. Method

1000 is not limited to linking head mounted devices together, and may be applicable to other computing devices that may link with one or more head mounted devices. In an embodiment, the head mounted device 10 may be operable as an accessory of a mobile device having a CPU (e.g., phone, tablet, etc.) and a portion of the operations in method 1000 may be performed by a CPU of the mobile device while the head mounted device may perform fewer operations, serving as a "terminal" and may receive an output from the mobile device via a wireless interface. For example, the processing may be performed on a first mobile device and a display output may be delivered to the head mounted display which generates the viewable image of the anchored virtual object.

In block 1002 of method 1000 the processor may receive position data from a locating device associated with the head mounted device, such as a Global Positioning Unit (GPS) or any other space-based global navigation satellite system (GNSS) receiver, or navigation device associated with the head mounted device. For example, the location device may be a device that determines a location from a radio network base station. In another embodiment, the head mounted device may receive local positional data from a local device, such as a cloud server, or from a wireless communication network base station. In a further embodiment, the user may provide an input (e.g., a voice command or button press) indicating the head mounted device is entering a new location and/or starting a new collaboration session. In a further embodiment, the head mounted device may receive peer network advertisements from other devices and determine from a new advertisement that the device has entered a new location.

In determination block 1004, the processor may determine whether the first head mounted device has entered a new location based on position data or other indications. If so (i.e., determination block 1004="Yes"), the head mounted device may initiate peer-to-peer discovery in block 1006 to determine if other computing devices or head mounted devices are in the vicinity and can be linked by wireless data connections. The process of initiating peer-to-peer discovery in block 1006 may continue until a response is received from a device that can be linked (i.e., so long as determination block 1008="No"). When a device capable of establishing a peer-to-peer communication link is identified (i.e., determination block 1008="Yes"), a peer-to-peer communication link may be negotiated in block 1010, and a two-way communication established between the two devices in block 1012.

In block 1014, the head mounted device may receive map data from the computing device with which it has established a communication link. In this operation, the head mounted device may download any map data that has been stored on the other computing device (e.g., another head mounted device, another computing device or a distant server, etc.) so that the head mounted device can immediately orient itself within the new location. For example, if the computing device with which the head mounted device has established a communication link has access to a network or the Internet, map data may be downloaded from a remote server (e.g., from the "cloud"). The head mounted device may also scan its own internal memory to determine whether map data for the new location is already stored in memory. If map data is stored in memory, as part of the operations in block 1014, the head mounted device may share some of that map data with the computing device with which the communication link has been established. Also, before exchanging map data, the communicating head mounted devices may determine whether they are close by each other, and only exchange map, distance, and orientation data if they are close enough together that sharing map data will reduce processing burdens on one or both device processors. Thus, if the head mounted device and the linked computing device are not in the same room, it may not make sense to share location, map or orientation data that would be irrelevant to the other device.

In block 1016, the processor may receive data from the head mounted or body mounted stereo cameras, as well as distance measurements that may be obtained by distance sensors. In block 1018, the processor may use any map data received in block 1014 in conjunction with the camera images and any distance measurements in order to orient the device within the map and scene. Optionally, in block 1018, the processor may generate or update three-dimensional map data for any items or structures seen in the images that do not appear within the received map data. If no map data was received from another computing device and the device did not have a map for the location in memory, the processor may generate a new map in block 1018.

In block 1020, the head mounted device processor may process images obtained by the camera using the data from the various sensors, including distance sensors and orientation sensors. This processing may enable the device to locate itself within coordinates or locations within the map data. This processing may also include determining the distance to and orientation of an anchor surface to use in rendering virtual objects.

In block 1022, the head mounted device processor may exchange display and virtual object data with the linked computing devices in order to enable the devices to generate the displays that may be used in collaboration. In block 1024, the head mounted device may begin supporting the user with collaboration, such as by displaying virtual objects on anchor services, detecting and responding to user command gestures, and communicating changes and inputs to other coupled computing devices as described herein regarding the various embodiments.

Figure 11:
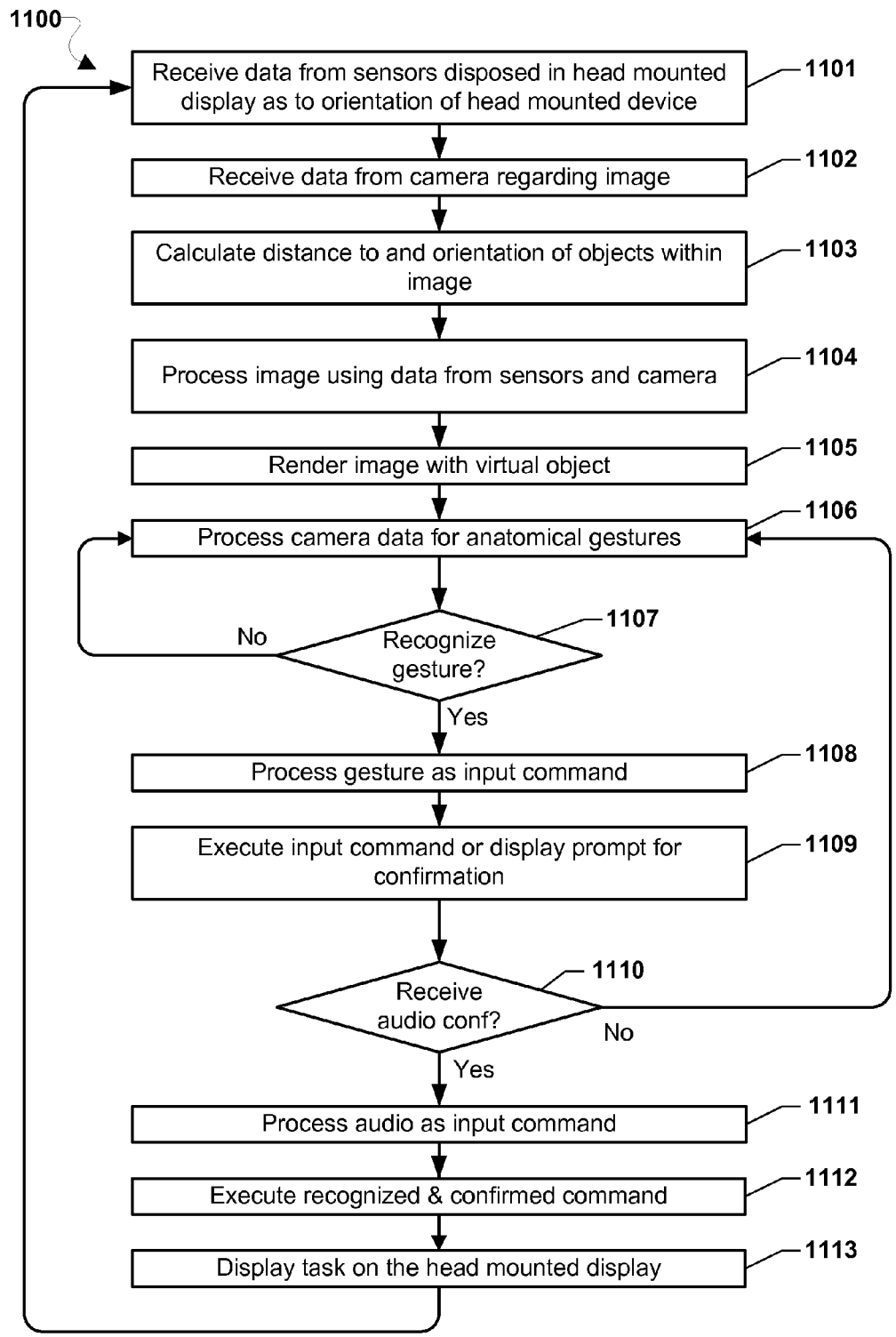
FIG. 11 is a process flow diagram of an embodiment method for recognizing both gestures and audio from a user as a confirmed input command for controlling the head mounted device.

FIG. 11 illustrates an embodiment method 1100 for processing recognized gestures and detected audio as input commands. The gestures and detected audio may execute tasks and instructions on the head mounted display. Method 1100 may be implemented in a computing device having a processor configured with processor-executable instructions to perform operations of the method 1100.

In this embodiment method, user input commands received in one form, such as recognized user gestures, may be confirmed by a user input in another form, such as a verbal command received by a microphone. For example, if a processor of the head mounted device recognizes a first command, such as by processing image data to recognize gestures, the processor may monitor other user inputs for a short period of time for a second command that confirms the recognized first command. In this embodiment, the processor may not implement an action or execute a task corresponding to the first recognized user input unless that action or task is confirmed by a second user input. The second user input may be a voice command received by a microphone, or a second gesture that is recognized within images gathered by the body mounted cameras. This embodiment may be useful since a number of normal user movements may be misinterpreted as command gestures; requiring the user to confirm gesture commands before they are executed and guard against unintended commands being executed. The process of waiting for a confirmatory user input may be invoked when a gesture made by the user is recognized within an image, or the processor believes it has received a verbal command. Generally, this two command confirmation process may avoid a situation where a stray gesture or an inadvertently spoken command may unintentionally be acted upon by the head mounted device. Instead, the head mounted device will await a second command before taking an action. This two-command process may also be implemented based upon the type of command that is recognized, such as when the action associated with a recognized command involves an operation that may be undesirable or irreversible, like deleting a piece of content.

In block 1101 of method 1100, the processor may commence operation by receiving sensor data regarding the orientation of the head mounted device. In block 1102, the processor may receive data from the cameras regarding the captured image. In block 1103, the processor may calculate distance and orientation of objects in the image. In block 1104, the processor may process the image using sensor data, camera data and the distance sensor data. In block 1105, the processor may render the image on the display with the virtual object contained in the image.

In block 1106, the camera data may be processed for determining whether any anatomical features are contained within the view of the camera. Generally, an anatomical feature detection algorithm may be applied to captured camera image data in order to determine whether any features are recognized as being part of the human. For example, the anatomical recognition algorithm may scan the images received from the body mounted camera to determine if an anatomical feature is recognized, such as a hand with five fingers and an arm. The process of recognizing anatomical features may also determine their orientation, such as the angle of a user's arm within the captured image. Positions and orientations of recognized anatomical features may be tracked in images over a time period and compared to a database or dictionary of user gestures to determine movements of the tracked anatomical features correspond to a recognized gesture. If a user gesture is recognized, the processor may output a command in response to the detected gesture. For example, the command may open a software application, or may provide a signal or input to a software application.

The processor is recognizing user gestures may be accomplished in determination block 1107 by comparing movements of recognized anatomical features to a database of predefined anatomical movements, such as may be maintained in a gesture dictionary. For example, a body part, such as a hand, may be recognized in the captured images and its movements tracked over a predetermined time interval. For example, if the processor, using the anatomical model, recognizes that the user's hand and the fingers are positioned in front of the body mounted camera with two fingers outstretched and three fingers are folded downwardly toward a palm of the user, the processor may determine by comparing this orientation of the user's hand and fingers to a gesture dictionary that the that the user is expressing a desire for the processor to take an action. The processor may recognize body part gestural arrangements by comparing image patterns and movements to movement data or patterns stored in a gesture dictionary. Such a gesture dictionary may store gesture data for movements that may include pokes, pats, taps, pushes, guiding, flicks, turning, rotating, grabbing and pulling, two hands with palms open for panning images, drawing (e.g., finger painting), forming shapes with fingers (e.g., an "OK" sign), and swipes, all of which may be accomplished on or in close proximity to the apparent location of a virtual object in a generated display. If the head mounted display recognizes a gesture in the camera image data that matches an entry within the gesture dictionary (i.e., determination block 1107="Yes"), the processor may process an input command that corresponds to the recognized gesture in block 1108. In block 1109, the input command may be executed by the processor. The input may also be any signal or data that is communicated to a software application, or a computing device, or a signal to provide an indication.

Again, as discussed above, the execution of a command based on the recognized gesture may not be accomplished until a second confirming user input is received. Thus, in such an embodiment, instead of executing the command, the processor may display a prompt (or generate a tone) for the user to confirm the recognized gesture command in block 1109. In determination block 1110, the processor may determine whether any audio (or other user input) is received from a microphone for a short period following recognition of a gesture command. If the audio is received within that period of time, the processor may process the audio to determine whether a confirmatory command was spoken to confirm the detected gesture. To accomplish this, audio inputs received from the microphone may be digitized and the resulting data compared to a voice command recognition database for words that correspond to one or more input commands. When the processor determines that an audio input matches a voice command pattern corresponding to command confirmation (i.e., determination block 1110="Yes"), the processor may process an input command that results in an action that corresponds to the audio in block 1111. In block 1112, the processor may execute the recognized command and an indication or the recognized task may be displayed on the head mounted in block 1113.

For example, a user may gesture to anchor the virtual object 14 on a physical surface by pointing. Upon recognizing this gesture, the processor may generate a prompt, such as an audible tone or message presented in the head mounted display requesting the user to confirm the command. To do so, the user may speak words like "okay," "confirm" or "make it so" to confirm that a gesture command recognized by the head mounted device should be executed. Thus, when the processor detects the confirmatory or audible command, the processor may present images in the head mounted display that shows the virtual object anchored on the physical surface to which the user is pointing.

If no audio is received that is recognized as corresponding to a spoken audio command (i.e., determination block 1110="No"), the processor may determine that the gesture that was detected was inadvertent and the processor may ignore the recognized gesture and input command and may continue to process camera data looking for anatomical gestures in block 1107.

Returning to determination block 1107, if the processor does not recognize a gesture within the image data (i.e., determination block 1107="No"), the processor may continue to process camera data for anatomical gestures for a further additional time interval in block 1106. The processor may display a task identifier or icon on the head mounted display in block 1113 indicating that no gestures have been recognized. Alternatively, the processor may display a task identifier or icon as soon as a gesture command is been received, which may serve as a prompt for the user to issue a confirmatory command, such as a verbal command or an "OK" gesture command.

In another embodiment, different first and second commands may be used. In another embodiment, the processor may be configured to detect an audio command first and look for a confirmatory gesture command within received images, effectively swapping the operations performed in determination block 1107 and 1110. In further embodiments, more than one type of confirmatory input may be required, such as an audible command in combination with a button press, etc.

Figure 12:
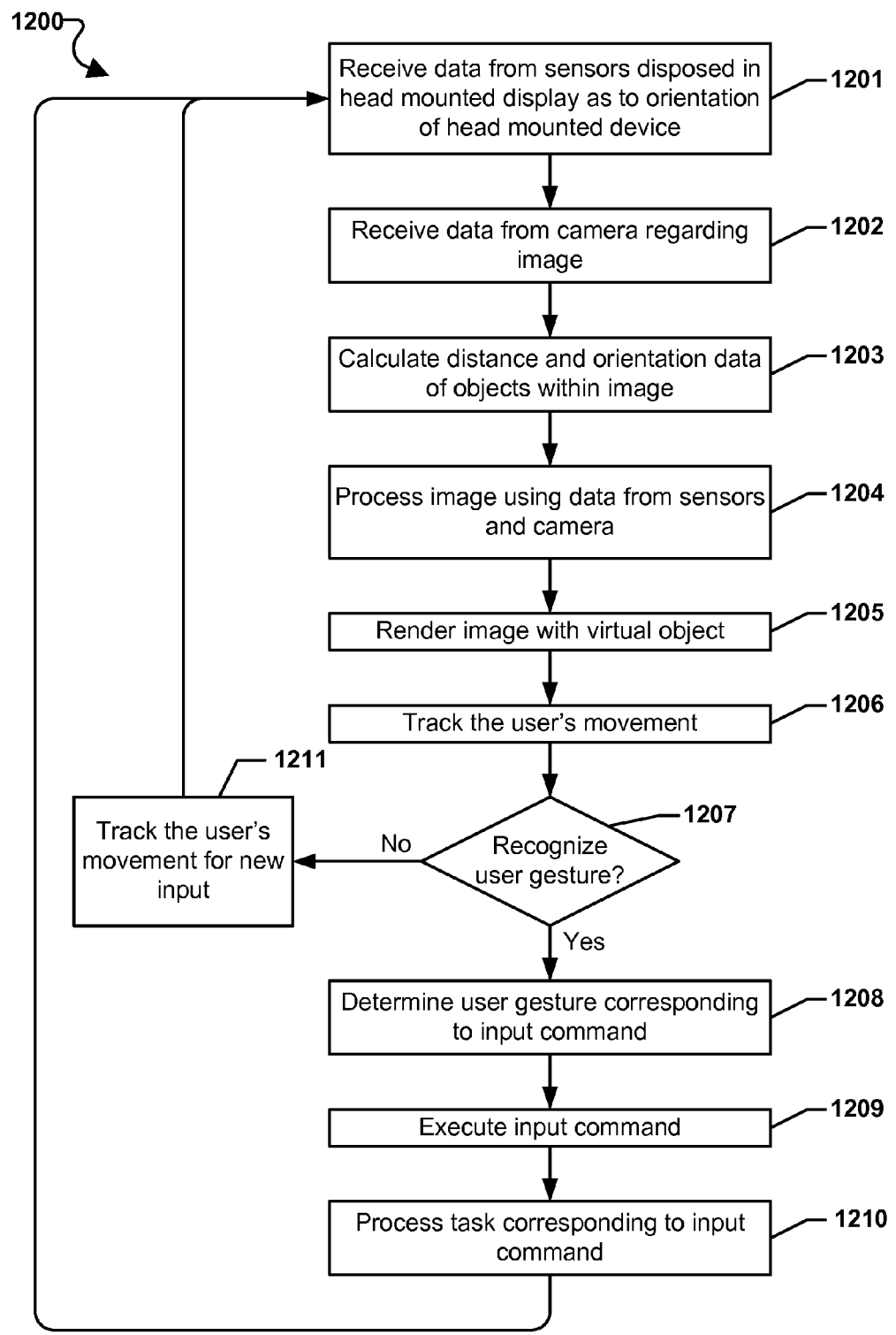
FIG. 12 is a process flow diagram of an embodiment method for using a head mounted device that captures images of a user to recognize gestures as input commands.

FIG. 12 illustrates an embodiment method 1200 for processing recognized gestures as input commands to execute software tasks on the head mounted device. Method 1200 may be implemented in a computing device having a processor configured with processor-executable instructions to perform the operations of the method 1200.

In method 1200 in block 1201, the processor may commence operation by receiving sensor data regarding an orientation of the head mounted device 10. In block 1202, the processor may receive stereo image data from the stereo cameras, as well as data from any distance sensors included in the head mounted device 10 described above. Thus, in block 1202 the processor may obtain all information gathered by the head mounted device regarding images and distances to surfaces within the field of view of the camera(s). In block 1203, the processor may calculate distance and orientation data of objects in the captured image. These calculations may use well known trigonometric methods when stereo images are provided in block 1202, direct measurements when distance sensors are used to provide distance data, and combinations of distance information obtained from sensors and calculated from stereo images. In block 1204, the processor may process the image using distance sensor data, camera data and the distance and orientation data. In block 1205, the processor may render the image on the head mounted display with the virtual object. In block 1206, the camera data may be tracked by the processor. The captured images may be processed and the processor may determine whether an anatomical feature is contained within the captured images. The processor may apply an anatomical feature detection algorithm to the captured images to determine if any features or at least one body part is located within the data. The processor may track the body part over a time interval to determine if a predetermined gesture is recognized.

In determination block 1207, the processor may determine whether any gestures are recognized in the captured image. If so (i.e., determination block 1207="Yes") which indicates the processor has recognized a gesture in the image, the processor may substantially match the determined gesture with an input command stored in memory in block 1208. The processor may execute the input command that corresponds to the detected gesture in block 1209. In block 1210, processor may execute a task that corresponds to the input command. If the processor reaches a decision that there are no recognized gestures (i.e., determination block 1207="No"), the processor may continue tracking the captured images and applying the detection algorithm to the captured images in block 1211 to track for an input.

Figure 13:
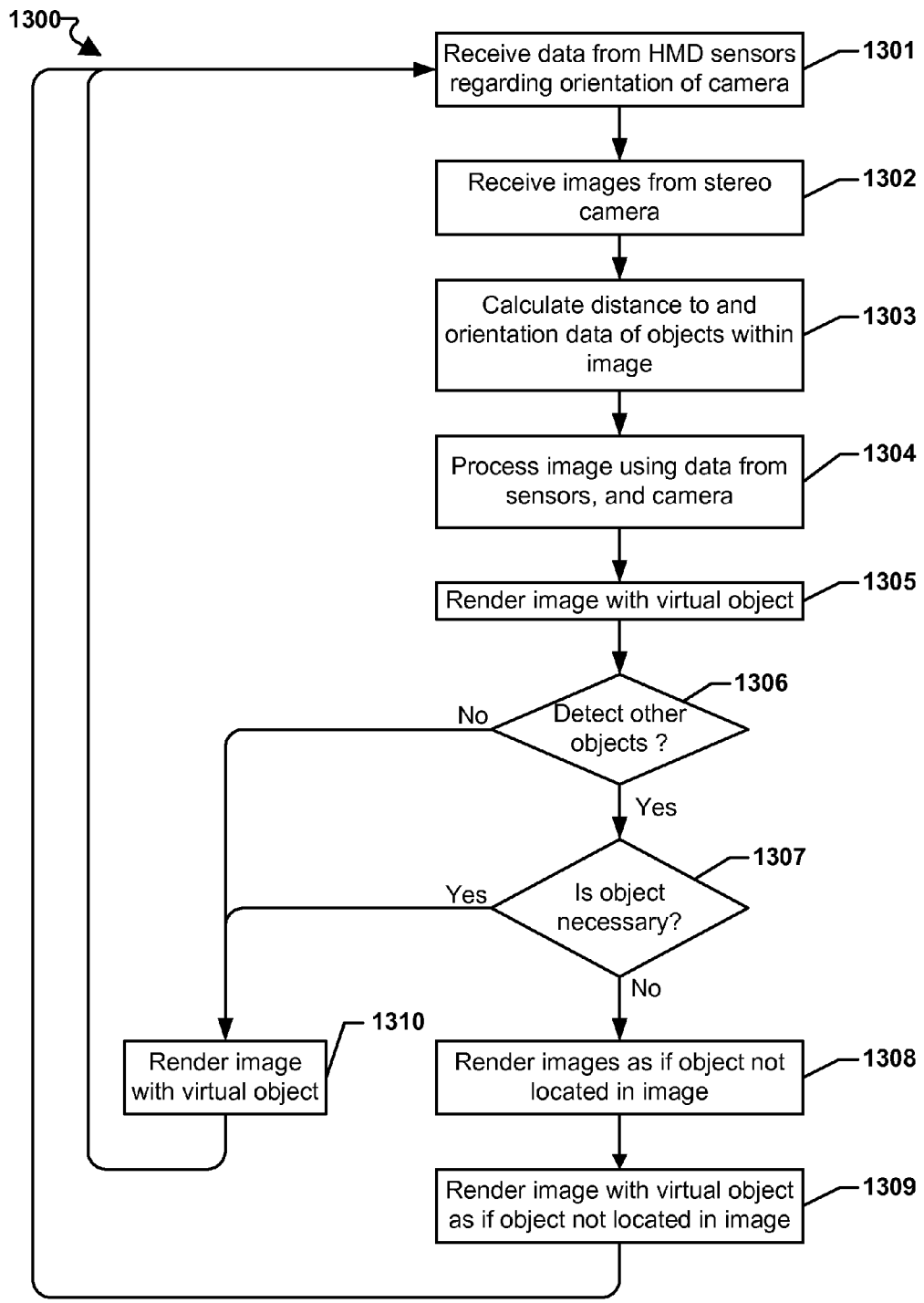
FIG. 13 is a process flow diagram of an embodiment method for controlling the rendering of certain objects within an image.

FIG. 13 illustrates an embodiment method 1300 for detecting objects in the stereoscopic image and providing an interesting visual virtual reality effect based on the detection and interpretation of the detected objects. Method 1300 may display "deemed essential objects" on the head mounted display while the method 1300 may render other "unessential objects" as transparent on the head mounted display. Method 1300 may be implemented in a computing device having a processor configured with processor-executable instructions to perform the operations of the method 1300. In method 1300, the processor may commence operation by receiving sensor data regarding orientation of the camera and head mounted device in block 1301. In block 1302, the processor may capture images and receive data from the cameras. In block 1303, the processor may calculate distance and orientation of objects in the image. In block 1304, the processor may process the image using distance sensor data, camera data, orientation, and the distance data.

In block 1305, the process may render the image on the display with the virtual object 14. In determination block 1306, the processor may determine whether any objects are recognized within the images. For example, an anatomical detection algorithm may be applied to the detected images and data to determine if a body part is detected in the images. For example, an anatomical or a skeletal detection algorithm may be applied to the captured images to detect a body part, such as, an arm or a hand that may be rendered as visible or as transparent. If the processor determines that other objects are detected (i.e., determination block 1306="Yes") which indicates the objects are detected, the processor may determine whether to render the object transparent by superimposing a virtual object on the object so as to make the object appear as if the object has been omitted from the image.

In the various embodiments, virtual objects may be presented with a variety of transparency characteristics. In some embodiments, a virtual object may be displayed as appearing over an outline of a real world object (arm, hands, fingers, and face). In such an embodiment, the virtual object may be changed in shape to match or cover over a real world object. In this manner, the real world object appears to be "see-through" in the image output on the head mounted display. In an embodiment, if the unnecessary object is in front of a wall or table, a virtual object may be generated that resembles the wall and/or table and superimpose the virtual wall/table over the unnecessary object. If the processor determines that no other objects are detected (i.e., determination block 1306="No"), the processor may continue and render the image with the virtual object in block 1310.

In determination block 1307, the processor may determine whether any objects are recognized within the images are necessary. For example, deemed "necessary objects" may be displayed while other deemed "unnecessary objects" may be rendered transparent to omit the object from the image. For example, a deemed necessary object may be a user's own hands in the image but another object that is deemed unnecessary may be a second individual's hands located over the virtual object. The unnecessary object may be displayed in an outline form with the virtual object superimposed over the unnecessary object. The terms necessary and unnecessary may be arbitrarily programmed and selected by the user utilizing a drop down menu or any supported gesture or method for the user to indicate a preference, such as gaze detection, a hand pointing gesture that may be recognized by the head mounted or body mounted cameras, etc. The user may program the head mounted device to display "other users' features" as transparent and display "my features always", or vice versa. If the processor determines that the objects are necessary (i.e., determination block 1307="Yes"), the processor may provide program instructions to render the image in block 1310 with the necessary object and the virtual object. For example, a user's own hands may be deemed necessary and displayed in the image. The terms necessary and unnecessary are arbitrary parameters and may be determined by the user. For example, the user at a set up operating procedure may indicate the objects that are necessary and the objects that are unnecessary and should be rendered as transparent. For example, the user may determine using a drop down menu and an input device that the user's hands are necessary and that other user's body parts in the image are not necessary. For example, many different users may be present in the image and collaborating over an anchored virtual object. The scene may be cluttered with many users and many virtual objects. Therefore, some of the users may be rendered transparent so as to alleviate cluttering in order to enhance collaboration.

If the processor determines that the objects are unnecessary (i.e., determination block 1307="No"), the processor may render the image with the object as transparent in block 1308. In block 1309, the processor may also display the virtual object with the unnecessary object rendered as transparent or with the virtual object displayed over the unnecessary object. In another embodiment, the object may be rendered partially transparent only when the object occludes the virtual object 14 and may be rendered solid when the object does not occlude the virtual object 14.

Figure 14:
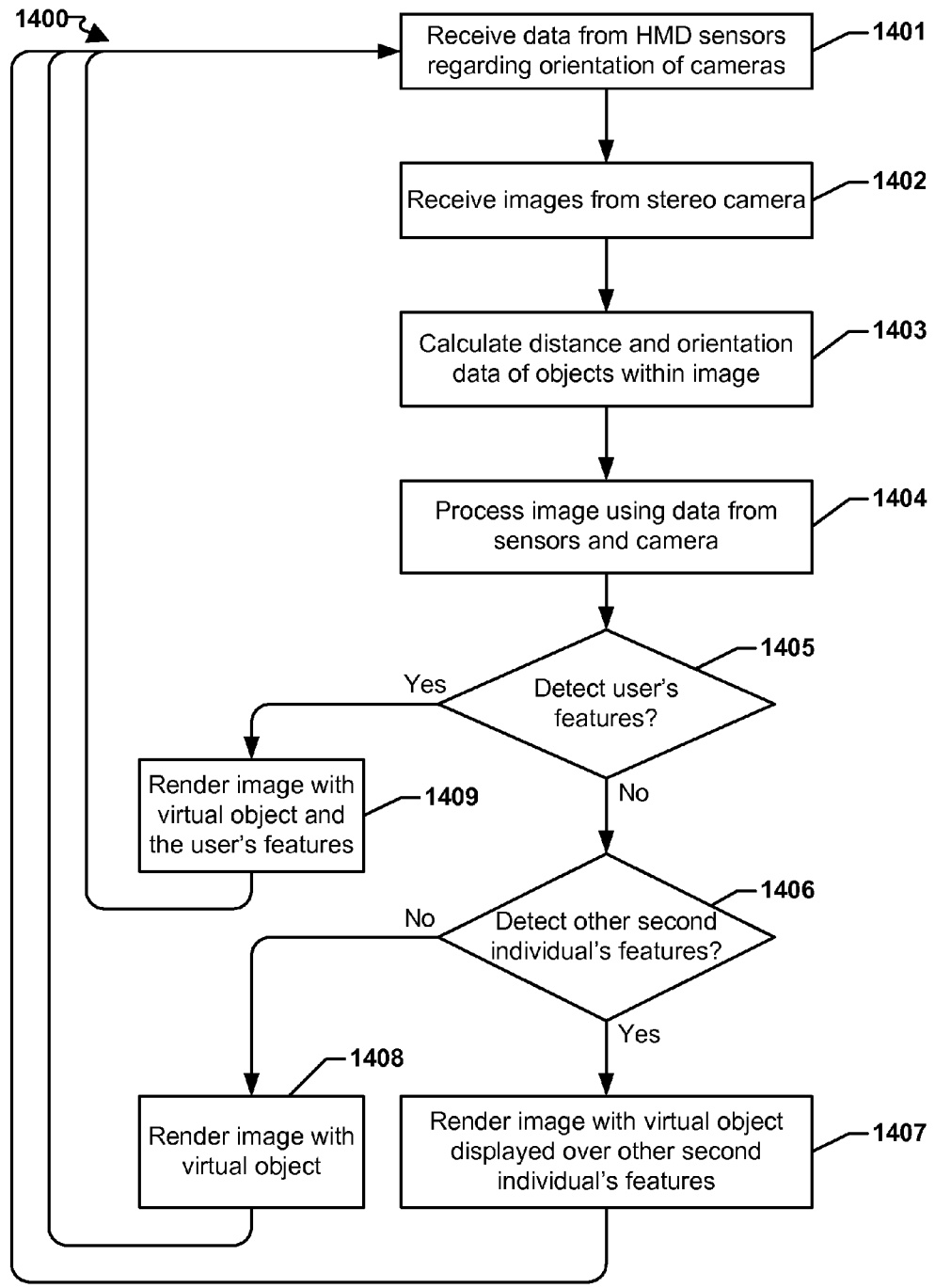
FIG. 14 is a process flow diagram of an embodiment method for using a head mounted device to capture images associated with a user and to detect the user's and other individual's features, and when the other individual's features are detected, to superimpose the virtual object over the other individual's features so as to not occlude the virtual object.

FIG. 14 illustrates an embodiment method 1400 for rendering images on a head mounted display taking into account hands, arms and other human features (e.g., those of the user and another individual) that may appear in the image scene. In this embodiment, the head mounted device processor may capture an image of a scene in which a virtual object is to be displayed, recognize a body part present in the captured image, such as by processing the image using an anatomical model, and adjust the display of the virtual object based upon the recognized body part. The adjustment to the display may involve rendering the virtual object in front of, behind or blended with a recognized body part. For example, the processor may render a virtual object as partially transparent in places where a user's feature (e.g., hands and arms) occludes the virtual object and as nontransparent where the user's feature does not occlude the virtual object. In this manner, the user can see his/her hands in the vicinity of the image of a virtual object while the rest of the virtual object appears solid as if real. Alternatively, the processor may render the virtual object so the user's own features appear in front of or over a virtual object (i.e., solid) while the hands and arms (and other body parts) of another individual are rendered transparent so they are made invisible by the image of the virtual object (i.e., the virtual object blocks the user's view of the other person's hands/arms), or so that the virtual object can be viewed through the other person's hands and arms.

For example, the head mounted or body mounted camera may capture images of the scene which include hands and arms of the user and another individual. The device's processor may apply an anatomical algorithm to the captured image data to recognize body parts within the captured images. For example, the processor may detect a user's hands and a second individual's hands in the captured images by comparing the image shapes to an anatomical model.

Both sets of hands may occlude a virtual object. For example, five fingers and hand size data may be reviewed for the image. The processor may infer that hands which are oriented from top down on captured images are the second individual's hands while other hands that are oriented from bottom up within captured images are the user's hands. Additionally, the processor may capture distance data of the recognized object to formulate an inference. For example, when the processor determines that anatomical features (e.g., arm and hands) are at least a predetermined distance (twelve feet) away from the user, the processor may infer from this information that those features belong to another individual. Additional sensed parameters are also possible and within the scope of the present disclosure. For example, the height of the objects, the orientation of the objects, and the size of the objects may all be utilized.

In method 1400, the processor may commence operation by receiving sensor data regarding the orientation of the cameras block 1401. In block 1402, the processor may receive data from the cameras. In block 1403, the processor may calculate a distance and an orientation of objects in the image. In block 1404, the processor may process the captured image using distance sensor data, camera data, orientation of the image and the distance data. In determination block 1405, the processor may determine whether an object is recognized within the images that corresponds to a user's feature, for example, the user's hands, arms, legs, torso, etc. This determination may involve applying an anatomical analysis to the image by recognizing objects within the captured image, comparing the recognized objects to a skeletal model stored in memory, and determining if any of the recognized objects match a portion of the skeletal model in response to comparing the recognized objects to the skeletal model. The skeletal model may include relative position information about key joints, bones, and limbs of a human skeleton.

If a feature of a person is recognized within the image (i.e., determination block 1405="Yes"), in block 1409, the processor may render the image with the virtual object and the user's features in the image. If no user's features are detected within the images (i.e., determination block 1405="No"), the processor may determine whether the feature is the second individual's features in determination block 1406.

In determination block 1406, the processor may determine whether the second individual's features are detected. This determination may involve determining whether the body part belongs to a first individual or to a second individual in response to recognizing a body part present in the captured image, determining a location and encompassed area of the virtual object, and determining whether the recognized body part overlaps at least one portion of the area encompassed by the virtual object. These features may be rendered transparent by the processor. The processor may omit the object(s) by generating and superimposing a virtual object on the detected feature. For example, the processor may render the virtual object over the second individual's hands on the display. If so (i.e., determination block 1406="Yes") which indicates the second individual's hands are detected and are not necessary in the image, the processor may render the virtual object superimposed in the image over the second individual's hands in block 1407.

If the processor is unable to determine whether the object is the second individual's hands (i.e., determination block 1406="No"), the processor may render the image with the virtual object in block 1408. The processor may determine a number of pixels in the image that correspond to a desired object and then leave an outline of the desired object as displayed, but replace pixels in the image with a virtual object 14. The outline size may vary and may include about 1 percent of the object image length.

Figure 15:
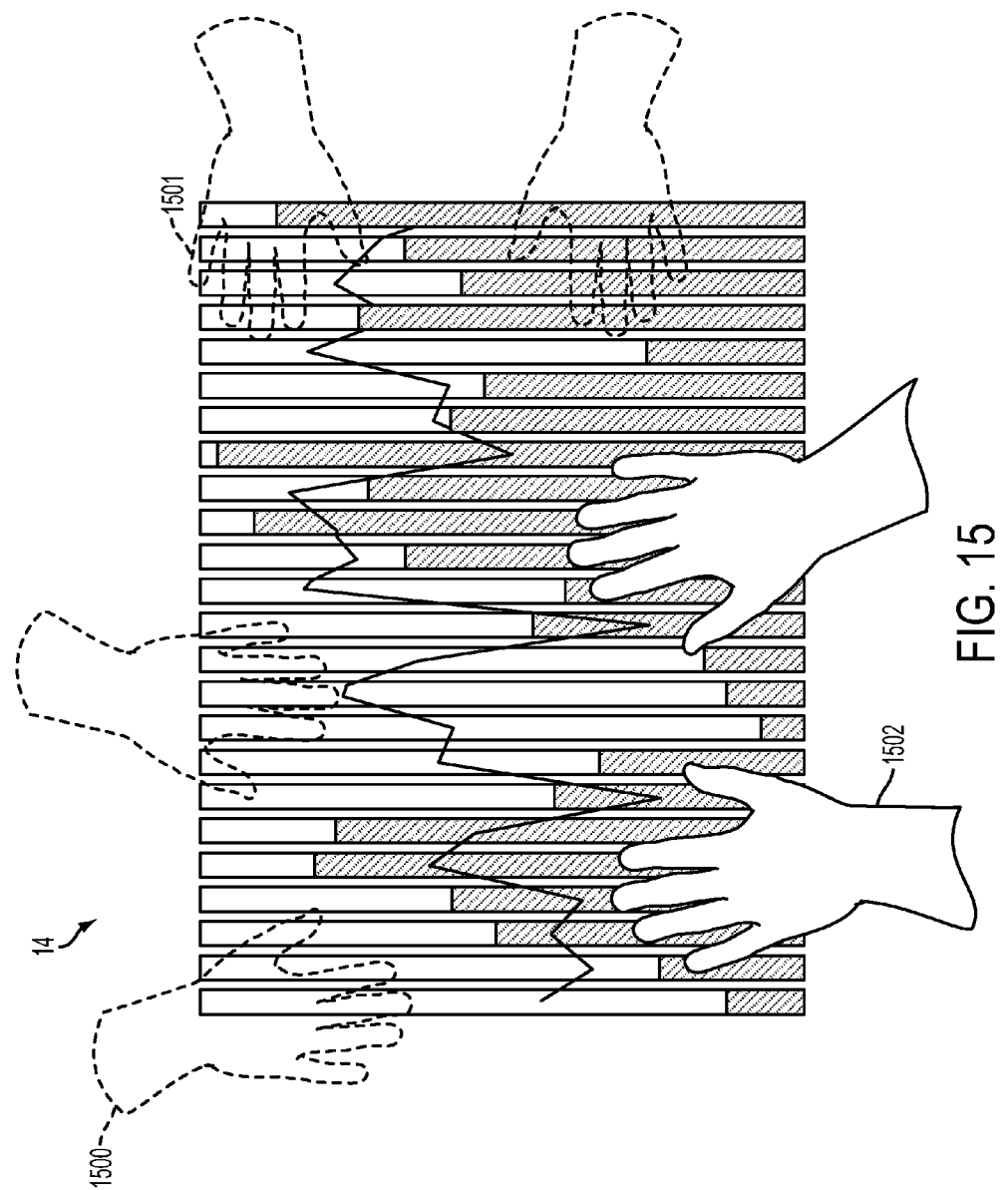
FIG. 15 is a top view of a head mounted display output showing a virtual object with a user's hands and with other individual's hands occluding the virtual object and with the virtual object displayed superimposed on the other individual's hands so they seem transparent.

FIG. 15 illustrates a high level top down view of an illustration of a display output of the head mounted device 10. The display output shows a virtual object 14. The virtual object 14 is illustrated as a virtual flat panel screen that outputs data. In this embodiment, the virtual screen outputs a graphical table with a number of bar charts. Multiple users may collaborate over the virtual object in a virtual reality setting in that the virtual object 14 only appears in the output of the display but appears to be a tangible, real object to the viewer.

In the illustrated example, the processor detects a user's features or hands 1502 and detects two other individuals' features or hands 1500 and 1501 over the virtual object 14 within the stereoscopic image. As illustrated in FIG. 15, the user's hands are allowed to be displayed by the processor as an essential element in the display. The user's hands will appear over and will occlude the virtual object 14. Additionally, two other individuals' features may be rendered seemingly transparent on portions of the virtual object 14 since these elements are deemed to be not essential and may distract or may clutter the view of the user of the head mounted device 10. The virtual object 14 may be displayed by the processor as superimposed and fitted over the hands 1500 and 1501 so the hands 1500 and 1501 do not occlude the generated virtual object 14.

In the illustrated example, the second user's hands 1501 are rendered by the processor as "transparent" and as shown by the outline of the second individual's hands 1501 rendered over the virtual object 14. The virtual object 14 portion that should normally be occluded may be rendered directly on the second individual's hands 1501. In the illustrated example, the second user's hands 1501 appear to be transparent with only an outline of the hands 1501 shown. The other user's hands 1502 are rendered as a "solid object" in the illustrated example, with those hands 1502 rendered over and occluding the virtual object 14. In the illustrated example, the hands 1502 appear to be solid and the virtual object 14 may be not visible underneath. In an embodiment, the other individual's hands may be detected and rendered with an outline of the hands 1500 and 1501. A remainder of the hands 1500 and 1501 are illustrated as being rendered beneath the virtual object 14.

The head mounted or body mounted camera may capture images and apply an anatomical model to the captured image data to recognize a body part. For example, this may be a user's hands 1502 and a second individual's hands 1500 and a third individual's hands 1501 over the virtual object 14. For example, five fingers, hand size data, a portion of the arm, the orientation of the hands, the orientation of the fingers, distance data and orientation data may be reviewed. The processor may infer that hands that are oriented from the top of the image and extending toward the bottom of the image are the second individual's hands 1500. The processor may also infer that hands oriented from a right side of the image and a certain distance away from the camera 1501 are the other individual's hands 1501. The processor may also infer that a third set of hands 1502 which are oriented so they extend from the bottom of the image up are the user's hands if they are within a distance range and positioned in the image with respect to the orientation of the head mounted device 10 consistent with an anatomical model. Additional sensed parameters may also be used by the processor in recognizing body parts. For example, when the user's hands or arms have been tracked, the processor may infer that all other hands in the displayed image belong to other users, and therefore the processor may render those remaining hands as outlines or transparent in the image presented on the head mounted display.

FIG. 16 illustrates another embodiment of the head mounted device 1600 communicating with a mobile device 1605 across a high speed data link to leverage processing resources. FIG. 16 illustrates a number of subcomponents of the head mounted device 1600. The head mounted device 1600 may be operable as an accessory to a mobile CPU (phone, tablet etc.) with the main processing performed on the mobile CPU. Generally, the head mounted device 1600 may be made as lightweight as possible to be comfortably worn around the head of the user. The head mounted device 1600 may leverage the processing and data storage resources of a mobile device 1605 and a VIRT control system 1610 may be implemented within the software applications running on the mobile device 1605. The mobile device 1605 may provide processing functions, increase memory, and conserve battery life of the head mounted device 1600 by performing the processing at the mobile device 1605.

The head mounted device 1600 comprises a scene sensor (a RGB-D camera) 1615 connected to a processor. The head mounted device 1600 may also include an audio sensor (microphone) 1620 and a stereoscopic display 1625. The display 1625 may be a semitransparent OLED video display 1625. The head mounted device 1600 may also include an ear bud that includes a speaker or may alternatively include a pair of headphones 1630. In another embodiment, the head mounted device 1600 may comprise a stripped down device 1600 to be lightweight. The device 1600 may comprise a wireless interface, a scene sensor 1615, a battery and a display 1625. The wireless interface may communicate data to a processor in the mobile device 1605 which may be configured to run a VIRT control system 1610 so the head mounted apparatus remains lightweight and comfortable on the user. As described in more detail below with reference to FIG. 41, a mobile device 1605 includes a processor and a memory, and in an embodiment the processor may be configured with a VIRT control software module 1610 that may be configured to interoperate with the head mounted device 1600. The mobile device 1605 and the head mounted device 1600 may communicate using a high speed data link 1612, which may be wired or wireless. For example, the high speed data link 1612 may be a short range wireless data link 1612 selected from any one or more of Bluetooth®, Wi-Fi®, Qualcomm's Peanut®, and ZigBee® wireless protocols.

For example, sensor data may be captured utilizing sensors 1615, 1620 and 1630 and converted to digital data. The digital data may be communicated to a wireless device and the digital data may be communicated along link to the control system 1610 operable on the mobile device 1605. The control system 1610 may process the sensed data and may render display data. For example, the control system 1610 may receive scanned images and distance data of the area and generate a virtual object on at least one surface in the room. The display data may be communicated back along the link and output on the head mounted display 1625.

Figure 17:
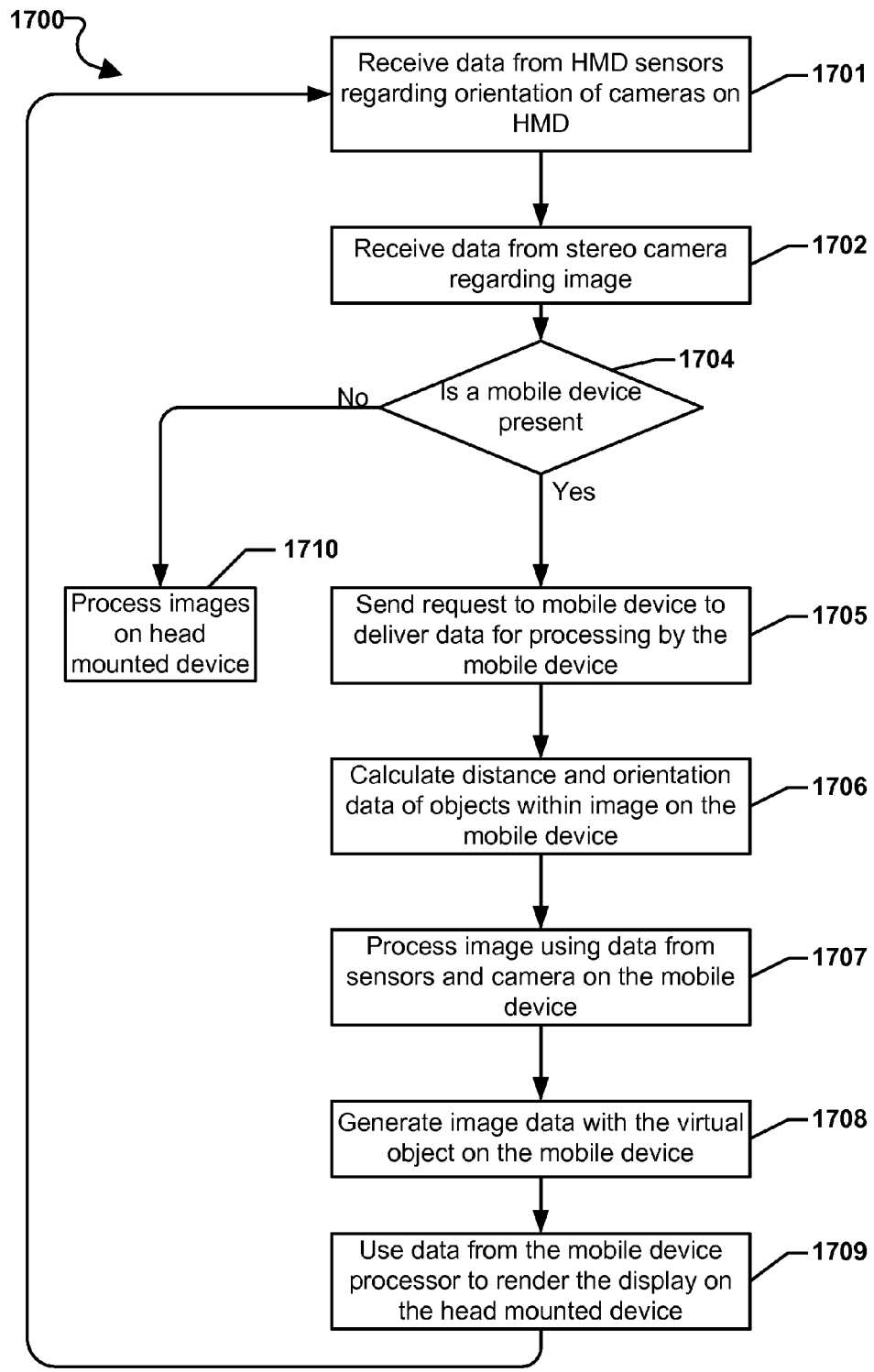
FIG. 17 is a process flow diagram of an embodiment method for using a head mounted device to wirelessly link to the mobile communication device to exchange data.

FIG. 17 illustrates an embodiment method 1700 for using a high speed link between the mobile device and a head mounted device to enable off loading of sensor data processing to the mobile device. Method 1700 may be implemented in a computing device having a processor configured with processor-executable instructions to perform the operations of the method 1700. In block 1701, the processor may receive sensor data regarding orientation of the head mounted device and its cameras. In block 1702, the processor may receive image data from the device's cameras. In determination block 1704, the processor may determine whether a mobile device is present, wirelessly communicating with the head mounted device and able to assist with processing and memory storage. If no (i.e., determination block="No"), in block 1710, the images may be processed by the head mounted device as described in other embodiments.

If a mobile device is present, wirelessly communicating with the head mounted device and able to assist with processing and memory storage (i.e., determination block="Yes"), the head mounted device may send sensor data to the mobile device for processing by the mobile device processor in block 1705. In block 1706, the mobile device processor may calculate distance and orientation data for objects within the image based on the received data. In block 1707, the mobile device processor may process the image data using sensor and camera data received from the head mounted device. In block 1708, the mobile device processor may generate display data for the virtual object using the sensor and image data received from the head mounted device, and transmit the generated display data to the head mounted device. In block 1709, that head mounted device may use display data received from the mobile device to render images on the head mounted display. This process may continue by returning to block 1701, although once the head mounted device is determined that a mobile device is present (i.e., determination block 1704="Yes"), then a determination may not be repeated for a current session.

Figure 18:
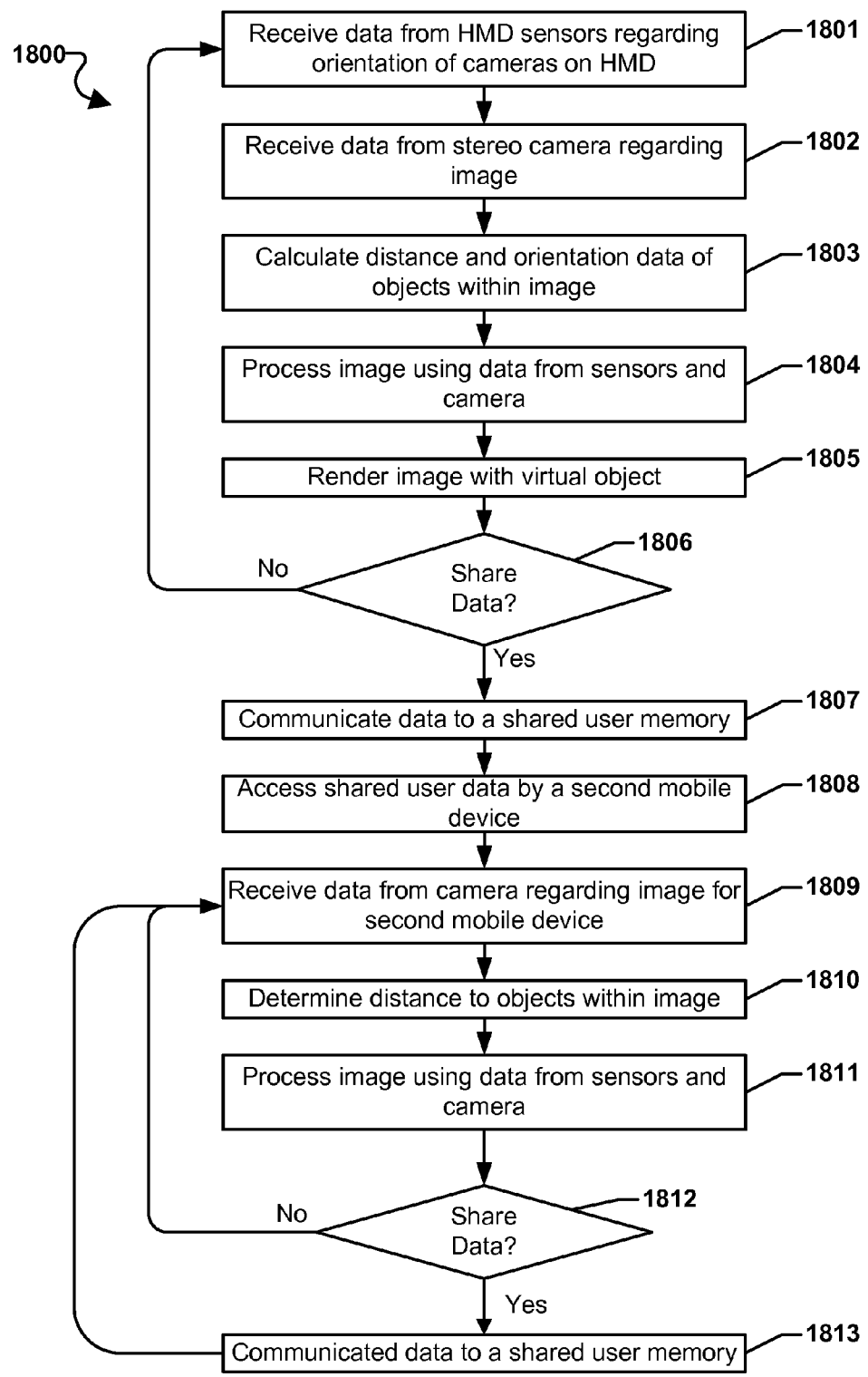
FIG. 18 is a process flow diagram of an embodiment method for using a head mounted device to scan an area, calculate parameters of an area, and upload the calculated parameters of the area to a shared memory for access by another device.

FIG. 18 illustrates a method 1800 for communicating data to a shared user memory so a second head mounted device may access shared data. Method 1800 may alleviate a processing time to render an image or may alleviate processing time to generate a virtual object on a properly oriented display. For example, the processor may, in some embodiments, process image data and also receive image data, or location data from a storage medium to render a virtual object faster. Method 1800 may be implemented in a computing device having a processor configured with processor-executable instructions to perform the operations of the method 1800.

In method 1800, the processor may commence operation by receiving sensor data regarding orientation of the cameras. In block 1802, the images may be captured and the processor may receive stereo image data from the cameras. In block 1803, the processor may calculate distance and orientation of objects in the image. In block 1804, the processor may process image data from the sensors. In block 1805, the image may be rendered with a virtual object. In block 1806, a determination may be made regarding whether to share data to a remote storage medium so another head mounted device may receive the shared data and utilize the shared data. For example, the other head mounted device may obtain position data, or may use the shared data to render the image and the virtual object.

If the processor determines to share data to a remote storage medium (i.e., determination 1806="Yes"), the data may be communicated to a shared memory in block 1807. If the processor determines not to share data to a remote storage medium (i.e., determination block 1812="No"), the processor may continue to block 1801 to continue to capture data. A second head mounted device 10b may access the data from the storage medium in block 1808 and may receive the data in block 1809. In block 1810, the distance data may be calculated and the image processed in block 1811. A determination may be reached in determination block 1812 to share data that is aggregated by the second head mounted device 10b. For example, the data may be scanned sensor data or other data to collaborate. The data may be transmitted by the processor and stored at the storage medium. If the processor decides to share data aggregated by the second head mounted device (i.e., determination block 1812="Yes"), data may be communicated to a shared memory in block 1813. If the processor decides not to share data aggregated by the second head mounted device (i.e., determination block 1812="No"), the processor may continue to block 1809 to continued to receive data regarding the image.

Figure 19:
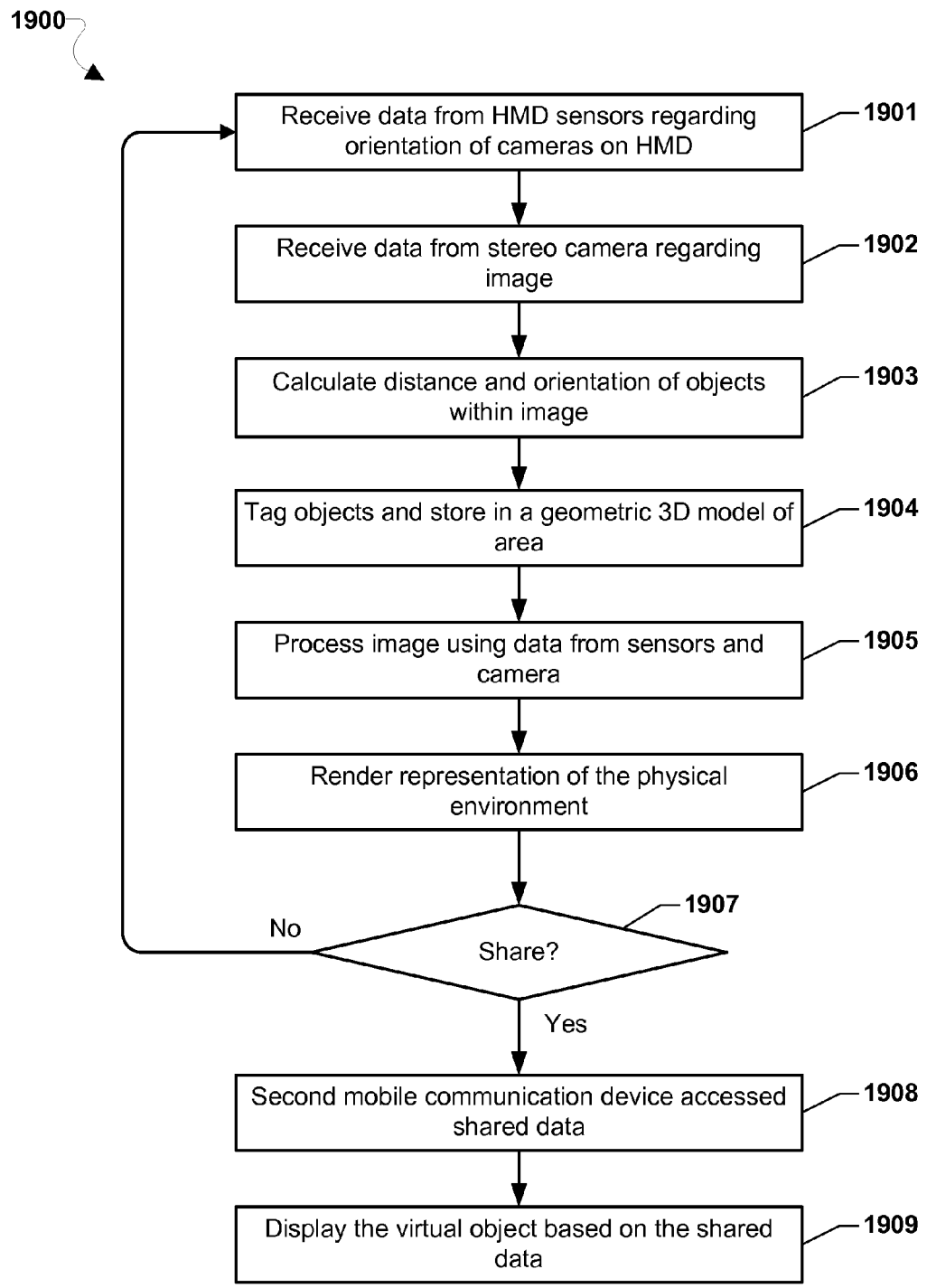
FIG. 19 is a process flow diagram of an embodiment method for using a head mounted device to generate a three-dimensional model of an area, tag the data with location data, and upload the model to share the data with other devices.

FIG. 19 illustrates an embodiment method 1900 for sharing data over a communication network and for use by multiple devices. A head mounted device 10 may share resources with a second mobile communication device 10b. The method 1900 may be implemented in a computing device having a processor configured with processor-executable instructions to perform the operations of the method 1900.

In method 1900, the processor may commence operation by receiving sensor data regarding orientation of the cameras. In block 1902, the processor may receive stereo image data from the cameras. In block 1903, the processor may calculate distance and orientation of objects in the image. The processor may convert the image data and the position and orientation data. The data may be tagged with position data for use by a second head mounted device. The second head mounted device may receive the distance, image, and the tagged positional data. The second head mounted device may utilize the data in order to render the image with the virtual object in the image with minimal processing.

In block 1904, the processor may tag objects in the image to store the tagged information in a geometric three-dimensional model. The tag may comprise geographic position data that may be obtained from a GPS device. In an embodiment, the position data may describe objects in the room and the relative position of objects relative to one another. In another embodiment, each object may be assigned GPS coordinates including an orientation of the objects. In an embodiment, the tag may comprise at least four separated positional coordinates. In a further embodiment, data associated with the virtual object may also be tagged with position data. In block 1905, the processor may process the image using sensor data, camera data, orientation of the image and the distance data. In block 1906, the processor may render the physical environment in a model. The model may be uploaded and transmitted by the processor to a storage medium, which may be accessible by other head mounted device(s) or separate processors connected to other head mounted device(s). As mentioned herein, the head mounted devices may be configured to be light weight by leveraging external processors and storage media (e.g., a smart phone, personal computer, or server accessible via a local wireless network). A second head mounted device may determine its position and may form a request to a storage medium to access scanned data relating to a current position. The storage medium may receive the request. The storage medium may communicate the data to the head mounted device based on the position.

In determination block 1907, the processor may determine whether to share the data. If so (i.e., determination block 1907="Yes"), the processor may share the data and communicate the data to a mobile device (block 1908) associated with a second user, or to a storage medium, where a computing device may request data from the storage medium. For example, the storage medium may comprise another computing device, a server, or a network distributed computing device. If the processor determines not to share the data (i.e., determination block 1907="No"), the processor may continue to block 1901 to continue to receive data from the sensors regarding orientation of the camera and capture images in block 1902. In block 1908, a second head mounted device may access the shared data. The processor may utilize the shared data to display the virtual object in block 1909 while reducing the amount of processing to render the virtual object.

Figure 20:
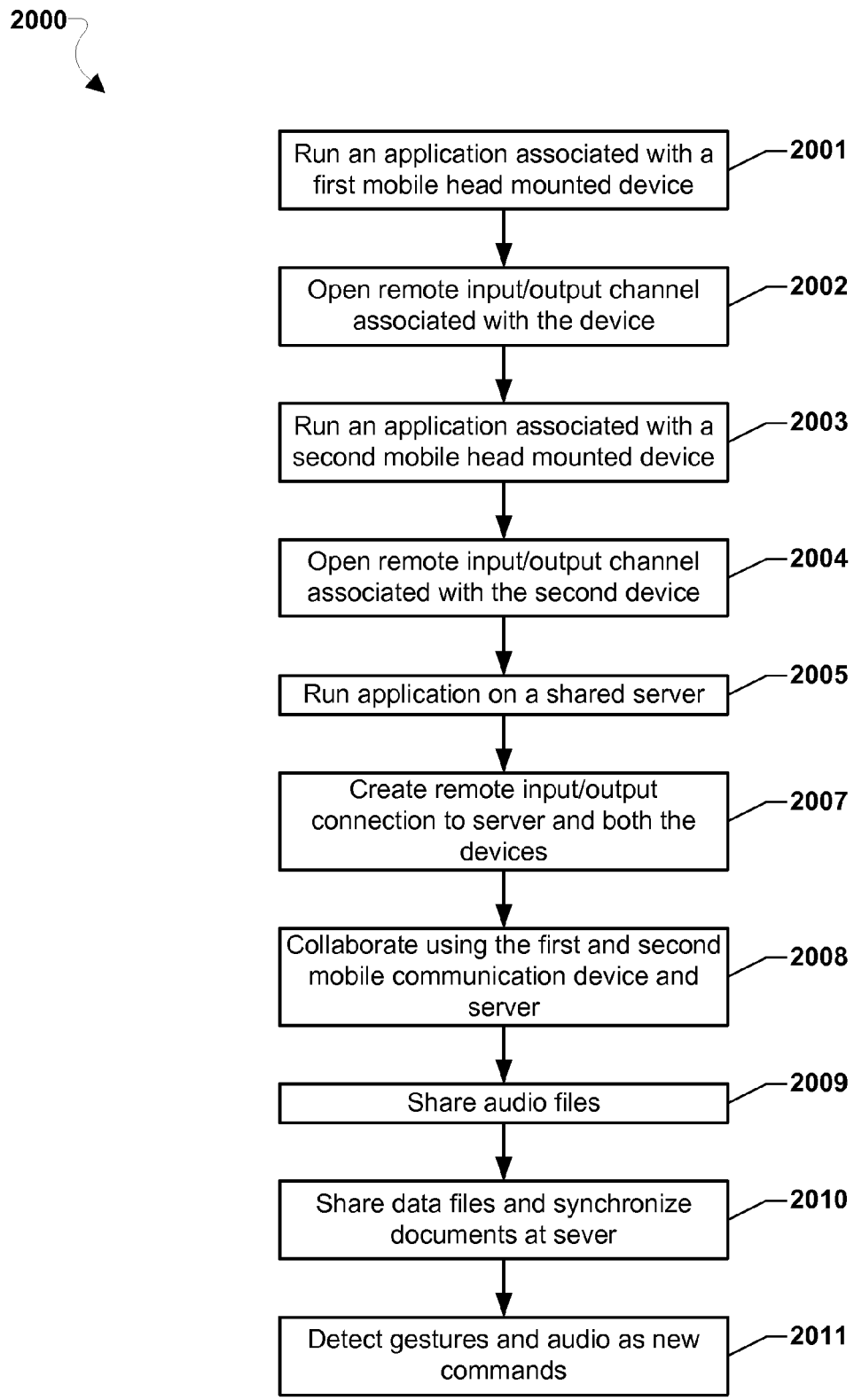
FIG. 20 is a process flow diagram of an embodiment method for using a head mounted device to execute an application on a server and share the data with other devices.

FIG. 20 illustrates an embodiment method 2000 for using a server to share location coordinate data and scanned data between at least two head mounted devices to render a virtual object. For example, a processor may share data over a communication network for use by multiple devices so the devices may process image data, positional data, orientation data, distance data and more quickly render a virtual object in an image by obtaining shared data or may share other data useful for collaboration purposes between software applications. For example, one user may be able to access another user's files stored in memory. The method 2000 enables a processor to collaborate and share resources with other devices. Method 2000 may be implemented in a computing device having a processor configured with processor-executable instructions to perform the operations of the method 2000. In block 2001, the processor may commence operation by executing an application associated with a first head mounted device.

In block 2002, the processor may open an input/output channel that is associated with the head mounted device. The processor may execute an application with second head mounted device in block 2003 and open the channel in block 2004 to communicate over the channel. The processor may execute an application on a shared server in block 2005. In block 2007, the processor may create a connection to the server and both head mounted devices using the RF channel. The processor may collaborate using the first and the second head mounted devices and the server in block 2008. In block 2009, the processor may share audio data. In block 2010, the processor may share data files and synchronize documents at the server. In block 2011, the processor may detect audio gestures at the mobile devices for new commands.

Also, as described above, sharing of image and audio data generated by one or more of the head mounted devices with a server may enable others to observe the collaborations in a virtual or augmented reality experience by seeing and hearing the same thing as participants by wearing a head mounted device that receives image and audio data from the server. By enabling bi-directional communications between observer head mounted devices, and between the server and participant head mounted devices, the observers wearing head mounted devices may also have the ability to interact with virtual objects seen in the head mounted displays. Observer interactions with virtual objects may include touching the augmentation to cause an effect, defining an interactive area or anchor point on the physical surface (effectively adding a new augmentation to the shared experience), and interacting with the shared mixed reality scene via gestural and/or audio inputs. Any of such changes in the virtual experience made by observers may be reflected in the head mounted displays worn by the participants and other observers.

Figure 21:
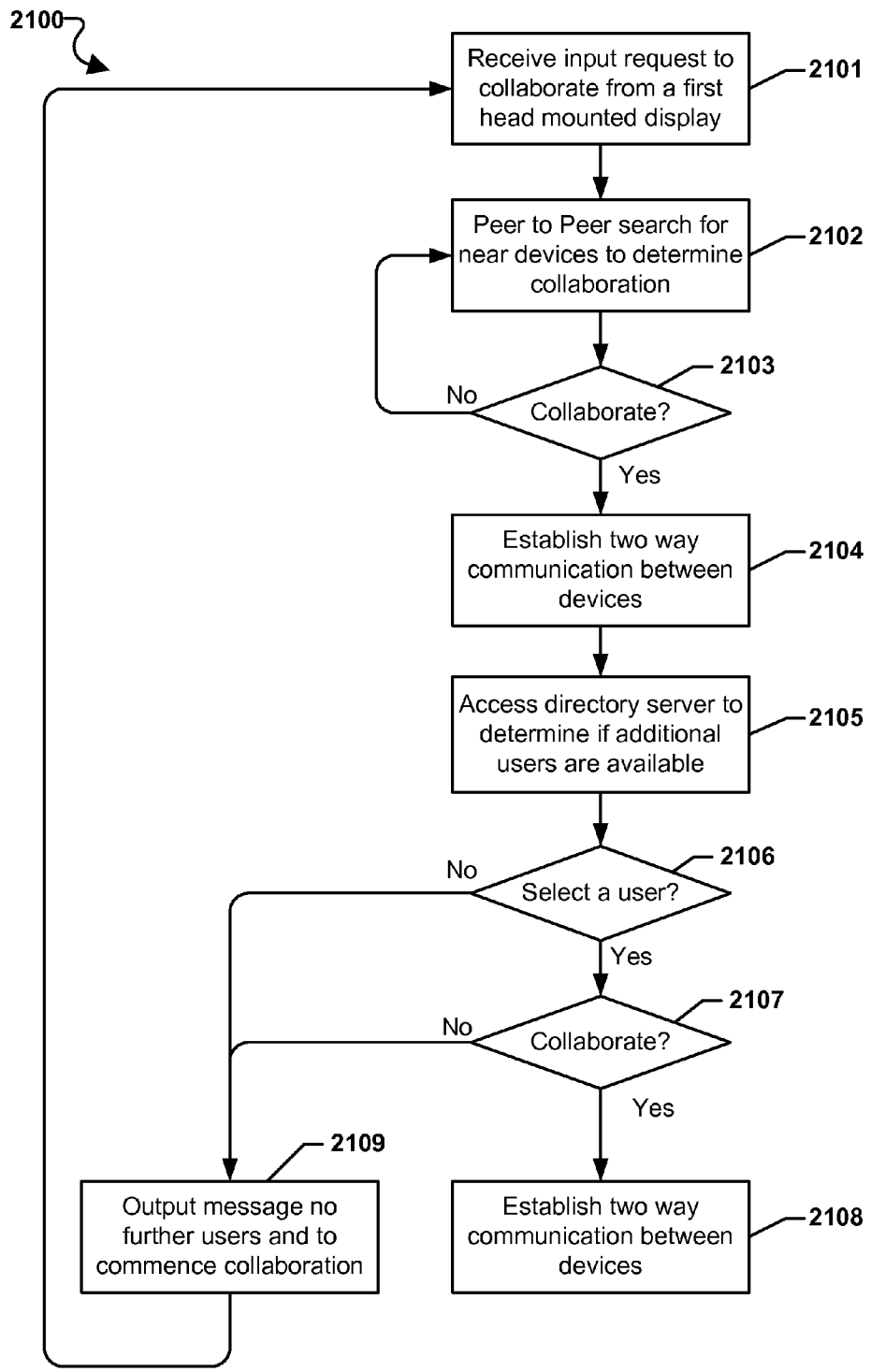
FIG. 21 is a process flow diagram of an embodiment method for using a head mounted device to discover other head mounted devices by a directory to share data with other devices and for collaboration.

FIG. 21 illustrates an embodiment method 2100 using a server to share data between at least two devices via an identifiable directory. The directory may identify other capable devices and head mounted devices in a predetermined area. Once a head mounted device enters an area, the head mounted device may register and may store address information on a directory, which may be shared with other head mounted devices. In alternative embodiments or in a possible implementation of the embodiments the scanning function may be performed by an attached processor unit, such as a smartphone. The use of a scanning of an area by a separate device may be particularly appropriate when a lightweight head mounted device is used. This way a head mounted device may quickly determine from a centralized location if other head mounted devices are available for collaboration and to share scanning resources. Method 2100 may be implemented in a computing device having a processor configured with processor-executable instructions to perform the operations of the method 2100. The directory may be computer readable data that provides information about available devices. This facilitates sharing data over a communication network for use by multiple devices. For example, the directory may include information about scanned areas in a building with geotags associated with the directory so a device 10 knowing its position may check the directory to obtain scanned data to render a virtual object 14. For example, the data may include data about the virtual object 14, may include data about one or more surfaces in the area, orientation data, object position data, or any other useful or processor intensive data, which can be obtained quickly.

Embodiment method 2100 enables collaboration and sharing resources to minimize an amount of processing performed by the head mounted devices themselves. In method 2100, the processor may commence operation by receiving an input request to collaborate from a first head mounted device that may be running an application in block 2101. In block 2102, the processor may initiate a peer to peer search for near devices for collaboration. In determination block 2103, the processor may determine whether to collaborate with discovered devices. If so (i.e., determination block 2103="Yes"), the processor may create a connection between the devices. The processor may collaborate using a two way communication link. The communication link may be formed between the first and the second head mounted devices 10 and 10*b* in block 2104.

The processor may access a directory in a server. Processor utilizing the directory may determine if other users are available for collaboration in block 2105 by scanning the directory. In determination block 2106, the processor may determine whether to select a new user. The processor may determine whether to select a new user based on an input or based on a decision rules engine that may collaborate based on one or more predefined relationship rules. If the processor determines to select a new user (i.e., determination block 2106="Yes"), the processor may proceed to determination block 2107 to determine whether to create a connection to the new user for collaborating. In determination block 2107, the processor may determine whether to collaborate with the new user. If the processor determines to collaborate with the new user (i.e., determination block 2107="Yes"), the processor may create a connection to relevant devices and may collaborate using the first and the second head mounted devices in block 2108.

If the processor determines not to collaborate with the new user (i.e., determination block 2106="No"), the processor will output a message to the user that no further users are expected and to commence collaboration in block 2109 with the existing participants. If the processor determines not to select a new user (i.e., determination block 2107="No"), the processor will assume that the collaboration is declined. The processor may output a message that no further users are expected and to commence collaboration in block 2109 with the existing participants.

Figure 22:
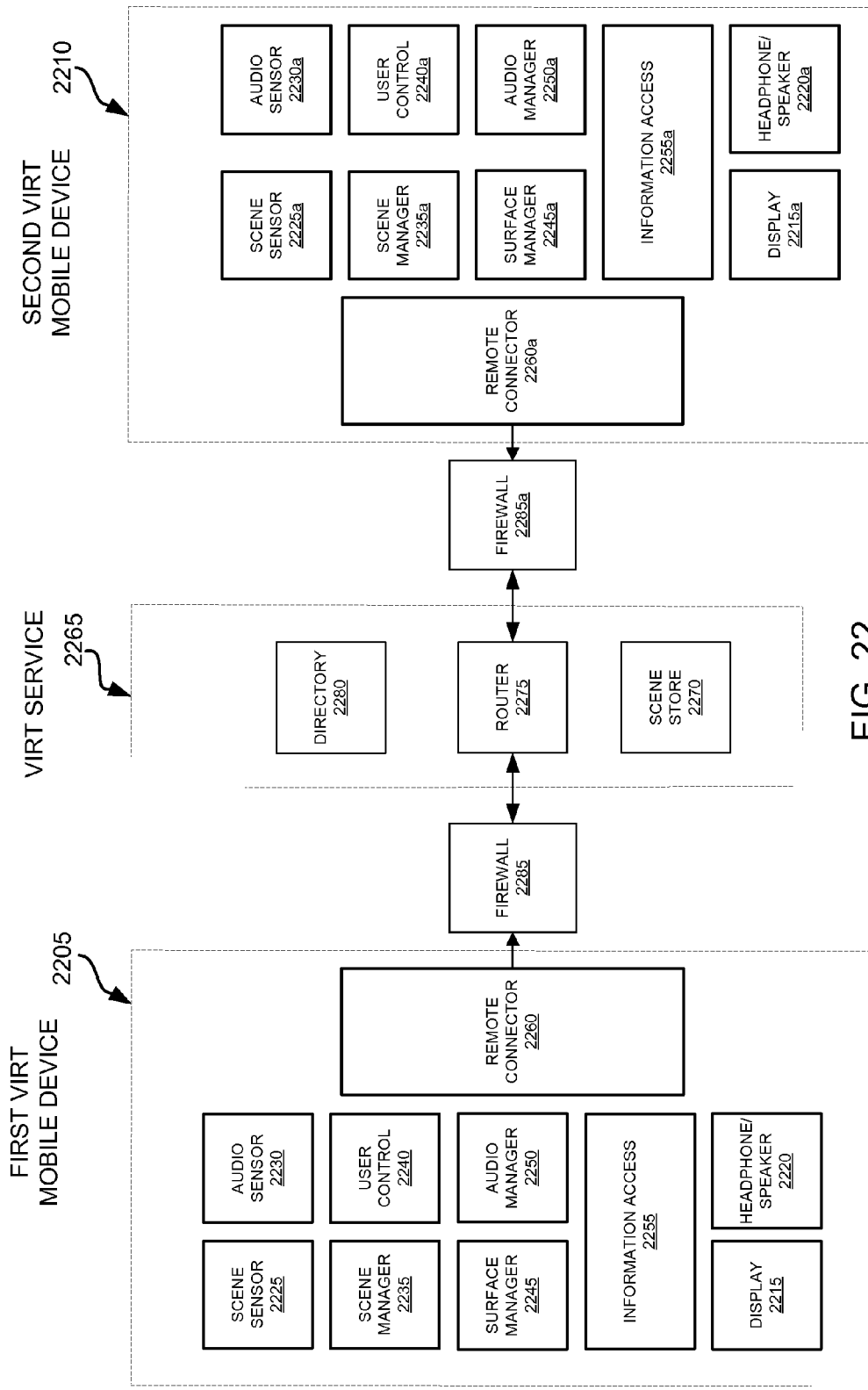
FIGS. 22-23 illustrate two head mounted devices accessing a shared service or a shared memory to exchange scanned data and to collaborate with one another.

FIG. 22 shows a high level illustration of a first head mounted device 2205 and a second head mounted device 2210 being located at two different geographic locations. FIG. 22 illustrates a number of components of the first and the second head mounted devices 2205, 2210 and also a VIRT service component 2265 that may provide data exchange functions between the head mounted devices 2205, 2210. The first and the second head mounted devices 2205 and 2210 may share digital assets including a three-dimensional map of a scanned area to reduce processing at the new head mounted device entering the new location. The sharing may increase a battery life and may assist with rendering images in a rapid manner. In another embodiment, the scanned three-dimensional map of one user may supplement the map of a second user. In another embodiment, the map of one user may replace the map of a second user. In a further embodiment, the map of one user may be referenced and used to check another's scanned data. For example, this reference may occur within a predetermined time frame.

At the expiration of the time frame or in the event processing constraints are burdensome the second user may utilize the first user's map. In another embodiment, the first head mounted device 2205 and the second head mounted device 2210 may be located at two far geographic locations relative to one another and may not scan similar areas. Therefore, while digital assets and virtual objects would be shared between the head mounted devices 2205 and 2210, there may be no need to share map data as such information would not be relevant to collaboration. Instead, the sharing of three-dimensional maps may be most useful for user's that are located close by or in the same building where the head mounted devices 2205 and 2210 are required to scan an area.

The first user operates the first head mounted display device 2205 that may have a display 2215, a speaker 2220, an image scene sensor 2225 and an audio sensor 2230. The first head mounted device 2205 may also include a wireless or wired interface 2260 and a controller that include a number of control components. In another embodiment, the head mounted device may comprise a display 2215, a wireless interface 2260, a battery (not shown), a speaker 2220, and a microphone/audio sensor 2230. Components include a scene manager block 2235, a user control block 2240, a surface manager block 2245, an audio manager block 2250 and an information access block 2255.

The second user also operates the second head mounted device 2210, which include similar components. Second device 2210 may have a display 2215a, a speaker 2220a, an image scene sensor 2225a and an audio sensor 2230a. The second device 2210 may also include a wireless or wired interface 2240a and a controller. Controller include a number of control components including a scene manager 2235a, a user control block 2240a, a surface manager block 2245a, an audio manager block 2250a and an information access block 2255a.

Each of the devices 2205 and 2210 communicate with a control provider 2265 that may provide service functionality for each of the devices 2205 and 2210. The control provider 2265 may assist the two devices 2205 and 2210 and may provide services on behalf of the devices so the devices 2205 and 2210 remain lightweight and do not need to necessarily perform computational intensive processing locally. Like any two Internet connected devices, the control provider 2265 may have to implement firewalls 2285 and 2285a to protect them from hacking attacks and malware (e.g., may be provided by local software, Internet service providers and/or enterprise service providers). Firewalls 2285 and 2285a restrict access to the control provider 2265. In another embodiment, the firewalls 2285 and 2285a are optional and are absent.

The control provider 2265 may include a directory 2280, which maintains data pertaining to many devices including identification and routing information to the devices 2205 and 2210. The control provider 2265 may also include a scene storage block 2270. The scene storage block 2270 processes data relating to surface and contour information of scanned images. The surface and contour data may include distance, shape and orientation data. The scene storage block 2270 may permit a first user to map a first area, and store the data for the benefit of a second user's head mounted device to more rapidly render the scene or to verify scanned data parameters. The control provider 2265 facilitates sharing digital assets. The control provider 2265 may provide a communication link between the wireless interface 2260 and 2260a, which may be optimized. The control provider 2265 may also facilitate connectivity by different network topologies, firewalls and IP addressing architectures.

Each device 2205 and 2210 may embed location data into the data collected pertaining to the mapped and scanned image and scanned surfaces. For example, a first head mounted device 2205 may scan a room including objects in the room. The scanning may result in the aggregation and collection of positional data for the objects, contour data of the objects, distance data from the object to the head mounted device, and orientation data of the head mounted device and the objects. The scanning may result in data, which may be communicated to the router 2275. Together with the data, the first head mounted device 2205 processor may embed location data into the scanned data. The location data may be coordinates in longitude, latitude and elevation. The first communication device 2205 designates each surface in a local physical environment. The processor may be able to identify which shared data may be placed on each surface so another device may quickly be able to located and utilize the data.

The first head mounted device 2205 may write data to a cloud based service 2265. Such a service 2265 may provide computation, software, data access, and storage services for the head mounted devices. The head mounted devices do not require end-user knowledge of the physical location and configuration of the service 2265. The cloud-based service 2265 may have a lookup directory 2280 stored thereon. Service 2265 resides on a server. The service 2265 resources may be dynamically provisioned to head mounted devices on a fine-grained, self-service basis over the Internet, via web applications/web services executable on the head mounted devices. The service 2265 may be located on an off-site third-party provider. The directory 2280 assists the first device 2205 and facilitates connectivity via a router 2275 between the remote users 2205, 2210. In this manner, the second head mounted device 2210 may determine that the head mounted device 2210 is in a particular location and may communicate the location to the router 2275. The service 2265 may involve provisioning of dynamically scalable resources. Head mounted devices may be loaded with a web-based tool or an application that a user can access and use through a web browser as if the program was installed locally on their own head mounted device. The service 2265 may deliver applications via the internet, which are accessed from web browsers, while the software and data are stored on servers at a remote location. Service 2265 may be transmitted through shared data-centers and appearing as a single point of access for head mounted devices. In response, data from the scene store 2270 that was generated from the first head mounted device 2205 may be transmitted to the scene manager and surface manager blocks 2235a and 2245a to avoid additional computational processing to render the image. The second head mounted device 2210 may verify data generated by the scene sensor block 2225a or may utilize the data transmitted from the scene store block 2270 to render an image on the display 2215a to avoid additional computational processing to render the image.

Figure 23:
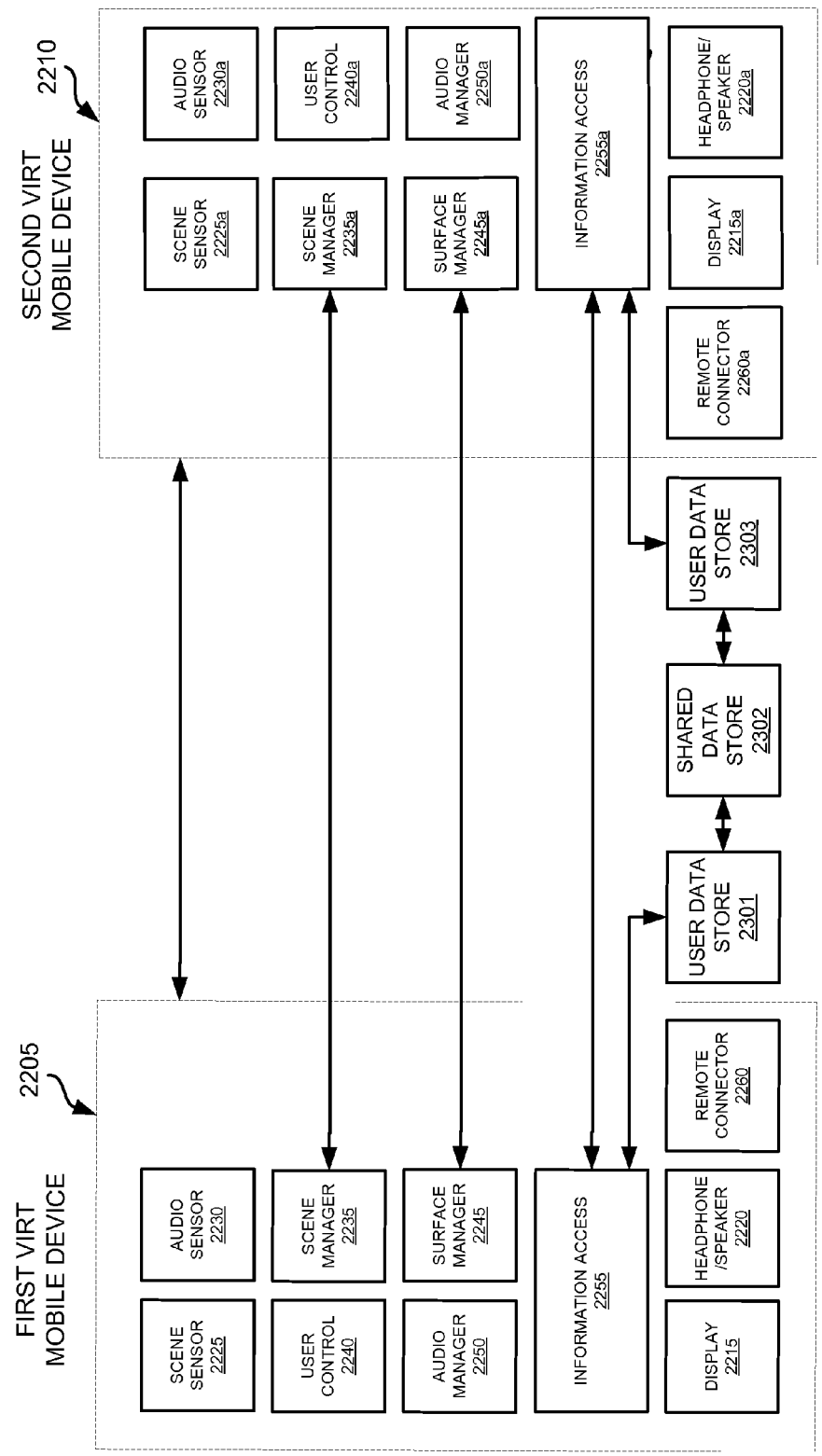

FIG. 23 illustrates a high level diagram for a first head mounted device 2205. A first head mounted device 2205 may be located in close proximity to a second head mounted device 2210. The head mounted devices 2205 and 2210 may exchange data via one or more fast wireless data links. The first head mounted display device 2205 may have a display 2215, a speaker 2220, an image scene sensor 2225 and an audio sensor 2230. The first head mounted device 2205 may also include a wired interface connection to a user data store 2301, where data may be written for access. The first device 2205 may also include a wired or wireless connection to shared data storage 2302, which may be a memory that the second mobile communication device may access. First device 2205 may also have a controller that include a number of control components include a scene manager 2235, a user control block 2240, a surface manager block 2245, an audio manager block 2250 and an information access block 2255.

The second user also operates the second head mounted device 2210, which include similar components to the first head mounted device 2205. Second device 2210 may have a display 2215a, a speaker 2220a, an image scene sensor 2225a and an audio sensor 2230a. The second device 2210 may also include a wireless or wired interface. The second device 2210 may write and read data to/from a user data store memory 2303. The second device 2210 may also read and write data to a shared data store memory 2302 accessible by the first device 2205. The second device 2210 may also have a controller that includes a number of control components or modules. The second device 2210 may include a scene manager block 2235*a*, a user control block 2240*a*, a surface manager block 2245*a*, an audio manager block 2250*a*, and an information access block 2255*a*.

In this regard, users may share a set of scanned surface data that have been designated. Users may interact with virtual assets that are placed onto the surfaces as virtual objects. The first and second device 2205 and 2210 may communicate over a local fast wireless data carrier (for example Wi-Fi®, Qualcomm® Peanut® short range communication standard, and Qualcomm® FlashLinQ®). If additional users are present, the devices 2205, 2210 may further communicate via peer-to-peer connections or a broadcast, unicast, or multicast.

Figure 24:
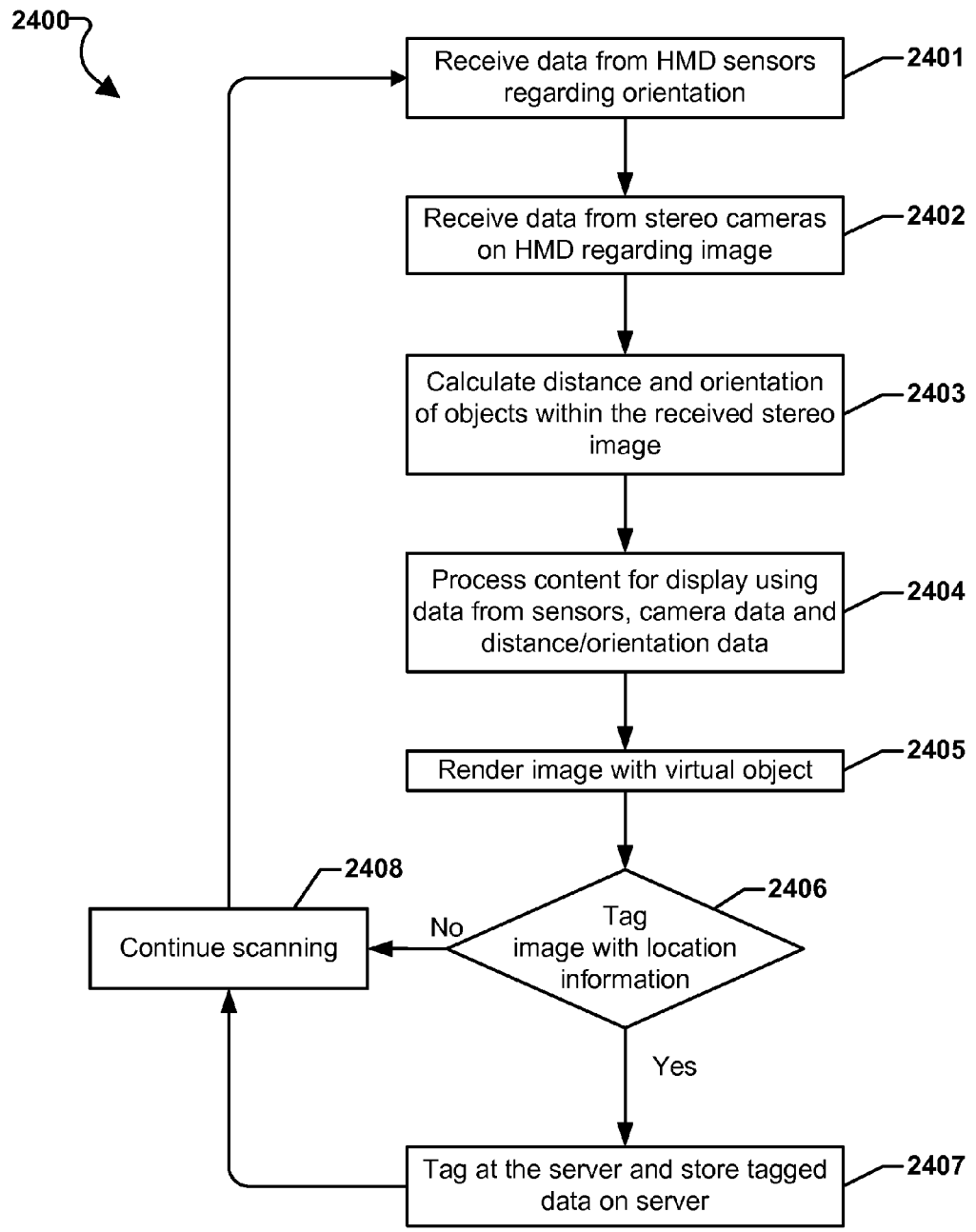
FIG. 24 is a process flow diagram of an embodiment method for using a head mounted device to scan an area, render a virtual object, tag calculated parameters with location data, and upload the tagged parameters to a shared memory for the benefit of other head mounted devices.

FIG. 24 illustrates an embodiment method 2400 using a server to tag data with location information and share the tagged data between at least two head mounted devices via a directory. Method 2400 may be implemented in a computing device having a processor configured with processor-executable instructions to perform the operations of the method 2400. The directory may provide information about scanned three-dimensional maps. For example, the head mounted device may emit infrared light and calculate a time of flight of the infrared light via a fast gating mechanism and may store the calculations to determine the distance certain objects are from the head mounted device 10. Additionally, the head mounted device 10 may scan an area to determine an orientation of the objects, to determine surfaces, and structural information of the objects and height, width, length and distance information.

In block 2401 of method 2400, the processor may commence operation by receiving data from a head mounted device. In block 2402, the processor may receive image data. In block 2403, the processor may calculate the distance and orientation. The processor may process the content for display in block 2404. The processor may render the image with the virtual object contained within the displayed image in block 2405. In determination block 2406, the processor may determine whether to tag the image with location information so that another head mounted device may utilize the image data.

A second device may include a second processor that may calculate image data and may utilize the first device scanning capabilities as a resource to verify the scanned parameters as a reference. In another embodiment, the second device may import the scanned data. Using the imported data, the second device may render the displayed image with a virtual object anchored on at least one surface in the displayed image. This may occur when the second head mounted device 10*b* enters a location. The second head mounted device 10*b* may determine its location in an area, for example, a room and then communicate the location data thereby forming a requested for the first head mounted device's 10 scanned data.

If the processor decides to tag the image with location information (i.e., determination block 2406="Yes"), the processor may tag the scanned data with the location information for the directory and store the data on a server in block 2407 so another head mounted device 10*b* may access the scanned data. In an alternative, instead of storing the data on a server, in block 2407 the data may be stored in a shared memory, such as a memory accessible via a shared network. If the processor decides not to tag the image with location information (i.e., determination block 2406="No"), the processor may determine that no other devices are available to utilize the shared data and will continue scanning the area in block 2408 to render the virtual object for the instant user.

Figure 25A:
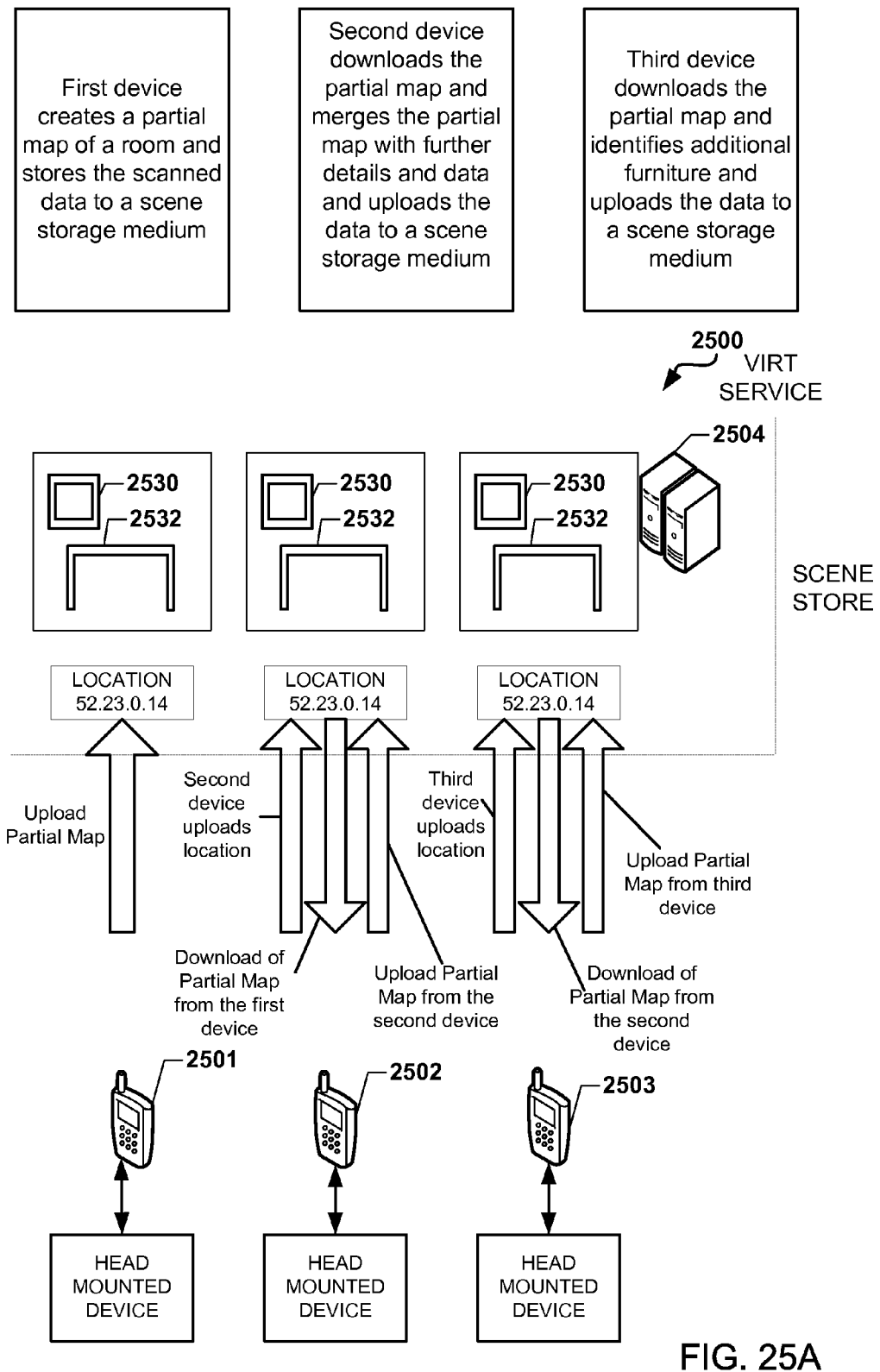
FIG. 25A is a high level illustration of several mobile devices communicating with a cloud server to provide shared data to the cloud server and to allow new devices to scan and map an area utilizing the shared data.

FIG. 25A illustrates an embodiment of a system 2500 with three mobile devices 2501, 2502, and 2503 and a server 2504. The devices 2501-2503 and the server 2054 exchange scanned data and map information. The map may include scanned parameters of a room. The map may include an identification of surfaces in the image, such as a flat screen display 2530 and a table 2532, including shapes and sizes of objects in the image. The map may also include a distance and angle that the objects are located from the device, or coordinate locations within a frame of reference linked to room or arbitrary coordinates. For example, the map may identify locations of objects in terms of a number of meters from an origin along three perpendicular coordinate axes, such as along the three axes (e.g., length, width, height) defining a particular corner of the room. The map may include a header that relates to a three-dimensional position and location of the device where the objects were captured. Map data may be uploaded to a server 2504 from each position where the device scans image data, and the server may use distance measurements and images from all head mounted devices and from all locations to build a map based on the frame of reference linked to the room. To do so, the server 2504 may perform a coordinate transformation on all received location data to transform distance measurements from head-mounted device-centric spherical coordinates (i.e., distance and angle from the head mounted device to each object) to an arbitrary rectilinear coordinate system, such as to locate objects with respect to room length, width and height coordinates. The mathematics and algorithms for accomplishing such coordinate transformations are well known in the art.

The embodiment of a system 2500 is not limited to a head mounted device but instead may further be applicable to a different computing device. Alternatively, the head mounted device 10 may be an accessory to a mobile CPU (phone, tablet etc.) with the main processing performed on the mobile CPU and data being exchanged by and between the mobile phone and a head mounted device (not shown). FIG. 25A illustrates how collaboration may occur to scan and to render the image quickly using a centralized database server 2504. For example, the devices 2501, 2502, and 2503 may include a device for emitting and sensing light or ultrasound for measuring distances to objects and surfaces in a room via time of flight calculations. In another embodiment, a RGB-D camera may capture image data. The devices 2501, 2502, and 2503 may utilize the scanned data to generate a virtual object and anchor the virtual object on at least one surface of the image and render the virtual object together with the captured image to provide a virtual or augmented reality experience.

The first device 2501 may create a partial map and upload the map to a server 2504. The partial map may include data pertaining to a first and a second object in the image for location 52.23.0.14. The map may include a header that identifies the location. The map may also include substantial data about the scanned images including distance from the device 2501, object length, object width and object height, orientation of the objects, and distance that the objects are from a wall, ceiling, doorway, etc. The individual coordinates and positional data of each object may also be recorded and stored in the map.

The second device 2502 may report its location to the server 2504 via coordinates (52.23.0.14), which correspond to a predetermined location, which may have already been scanned by the first device 2501. The second device 2502 may upload the location data to the server 2504. The server 2504 may receive the location data. The second device 2502 may receive a message that a partial map is available. The second device 2502 may download a partial map formed by the first device 2501. Substantially simultaneously, the second device 2502 may be scanning a different portion of the room. For example, the second device 2502 may scan a portion of the room adjacent a first table. The second device 2502 may utilize the scanned data and merge the scanned data with the downloaded map to render a displayed image with the virtual object. The second device 2502 may also upload the updated map to the server 2504.

The third device 2503 may also provide its location data 52.23.0.14 in the form of a request. The server 2504 may receive the location data 52.23.0.14 and coordinates and select an appropriate data set and transmit the data set of scanned data in the form of a map to the third device 2503. The third device 2503 may download the map data that include the first device's 2501 scanned data and the second device's 2502 scanned data, which may supplement the first device's 2501 scanned data. In another embodiment, the data may not supplement and instead the second device 2502 may scan to determine if the first data set is accurate and may verify the data set. In another embodiment, if the data is incorrect, the second device 2502 may replace the scanned data of the first device 2501.

The third device 2503 may utilize the map to render a displayed image with a virtual object. As shown, the third device 2503 may quickly determines a location of objects in the image including a flat screen television 2530 and a table 2532 utilizing the updated map. The third device 2503 may further capture image data and may scan a new area of the room and may also upload data to the server 2504 corresponding to an update of the map. In this manner, each of the devices 2501, 2502 and 2503 does not need to process the entire image locally and may obtain services to more quickly render the virtual object and displayed image.

Each of the devices 2501, 2502 and 2503 and server 2504 may be optimized with one another to quickly receive the map and piece together the scanned data and map components to render the scene quickly. For example, if a device 2501 is in a new location and there have been no scanned images recorded, the device 2501 may scan an entire area. For example, the device 2501 may alternatively determine that the scanned data is old and was recorded some time ago. The device 2501 may determine that the scanned data is stale, and decide to scan an entire area.

Alternatively, the device 2501 may compare the age of the scanned data to a threshold value and may make a determination whether to scan the entire area. For example the device 2501 may calculate a time to scan an entire room and may accept or reject a stale map if the time to scan the entire room is above a predetermined limit based on a processing requirement. Alternatively, the device 2501 may monitor a location of other devices 2502, 2503 and form a request to receive a scanned image based on the monitored location. For example, the device 2501 may determine that the devices 2502, 2503 are in a different far area located far away and a request for a map is likely to render irrelevant data (not useful) and formulating a request is unnecessary. In yet another embodiment, if several devices 2501, 2502 and 2503 are present each device may scan different areas in the room in order to scan a room in a more rapid manner.

Figure 25B:
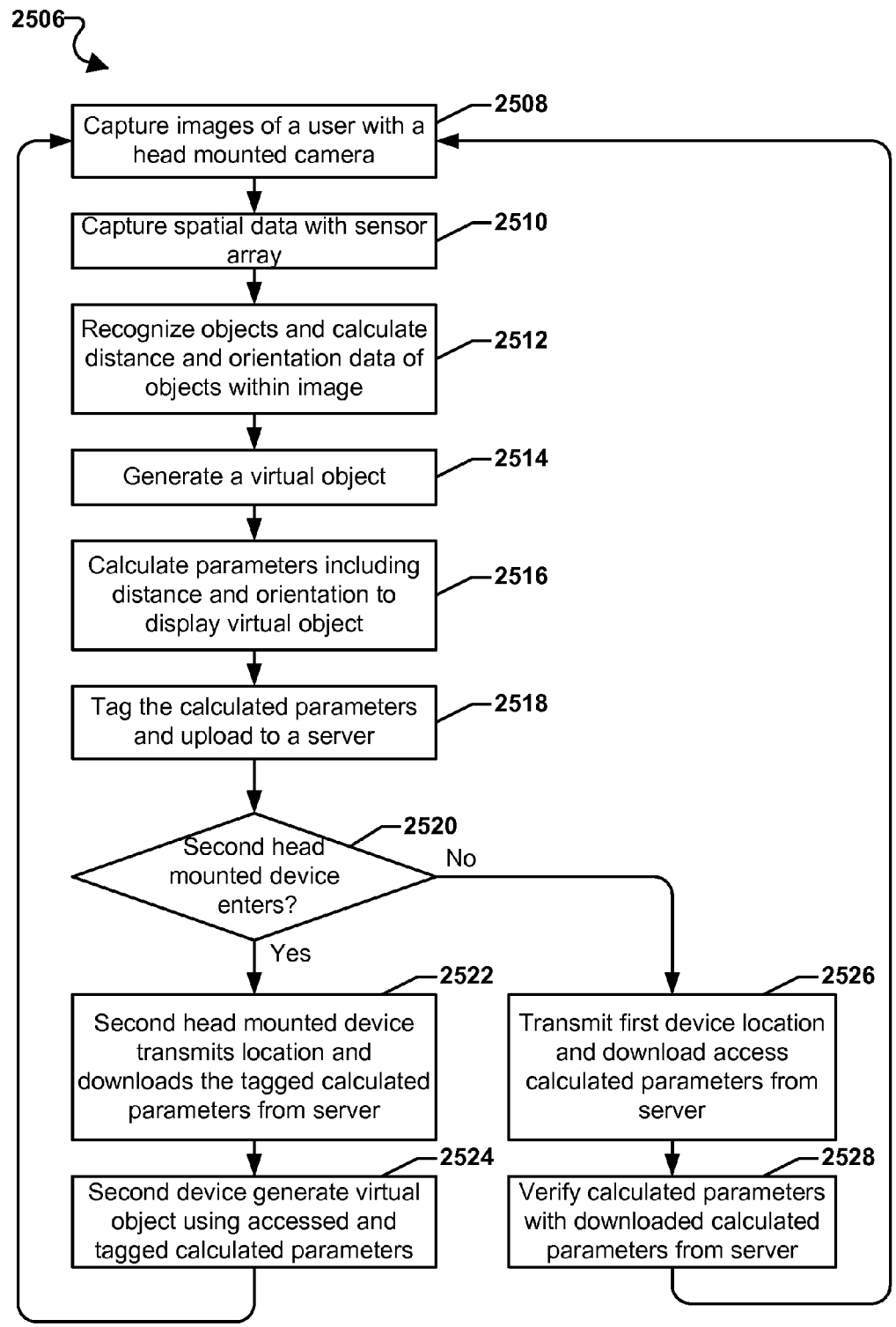
FIG. 25B is a process flow diagram of a method of storing tagged and scanned parameters in a cloud server for use by a second head mounted device to render a virtual object.

FIG. 25B illustrates an embodiment method 2506 for cloud storage and retrieval of data utilized to generate a virtual object on a head mounted display. Method 2506 may be implemented in a computing device having a processor configured with processor-executable instructions to perform the operation of the method 2506. Generating a virtual object may require intensive scanning of surfaces in a room to determine a distance of the objects, shape of the objects and the orientation of objects in order to anchor a virtual image to one or more surfaces in the room. Some head mounted devices may download their location to a cloud and instantly receive accurate data to assist with rendering a virtual object on a surface so as to avoid processing the data locally and to verify scanned data. In method 2506, the processor may commence operation by capturing images of a user with a head mounted or body mounted camera in block 2508. In block 2510, the processor may provide program instructions to scan an area of a room to capture spatial data with a sensor array. This may be accomplished by scanning with an infrared light emitting device and measuring a time of flight of the infrared light reflected from the surfaces.

The data may be also provided to a processor that may generate a three-dimensional map of the room. The processor may recognize objects in the captured image and may determine a distance parameter of the objects in the captured image and may also determine an orientation of surfaces contained within the image in block 2512. The processor may generate a virtual object in block 2514. In an embodiment, the virtual object 14 may resemble a collaborative flat screen three-dimensional object 14 that emits content. The virtual object 14 may be anchored to a surface 16 in the image and the user may move around the room but the virtual object display parameters change so the virtual object remains anchored to a desired anchor surface. The processor may calculate parameters including distance and orientation to display the virtual object in block 2516 and may tag the calculated parameters and upload the calculated parameters to a cloud server in block 2518. The processor may tag the calculated parameters with a location tag that may be a geotag. In another embodiment, the geotag may include latitude coordinates, longitude coordinates, altitude coordinates, bearing coordinates, distance coordinates, and accuracy data. The Geotag adds geographical identification metadata to various the uploaded parameters. The Geotag may help users find a wide variety of location-specific information in the three-dimensional map of the scanned area.

In determination block 2520 the processor may determine whether a second head mounted device has entered a location for which to receive complementary shared data to generate the virtual object faster for a particular location. For example, a second head mounted device may be in the same room and may emit a signal to a first head mounted device, or may emit a signal to the cloud server, which determines that the second device has entered a specific location. Processing an image can be burdensome for some devices. Also, scanning a room may also be time consuming. The second head mounted device, therefore, may take advantage of the work that the first head mounted device has already done and receive the calculated parameters pertaining to objects, and surfaces in the room to generate a virtual object for the second user faster.

If the processor determines that it has entered a new room (i.e., determination block 2520="Yes"), in block 2522, the second head mounted device may transmit its location data from a navigation device and may download the tagged calculated parameters from the server. In block 2524, the processor of the second head mounted device may generate the virtual object using the accessed and tagged calculated parameters. If the processor determines that it has not changed locations (i.e. determination block 2520="No"), the processor may perform operations to verify that the calculated parameters are correct in the event another third head mounted device already scanned the area and generated an anchored virtual object. In block 2526, the first head mounted device may transmit its location from a navigation device and may download calculated parameters from a server. In block 2528, the processor may verify the calculated parameters with the downloaded calculated parameters from the server.

In another embodiment, instead of calculated parameters including distance and orientation of objects, a three-dimensional map may be formed of a particular area and uploaded to the cloud server. The tag or location data may be embedded in the form of a header into the three-dimensional map message and the three-dimensional map may be transmitted and stored in a cloud server for access by the second head mounted device. For example, when a second head mounted device enters an area, the second head mounted device may upload its location coordinates and may download a three-dimensional map of a room, or predetermined area. The second head mounted device may recognize objects within the image and may determine the distance parameter of the objects within the image utilizing the three-dimensional map. This may occur with minimal processing of the spatial data and the image captured at the second head mounted computing device. In another embodiment, metadata may be stored to the cloud server. The metadata may include distance and orientation of objects that were captured, which may be accessed by different head mounted devices. The metadata may also include indoor location data relating to locations of objects in a room and an indication that the processor can use to determine whether the data is stale.

Figure 26:
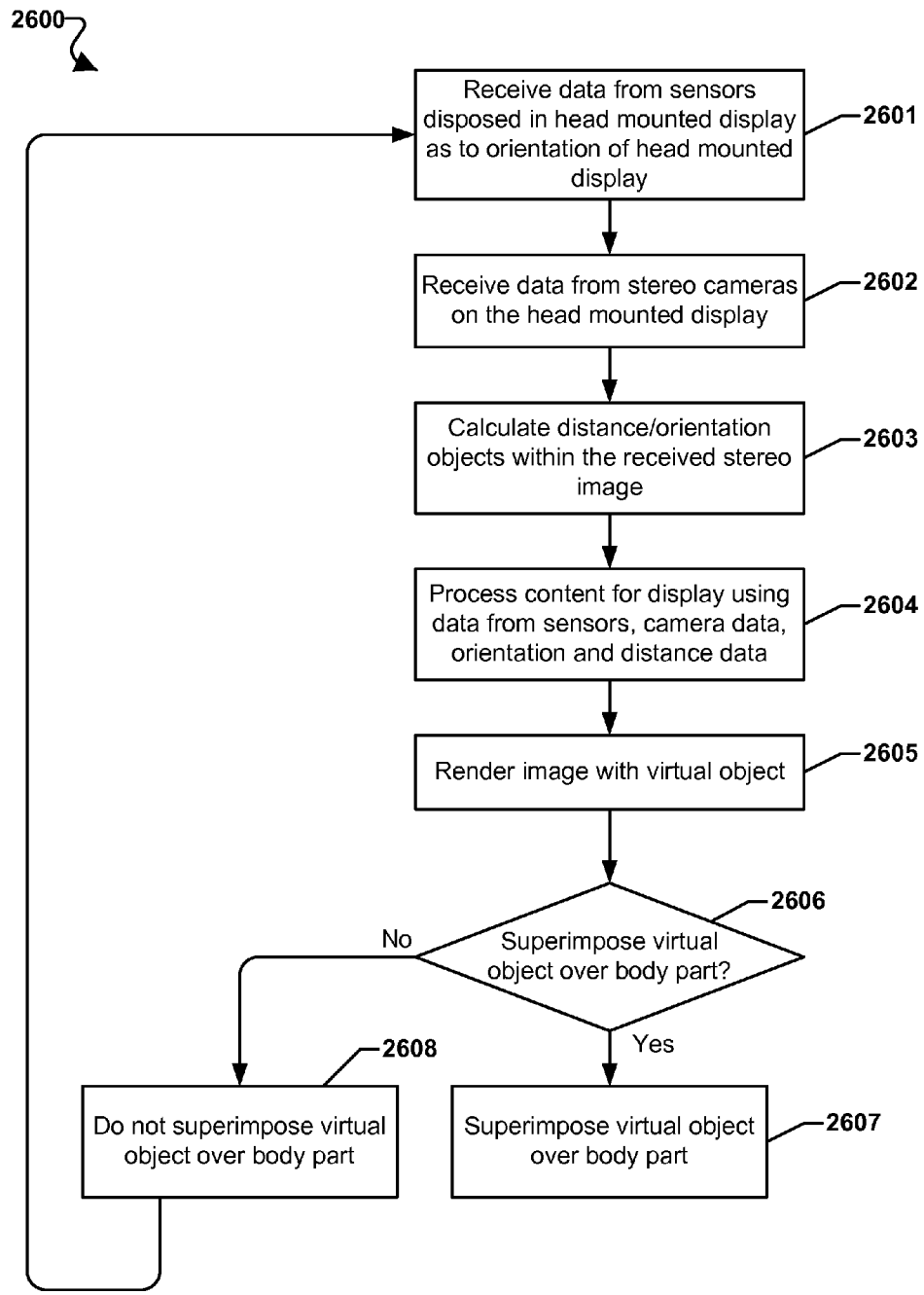
FIGS. 26-28B are process flow diagrams of embodiment methods for using a head mounted device to render a virtual object on a display and to superimpose the virtual object over a body part on the display.

FIG. 26 illustrates an embodiment method 2600 for displaying a virtual object superimposed over a detected body part, which is detected in tracked images by applying and comparing an anatomical model to the tracked images. Method 2600 may be implemented in a computing device having a processor configured with processor-executable instructions to perform the operations of the method 2600. In block 2601 of method 2600, the processor may commence operation by receiving data from a head mounted device including sensors that provide data regarding orientation of the device (e.g., accelerometers, gyroscopes, electronic compass, etc.). In block 2602, the processor may receive image data. In block 2603, the processor may calculate the distance and orientation and process the content for display in block 2604 utilizing the distance sensor data, camera data, orientation data and distance data. The processor may render the image with the virtual object in block 2605.

At determination block 2606, a decision may be reached regarding whether to superimpose a virtual object over a surface of a detected body part contained in the displayed image of the head mounted display. If the processor decides to superimpose the virtual object over a surface of a detected body part (i.e., determination block 2606="Yes"), the processor may superimpose the virtual object over a body part in block 2607. If the processor decides not to superimpose the virtual object over a surface of a detected body part (i.e., determination block 2606="No"), the processor will not superimpose the object over the body part in block 2608 and may allow the body part to occlude the virtual object or may render the virtual object in a different location of the display. For example, the virtual object may be superimposed according to an input by the user received by the processor.

Figure 27:
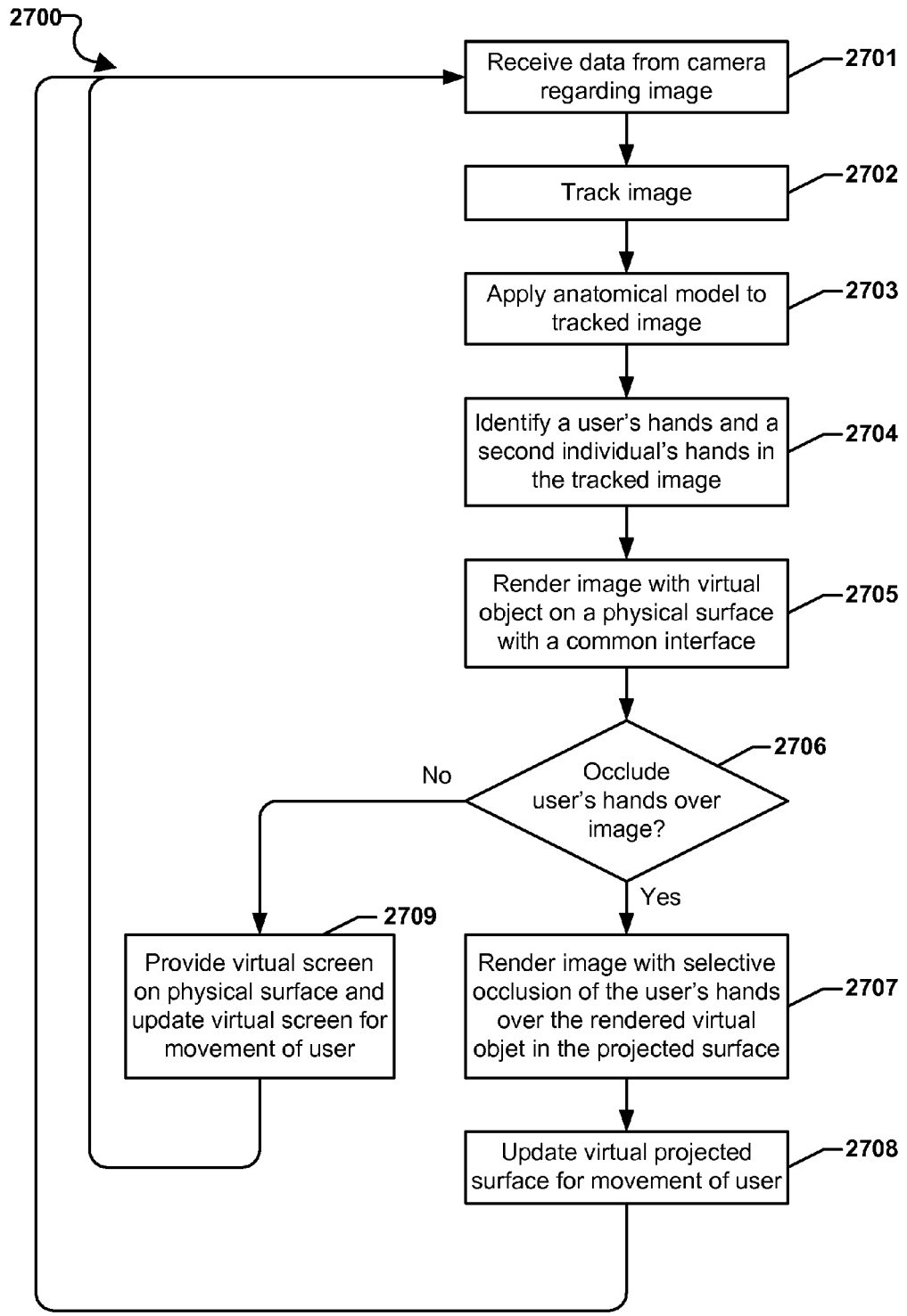

FIG. 27 illustrates an embodiment method 2700 where a user's hands may be occluded over a virtual object by tracking images and applying an anatomical model to the tracked images to detect body parts contained in the image. In block 2701 of method 2700, the processor may commence operation by receiving data from a head mounted device including sensors that provide data regarding orientation. In block 2702, the processor may track images. In block 2703, the processor may apply an anatomical model to the tracked image. In block 2704, the processor may identify the user's hands and render the image in block 2706. For example, the processor may identify fingers, a hand, and an arm that originate from a bottom upwardly in the tracked images as a user's hand. While at the same time, an anatomical or skeletal tracking algorithm may be applied to detect a second body part. The second body part may also include fingers, a hand, and an arm. The processor may infer that a second body part originating at a top and extending downwardly in the image may be another user's body part. Additionally, the processor may infer that arms and hands that are a predetermined distance too far away from the user based on size and orientation in the image may be another user's determined body part.

At determination block 2706, a decision may be reached regarding whether to occlude the user's hands over the virtual object. If the processor determines to render the user's hands over the virtual object (i.e., determination block 2706="Yes"), in block 2707, the processor may render the virtual object with selective occlusion of the user's hands over the virtual object. For example, the user's hands may block the virtual object from the viewer. In block 2708, the image may be updated by the processor. If the processor determines not to render the user's hands over the virtual object (i.e., determination block 2706="No"), in block 2709, the processor will display the virtual object superimposed over the user's body part so the body part appears transparent. For example, the user may run his hand over the virtual object. However, the virtual object may be displayed over the body part and superimposed over the surface of the hand so the content on the virtual object remains seen, despite the fact that the user's hand should be blocking the virtual object. Once a command is detected and confirmed from the user by a detected gesture, or input command, the input results in execution of the task and action of the detected command and the virtual object content may be updated in block 2709.

Figure 28A:
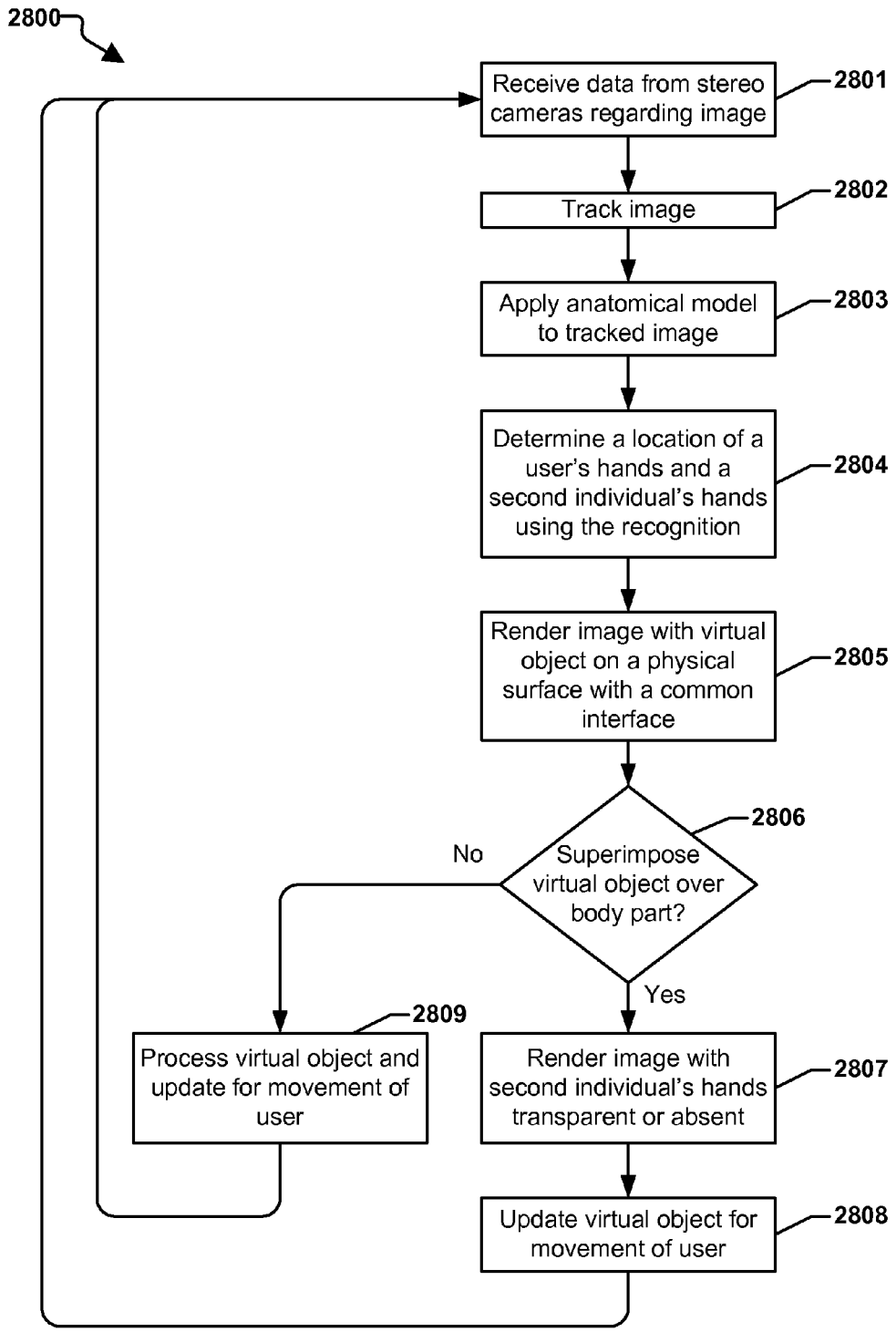

FIG. 28A illustrates an embodiment method 2800 where a second individual's hands may be rendered transparent or absent over a virtual object. Method 2800 may be implemented in a computing device having a processor configured with processor-executable instructions to perform the operations of the method 2800. In method 2800, the processor may commence operation by receiving data from a head mounted device including sensors that provide data regarding orientation in block 2801. In block 2802, the processor may track captured images. In block 2803, the processor may apply an anatomical model to the tracked image. For example, the anatomical model may be a skeletal tracking algorithm that compares tracked objects to a skeletal model to determine if there are any body parts contained in the image. If an object is not detected to be a body part by the processor, the processor may ignore the object.

In block 2804, the processor may identify the user's hands and a second individual's hands. The processor may render the image in block 2805 on an anchor surface contained in the image, for example, on a desktop or on a wall. At determination block 2806, the processor may determine whether to superimpose the virtual object over a body part. If the processor determines to superimpose the virtual object over a body part (i.e., determination block 2806="Yes"), in block 2807, the processor may render the second individual's hands transparent or absent over the virtual object, or when the body part occludes the virtual object, the virtual object may be displayed over a top surface of the body part so the body part appears to be transparent. In another embodiment, an outline of the body part may still remain visible with virtual object superimposed over a body part surface. In block 2808, the displayed image of the virtual object may be updated by the processor to account for changes in the content and movement of the body part. If the processor determines not to superimpose the virtual object over a body part (i.e., determination block 2806="No"), the processor will display the virtual object in block 2809 and update the virtual object for movement of the user.

Figure 28B:
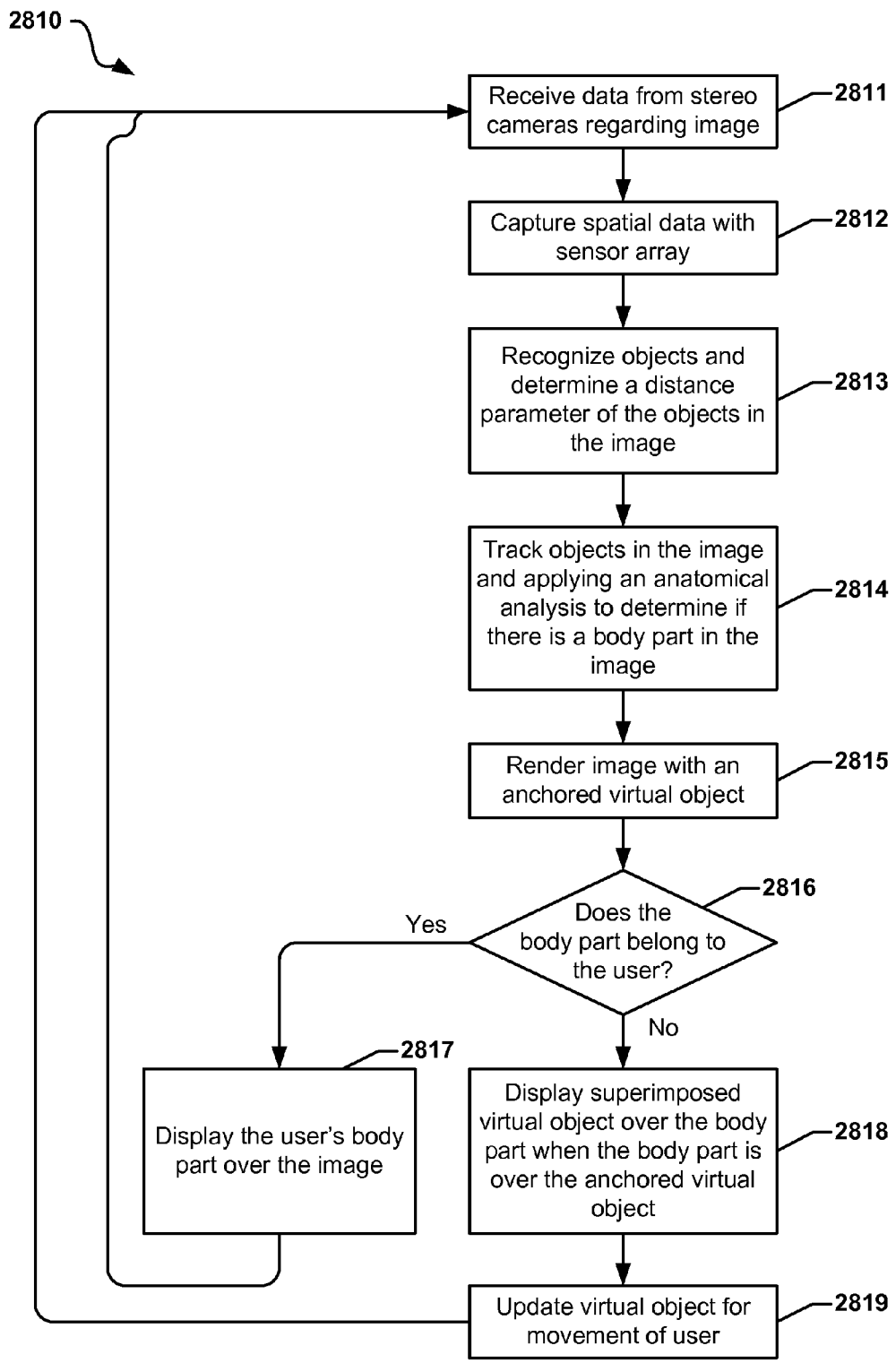

FIG. 28B illustrates an embodiment method 2810 where a processor may infer which hands are the user's hands and which hands are other user's hands and the processor may render the other user's hands as transparent or absent when the hands occlude a virtual object. Method 2810 may be implemented in a computing device having a processor configured with processor-executable instructions to perform the operations of the method 2810. In method 2810, the processor may commence operation by receiving data from a head mounted device including captured image data in block 2811. In block 2812, the processor may capture spatial data with a sensor array. In block 2813, the processor may recognize objects in the image and determine a distance parameter of the objects in the image. In block 2814, the processor may process images to track objects and the processor may apply an anatomical analysis via a skeletal model to the tracked image. This may include identification of a partial anatomy when the camera is mounted on the user or where another user is only partially visible in the field of view of the sensor. For example, the anatomical model may be a skeletal tracking algorithm that compares tracked objects to a skeletal model to determine if there are any body parts contained in the image. If an object is not detected to be a body part by the processor, the processor may ignore the object. For example, the processor may apply an anatomical analysis to the image to determine whether a body part is within the image. The processor may reference a stored anatomical or skeletal model within a memory and compare it to the tracked objects in the video image. The stored skeletal model may include anatomical data, for example, a relative position of key joints, bones and limbs in a human skeleton, and other data. The processor may compare the tracked objects in the image to the stored skeletal model to determine if the body part is in the image.

For example, the processor may detect the user's arm by detecting an arm and a number of fingers extending from a hand in a first orientation, or with an arm, a wrist and fingers progressing from a bottom of an image upwardly. The processor may detect the second individual's arm by detecting a second arm and a second number of fingers extending from the second hand in a second different orientation, or with an arm, a wrist and fingers progressing from a top of the image downwardly. In another embodiment, the processor may distinguish from between the user and another's body parts by reviewing the tracked images for orientation, object size, distance from the user, or by counting the number of body parts within the image.

In block 2815, the processor may render the image with an anchored virtual object in the image. At determination block 2816, the processor may determine whether the detected body part belongs to the user or to another individual. The processor may superimpose a virtual object over another user's body part. In the displayed image only the user's hands occlude the virtual object while other hands, arms and body parts will not occlude the virtual object and will appear transparent.

The user may see the virtual object as superimposed over the other user's body part so the other user's body part is rendered as transparent. The processor may determine an area in the image relevant to the other individual's body part and may display the virtual object over the image only when the other individual's body part occludes the anchored virtual object. If the processor determines that the detected body part belongs to the user (i.e., determination block 2816="Yes"), in block 2818, the processor may render the user's body part as solid when the user's body part occludes the image in block 2817. If the processor determines that the detected body part belongs to another individual, (i.e., determination block 2816="No"), the processor will display the virtual object, or a portion thereof as superimposed over the detected body part in block 2819 when the body part occludes the virtual object.

For example, the processor may determine an area in the image defined as an area (in pixels) over the body part of the other individual. The processor may form the superimposed virtual object over the area and not render the virtual object over the perimeter of a body part. When the body part is located over the anchored virtual object an outline of the body part of the second individual may still be shown and rendered. Therefore, the outline may be visible over the anchored virtual object while a remainder may be rendered as transparent. In block 2819, the processor may update the virtual object for movement of the user to account for changes in the content and movement of the body part. For example, the processor may display the anchored virtual object as a rectangular virtual display on a surface. As described above, the processor may analyze captured images to detect user gestures. A seemingly virtual reality interaction with the anchored virtual object by the second individual and the user may occur. In another embodiment, the processor may detect a body part of a third individual. The processor may display a superimposed virtual object over the body part of the third individual when the body part of the third individual is located over the anchored virtual object. The processor may also not display the superimposed virtual object over the body part of the third individual and allow the body part to be displayed when the body part is determined to be located off the anchored virtual object and not occluding the virtual object.

Figure 29:
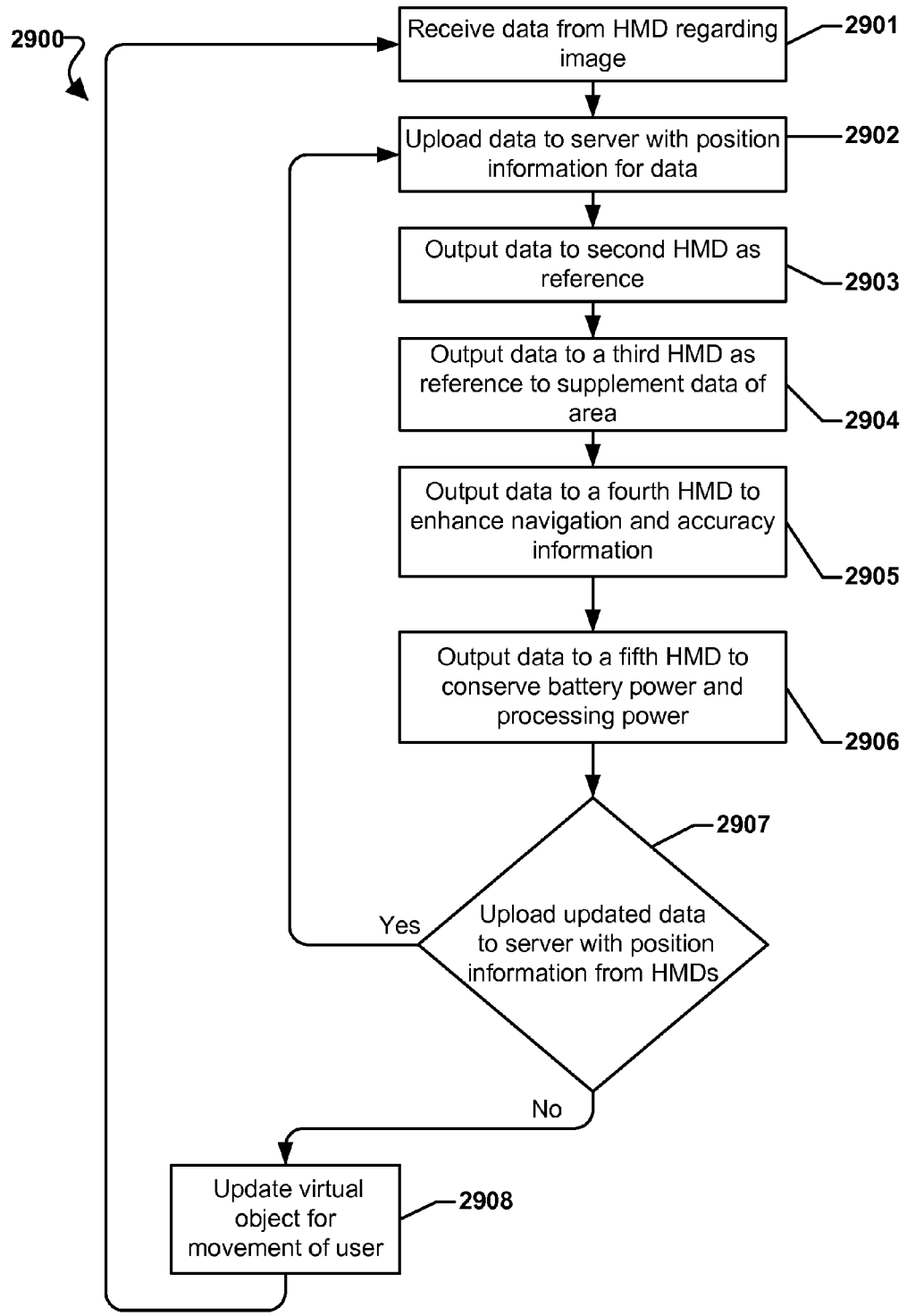
FIG. 29 is a process flow diagram of an embodiment method for using a head mounted device and a cloud server to share scanned and calculated data parameters with several other head mounted devices.

FIG. 29 illustrates an embodiment method 2900 where data may be transmitted from a server to multiple devices to provide services and to alleviate processing at the head mounted device. The method 2900 may be implemented within a system like that described above with reference to FIG. 25A, which may include a server and one or more head mounted devices configured with processor-executable instructions to perform the operations of the method 2900. In method 2900, the server 2504 may receive image and location data from a head mounted device including sensors that provide data regarding spectral data and images in block 2901. In block 2902, the processor may upload data to the server with position information relating to a location where the data was scanned. The server may output scanned data to a number of different head mounted devices. In block 2903, the processor may output data to a second head mounted display as a reference.

In block 2904, the processor may output data to a third head mounted device to supplement the third head mounted device's scanned data and to verify the captured scanned data. In block 2905, the server may output data to a fourth head mounted device to enhance the data present on the device and in block 2906, the server may upload data to conserve battery power and processing. Substantially simultaneously, each of the head mounted devices may be conducting their own scanning of the area to determine information about objects in the area. For example, the head mounted devices may scan the area to determine a shape and dimensions of objects in the image, and may scan the area to determine an orientation of the objects in the image and relative positions of surfaces in the image, which may be useful to anchor a virtual object for an immersive virtual or augmented reality experience. At determination block 2907, the processor may determine whether to upload the updated scanned positional data from the devices to the server for storage on the server. If the processor determines to upload scanned positional data to the server (i.e., determination block 2907="Yes"), the processor may upload updated data and merge and combine the head mounted devices scanned data with the data stored on the server. If the processor determines not to upload scanned positional data to the server (i.e., determination block 2907="No"), the processor may display the virtual object in block 2908 and update the virtual object for movement of the user.

In another alternative embodiment, the processor of FIG. 29 may operate as a 'magic lens'. In this manner, the virtual object displayed on a physical surface in a room may be viewed on a conventional smartphone or computing device. Such a smartphone may output data to a server and may further link to the server. A user, without a head mounted device, and using a mobile communication device, may collaborate using the mobile communication device or smartphone with users wearing the head mounted displays. For example, a user may view an output of a virtual object anchored on a physical surface by watching a smartphone display and may communicate via a wireless audio link to the user utilizing a head mounted display.

The smartphone may be operatively connected to the server via a wireless RF link, such as a cellular data link (e.g., 3G, 4G, LTE, UTMS, etc.). The smartphone may output an image on a display of the smartphone. The image may correspond exactly to another user's head mounted display output. The user viewing the display on the smartphone may view the augmentations and virtual objects shown on physical surfaces. This display may occur in two or three dimensions on the display of the smartphone. The smartphone may also be operable to collaborate with the head mounted device 10 using a mobile communication device and a wireless interface to receive signals from the server. Alternatively, the smartphone may receive RF data signals using a short range communication protocol directly from the head mounted device 10. In this manner, the user may hold up the smartphone and view the virtual or augmented reality experience of the users of the head mounted display for collaboration. In this embodiment the smartphone may manipulate the image to correct for the smartphone's own position and orientation in relation to near by surfaces using methods similar to those described herein.

Figure 30:
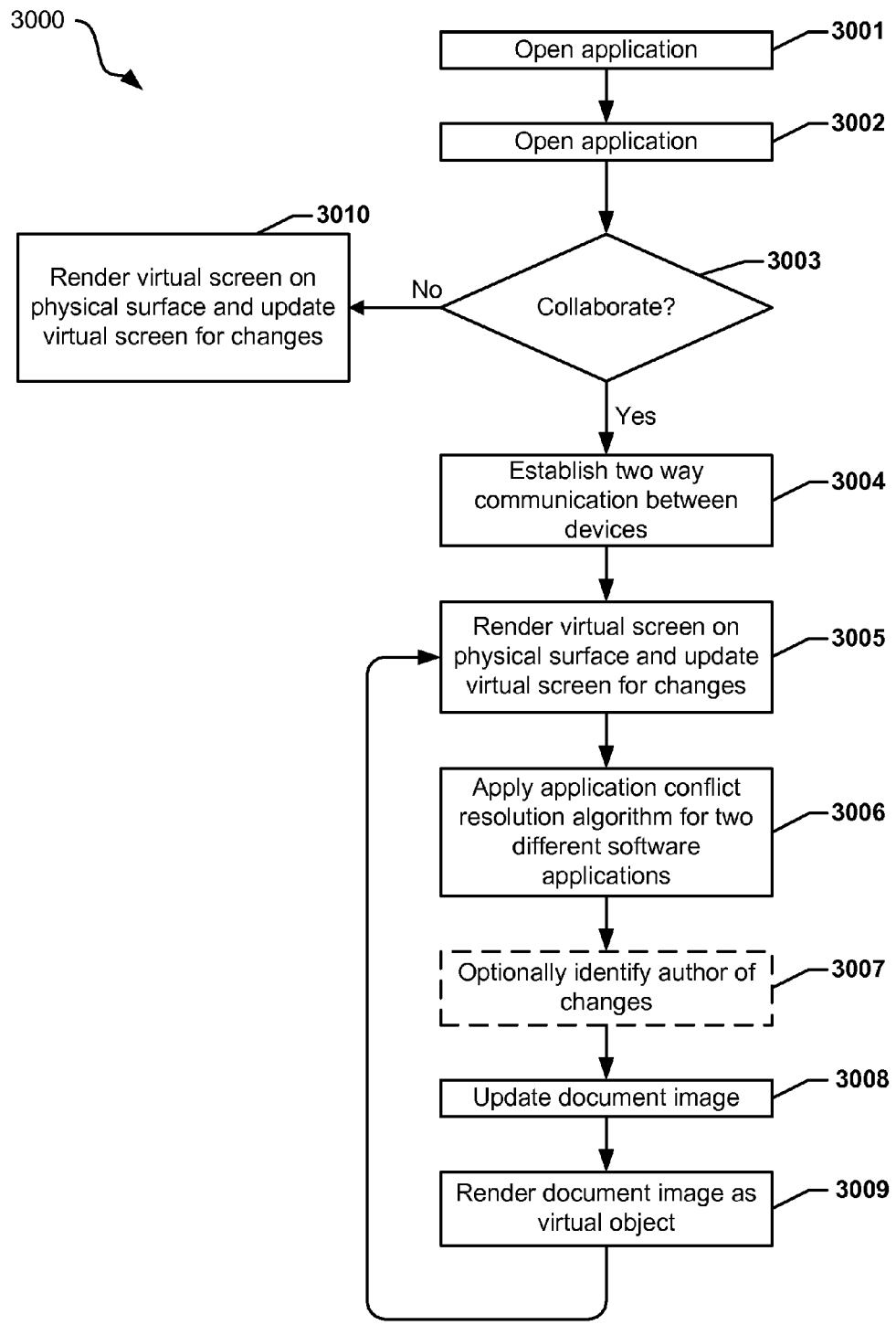
FIG. 30 is a process flow diagram of an embodiment method for using two different head mounted devices and a server to share data and collaborate using two different software applications using a virtual object input device whereby conflicts are resolved between the two different software applications.

FIG. 30 illustrates an embodiment method 3000 where users may be collaborating using two head mounted devices. The two head mounted devices may be running different incompatible software applications from two different software providers. Generally, a first user using a first word processor cannot work with another user using a second different incompatible word processor at the same time in a collaborative fashion. In method 3000 a processor may reconcile and translate data so a first user using a first software application and a second user using a second software application can collaborate with one another and enter data that is viewable in real time.

The method 3000 is not limited to a head mounted device and may be implemented in other types of computing device. In method 3000, the processor may commence operation by opening a first application in block 3001 and opening a second application in block 3002. At determination block 3003, the processor may decide whether to collaborate with other devices. If the processor decides to collaborate with other devices (i.e., determination block 3003="Yes"), in block 3004, the processor may collaborate and provide a two way communication between the devices. If the processor decides not to collaborate with other devices (i.e., determination block 3003="No"), the processor will display the virtual object in block 3010 and update the virtual object for movement of the user.

In block 3005, the processor will render a virtual screen as the virtual object. The virtual screen may provide a display output of a software application. The virtual screen updates for changes entered by at least two different users. In block 3006, the processor will apply a conflict resolution program for two different software applications. The conflict resolution may provide a translation of the inputs and outputs of the two incompatible software programs to a generic format, which may be loaded to a third generic software program, which reconciles changes in the generic format, and translated the reconciled data back into the first and second incompatible formats. The third software program may provide a translation of the generic format back to the first and the second software programs to render the changes, and which can be viewable by the users in the original native program.

For example, data may be collected from a first software program pertaining to the inputs of the first user and communicated to a generic format and communicated to a third software program. Next, the data may be collected from a second software program pertaining to the inputs of the second user and communicated to a generic format and communicated to the third software program.

The third software program may reconcile the changes and may store the changes in a memory. Now, each of the users would like to view each other's changes to a document in real time. The third software program may translate the changes into a format understood by each of the first and the second software programs. The third software program may output the translated changes back to the first and the second software program so each of the users may view the total changes in their native program's formatting. In block 3007, the processor may also identify an author of the changes. In block 3008, the processor will update the document map and render the document image as the virtual object in block 3009 and the processor may update the virtual screen in block 3005.

Figure 31:
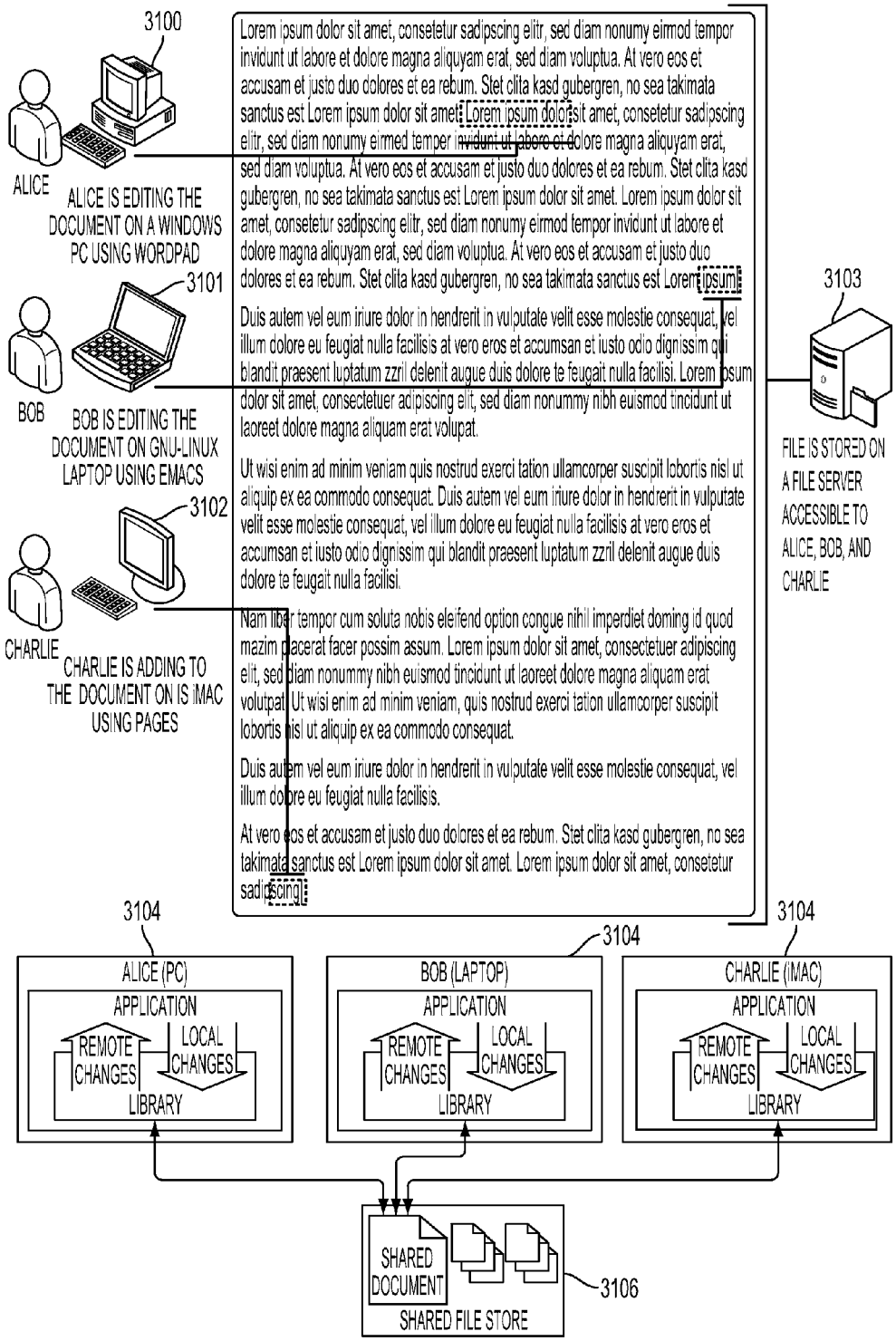
FIG. 31 is a high level block diagram of several users sharing data and collaborating using different software applications.

FIG. 31 shows a high level block diagram of three different users operating a computing device shown as reference numeral 3100, 3101 and 3102. Each may be using a different software application. Data from each of the software programs may be stored on the server 3103. For example, first local changes may be made in the relevant software program as conventionally known. Second remote changes may also be made and written to a shared storage medium 3106. For example, the second remote data changes may be communicated to a library 3104. Library 3104 may convert the input data and output data from each application from the remote changes into a generic format that can be input and read by a generic software program. The generic format may be stored on a library 3104 and may be written to a shared document format on storage medium 3106.

The shared document format stored on the storage medium 3106 may aggregate the changes into a single generic program. The single generic program may also translate and output the changes rendered by each user in a single stream of data back to each of the software application in a format that may be specific to and understood by the relevant software application so each user 3100, 3101, and 3102 can view changes made by other users.

For example, the shared document format 3106 may include a conflict resolution functionality that may provide a translation of the inputs and outputs of the software programs to a generic format, which may be loaded to the third independent software program 3106. There, the changes from all of the users are entered and stored. A translation of a number of different software word processing programs may be stored on the server 3103. The processor may provide a translation of the generic format having all of the changes back to the first, the second and the third software programs 3100, 3101 and 3102 to render and illustrate the changes therein.

Figure 32:
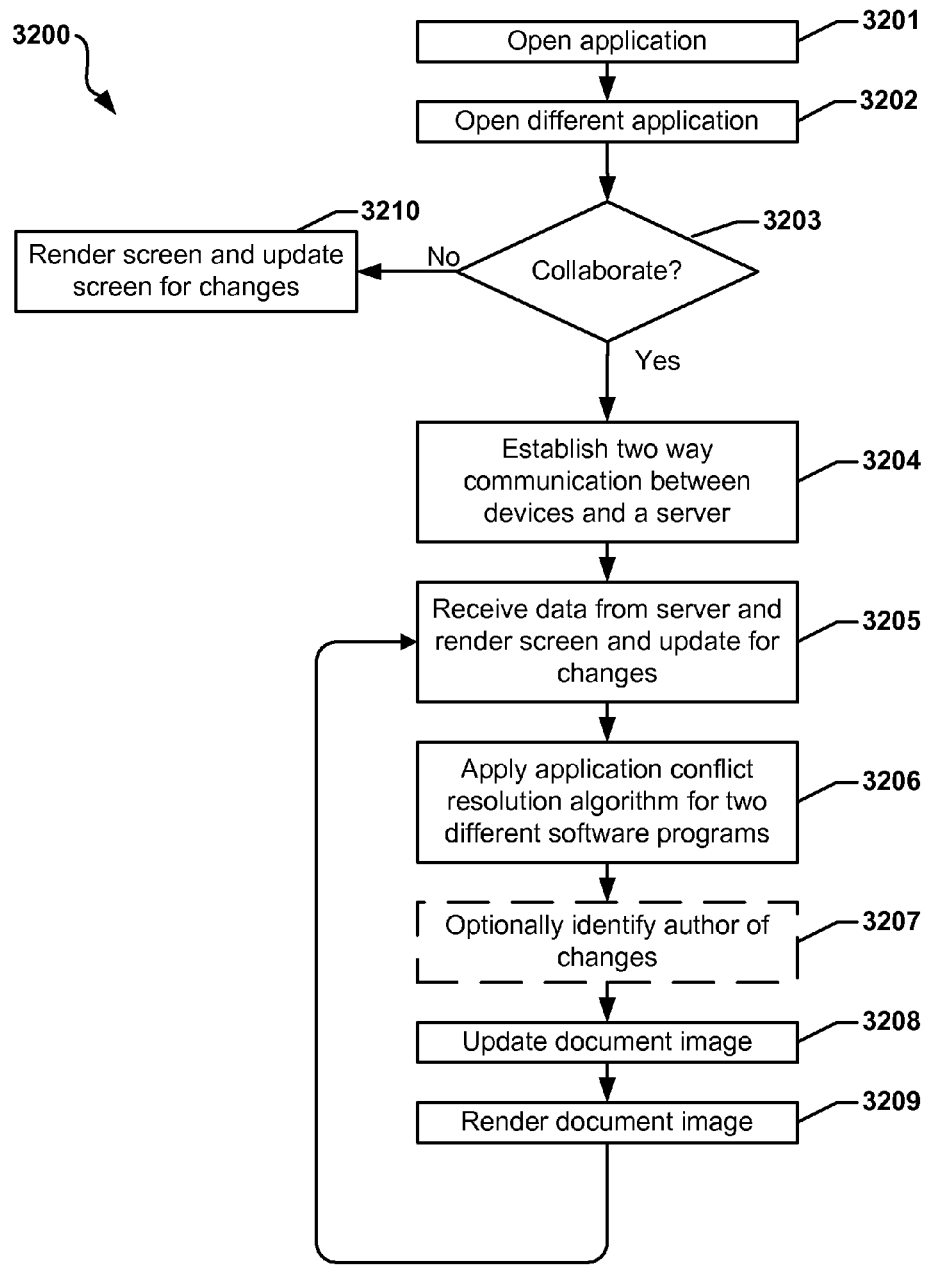
FIG. 32 is a process flow diagram of an embodiment method for using two different computing devices to share data and collaborate using two different word processing applications.

FIG. 32 illustrates an embodiment method 3200 where users may be collaborating using two computer systems. The users may be collaborating with one another utilizing different incompatible software applications from two different software providers. The method 3200 may reconcile the inputs and outputs of the data so any and all changes are viewable by multiple users utilizing multiple different incompatible computer software applications.

In method 3200, the processor may commence operation by opening a first application in block 3201 and opening a second application in block 3202. At determination block 3203, a decision may be reached regarding whether to collaborate from the devices to a server. If the processor determines to collaborate with a server (i.e., determination block 3203="Yes"), the processor outputs program instructions for a collaboration and provide a two way communication between the devices (block 3204). For example, changes on each of the incompatible software applications may be rendered locally and also transmitted to a remote location, where the changes may be aggregated and entered into a third software program. If the processor determines not to collaborate with a server (i.e., determination block 3203="No"), the processor will not establish the two way communication between the devices and render the screen in block 3210 and update changes made in a non-collaborative manner.

In block 3205, the processor will render a screen and update the screen for changes. For example, changes on each of the software applications may be transmitted to the remote location, where the changes are aggregated and entered into the third compatible software program. In block 3206, the processor will apply a conflict resolution program for two different software applications. The changes are then translated into a native format, and then are transmitted to each of the users in the native format for display on the respective applications. In block 3207, the processor will identify an author of the changes. In block 3208, the processor will update the document image and render the document image. In block 3209, the processor will update the document image.

Figure 33:
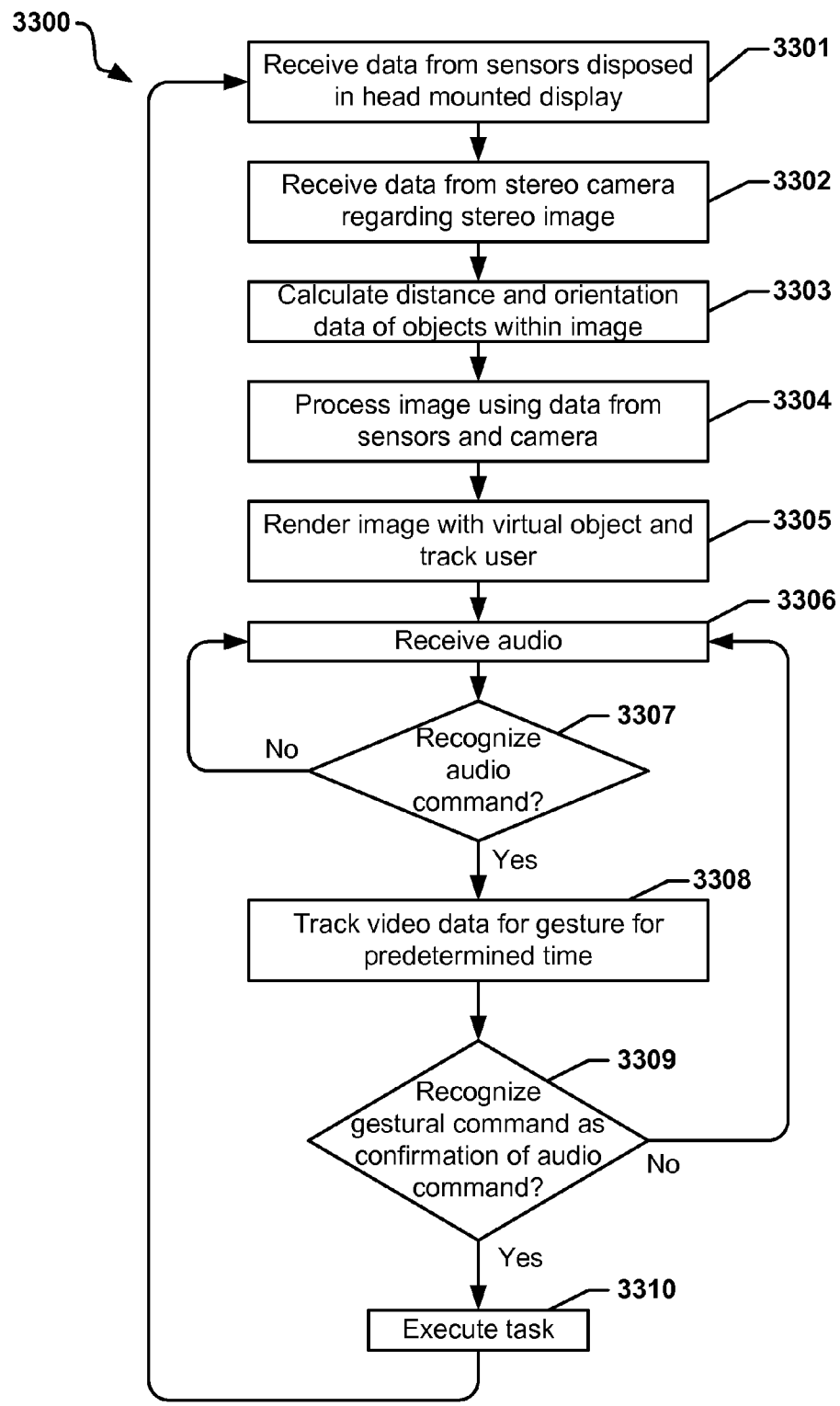
FIGS. 33-34 are process flow diagrams of embodiment methods for using a head mounted device to recognize both gestures and audio commands, and to process the commands as confirmed input commands when a first command and a second command are detected in succession.

FIG. 33 illustrates an embodiment method 3300 where an audio command may be processed and confirmed using a detected gesture. Method 3300 may be implemented in a computing device having a processor configured with processor-executable instructions to perform the operations of the method 3300. In method 3300, the processor may commence operation by receiving scanned data from sensors that provide data regarding orientation of the head mounted device in block 3301. In block 3302, the processor may receive image data from the camera regarding images. In block 3303, the processor may calculate distance and orientation of objects within the images. In block 3304, the processor may process the image using data from sensors, camera data and distance data and in block 3305 the processor may render the image with the virtual object. Additionally, in block 3305, the processor may track the user's movements to determine if there is a gestural input command that is to be executed. In block 3306, the processor may receive an audio signal.

At determination block 3307, the processor may determine whether an audio command spoken by the user is recognized. For example, the user may desire to enlarge a size of the virtual object to a larger virtual object rendered on the display and may speak the word "enlarge virtual object." For example, the user may alternatively wish to change a shape of the virtual object from rectangular to a different shape and may speak a word "change virtual object to oval". Other similar commands are also envisioned and possible and within the scope of the present disclosure. If the processor recognizes an audio command spoken by the user (i.e., determination block 3307="Yes"), in block 3308, the processor may track video data for a gesture for a predetermined time period. The gestural command may be utilized to confirm the first audio command. For example, the user may be speaking and may simply inadvertently mention "enlarge" and "virtual object" in a sentence speaking to a second user, which may be received by the microphone and communicated to a processor. Thereafter, instead of blindly executing the command, a confirmation may be awaited in the form of a detected gesture. For example, the user may point in a direction or the user may give an "O.K." sign with a thumb making an index finger and the remaining fingers being outstretched. This second command will confirm the first command. At determination block 3309, the processor may determine whether a gesture is recognized confirming the audio command. If the processor recognizes that a gesture is confirming the audio command (i.e., determination block 3309="Yes"), the processor may execute the task in block 3310.

If the processor does not recognize an audio command spoken by the user (i.e., determination block 3307="No"), the processor may continue to receive audio. If the processor does not recognize that a gesture is confirming the audio command (i.e., determination block 3309="No") the processor may continue to receive and analyze audio data. For example, if the user may be speaking and may simply inadvertently mention "enlarge" and "virtual object" in a sentence speaking to a second user. However, if no confirmation is detected in the form of the detected gesture (pointing, O.K. sign, outstretched hand), the processor will not execute the first command and simply may continue to monitor audio for additional new commands Many gestures may provide a confirmation and are not limited to any disclosed herein. Also, verbal commands (e.g., via speech recognition) and commands entered by user button presses (e.g., on a keyboard) may be accepted and processed by the processor. For example, verbal commands may be accepted to confirm or express the same information as gesture commands, thereby enabling the head mounted device and system to more accurately interpret a user's intent.

Figure 34:
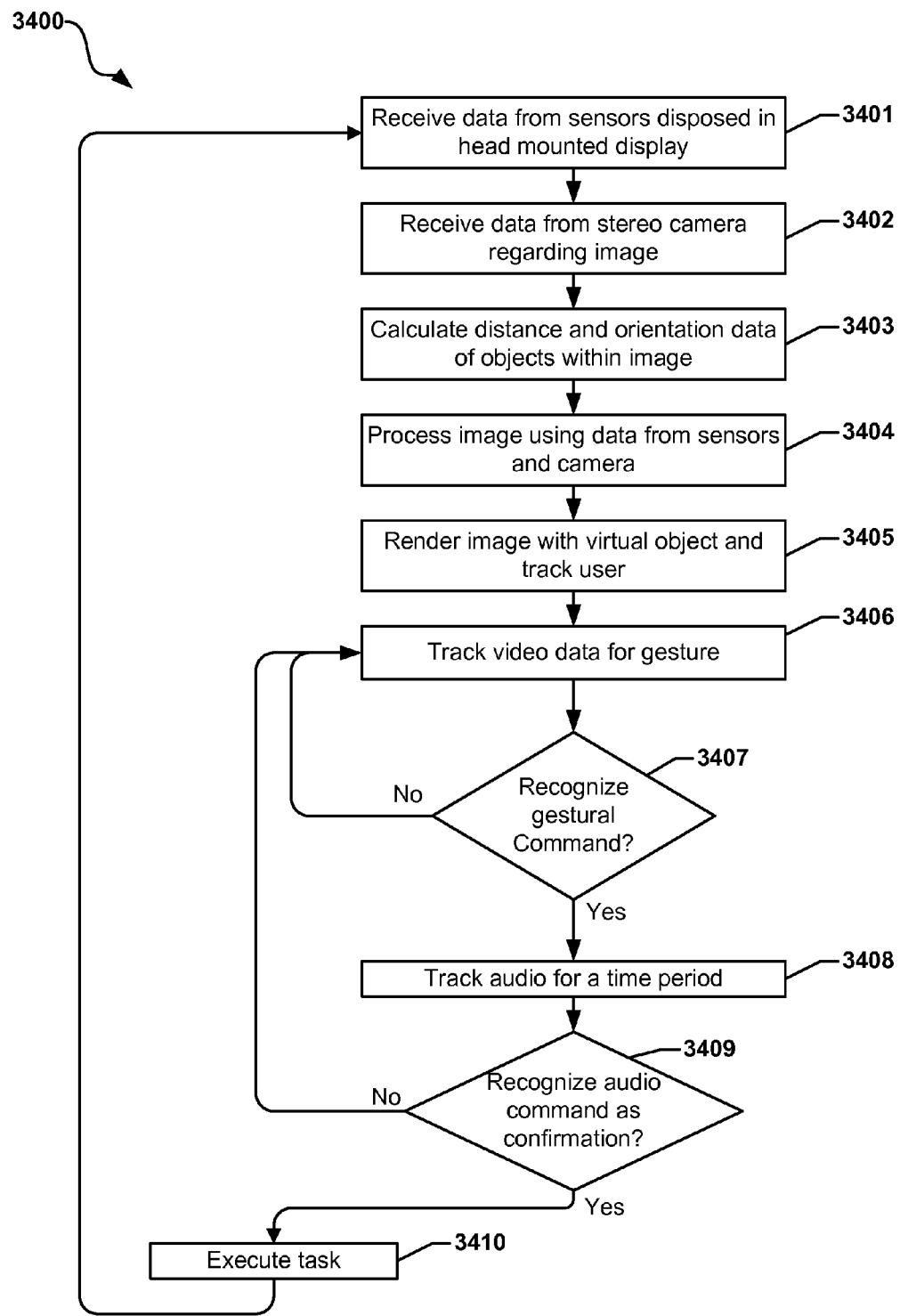

FIG. 34 illustrates an embodiment method 3400 where a gesture command may be processed and confirmed using a detected audio command, which may be a different order of operation than disclosed above. Method 3400 may be implemented in a computing device having a processor configured with processor-executable instructions to perform operations of the method 3400. In method 3400, the processor may commence operation by receiving data from a head mounted device including sensors that provide data regarding orientation in block 3401. In block 3402, the processor may receive data from the camera regarding images.

In block 3403, the processor may calculate distance and orientation of objects within the images. In block 3404, the processor may process an image using data from orientation sensors, camera data, and distance data. In block 3405, the processor may render the image with the virtual object and in block 3406 the processor may control the camera to track the user's movements.

At determination block 3407, a decision may be reached regarding whether to recognize a gesture command, for example, by recognizing one or more selected gestures including pointing, clapping, snapping fingers, making an "O.K. gesture" by joining the thumb and finger. This may be performed using an anatomical model that may be applied to the tracked video data. If a gesture is detected (i.e., determination block 3407="Yes"), the processor may track audio data for a command for a time period in block 3408 to confirm the detected gestural command.

At determination block 3409, a decision may be reached regarding whether to recognize an audio command as a confirmation of the gestural command. If the confirmation is received (i.e., determination block 3409="Yes"), the processor may execute the task in block 3410.

If a gesture is not recognized (i.e., determination block 3407="No"), which may occur when the gesture is inadvertently detected, the processor may continue to track the captured video images for a new gestural command. Also, if no audio confirmation is recognized (i.e., determination block 3409="No"), the processor may continue to receive video and track the video and ignores the gestural command as no confirmation was detected. Also, mentioned above verbal commands and commands entered by user button presses may be accepted and processed by the processor, alone or in conjunction with gesture commands in order to enable the head mounted device and system to more accurately interpret a user's intent.

Figure 35:
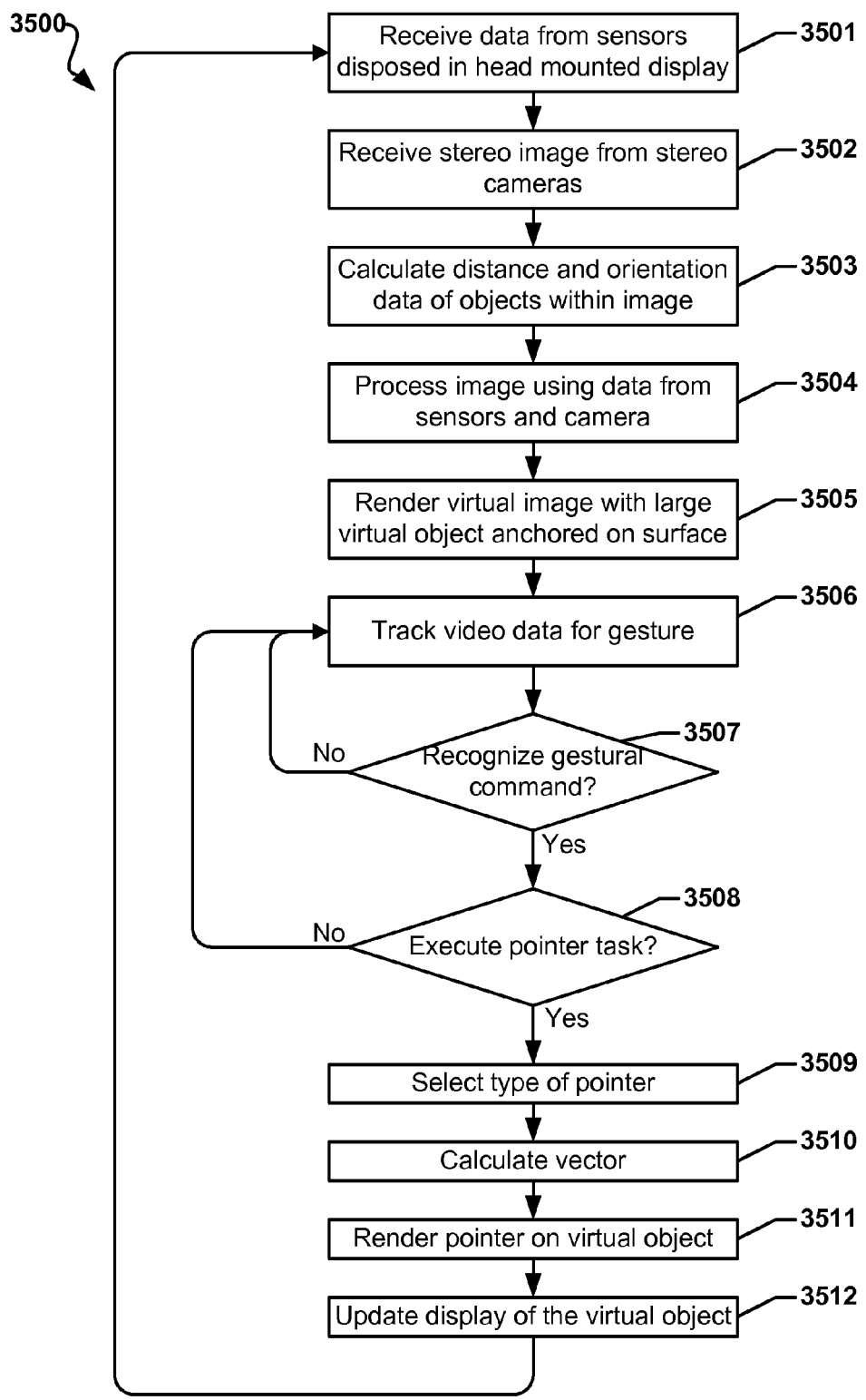
FIGS. 35-36 are process flow diagrams of embodiment methods for using a head mounted device to recognize gesture commands to render a "virtual object input device" on the generated virtual object so the user may control the virtual object using the virtual input device.

FIG. 35 illustrates an embodiment method 3500 where a gestural command may be processed and recognized. In response to the gestural command, the processor may render a "virtual input device" on the virtual object so the user can utilize the virtual input device to manipulate the virtual object. The virtual input device may be a generated virtual object that can be controlled by tracking the movements of the user. For example, the virtual object may be a virtual pointer, or an icon or any other controllable virtual object selected by the user.

Method 3500 may be implemented in a computing device having a processor configured with processor-executable instructions to perform the operations of the method 3500. For example, the input device may be a virtual reality pointer object. The pointer may be generated automatically in a line of sight measured from the gesture/tracking cameras and a virtual object connected to the anchor surface. In method 3500, the processor may commence operation by receiving data from a head mounted device including sensors that provide data regarding orientation in block 3501. In block 3502, the processor may receive captured image data from the camera regarding stereo images.

In block 3503, the processor may calculate distance and orientation of objects within the images. In block 3504, the processor may process image using data from orientation sensors, camera data and the distance data. In block 3505, the processor may render the image with the virtual object and in block 3506 the processor may control the camera to track the user's movements.

At determination block 3507, the processor may determine whether a gesture command is recognized, such as by applying an anatomical recognition algorithm to the tracked images. The processor may recognize one or more selected gestures including pointing, clapping, snapping fingers, making an "O.K. gesture" by joining the thumb and finger, etc. within the image. If the processor recognizes a gesture (i.e., determination block 3507="Yes"), the processor may have an indication to execute a virtual pointer task in block 3508.

The pointer may be an "input device related virtual object" (a mouse icon, a laser pointer virtual object, an arrow input device) that is displayed on the display in three dimensions and that is placed on the virtual object and that can allow a user to highlight text, select, make input commands and provide inputs to the processor of the head mounted device. At determination block 3508, a decision may be reached regarding whether to execute the pointer task. If the processor determines to execute the pointer task (i.e., determination block 3508="Yes"), the processor may execute the task and a type of pointer may be selected from a plurality of different virtual input devices in block 3509. On block 3510, a vector may be calculated from the head mounted or body mounted camera to the user's finger and to the virtual object. The vector may be used to render the pointer on the virtual object in block 3511. In block 3512, the virtual object and the virtual input device's display may be updated.

If the processor does not recognize a gesture (i.e., determination block 3507="No"), the processor may continue to process video images in order to recognize predetermined gestures. Also, if the processor determines not to execute the pointer task (i.e., determination block 3508="No"), the processor may continue to track video and ignore the gestural command as no task will be executed.

Figure 36:
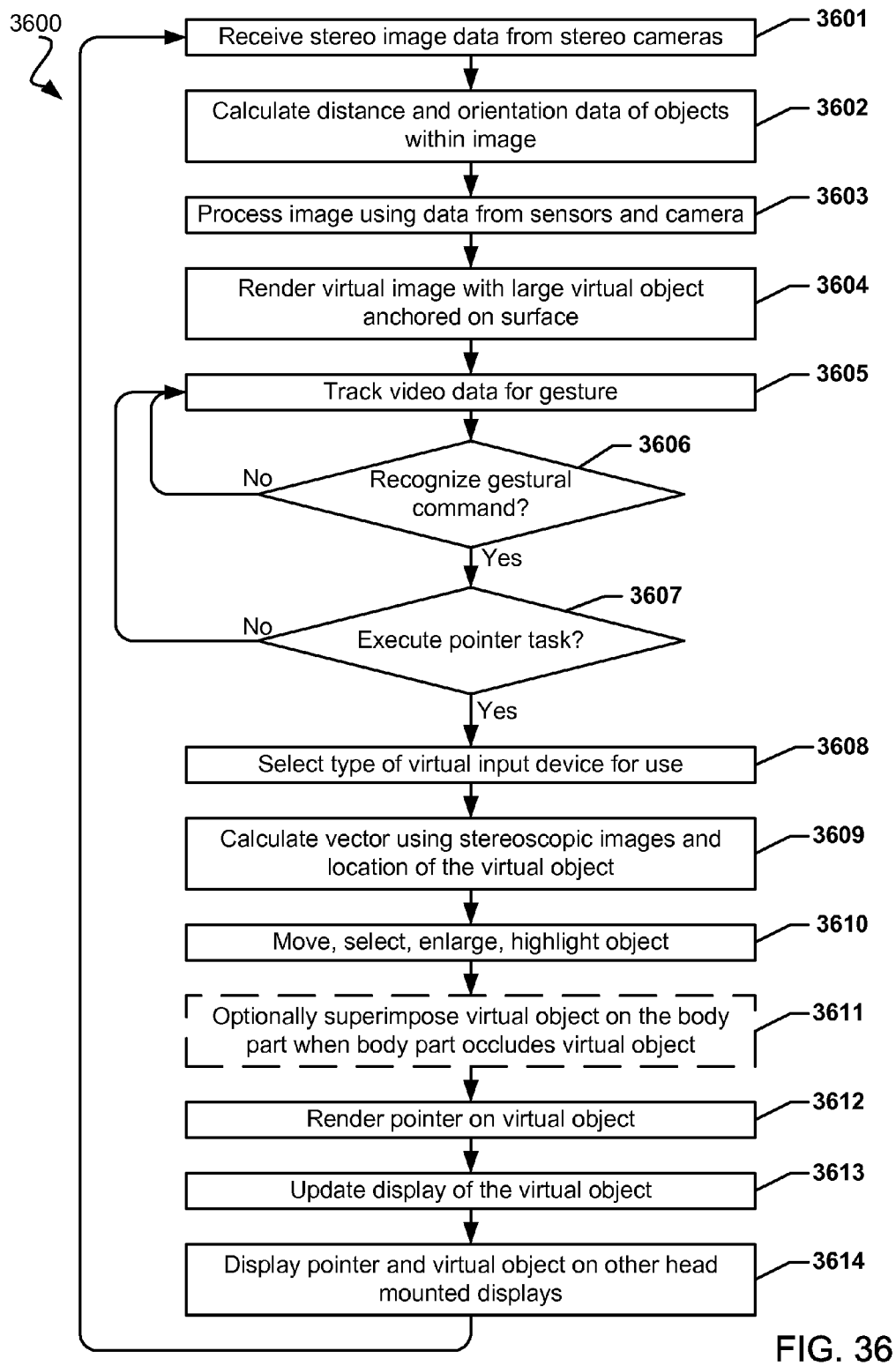

FIG. 36 illustrates an embodiment method 3600 where a gesture command may be recognized and processed and a three-dimensional virtual reality type input device may be rendered on the virtual object to provide input commands. Additionally, the processor may recognize features of individuals, which may be rendered transparent when the features/body parts occlude the virtual object. Method 3600 may be implemented in a computing device having a processor configured with processor-executable instructions to perform the operations of the method 3600. For example, the input device may be a virtual reality pointer object that is only displayed on the head mounted display. The object may be displayed on the display and may be generated in a line of sight or in a vector that may be measured from the gesture/tracking cameras to the virtual object that is connected on the anchor surface. For example, a vector may be formed from the camera/or a user's finger to the virtual object on the display. The virtual pointer object may be placed and displayed as connected to the vector. The user may control the virtual pointer object by one or more detected gestures, audio commands, by an input device, or by another input command. In method 3600, the processor in block 3601 may commence operation by receiving data from the camera regarding stereo images.

In block 3602, the processor may calculate the distance and the orientation of the objects within the images. In block 3603, the processor may process the image using data from orientation sensors, camera data and distance data. In block 3604, the processor may render the image with the virtual object. In block 3605, the processor may provide instructions to control the camera to track the user's movements by applying an anatomical algorithm to the tracked images to a detected body part and may track the body part over a predetermined time interval.

At determination block 3606, the processor may decide whether gesture command is recognized, which may occur when there is a match among one or more gestures in a gesture dictionary with shapes and movement within the tracked images, the processor may correlate the detected gesture to an input command to execute a software application, or to take some predefined action. If the processor recognizes a gesture command (i.e., determination block 3606="Yes"), the processor may execute a pointer task in block 3607.

The pointer may be a virtual input device (a mouse icon, a laser pointer virtual object) that is displayed on the head mounted display. The virtual input device may be associated with the virtual object that can allow a user to highlight text, select hyperlinks, formulate input commands and form inputs relative to the virtual object. For example, the virtual input device may be a three-dimensional virtual reality arrow displayed on the head mounted display. In such an embodiment, the arrow may be moveable in free space on the display in response to user gestures. For example, in response to the user moving a hand to the left, the system may render an image of the arrow moving to the left on the head mounted display. As another example, the user may input a command and the arrow may illustrate that the command is executed. For example, the user may speak the word "select" when the arrow is adjacent text on the virtual object and the arrow may indicate that the text is selected.

At determination block 3607, the processor may determine whether to execute the pointer task and whether to select a virtual input device object from a number of predefined alternatives (e.g., an arrow, a pointer device, or various virtual icons). If so (i.e., determination block 3607="Yes"), the processor may execute the task and a virtual input device may be selected in block 3608 from an array of different pointer types stored in memory. In block 3609, a vector may be calculated from the camera to the user's hand and to the virtual object. The virtual input device may be rendered and placed directly on the calculated vector and may be moveable on the display by tracking movement of the user's hand to provide for a virtual or augmented reality experience. In block 3610, the virtual reality input device/pointer may be used to move, select, enlarge or highlight a portion of the virtual object on the display.

In block 3611, optionally a user's features may come in contact with the virtual object and may occlude the virtual object. For example, a user's hand may pass over the virtual object and may occlude or block the view of the virtual object from the user's view point, which may not be favored. The processor may superimpose the virtual object on the user's body part so the virtual object may remain visible to the user, even though the user's body part should be occluding the virtual object on the display. In this manner, the body part may be rendered as seemingly transparent with only an outline of the body part shown. In block 3612, the vector may be used to render the pointer on the virtual object. In block 3613, the virtual input device may be updated. In block 3614, the virtual input device may be displayed with the virtual object.

If no gesture command is recognized (i.e., determination block 3606="No"), the processor may continue to track video to determine if the processor recognizes a gesture. Also, if the processor decides not to execute or use a pointer (i.e., determination block 3607="No"), the processor may continue to track video and will not generate and display a virtual input device.

Figure 37:
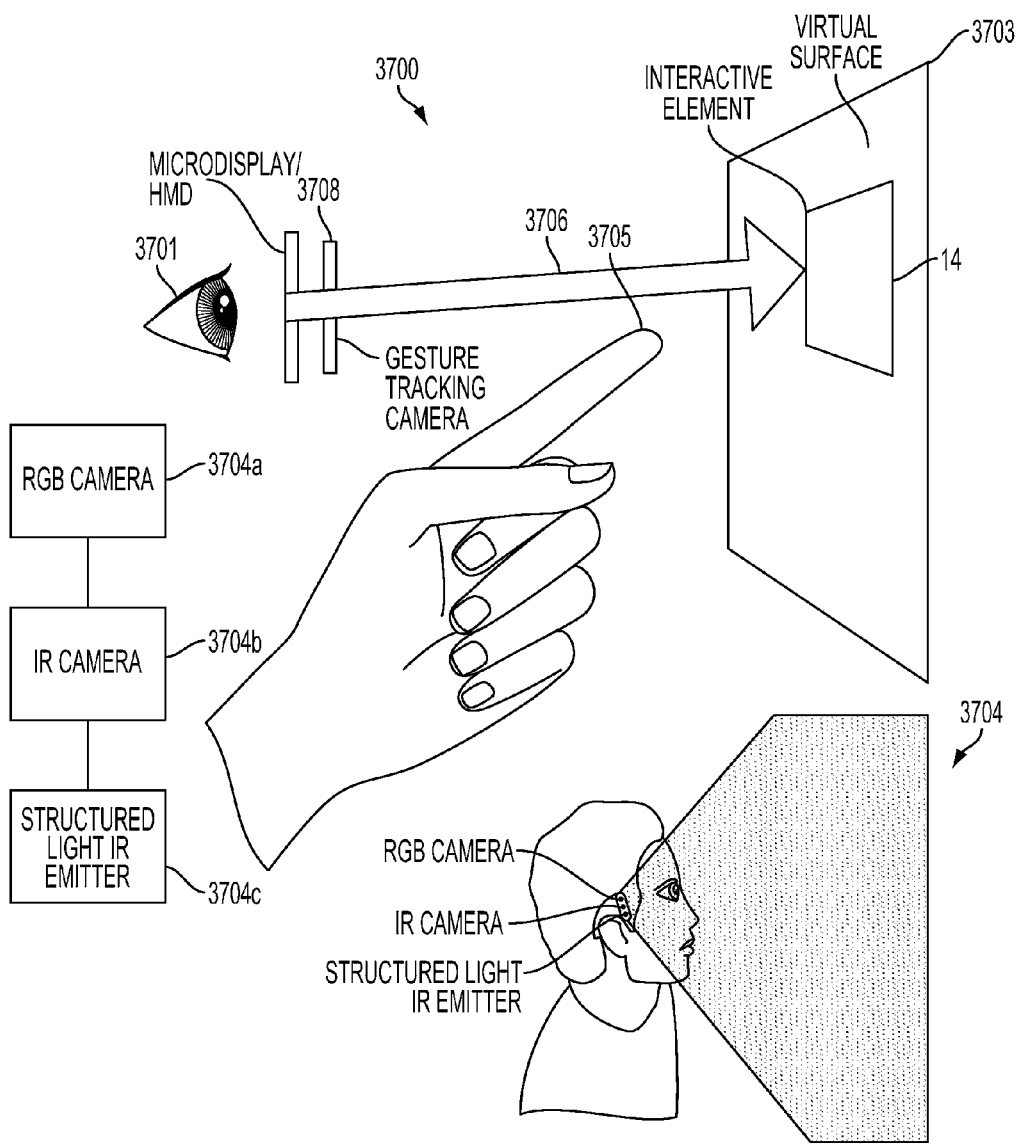
FIG. 37 is a high level block diagram of an embodiment using a gesture tracking camera and/or an RGB and distance measuring camera (or cameras) to provide the "virtual object input device" which is a virtual pointer device that is controlled by a user's finger to select icons on the virtual object.

FIG. 37 illustrates a high level illustration of a system 3700 that includes a virtual object reality input device or a virtual pointer 3706 that is visible on a head mounted display 3704 and a high level diagram of the virtual object 14. The head mounted display 3704 may include a processor and a wireless communication device that includes an antenna (not shown). As discussed above with reference to FIG. 5A, the head mounted device 3704 may include a core processor which may include a coprocessor for executing applications, sometimes referred to as an application processor.

The head mounted device 3704 may also include multiple peer processors associated with important device capabilities including communications (e.g., a wireless modem processor), navigation (e.g., a GPS receiver processor), and graphics (e.g., a graphics processor unit (GPU)). The head mounted device 3704 may also include a cellular transceiver or modem (not shown), which in many cases include one or more processors whose main task is managing wireless communications. The head mounted device 3704 may also include other wireless transceivers for communicating over other types of wireless communications networks, such as a Wi-Fi modem (not shown) that may be a separate transceiver chip, in which case it may also include a separate programmable processor. Other wireless transceivers (not shown) which have embedded programmable processors may be included to connect to other types of wireless communication links, such as near field communications (NFC) links, Bluetooth® links, and links based on other wireless protocols.

In addition to the communications processors, the head mounted device 3704 may also include a GPS receiver (not shown) which may have a dedicated processor. Also, a graphics processor may be included in order to provide high-resolution graphics. The head mounted device 3704 may also include processors associated with wired communications, such as a USB port. As described above with reference to FIG. 5A, the head mounted display 3701 may include an RGB-D camera system which itself may combine a RGB camera 3704a with an infrared camera 3704b and a structured infrared light infrared emitter 3704c.

The processor measures a vector that may be captured from the head mounted or body mounted camera 3701 to the user's finger 3705 and from the finger 3705 to the virtual object 14. Using the vector an input device virtual object 3706 may be generated and may be placed on the vector. The virtual input device 3706 may be generated and an orientation of the virtual input device 3706 may be calculated. The virtual input device 3706 may be generated to connect to the anchor surface 3703, which may be where a virtual object 14 is connected. In this embodiment, the virtual object 14 may be rendered for display to a very large size, for example the size of a building as displayed on the head mounted display. The user using the virtual input device 3706 may select text or portions of the virtual object or content displayed with the virtual object 14 thereof.

Figure 38:
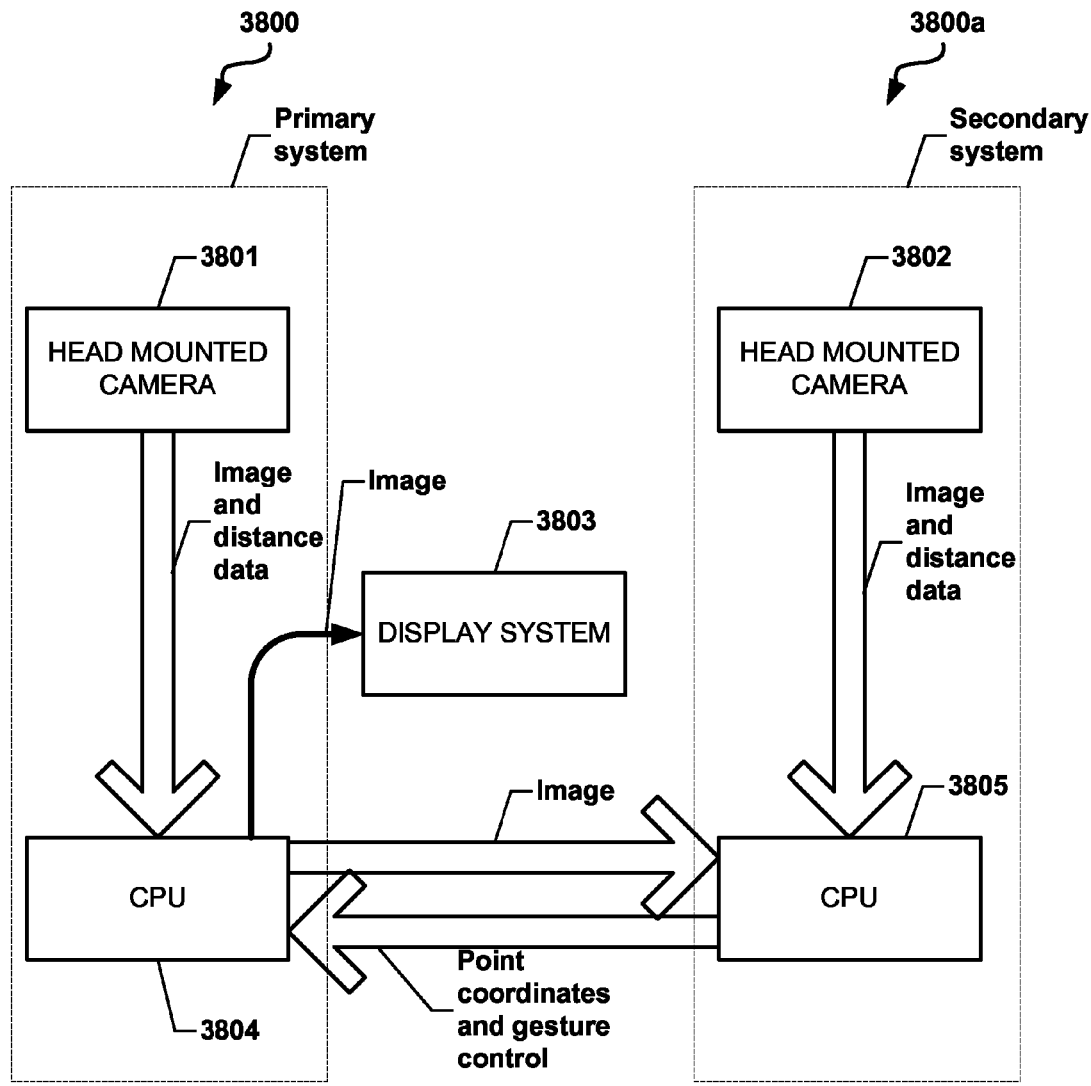
FIGS. 38-39 show high level block diagrams of a peer to peer based system and a central cloud configuration based system for using a head mounted device and a server to share data and enable user collaboration.

FIG. 38 illustrates a high level diagram of a first and a second head mounted device system 3800 and 3800a illustrating how a second head mounted device may provide pointing coordinates and gesture controls for implementation by a first head mounted device. The primary head mounted device system 3800 may include a first head mounted or body mounted camera array 3801 and a first processor 3804 operable with a peer to peer based arrangement. A first processor 3804 may be operable as a host processor and a second processor 3805 may be operable as a secondary system. A second head mounted device system 3800a may act as system that receives a generated image for display from a primary system 3800. The second head mounted device system 3800a may include a head mounted or body mounted camera array 3802 and a second processor 3805. A display system 3803 may be also be provided for the user to view three-dimensional images. The head mounted or body mounted camera array 3801 may provide the image and distance data to the first processor 3804, which generates and provides the image data to the display system 3803. The primary processor 3804 may provide the image to the second processor 3805, and the second head mounted device may provide point coordinates and gesture controls to the primary processor 3804. Image and distance data and provided to the processors 3804 and 3805 whereby a primary processor generates a virtual object and displays the image on a display system 3803 and also communicates the image to the second processor 3805 for display. The second processor 3805 may detect user gestures as user inputs, such as pointing to locations for anchor surfaces or moving objects and control commands, and provide those point and gesture controls to the first processor where the inputs may be processed.

Figure 39:
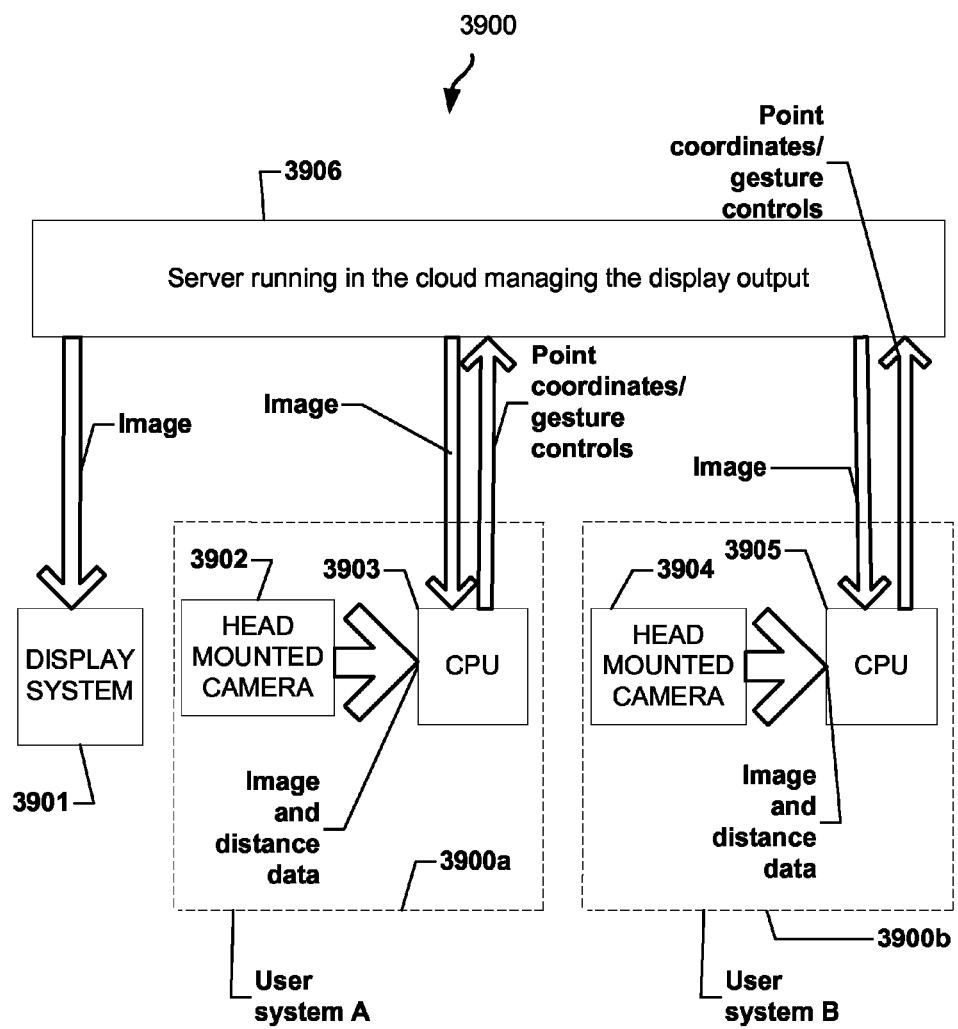

FIG. 39 illustrates a system 3900 that operates in a cloud configuration where point and gesture controls and image data information may be stored on and relayed to others (e.g., in a multicast) by a cloud server 3906. This system enables virtual object and display data to be wirelessly communicated to collaborating head mounted display systems 3900a and 3900b. The system 3900 also enables other computing devices, including other head mounted devices, to monitor the data exchanges taking place between the collaborating head mounted display systems 3900a and 3900b. In this manner, the collaboration may be viewed by a wider audience.

The system 3900 may include a central processor operable on a central server 3906. The first head mounted device 3900a may include a head mounted or body mounted camera 3902 and a first processor 3903. A second head mounted device 3900b may include a head mounted or body mounted camera 3904 with a second processor 3905. A display system 3901 also may be provided. An image may be provided from the server 3906 to the display system 3901. The image also may be provided to the first processor 3903. The first processor 3903 transmits data to the server 3906 including gestures, point coordinates, distance data, image data, orientation data, and sensed parameters. The image may be also provided to the second processor 3905. The second processor 3905 also may provide the data including gestures, point coordinates, distance data, image data, orientation data, and sensed parameters to the server 3906. The central processor operable on the central server 3906 may provide services to the head mounted devices to alleviate computational processing on the first and second processors 3903 and 3905 to render the virtual pointer object and a virtual object.

For example, the first user system 3900a may scan an area with infrared light and may measure a time of flight of the reflected infrared light to a gating mechanism. This may be utilized to determine the shape of objects in a predetermined area and may also be utilized to determine a distance parameter of the objects. The first user system 3900a may wirelessly communicate the distance parameter to the sever 3906. The cloud server 3906 may utilize the scanned data to generate an image including a virtual object. The virtual object may be generated in an image and wirelessly communicated to the display system 3901 and the second head mounted device 3900b together with scanned data of the predetermined area.

Referring back to FIG. 37, an example of a gesture that may be tracked by a head mounted device is a pointing gesture indicating or selecting a virtual object. For example, a user may point to a virtual object 14 with a finger 3705, and the camera system of the head mounted display may determine a vector from the head mounted or body mounted camera 3708 to the user's finger 3705 and from the finger 3705 to the virtual object 14. Using this vector, the processor may generate an input device virtual object.

For example, an orientation of the virtual object 14 for display on the head mounted display may be determined. The virtual input device object 14 may be connected to the anchor surface 3704 and may connect to the virtual object 14 so the user may control the virtual input device object 14. The virtual object 14 may be anchored on the anchor surface 3703 within images rendered on the head mounted display. In this embodiment, the virtual object 14 may be rendered for display, and using the virtual object input device, the user may select text or portions of the virtual object 14 which are recognized with the tracked video and captured gestures utilizing the gesture tracking camera 3708. In this embodiment, the virtual input device object 14 may be displayed as a moveable three-dimensional object around the user or that the user can walk around. The virtual object 14 may be rendered as a very large virtual object in the displayed image, such as the size of a building. The user may utilize the virtual input device to specify a position in space on the very large virtual object 14 in the displayed image.

Figure 40A:
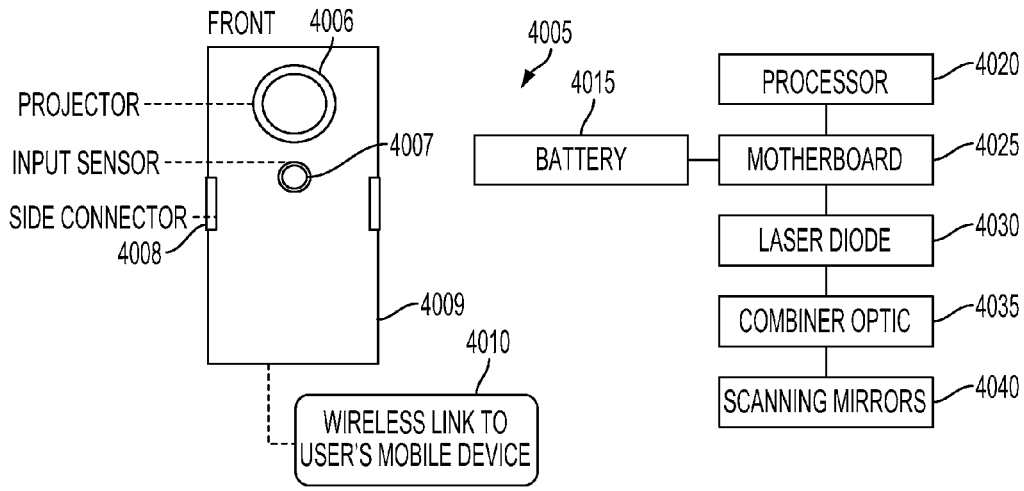
FIG. 40A is a high level block diagram of an embodiment system using a gesture tracking camera and a camera to provide the "virtual object input device" that forms a virtual pointer device where the virtual object may be rendered large on the head mounted display.
Figure 40B:
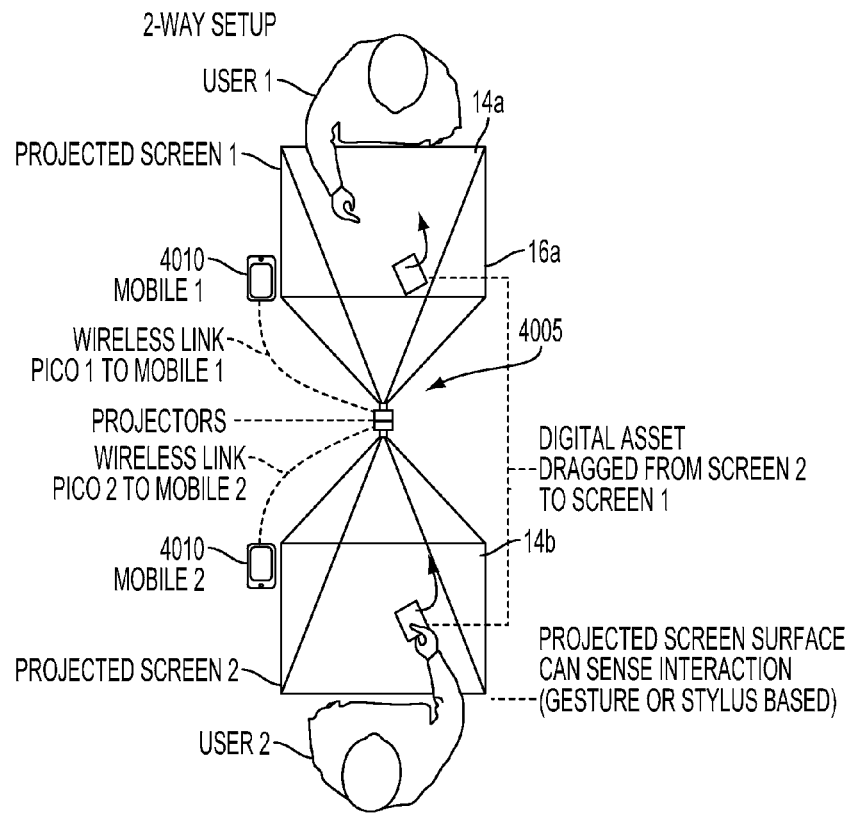
FIGS. 40B-40C show another embodiment of rendering a virtual object using a modular pico projector that may detect gestures and output a projection for a user.

FIGS. 40A-40B illustrate another embodiment in which the head mounted display device 10 shown in FIG. 1 may be replaced or supplemented with a pico projector 4005 that may be wirelessly connected to a mobile smartphone 4010 and that may generate a projected image on a surface where a user's gestures may be utilized to provide input commands. In this embodiment, the user does not wear any head mounted apparatus and merely may view the projected images on a horizontal or vertical surface. A handheld projector 4005 (also known as a pocket projector 4005, mobile projector or pico projector) may be used with a handheld device 4010 to output the virtual object 14a shown in FIGS. 40A and 40B. The handheld projector 4005 may include miniaturized hardware and software that can project digital images 14a onto any nearby viewing surface 16, such as a wall 16 shown in FIG. 1 or a desk top 16a shown in FIG. 40B.

The pico projector 4005 may include a battery 4015, an electronic motherboard 4005, a diode laser, laser or other light source 4030, a combiner optical element 4035, and scanning mirrors 4040. Various configurations of components in the handheld projector 4005 are possible and within the scope of the present disclosure. The processor 4020 may be coupled to a motherboard 4020. Processor 4020 may control the laser diode 4030 and a projector to output an image where controlled by the processor 4020 utilizing the mirror and optic 4040 and 4035.

Turning to FIG. 40A, the pico projector 4005 may include a projector element 4006, an input sensor 4007, a connector 4008, and a wireless interface 4009 for connecting to a mobile device 4010 or other computing device. An input-sensing pico-projector may be connected to other units of the same type in a modular fashion. The projectors may create multiple, positional aware shared projected displays rendered as virtual objects 14a and 14b for a real time local digital collaboration between users. The pico projector 4005 may capture images for a first user and applying an anatomical algorithm to the captured images. The processor may detect a first user and project a first virtual object 14a on a desktop surface 16 in a convenient location for the first user. The pico projector 4005 using a peer-to-peer or other RF wireless communication link, or using captured image data may detect that a second user has joined the collaboration. The pico projector 4005 may output a second virtual object 14b oriented correctly for the second user based on the captured image data.

Each projector 4005 may connect to a mobile computing device 4010 (or other computing device) via high-speed wireless data links (e.g., 4G, Wi-Fi or Bluetooth®) and/or be linked via a peer-to-peer communication protocol. Each projector 4005 may also be linked to the mobile computing device 4010 (or other computing device) via a wired data link. The mobile computing device 4010 may act as a processing unit and data storage device for the pico projector 4005 and may generate the projected image and communicate the image to the pico projector 4005. The pico projector 4005 may alternatively connect physically to other pico projectors, such as via strategically positioned connectors 4008 on each projector's 4005 housing. For example, two pico projectors 4005 may connect via respective connectors 4008. The connectors 4008 may provide a reference data point for each of the pico projectors 4005 when two pico projectors 4005 are connected to one another. The pico projector 4005 may display a projected image on a surface 16a, which may be a predetermined distance from the reference data point.

The connections 4008 on each projector's 4005 housing may provide both physical support and may include a circuit for a high-speed data link between projectors 4005, bridging communications between each projector's wirelessly connected mobile computing device 4010. The connector 4008 and circuit may support USB, Firewire®, or any other high speed connector 4008 known in the art.

Additionally, the connections may provide a reference data point to software regarding each projector's physical orientation with respect to other projectors connected via connector 4008 shown in FIG. 40A. The connectors 4008 may be used to provide interface software and the ability to transfer digital assets across the projectors 4005. The projector 4005 may output the virtual object 14a as a projection onto a surface. The projector 4005 may also use captured image data to sense objects in the image for tracking and for gesture recognition. The projected image 14a may be a virtual touch screen 14a and may also include a virtual input device on the virtual object. Gestures associated with the projected image may be detected and the processor may formulate input commands based on the detected gestures. This gesture recognition functionality may provide a simulated appearance that the user may be controlling a virtual input device.

FIG. 40B illustrates the pico projector 4005 rendering a first virtual object 14a and a second virtual object 14b. In an embodiment, a single pico projector 4005 may project at least two different images for each user. In another embodiment, the pico projector 4005 may be mated with a second pico projected which completes an electronic connection between the two projectors. The two different pico projectors 4005 may wirelessly connect with a mobile computing device 4010 or other available computing devices, and each may output two different images with one for each user. The projector 4005 linked to the mobile computing devices 4010 may use the processor of each mobile computing device 4010 to render the virtual object 14a and 14b. The processor of the mobile computing device 4010 and the image sensor may detect parameters associated with each user to render the virtual object 14a and 14b and to determine the correct orientation of the virtual object 14a and 14b for each of the users.

The input sensor 4007 may convert the image into an electronic signal. The electronic signal may drive the light sources with different colors and intensities down different optical paths. In the combiner optic 4035 the different light paths may be combined into one path demonstrating a number of colors. The mirrors 4040 reflect the image pixel-by-pixel and project the image. The handheld projector 4005 may project a clear image, regardless of the physical characteristics of the viewing surface 16. For example, the projected image of the virtual object 14a may be a "virtual object input device," such as a keyboard with a word processing application. The gestures of the user may be detected corresponding to the input device locations on the virtual objects 14a-14c and recognized as one or more input commands.

In the illustrated embodiment, the image may project a virtual object 14a on a surface 16a shown in FIG. 40B, and the user may anchor the virtual object 14a on the physical surface 16a. As the user moves based on the output of the sensor 4007, the virtual object 14a may change in shape, orientation and size to remain anchored to the physical surface 16a. For example, the user may be detected as moving backward or forwardly, or left or right relative to the projector 4005 by the sensor 4007. The input sensor 4007 may communicate a position change by the user and the processor 4020 may control the projected image to become larger or smaller, or more the projected image to a comfortable viewing location associated with the user's new location. For example, the projected image may move from a horizontal surface to a vertical surface to follow the user.

A mobile computing device 4010, such as a smartphone may be configured to support the gesture user interface functionality of the projector 4005, which projects a computer generated image (such as a presentation slide, text document or photograph) onto a projection surface 16. A camera (image sensor) 4007 (FIG. 40A) coupled to the mobile computing device 4010 may be positioned so its field of view encompasses at least part of the displayed image. In another embodiment, a user may also use a laser pointer to place a laser spot onto the displayed image, which may be detected by the camera 4007.

The camera 4007 may obtain a digital image of the laser spot and at least part of the displayed image and provide the camera image to the processor 4020 of the mobile computing device 4010 with a location of the laser spot within the image. The mobile computing device 4010 processor 4020 may be configured with software instructions to analyze the image generated by the camera 4007 (referred to herein as the "received camera image") to recognize at least a portion of the display content that is being projected onto the projection surface 16 and determine the location of the laser spot with respect to the content. Since laser pointers emit a bright beam of light at a specific wavelength, the laser spot can easily be recognized by the processor 4020 and distinguished from the projected image based upon the intensity and/or color elements. The camera 4007 may be further configured to track the movement of the laser spot and correlate that movement to predefined laser gestures. When a laser gesture is recognized, the processor 4020 may execute the corresponding function.

Figure 40C:
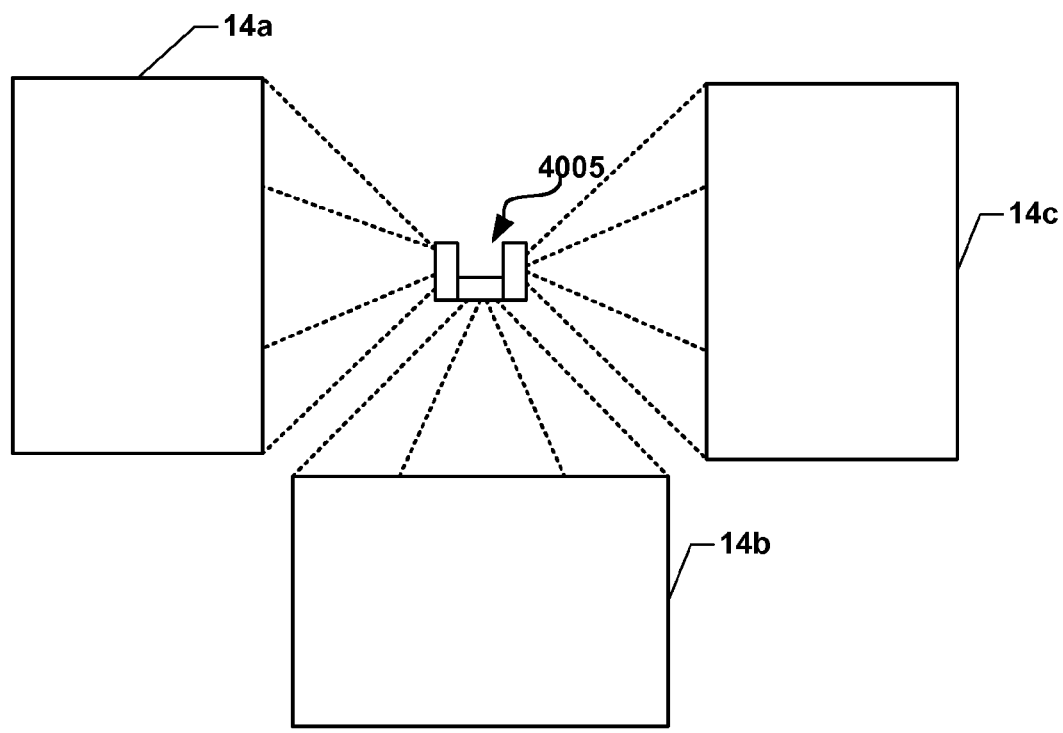

FIG. 40C is a high level diagram of a projector outputting multiple different projected images based on one or more detected users. FIG. 40C illustrates a projector 4005 that uses a mobile communication device processor 4010 (FIG. 40A) to detect gestures from tracked images of additional users that have joined the collaboration. In response to detecting the new user, the processor may render a third virtual object 14c in a modular fashion that is correctly oriented to the third user. Likewise, if an additional user joins and is detected, the processor may render a fourth virtual object (not shown) in a modular fashion where at least two projected images may render the same content and images. Further, a third or fourth user may use the mobile computing device 4010 to change the display of the projected images 14a, 14b and 14c. For example, the user may close the third object 14c and open a new object having different content.

Using the projector 4005, the mobile user experience may be enhanced by providing a large input and display environment that is highly portable. Digital collaboration environments for multiple users may be set up in an ad hoc manner by using mobile devices 4010. The physical connectors 4008 on the projectors 4005 may provide relative positional awareness between projectors. The position data may be provided with a high degree of accuracy. This allows users to easily create collaborative data presentations and manipulations using multiple projected virtual objects 14a-14c.

Figure 40D:
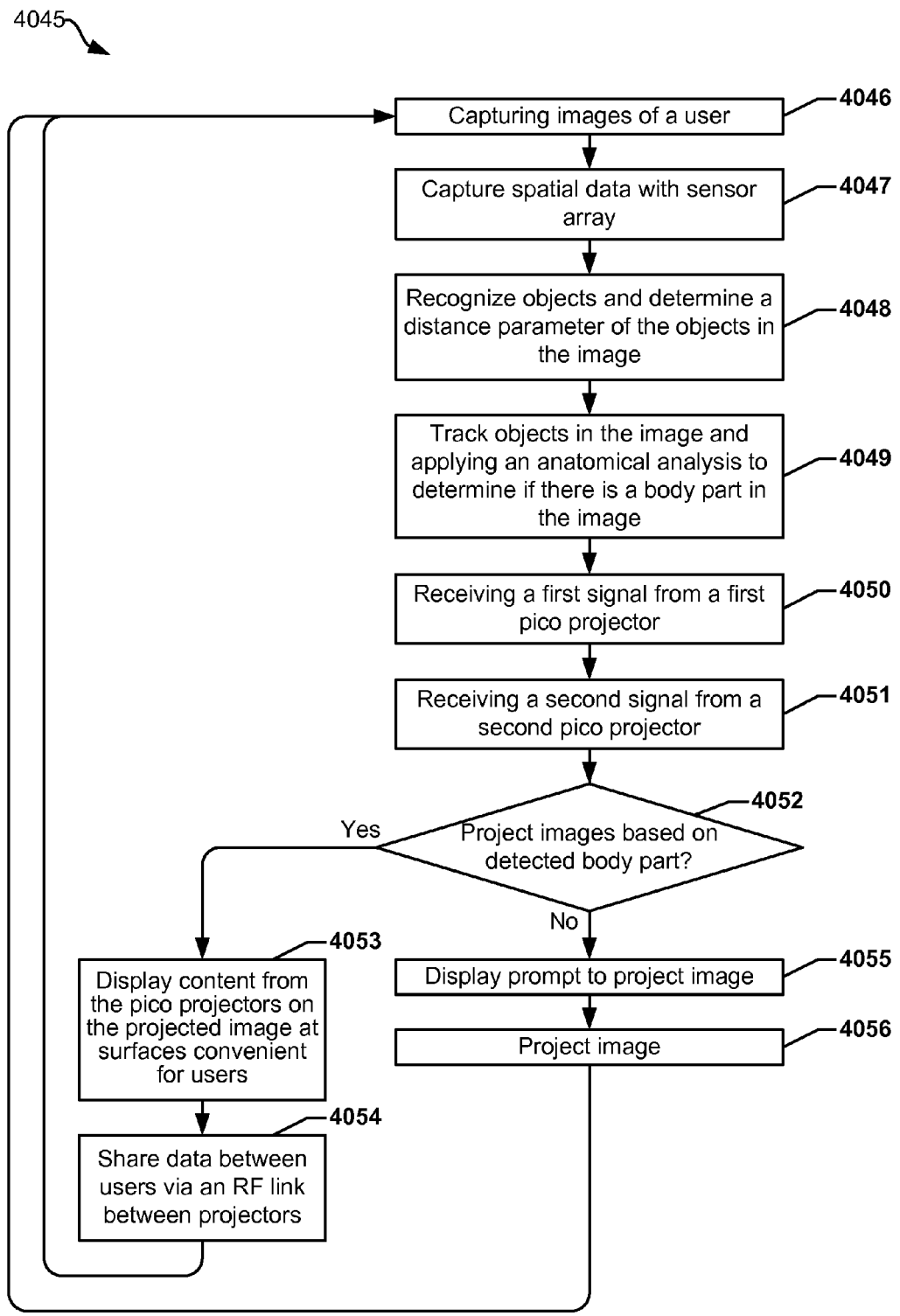
FIG. 40D shows a process flow diagram of an embodiment method of projecting an image with a pico projector in a convenient location for a user by detecting one or more gestures.

FIG. 40D illustrates an embodiment method 4045 for projecting images in a convenient manner for a user based on a detected object/gesture. Method 4045 may be implemented in a computing device having a processor configured with processor-executable instructions to perform the operations of the method 4045. In method 4045, the processor may capture images of a user and may capture spatial data with a sensor array in blocks 4046 and 4047. In block 4048, the processor may recognize objects in the image and determine distances to the objects in the image. In block 4049, the processor may track objects in the image and may apply an anatomical analysis to determine if there is a body part within the image.

For example, the processor may apply an anatomical analysis to the captured images to determine whether the captured image includes a head and shoulders, torso, and arms etc. or any other body part that would indicate a user or the direction in which a user is looking. If a body part is detected, the processor may determine if the detected body part over time conforms to gestures stored in a memory (e.g., in a gesture dictionary) and may apply a command when a gesture is recognized. In an embodiment, the pico projector may project the image in a specific location so the user can conveniently watch and interact with the projected images. For example, if a head and shoulders are determined to be in the image, the pico projector may project an image on a wall or on a table top conveniently near the user.

In a further embodiment, users may apply or wear on one or both hands or wrists gloves, rings, bracelets, and or other items that are colored or feature reflective features that can be recognized by one or both of the distance sensors and cameras in order to aid in distinguishing the user's hands and fingers and recognizing movement gestures. For example, a user may wear a glove that has different colors exhibited on each of the fingers, and the head mounted device may be configured to recognize each of the finger colors based on their respective red-green-blue intensity values within pixels of the scene image.

In blocks 4050 and 4051, the processor receives a first and a second signal from the respective first and second pico projector to link and communicate data between the pico projectors and the processor. For example, the pico projectors may link with a mobile communication device so data content of a memory associated with the mobile communication device memory may be accessed and displayed or shared. In determination block 4052, the processor determines whether to project images from the pico projectors based on a detected body part. If so, (i.e., determination block 4052="Yes"), the processor may display content utilizing the projected image at a surface convenient for a user in block 4053. In block 4054, the processor may share data between the users and a wireless data link between the pico projectors. For example, image files, word processing files, e-mails or any other data may be shared or displayed as a projected image. If the processor determines not to project the images based on the detected body part, (i.e., determination block 4052="No"), the processor may display a prompt to project an image and project the image in a conventional manner in blocks 4055 and 4056. For example, the pico projector may hold off projecting the projections until an input is received and the user may manually detect the projected images. The projected images may include a virtual object and the head mounted devices may be configured to recognize user hand gestures interacting with or relating to the projected virtual object image as user inputs. In such embodiments, the processor may apply a command corresponding to a recognized hand gesture that is made when utilizing the projected virtual input device.

For example, a virtual mouse or virtual pointer may be displayed that can be moved with tracked movements of a user's hand. Additionally, using the detected gesture, the processor may correctly orient the projected images on a vertical or horizontal surface. In this manner, the projected image may be projected right side up based on the detected body part. For example, the first pico projector may be connected to the second projector in a back to back configuration and the projectors may project at least two different projected images with the projected images being separated by at least one hundred eighty degrees relative to one another. In yet another embodiment, the processor may define a reference point and determine an orientation of each of the first and the second projectors based on the reference point. The processor may orient the projected image for the users based on the reference point and the orientation of the first and the second projectors.

In another embodiment, the processor may detect a third user and project at least a third projected image based on a detected body part. Also, the processor may receive data from a third computing device associated with the third user for collaboration. In another embodiment, a fourth pico projector may be provided and at least four different projected images.

Various embodiments may include methods of projecting images from first and second pico projectors coupled to a computing device by capturing images of a scene in a vicinity of the first and second projectors, capturing spatial data in the vicinity of the first and second projectors with a sensor array, analyzing captured scene images to recognize body parts, and projecting images from each of the first and the second projectors with a shape and orientation determined based on the recognized body parts. In an embodiment, the first and the second projectors may be pico projectors. In a further embodiment, projecting images from each of the first and the second projectors with a shape and orientation determined based on the recognized body parts may include projecting images on a surface in front of users in the vicinity of the projectors.

In a further embodiment, the method may include orienting the projected images on a vertical or horizontal surface appropriate for users in the vicinity of the projectors. In a further embodiment, the method may include tracking movements of the recognized body parts, applying a detection algorithm to the tracked movements to detect a predetermined gesture, applying a command corresponding to the detected predetermined gesture, and modifying the projected images in response to the applied command. In a further embodiment, analyzing captured images to recognize body parts may include applying an anatomical analysis to the images to determine whether objects within the captured images match a portion of an anatomical model.

In a further embodiment, the projected images may be of a virtual input device, and applying a command corresponding to the detected predetermined gesture may include applying a command consistent with those of a user input device. In a further embodiment, applying a command corresponding to the detected predetermined gesture may include applying a command corresponding to moving the virtual object, and modifying the projected images in response to the applied command may include displaying the virtual object as moving from a first location to a second location in response to detecting the predetermined gesture. In a further embodiment, the method may include connecting the first projector to the second projector via connectors on the exterior of each projector in a back to back configuration, in which projecting images from each of the first and the second projectors with a shape and orientation determined based on the recognized body parts may include projecting at least two images in approximately opposite directions.

In a further embodiment, the method may include connecting the first projector to a third projector via connectors on exteriors of the projectors, and connecting the third projector to the second projector via connectors on exteriors of the projectors, in which projecting images from each of the first and the second projectors with a shape and orientation determined based on the recognized body parts may include projecting at least three projected images such that they are separated by approximately ninety degrees.

In a further embodiment, the method may include connecting the first projector to a third projector and a fourth projector via connectors on exteriors of the projectors, and connecting the third and fourth projectors to the second projector via connectors on exteriors of the projectors, in which projecting images from each of the first and the second projectors with a shape and orientation determined based on the recognized body parts may include projecting four images such that they are separated by approximately ninety degrees.

In a further embodiment, the method may include defining a reference point in the scene, determining an orientation of each of the first and the second projectors based on the defined reference point, and orienting the projected images based on the defined reference point and the orientation of the first and the second projectors. In a further embodiment, defining a reference point in the scene may include connecting the first projector to the second projector by a connection point, and defining the connection point as the reference point.

Various embodiments may include methods of rendering virtual images in an augmented reality system by capturing an image with a body mounted camera, capturing spatial data with a body mounted sensor array, recognizing an object within the captured image, receiving a first user input indicating a first anchor surface in the captured image that corresponds to a first surface located in the image, calculating parameters including distance and orientation with respect to the body mounted camera that correspond to the first anchor surface, displaying a virtual object so the virtual object appears anchored to the selected first anchor surface, receiving a second input indicating a second anchor surface within the captured image that is different from the first anchor surface, in which the second anchor surface corresponds to a second surface located in the image and the first and second surfaces are different, calculating parameters including distance and orientation with respect to the body mounted camera that corresponds to the second anchor surface, and displaying the virtual object so the virtual object appears to the user to be anchored to the selected second anchor surface and moved from the first anchor surface.

In an embodiment, the method may include continuously updating the display of the generated virtual object so the virtual object appears anchored to the selected first or second anchor surface as the user turns his/her head and moves with respect to the selected first or second anchor surface. In a further embodiment, displaying the virtual object may include displaying a virtual head mounted display. The method may further include outputting video images as if appearing on the head mounted display anchored to the selected first or second anchor surface. In a further embodiment, displaying the generated virtual object so the virtual object appears to the user to be anchored to the selected second anchor surface and moved from the first anchor surface may include generating the virtual object as a rectangular shaped virtual object that resembles a flat screen display, and displaying the generated virtual object on a semitransparent display with the virtual object superimposed on a real world surface visible through the semitransparent display.

In a further embodiment, the first or second anchor surface may include a wall in a room, and in which the virtual object remains anchored on the wall in the room as the user moves about in the room. In a further embodiment, displaying the generated virtual object so the virtual object appears anchored to the selected first or second anchor surface may include generating the virtual object so that it appears to be contacting the first or second anchor surface and so that the first or second anchor surface appear to be a rigid point of support for the anchored virtual object. In a further embodiment, displaying the generated virtual object so the virtual object appears anchored to the selected anchor surface may include generating the virtual object so that it appears to be spaced apart from the first or second anchor surface but hovering in a fixed position and spaced relative to the first or second anchor surface.

In a further embodiment, the method may include transmitting data by the captured spatial data, the generated virtual object and the image to a second head mounted display. In a further embodiment, the method may include receiving audio from the user utilizing a microphone, applying a detection algorithm to the received audio to detect a predetermined audio signal, and implementing the predefined user input when the predetermined audio signal is detected. In a further embodiment, applying a detection algorithm to the received audio to detect a predetermined audio signal may include applying a detection algorithm to the received audio to detect a predetermined audio signal spoken by the user corresponding to a predefined user input. In a further embodiment, the predefined user input corresponding to the detected predetermined audio signal is one of the first input, the second input or a confirmation of one of the first and second inputs.

In a further embodiment, the method may include capturing the image with the body mounted camera that is mounted and disposed together with a head mounted display, and displaying the virtual object on the head mounted display. In a further embodiment, the body mounted camera and head mounted display include a body mounted device. The method further may further include establishing a wireless data link between the body mounted device and a second body mounted device, receiving audio data from the second body mounted device via the wireless data link, and using the received audio data to output audio to the user. In a further embodiment, the method may include receiving video data via the wireless data link, and using the received video data to output video images on the head mounted display received from the second body mounted device, in which the video displays an anchored virtual object.

In a further embodiment, receiving video data via the wireless data link may include receiving one or more of a three dimensional model data for a virtual object, three dimensional data for an anchoring surface, three dimensional data for an anchoring point, three dimensional depth data, and three dimensional distance data. In a further embodiment, the method may include receiving a third input indicating a standby location for the virtual object, in which the standby location is different from the first and the second anchor surfaces, calculating parameters including distance and orientation with respect to the body mounted camera that corresponds to the standby location, and displaying the virtual object at the standby location. In a further embodiment, the standby location is displayed as free floating on a display, in which the virtual object appears on the display as movable and unconnected to surfaces in the image as the user turns his/her head and moves.

In a further embodiment, capturing an image with a body mounted camera may include capturing video data by a full-color video camera, and capturing spatial data with a body mounted sensor array may include capturing spatial data utilizing a distance sensor to determine distances to objects in the image. In a further embodiment, capturing spatial data with a body mounted sensor array may include capturing distance information of objects in the image using an infrared laser and an infrared sensor. In a further embodiment, the method may include building a three dimensional map based on the captured video data and the calculated spatial data. In a further embodiment, the method may include tracking movements of the user utilizing the body mounted camera, applying a detection algorithm to the tracked user movements to detect a predetermined gesture, and executing a command corresponding to the predetermined gesture when the predetermined gesture is detected.

In a further embodiment, the detected predetermined gesture is selected from the group consisting of an "OK" sign, a fist, an open hand, pointing with one finger, pointing with two fingers, pointing with three or four fingers, an outstretched hand, a hand rotation, a wave, a movement of one or more fingers, a movement of a body part or a foot, and any combination thereof. In a further embodiment, the predetermined gesture is retrieved from a gesture dictionary. In a further embodiment, the gesture dictionary defines one or more of a poke gesture, a pat gesture, or a tap gesture for target selection or toggling, a push gesture for guiding a screen object across a screen, a flick gesture for imparting momentum to the screen object, a turn gesture for rotating the screen object, a grab gesture or a pull gesture for zoom operations, a two hand move gesture for panning operations, a drawing hands apart gesture for resizing the screen object, and a swipe gesture for horizontal scrolling or shuttling through media.

In a further embodiment, receiving the first input indicating a first anchor surface in the captured image may include detecting a first predetermined gesture made by the user corresponding to a command to designate a surface within the captured image as an anchor surface and applying the command, and receiving the second input to anchor the virtual object in the image may include detecting a second predetermined gesture made by the user corresponding to a command to move the anchor surface to another surface in the captured image and applying the command. In a further embodiment, either of the first or second detected predetermined gestures may include the user pointing to a surface in the captured image. In a further embodiment, the method may include continuing tracking movements of the user after the first input is received, applying a detection algorithm to the tracked movements to detect a third predetermined gesture corresponding to a user input confirming the first input, and anchoring the virtual object to the selected anchor surface in response to the third predetermined gesture.

Various embodiments may include methods of storing spatial data for use in an augmented reality system by generating data regarding locations of surfaces and objects in a scene based on images and spatial data gathered from a first body mounted sensor device, generating a three dimensional map of the scene based on the generated data, adding geographical identification metadata to the three dimensional map of the scene, storing the geographical identification metadata and three dimensional map in a memory, and transmitting at least a portion of the geographical identification metadata and three dimensional map to a second body mounted sensor device. In an embodiment, generating data regarding locations of surfaces and objects in a scene based on images and spatial data gathered from a first body mounted sensor device may include capturing a scene image of the scene with a body mounted camera, capturing spatial data of objects within the scene with a body mounted sensor array, recognizing objects within the captured scene image, and determining distances from the first body mounted sensor device to the objects recognized within the scene image, and adding geographical identification metadata to the three dimensional map of the scene may include associating the determined distances with the objects recognized within the scene image.

In an embodiment, the method may include determining a location of the second body mounted sensor device, in which transmitting at least a portion of the geographical identification metadata and three dimensional map to the second body mounted sensor device may include transmitting a portion of the geographical identification metadata and three dimensional map relevant to the location of the second body mounted sensor device. In a further embodiment, the method may include receiving the transmitted portion of the geographical identification metadata and three dimensional map in the second body mounted sensor device, and generating a visual image on a display on the second body mounted sensor device based in part on the received portion of the geographical identification metadata and three dimensional map.

In a further embodiment, the method may include determining a location of the second body mounted sensor device, generating data regarding locations of surfaces and objects in the scene based on images and spatial data gathered from the second body mounted sensor device, and refining the geographical identification metadata and the three dimensional map based upon the data generated by the second body mounted sensor device. In a further embodiment, adding geographical identification metadata to the three dimensional map of the scene may include tagging the three dimensional map with a geotag. In a further embodiment, generating data regarding locations of surfaces and objects in a scene based on images and spatial data gathered from a first body mounted sensor device, generating a three dimensional map of the scene based on the generated data, and adding geographical identification metadata to the three dimensional map of the scene are accomplished in a processor within the first body mounted sensor device.

In a further embodiment, the method may include relaying images and spatial data gathered by the first body mounted sensor device to a processor in communication with the first body mounted sensor device, in which generating data regarding locations of surfaces and objects in a scene based on images and spatial data gathered from a first body mounted sensor device, generating a three dimensional map of the scene based on the generated data, and adding geographical identification metadata to the three dimensional map of the scene are accomplished in the processor in communication with the first body mounted sensor device. In a further embodiment, the method may include transmitting images and spatial data gathered by the first body mounted sensor device to a server via a network, in which generating data regarding locations of surfaces and objects in a scene based on images and spatial data gathered from a first body mounted sensor device, generating a three dimensional map of the scene based on the generated data, and adding geographical identification metadata to the three dimensional map of the scene are accomplished in the server based on the image and spatial data received from the first body mounted sensor device.

In a further embodiment, the method may include determining a location of the second body mounted sensor device, and transmitting a request from the second body mounted sensor device to the server for a portion of the geographical identification metadata and three dimensional map, the request including the determined location of the second body mounted sensor device, in which transmitting at least a portion of the geographical identification metadata and three dimensional map to the second body mounted sensor device may include transmitting from the server to the second body mounted sensor device a portion of the geographical identification metadata and three dimensional map that is relevant to the location of the second body mounted sensor device. In a further embodiment, generating a three dimensional map of the scene may include developing a mathematical representation of three-dimensional surfaces within the scene, and writing the geographical identification metadata into the mathematical representation. In a further embodiment, storing the geographical identification metadata and the three dimensional map to a memory may include storing the mathematical representation on a server accessible by the first and second body mounted sensor devices.

In a further embodiment, generating data regarding locations of surfaces and objects in a scene based on images and spatial data gathered from a first body mounted sensor device may include determining a location of the first body mounted sensor device, capturing a scene image of the scene with a body mounted camera, capturing spatial data of objects within the scene with a body mounted sensor array, recognizing objects within the captured scene image, and determining locations of the objects recognized within the scene image, and adding geographical identification metadata to the three dimensional map of the scene may include associating the determined locations with the objects recognized within the scene image. In a further embodiment, determining locations of the objects recognized within the image may include determining locations of the objects with respect to the determined location of the first body mounted sensor device. In a further embodiment, determining locations of the objects recognized within the image may include determining locations of the objects within a coordinate system used in determining the location of the first body mounted sensor device.

Various embodiments may include methods of rendering images in an augmented reality system by capturing an image of a scene in which a virtual object is to be displayed, recognizing a body part present in the captured image, and adjusting a display of the virtual object based upon the recognized body part. In an embodiment, adjusting a display of the virtual object may include identifying a portion of the virtual object that overlaps the recognized body part, and suppressing the identified portion such that the recognized body part appears to occlude the identified portion of the virtual object. In a further embodiment, adjusting a display of the virtual object may include identifying a portion of the virtual object that overlaps the recognized body part, and superimposing the virtual object on the recognized body part such that the identified portion of the virtual object appears to occlude the recognized body part.

In a further embodiment, adjusting the displayed virtual object may include adjusting displayed portions of the virtual object overlapping the recognized body part such that the virtual object is viewable through the recognized body part and such that the recognized body part appears semitransparent. In a further embodiment, the method may include displaying the virtual object on a body mounted semitransparent display configured such that that an individual wearing the body mounted semitransparent display can view the scene through the display. In a further embodiment, capturing an image of a scene in which a virtual object is to be displayed may include capturing an image with a body mounted camera worn by a first individual. The method may further include capturing spatial data with a body mounted sensor array worn by the first individual, recognizing objects within the captured image, and determining distances to the recognized objects within the captured image. In a further embodiment, the method may include displaying the virtual object and the captured image on a head mounted display such that the scene is viewable to an individual wearing the body mounted semitransparent display.

In a further embodiment, recognizing a body part present in the captured image may include applying an anatomical analysis to the captured image. In a further embodiment, applying an anatomical analysis to the image may include recognizing objects within the captured image, comparing the recognized objects to a skeletal model stored in memory, the stored skeletal model including relative position information about key joints, bones, and limbs of a human skeleton, and determining if any of the recognized objects match a portion of the skeletal model in response to comparing the recognized objects to the skeletal model. In a further embodiment, the method may include determining whether the body part belongs to a first individual or to a second individual in response to recognizing a body part present in the captured image, determining a location and encompassed area of the virtual object, and determining whether the recognized body part overlaps at least one portion of the area encompassed by the virtual object.

In a further embodiment, determining whether the body part belongs to a first individual or to a second individual may include determining whether the body part belongs to the first or second individual based on an orientation of the recognized body part. In a further embodiment, determining whether the body part belongs to a first individual or to a second individual may include determining that the body part belongs to the first or second individual based on a distance of the recognized body part from the body mounted camera. In a further embodiment, determining whether the body part belongs to a first individual or to a second individual may include determining that the body part belongs to the first or second individual based on a number of body parts determined to be in the captured image.

In a further embodiment, adjusting a display of the virtual object may include displaying the virtual object superimposed over the recognized body part of the second individual when it is determined that the body part belongs to the second individual, and displaying the virtual object so that the virtual object appears to be located beneath the recognized body part when it is determined that the body part belongs to the first individual. In a further embodiment, displaying the virtual object so that the virtual object appears to be located beneath the recognized body part may include not rendering portions of the virtual object which overlap the recognized body part. In a further embodiment, the method may include displaying an outline of portions of the recognized body part of the second individual that overlap a display area encompassed by the virtual object such that the outline is visible over the virtual object in the display.

Various embodiments may include methods of rendering images in an augmented reality system by first and second body mounted devices each including a body mounted camera and a head mounted display. The method may include capturing a first scene image of a scene with the body mounted camera of the first body mounted device, displaying on the head mounted display of the first body mounted device a first image of a virtual object, the first image displaying the virtual object as being anchored to a first anchor surface within the captured first scene image in a first orientation that is appropriate for a user of the first body mounted device, and displaying on the head mounted display of the second body mounted device a second image of the virtual object, the second image displaying the virtual object as being anchored to a second anchor surface in a second orientation that is appropriate for a user of the second body mounted device.

In a further embodiment, the method may include sending the virtual object from the first body mounted device to the second body mounted device, receiving the virtual object in the second body mounted device, capturing a second scene image of the scene with the body mounted camera of the second body mounted device, and analyzing the captured second scene image to identify a suitable anchor surface within the second scene image that is in a direction close to a direction that the user of the second body mounted device is looking, in which displaying on the head mounted display of the second body mounted device a second image may include displaying the second image such that the virtual object is anchored to the identified suitable anchor surface. In an embodiment, the method may include transmitting a signal from the first body mounted device to the second body mounted device indicating an orientation of the virtual object, in which displaying the second image may include displaying the second image such that virtual object is oriented based in part on the signal received from the first body mounted device.

In a further embodiment, the method may include transmitting a signal from the first body mounted device to the second body mounted device indicating a preferred orientation of the virtual object, informing the user of the second body mounted device of the indicated preferred orientation, and receiving input from the user of the second body mounted device accepting or rejecting the indicated preferred orientation, in which displaying on the head mounted display of the second body mounted device a second image of the virtual object may include displaying the second image such that the virtual object is oriented based in part on the indicated preferred orientation when the received input accepts the indicated preferred orientation and such that the virtual object is oriented in a manner different from the indicated preferred orientation when the received input rejects the indicated preferred orientation.

In a further embodiment, the first anchor surface and the second anchor surface are the same surface. In a further embodiment, the method may include transmitting the virtual object from the first body mounted device to the second body mounted device, in which displaying on the head mounted display of the second body mounted device a second image of the virtual object may include displaying the second image as being anchored to the first anchor surface in the second orientation. In a further embodiment, the first and second body mounted devices are located in different locations, the method may further include transmitting the virtual object to each the first and second body mounted devices via a network.

In a further embodiment, the method may include capturing a second scene image with the body mounted camera of the second body mounted device, and receiving input on the second body mounted device indicating the second anchor surface in the captured second scene image, the indicated second anchor surface being different from the first anchor surface, in which displaying on the head mounted display of the second body mounted device a second image may include displaying the virtual object as being anchored to the indicated second anchor surface in a configuration appropriate for the indicated second anchor surface and the user of the second body mounted device. In a further embodiment, the method may include transmitting a second virtual object from the second body mounted device to the first body mounted device, and displaying a third image on the head mounted display of the first body mounted device, the third image displaying the second virtual object as being anchored to the first anchor surface.

Further embodiments may include systems, servers, and/or computing devices configured to perform various operations corresponding to the various embodiment methods and/or operations discussed above. Even further embodiments may include non-transitory processor-readable storage mediums having stored thereon processor-executable instructions to cause a processor to perform operations corresponding to the various embodiment methods and/or operations discussed above.

Figure 41:
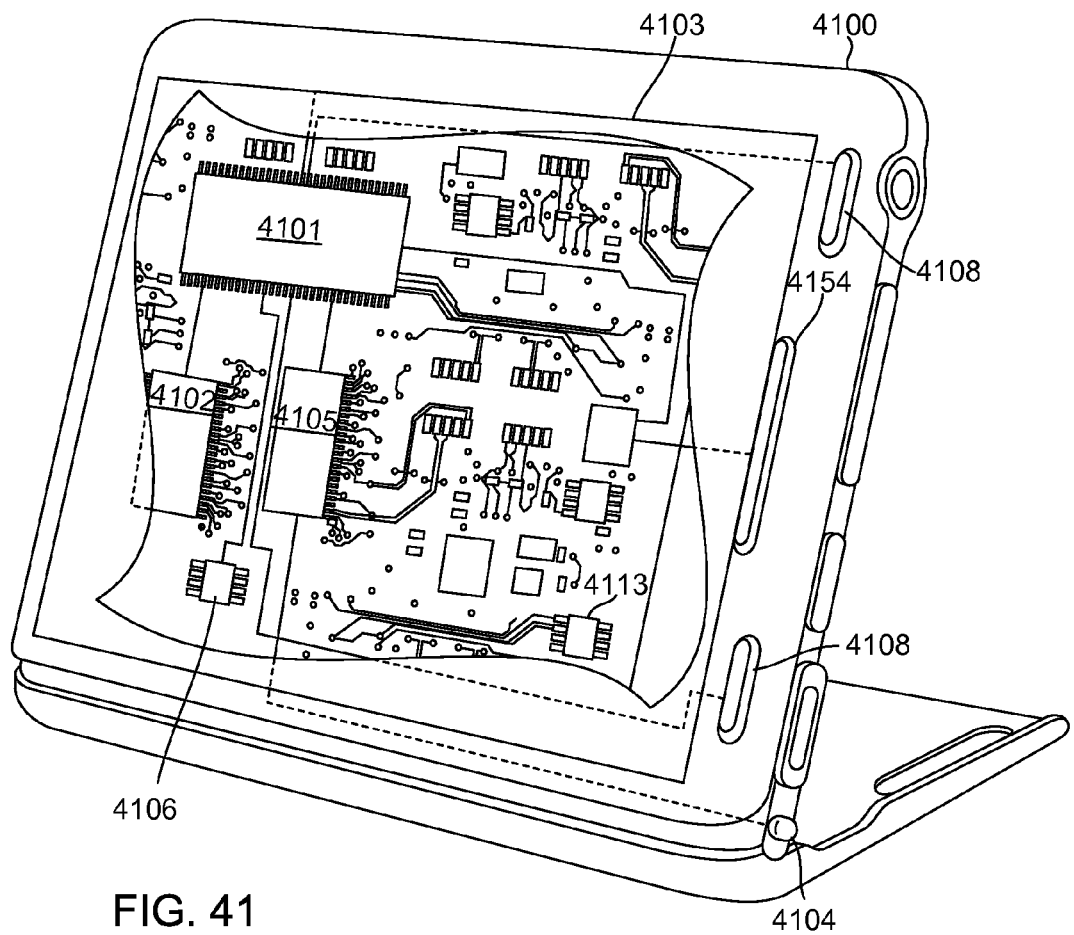
FIG. 41 is a component block diagram of a mobile computing device suitable for use with the various embodiments.

FIG. 41 is a system block diagram of a receiver device suitable for use with any of the embodiments. A typical receiver device 4100 may include a processor 4101 coupled to internal memory 4102, a display 4103, and to a speaker 4154. Additionally, the receiver device 4100 may include an antenna 4104 for sending and receiving electromagnetic radiation that may be connected to a wireless data link and/or cellular telephone transceiver 4105 coupled to the processor 4101 and a mobile multimedia broadcast receiver 4106 coupled to the processor 4101. Receiver devices 4100 typically also include menu selection buttons or rocker switches 4108 for receiving user inputs.

Figure 42:
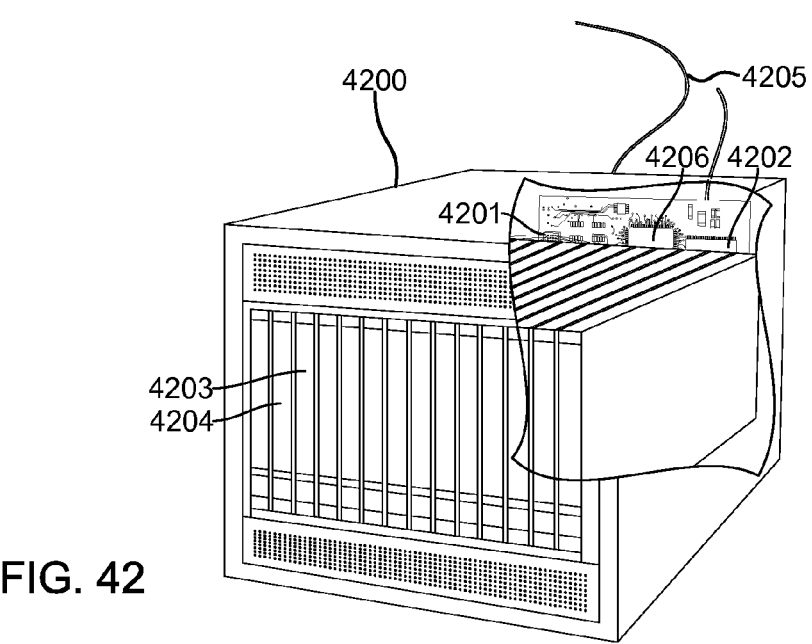
FIG. 42 is a component block diagram of a server computing device suitable for use with the various embodiments.

The various embodiments may be implemented on any of a variety of commercially available server devices, such as the server 4200 illustrated in FIG. 42. Such a server 4200 typically may include a processor 4201 coupled to volatile memory 4202 and a large capacity nonvolatile memory, such as a disk drive 4203. The server 4200 may also include a floppy disc drive, compact disc (CD) or DVD disc drive 4206 coupled to the processor 4201. The server 4200 may also include network access ports 4204 coupled to the processor 4201 for establishing data connections with a network 4205, such as a local area network coupled to other broadcast system computers and servers.

The processors 3903, 3905, 4101, 4201 may be any programmable microprocessor, microcomputer or multiple processor chip or chips that can be configured by software instructions (applications) to perform a variety of functions, including the functions of the various embodiments described above. In some devices, multiple processors 3903, 3905, 4101 may be provided, such as one processor dedicated to wireless communication functions and one processor dedicated to running other applications. Typically, software applications may be stored in the internal memory 4102, 4202, 4203 before they are accessed and loaded into the processor 4101, 4201. The processor 4101, 4201 may include internal memory sufficient to store the application software instructions. In many devices the internal memory may be a volatile or nonvolatile memory, such as flash memory, or a mixture of both. For the purposes of this description, a general reference to memory refers to memory accessible by the processor 3903, 3905, 4101, 4201 including internal memory or removable memory plugged into the device and memory within the processor 3903, 3905, 4101, 4201 itself.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on as one or more instructions or code on a non-transitory computer-readable medium. The steps of a method or algorithm disclosed herein may be embodied in a processor-executable software module executed which may reside on a non-transitory computer-readable medium. Non-transitory computer-readable media include any storage media may be accessed by a computer. By way of example, and not limitation, such non-transitory computer-readable media may include RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a non-transitory machine readable medium and/or non-transitory computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for rendering virtual images in an augmented reality system, comprising:
    capturing an image with a body mounted camera;
    capturing spatial data with a body mounted sensor array;
    recognizing an object within the captured image;
    receiving a first user input selecting a first anchor surface in the captured image that corresponds to a first surface located in the image;
    calculating parameters including distance and orientation with respect to the body mounted camera that correspond to the first anchor surface;
    displaying a virtual object so the virtual object appears anchored to the selected first anchor surface;
    receiving a second input selecting a second anchor surface within the captured image that is different from the first anchor surface, wherein the second anchor surface corresponds to a second surface located in the image and the first and second surfaces are different;
    calculating parameters including distance and orientation with respect to the body mounted camera that corresponds to the second anchor surface; and
    displaying the virtual object so the virtual object appears to the user to be anchored to the selected second anchor surface and moved from the first anchor surface.

2. The method of claim 1, further comprising continuously updating the display of the generated virtual object so the virtual object appears anchored to the selected first or second anchor surface as the user turns his/her head and moves with respect to the selected first or second anchor surface.

3. The method of claim 1, wherein displaying the virtual object comprises
    displaying the virtual object on a head mounted display, the method further comprising outputting video images as if appearing on the head mounted display anchored to the selected first or second anchor surface.

4. The method of claim 1, wherein displaying the generated virtual object so the virtual object appears to the user to be anchored to the selected second anchor surface and moved from the first anchor surface comprises:
    generating the virtual object as a rectangular shaped virtual object that resembles a flat screen display; and
    displaying the generated virtual object on a semitransparent display with the virtual object superimposed on a real world surface visible through the semitransparent display.

5. The method of claim 1, wherein the first or second anchor surface comprises a wall in a room, and wherein the virtual object remains anchored on the wall in the room as the user moves about in the room.

6. The method of claim 1, wherein displaying the generated virtual object so the virtual object appears anchored to the selected first or second anchor surface comprises generating the virtual object so that it appears to be contacting the first or second anchor surface and so that the first or second anchor surface appear to be a rigid point of support for the anchored virtual object.

7. The method of claim 1, wherein:
    displaying the generated virtual object so the virtual object appears anchored to the selected anchor surface comprises generating the virtual object so that it appears to be spaced apart from the first or second anchor surface but hovering in a fixed position and spaced relative to the first or second anchor surface.

8. The method of claim 3, further comprising transmitting data comprising the captured spatial data, the generated virtual object and the image to a second head mounted display.

9. The method of claim 1, further comprising:
receiving audio from the user utilizing a microphone;
applying a detection algorithm to the received audio to detect a predetermined audio signal; and
implementing the predefined user input when the predetermined audio signal is detected.

10. The method of claim 9, wherein applying a detection algorithm to the received audio to detect a predetermined audio signal comprises applying a detection algorithm to the received audio to detect a predetermined audio signal spoken by the user corresponding to a predefined user input.

11. The method of claim 9, wherein the predefined user input corresponding to the detected predetermined audio signal is one of the first input, the second input or a confirmation of one of the first and second inputs.

12. The method of claim 1, further comprising:
capturing the image with the body mounted camera that is mounted and disposed together with a head mounted display; and
displaying the virtual object on the head mounted display.

13. The method of claim 12, wherein the body mounted camera and head mounted display comprise a body mounted device, the method further comprising:
establishing a wireless data link between the body mounted device and a second body mounted device;
receiving audio data from the second body mounted device via the wireless data link; and
using the received audio data to output audio to the user.

14. The method of claim 13, further comprising:
receiving video data via the wireless data link; and
using the received video data to output video images on the head mounted display received from the second body mounted device,
wherein the video displays an anchored virtual object.

15. The method of claim 14, wherein receiving video data via the wireless data link comprises receiving one or more of a three dimensional model data for a virtual object, three dimensional data for an anchoring surface, three dimensional data for an anchoring point, three dimensional depth data, and three dimensional distance data.

16. The method of claim 1, further comprising:
receiving a third input selecting a standby location for the virtual object, wherein the standby location is different from the first and the second anchor surfaces;
calculating parameters including distance and orientation with respect to the body mounted camera that corresponds to the standby location; and
displaying the virtual object at the standby location.

17. The method of claim 16, wherein the standby location is displayed as free floating on a display, wherein the virtual object appears on the display as movable and unconnected to surfaces in the image as the user turns his/her head and moves.

18. The method of claim 1, wherein:
capturing an image with a body mounted camera comprises capturing video data by a full-color video camera; and
capturing spatial data with a body mounted sensor array comprises capturing spatial data utilizing a distance sensor to determine distances to objects in the image.

19. The method of claim 18, wherein capturing spatial data with a body mounted sensor array comprises capturing distance information of objects in the image using an infrared laser and an infrared sensor.

20. The method of claim 18, further comprising building a three dimensional map based on the captured video data and the calculated spatial data.

21. The method of claim 1, further comprising:
tracking movements of the user utilizing the body mounted camera;
applying a detection algorithm to the tracked user movements to detect a predetermined gesture; and
executing a command corresponding to the predetermined gesture when the predetermined gesture is detected.

22. The method of claim 21, wherein the detected predetermined gesture is selected from the group consisting of an "OK" sign, a fist, an open hand, pointing with one finger, pointing with two fingers, pointing with three or four fingers, an outstretched hand, a hand rotation, a wave, a movement of one or more fingers, a movement of a body part or a foot, and any combination thereof.

23. The method of claim 21, wherein the predetermined gesture is retrieved from a gesture dictionary.

24. The method of claim 23, wherein the gesture dictionary defines one or more of:
a poke gesture, a pat gesture, or a tap gesture for target selection or toggling;
a push gesture for guiding a screen object across a screen;
a flick gesture for imparting momentum to the screen object;
a turn gesture for rotating the screen object;
a grab gesture or a pull gesture for zoom operations;
a two hand move gesture for panning operations;
a drawing hands apart gesture for resizing the screen object; and
a swipe gesture for horizontal scrolling or shuttling through media.

25. The method of claim 21, wherein: receiving the first input selecting a first anchor surface in the captured image comprises detecting a first predetermined gesture made by the wearer corresponding to a command to designate a surface within the captured image as an anchor surface and applying the command; and
receiving the second input to anchor the virtual object in the image comprises detecting a second predetermined gesture made by the wearer corresponding to a command to move the anchor surface to another surface in the captured image and applying the command.

26. The method of claim 25, wherein either of the first or second detected predetermined gestures comprises the user pointing to a surface in the captured image.

27. The method of claim 25, further comprising:
continuing tracking movements of the user after the first input is received;
applying a detection algorithm to the tracked movements to detect a third predetermined gesture corresponding to a user input confirming the first input;
and anchoring the virtual object to the selected anchor surface in response to the third predetermined gesture.

28. A computing device, comprising:
means for capturing an image from a body mounted camera;
means for capturing spatial data from a body mounted sensor array;
means for recognizing an object within the captured image;
means for receiving a first user input selecting a first anchor surface in a captured image, wherein the first anchor surface corresponds to a first surface located in the image;

means for calculating parameters including distance and orientation with respect to the body mounted camera that correspond to the first anchor surface;

means for displaying a virtual object so the virtual object appears anchored to the selected first anchor surface;

means for receiving a second input selecting second anchor surface within the captured image that is different from the first anchor surface, wherein the second anchor surface corresponds to a second surface located in the image and the first and second surfaces are different;

means for calculating parameters including distance and orientation with respect to the body mounted camera that corresponds to the second anchor surface; and means for displaying the virtual object so the virtual object appears to the user to be anchored to the selected second anchor surface and moved from the first anchor surface.

29. The computing device of claim 28, further comprising means for continuously updating the display of the generated virtual object so the virtual object appears anchored to the selected first or second anchor surface as the user turns his/her head and moves with respect to the selected first or second anchor surface.

30. The computing device of claim 28, wherein means for displaying the virtual object comprises means for displaying the virtual object on a head mounted display, the computing device further comprising:

means for outputting video images as if appearing on the head mounted display anchored to the selected first or second anchor surface.

31. The computing device of claim 28, wherein means for displaying the generated virtual object so the virtual object appears to the user to be anchored to the selected second anchor surface and moved from the first anchor surface comprises:

means for generating the virtual object as a rectangular shaped virtual object that resembles a flat screen display; and means for displaying the generated virtual object on a semitransparent display with the virtual object superimposed on a real world surface visible through the semitransparent display.

32. The computing device of claim 28, further comprising:

means for selecting the first or second anchor surface to include a wall in a room; and means for displaying the virtual object such that the virtual object remains anchored on the wall in the room as the user moves about in the room.

33. The computing device of claim 28, wherein means for displaying the generated virtual object so the virtual object appears anchored to the selected first or second anchor surface comprises means for generating the virtual object so that it appears to be contacting the first or second anchor surface and so that the first or second anchor surface appear to be a rigid point of support for the anchored virtual object.

34. The computing device of claim 28, wherein means for displaying the generated virtual object so the virtual object appears anchored to the selected anchor surface comprises:

means for generating the virtual object so that it appears to be spaced apart from the first or second anchor surface but hovering in a fixed position and spaced relative to the first or second anchor surface.

35. The computing device of claim 30, further comprising:

means for transmitting data comprising the captured spatial data, the generated virtual object and the image to a second head mounted display.

36. The computing device of claim 28, further comprising:

means for receiving audio from the user utilizing a microphone;

means for applying a detection algorithm to the received audio to detect a predetermined audio signal; and means for implementing the predefined user input when the predetermined audio signal is detected.

37. The computing device of claim 36, wherein means for applying a detection algorithm to the received audio to detect a predetermined audio signal comprises means for applying a detection algorithm to the received audio to detect a predetermined audio signal spoken by the user corresponding to a predefined user input.

38. The computing device of claim 36, wherein means for applying a detection algorithm to the received audio to detect a predetermined audio signal comprises means for detecting a predetermined audio signal that is one of the first input, the second input or a confirmation of one of the first and second inputs.

39. The computing device of claim 28, further comprising:

means for capturing the image with the body mounted camera that is mounted and disposed together with a head mounted display; and means for displaying the virtual object on the head mounted display.

40. The computing device of claim 39, further comprising:

means for establishing a wireless data link between a body mounted device and another body mounted device;

means for receiving audio data from the second body mounted device via the wireless data link; and means for using the received audio data to output audio to the user.

41. The computing device of claim 40, further comprising:

means for receiving video data via the wireless data link; and means for using the received video data to output video images on the head mounted display received from the second body mounted device, wherein the video displays an anchored virtual object.

42. The computing device of claim 41, wherein means for receiving video data via the wireless data link comprises means for receiving one or more of a three dimensional model data for a virtual object, three dimensional data for an anchoring surface, three dimensional data for an anchoring point, three dimensional depth data, and three dimensional distance data.

43. The computing device of claim 28, further comprising:

means for receiving a third input selecting a standby location for the virtual object, wherein the standby location is different from the first and the second anchor surfaces;

means for calculating parameters including distance and orientation with respect to the body mounted camera that corresponds to the standby location; and means for displaying the virtual object at the standby location.

44. The computing device of claim 43, further comprising means for displaying the standby location as free floating on a display such that the virtual object appears on the display as movable and unconnected to surfaces in the image as the user turns his/her head and moves.

45. The computing device of claim 28, wherein:

means for capturing an image with a body mounted camera mounted on a head of a user comprises means for capturing video data by a full-color video camera; and means for capturing spatial data with a body mounted sensor array comprises means for capturing spatial data utilizing a distance sensor to determine distances to objects in the image.

46. The computing device of claim 45, wherein means for capturing spatial data with a body mounted sensor array comprises means for capturing distance information of objects in the image using an infrared laser and an infrared sensor.

47. The computing device of claim 45, further comprising means for building a three dimensional map based on the captured video data and the calculated spatial data.

48. The computing device of claim 28, further comprising:
means for tracking movements of the user utilizing the body mounted camera;
means for applying a detection algorithm to the tracked user movements to detect a predetermined gesture; and
means for executing a command corresponding to the predetermined gesture when the predetermined gesture is detected.

49. The computing device of claim 48, further comprising means for selecting the detected predetermined gesture from the group consisting of an "OK" sign, a fist, an open hand, pointing with one finger, pointing with two fingers, pointing with three or four fingers, an outstretched hand, a hand rotation, a wave, a movement of one or more fingers, a movement of a body part or a foot, and any combination thereof.

50. The computing device of claim 48, further comprising means for retrieving the predetermined gesture from a gesture dictionary.

51. The computing device of claim 50, wherein means for retrieving the predetermined gesture from a gesture dictionary comprises means for retrieving the predetermined gesture from a gesture dictionary that defines one or more of:
a poke gesture, a pat gesture, or a tap gesture for target selection or toggling;
a push gesture for guiding a screen object across a screen;
a flick gesture for imparting momentum to the screen object;
a turn gesture for rotating the screen object;
a grab gesture or a pull gesture for zoom operations;
a two hand move gesture for panning operations;
a drawing hands apart gesture for resizing the screen object; and
a swipe gesture for horizontal scrolling or shuttling through media.

52. The computing device of claim 48, wherein: means for receiving the first input selecting a first anchor surface in the captured image comprises means for detecting a first predetermined gesture made by the wearer corresponding to a command to designate a surface within the captured image as an anchor surface and applying the command; and
means for receiving the second input to anchor the virtual object in the image comprises means for detecting a second predetermined gesture made by the wearer corresponding to a command to move the anchor surface to another surface in the captured image and applying the command.

53. The computing device of claim 52, further comprising means for selecting either of the first or second detected predetermined gestures from the user pointing to a surface in the captured image.

54. The computing device of claim 52, further comprising: means for continuing tracking movements of the user after the first input is received;
means for applying a detection algorithm to the tracked movements to detect a third predetermined gesture corresponding to a user input confirming the first input; and
means for anchoring the virtual object to the selected anchor surface in response to the third predetermined gesture.

55. A computing device, comprising:
a transceiver;
a memory; and
a processor coupled to the transceiver and the memory, wherein the processor is configured with processor-executable instructions to perform operations comprising:
capturing an image with a body mounted camera;
capturing spatial data with a body mounted sensor array;
recognizing an object within the captured image;
receiving a first user input selecting a first anchor surface in a captured image, wherein the first anchor surface corresponds to a first surface located in the image;
calculating parameters including distance and orientation with respect to the body mounted camera that correspond to the first anchor surface;
displaying a virtual object so the virtual object appears anchored to the selected first anchor surface;
receiving a second input selecting a second anchor surface within the captured image that is different from the first anchor surface, wherein the second anchor surface corresponds to a second surface located in the image and the first and second surfaces are different;
calculating parameters including distance and orientation with respect to the body mounted camera that corresponds to the second anchor surface; and
displaying the virtual object so the virtual object appears to the user to be anchored to the selected second anchor surface and moved from the first anchor surface.

56. The computing device of claim 55, wherein the processor is configured with processor-executable instructions to perform operations further comprising continuously updating the display of the generated virtual object so the virtual object appears anchored to the selected first or second anchor surface as the user turns his/her head and moves with respect to the selected first or second anchor surface.

57. The computing device of claim 55, wherein the processor is configured with processor-executable instructions such that displaying the virtual object comprises displaying the virtual object on a head mounted display, and wherein the processor is configured with processor-executable instructions to perform operations further comprising:
outputting video images as if appearing on the head mounted display anchored to the selected first or second anchor surface.

58. The computing device of claim 55, wherein the processor is configured with processor-executable instructions such that displaying the generated virtual object so the virtual object appears to the user to be anchored to the selected second anchor surface and moved from the first anchor surface comprises:
generating the virtual object as a rectangular shaped virtual object that resembles a flat screen display; and
displaying the generated virtual object on a semitransparent display with the virtual object superimposed on a real world surface visible through the semitransparent display.

59. The computing device of claim 55, wherein the processor is configured with processor-executable instructions such that the first or second anchor surface are selected to be a wall in a room and the virtual object is displayed such that the virtual object remains anchored on the wall in the room as the user moves about in the room.

60. The computing device of claim 55, wherein the processor is configured with processor-executable instructions such that displaying the generated virtual object so the virtual object appears anchored to the selected first or second anchor surface comprises generating the virtual object so that it appears to be contacting the first or second anchor surface and so that the first or second anchor surface appear to be a rigid point of support for the anchored virtual object.

61. The computing device of claim 55, wherein the processor is configured with processor-executable instructions such that displaying the generated virtual object so the virtual object appears anchored to the selected anchor surface comprises generating the virtual object so that it appears to be spaced apart from the first or second anchor surface but hovering in a fixed position and spaced relative to the first or second anchor surface.

62. The computing device of claim 57, wherein the processor is configured with processor-executable instructions to perform operations further comprising transmitting data comprising the captured spatial data, the generated virtual object and the image to a second head mounted display.

63. The computing device of claim 55, wherein the processor is configured with processor-executable instructions to perform operations further comprising:
receiving audio from the user utilizing a microphone;
applying a detection algorithm to the received audio to detect a predetermined audio signal; and
implementing the predefined user input when the predetermined audio signal is detected.

64. The computing device of claim 63, wherein the processor is configured with processor-executable instructions such that applying a detection algorithm to the received audio to detect a predetermined audio signal comprises applying a detection algorithm to the received audio to detect a predetermined audio signal spoken by the user corresponding to a predefined user input.

65. The computing device of claim 63, wherein the processor is configured with processor-executable instructions such that the predefined user input corresponding to the detected predetermined audio signal is one of the first input, the second input or a confirmation of one of the first and second inputs.

66. The computing device of claim 55, wherein the processor is configured with processor-executable instructions to perform operations further comprising:
capturing the image with the body mounted camera that is mounted and disposed together with a head mounted display; and
displaying the virtual object on the head mounted display.

67. The computing device of claim 66, wherein the processor is configured with processor-executable instructions such that the body mounted camera and head mounted display comprise a body mounted device, and wherein the processor is configured with processor-executable instructions to perform operations further comprising:
establishing a wireless data link between the body mounted device and another body mounted device;
receiving audio data from the second body mounted device via the wireless data link; and
using the received audio data to output audio to the user.

68. The computing device of claim 67, wherein the processor is configured with processor-executable instructions to perform operations further comprising:
receiving video data via the wireless data link; and
using the received video data to output video images on the head mounted display received from the second body mounted device, wherein the video displays an anchored virtual object.

69. The computing device of claim 68, wherein the processor is configured with processor-executable instructions such that receiving video data via the wireless data link comprises receiving one or more of a three dimensional model data for a virtual object, three dimensional data for an anchoring surface, three dimensional data for an anchoring point, three dimensional depth data, and three dimensional distance data.

70. The computing device of claim 55, wherein the processor is configured with processor-executable instructions to perform operations further comprising:
receiving a third input selecting a standby location for the virtual object, wherein the standby location is different from the first and the second anchor surfaces;
calculating parameters including distance and orientation with respect to the body mounted camera that corresponds to the standby location; and
displaying the virtual object at the standby location.

71. The computing device of claim 70, wherein the processor is configured with processor-executable instructions such that the standby location is displayed as free floating on a display, wherein the virtual object appears on the display as movable and unconnected to surfaces in the image as the user turns his/her head and moves.

72. The computing device of claim 55, wherein the processor is configured with processor-executable instructions such that:
capturing an image with a body mounted camera mounted on a head of a user comprises capturing video data by a full-color video camera; and
capturing spatial data with a body mounted sensor array comprises capturing spatial data utilizing a distance sensor to determine distances to objects in the image.

73. The computing device of claim 72, wherein the processor is configured with processor-executable instructions such that capturing spatial data with a body mounted sensor array comprises capturing distance information of objects in the image using an infrared laser and an infrared sensor.

74. The computing device of claim 72, wherein the processor is configured with processor-executable instructions to perform operations further comprising building a three dimensional map based on the captured video data and the calculated spatial data.

75. The computing device of claim 55, wherein the processor is configured with processor-executable instructions to perform operations further comprising:
tracking movements of the user utilizing the body mounted camera;
applying a detection algorithm to the tracked user movements to detect a predetermined gesture; and
executing a command corresponding to the predetermined gesture when the predetermined gesture is detected.

76. The computing device of claim 75, wherein the processor is configured with processor-executable instructions such that the detected predetermined gesture is selected from the group consisting of an "OK" sign, a fist, an open hand, pointing with one finger, pointing with two fingers, pointing with three or four fingers, an outstretched hand, a hand rotation, a wave, a movement of one or more fingers, a movement of a body part or a foot, and any combination thereof.

77. The computing device of claim 75, wherein the processor is configured with processor-executable instructions such that applying a detection algorithm to the tracked user movements to detect a predetermined gesture comprises retrieving the predetermined gesture from a gesture dictionary.

78. The computing device of claim 77, wherein the processor is configured with processor-executable instructions such that retrieving the predetermined gesture from a gesture dictionary comprises retrieving the predetermined gesture from a gesture dictionary that defines one or more of:
a poke gesture, a pat gesture, or a tap gesture for target selection or toggling;
a push gesture for guiding a screen object across a screen;
a flick gesture for imparting momentum to the screen object;
a turn gesture for rotating the screen object;
a grab gesture or a pull gesture for zoom operations;
a two hand move gesture for panning operations;
a drawing hands apart gesture for resizing the screen object; and
a swipe gesture for horizontal scrolling or shuttling through media.

79. The computing device of claim 75, wherein the processor is configured with processor-executable instructions such that:
receiving the first input selecting a first anchor surface in the captured image comprises detecting a first predetermined gesture made by the wearer corresponding to a command to designate a surface within the captured image as an anchor surface and applying the command; and
receiving the second input to anchor the virtual object in the image comprises detecting a second predetermined gesture made by the wearer corresponding to a command to move the anchor surface to another surface in the captured image and applying the command.

80. The computing device of claim 79, wherein the processor is configured with processor-executable instructions such that either of the first or second detected predetermined gestures comprises the user pointing to a surface in the captured image.

81. The computing device of claim 79, wherein the processor is configured with processor-executable instructions to perform operations further comprising:
continuing tracking movements of the user after the first input is received;
applying a detection algorithm to the tracked movements to detect a third predetermined gesture corresponding to a user input confirming the first input;
and anchoring the virtual object to the selected anchor surface in response to the third predetermined gesture.

82. A non-transitory computer readable storage medium having stored thereon processor-executable software instructions configured to cause a processor to perform operations for rendering virtual images in an augmented reality system, the operations comprising:
capturing an image with a body mounted camera;
capturing spatial data with a body mounted sensor array;
recognizing an object within the captured image;
receiving a first user input selecting a first anchor surface in a captured image, wherein the first anchor surface corresponds to a first surface located in the image;
calculating parameters including distance and orientation with respect to the body mounted camera that correspond to the first anchor surface;
displaying a virtual object so the virtual object appears anchored to the selected first anchor surface;
receiving a second input selecting a second anchor surface within the captured image that is different from the first anchor surface, wherein the second anchor surface corresponds to a second surface located in the image and the first and second surfaces are different;
calculating parameters including distance and orientation with respect to the body mounted camera that corresponds to the second anchor surface; and
displaying the virtual object so the virtual object appears to the user to be anchored to the selected second anchor surface and moved from the first anchor surface.

83. The non-transitory computer readable storage medium of claim 82, wherein the stored processor-executable software instructions are configured to cause a processor to perform operations comprising continuously updating the display of the generated virtual object so the virtual object appears anchored to the selected first or second anchor surface as the user turns his/her head and moves with respect to the selected first or second anchor surface.

84. The non-transitory computer readable storage medium of claim 82, wherein the stored processor-executable software instructions are configured to cause a processor to perform operations such that displaying the virtual object comprises displaying the virtual object on a head mounted display, and wherein the stored processor-executable software instructions are configured to cause a processor to perform operations comprising:
outputting video images as if appearing on the head mounted display anchored to the selected first or second anchor surface.

85. The non-transitory computer readable storage medium of claim 82, wherein the stored processor-executable software instructions are configured to cause a processor to perform operations such that displaying the generated virtual object so the virtual object appears to the user to be anchored to the selected second anchor surface and moved from the first anchor surface comprises:
generating the virtual object as a rectangular shaped virtual object that resembles a flat screen display; and
displaying the generated virtual object on a semitransparent display with the virtual object superimposed on a real world surface visible through the semitransparent display.

86. The non-transitory computer readable storage medium of claim 82, wherein the stored processor-executable software instructions are configured to cause a processor to perform operations such that the first or second anchor surface are selected to be a wall in a room and the virtual object is displayed such that the virtual object remains anchored on the wall in the room as the user moves about in the room.

87. The non-transitory computer readable storage medium of claim 82, wherein the stored processor-executable software instructions are configured to cause a processor to perform operations such that displaying the generated virtual object so the virtual object appears anchored to the selected first or second anchor surface comprises generating the virtual object so that it appears to be contacting the first or second anchor surface and so that the first or second anchor surface appear to be a rigid point of support for the anchored virtual object.

88. The non-transitory computer readable storage medium of claim 82, wherein the stored processor-executable software instructions are configured to cause a processor to perform operations such that displaying the generated virtual object so the virtual object appears anchored to the selected anchor surface comprises generating the virtual object so that it appears to be spaced apart from the first or second anchor surface but hovering in a fixed position and spaced relative to the first or second anchor surface.

89. The non-transitory computer readable storage medium of claim 84, wherein the stored processor-executable software instructions are configured to cause a processor to perform operations comprising transmitting data comprising the captured spatial data, the generated virtual object and the image to a second head mounted display.

90. The non-transitory computer readable storage medium of claim 82, wherein the stored processor-executable software instructions are configured to cause a processor to perform operations comprising:
   receiving audio from the user utilizing a microphone;
   applying a detection algorithm to the received audio to detect a predetermined audio signal; and
   implementing the predefined user input when the predetermined audio signal is detected.

91. The non-transitory computer readable storage medium of claim 90, wherein the stored processor-executable software instructions are configured to cause a processor to perform operations such that applying a detection algorithm to the received audio to detect a predetermined audio signal comprises applying a detection algorithm to the received audio to detect a predetermined audio signal spoken by the user corresponding to a predefined user input.

92. The non-transitory computer readable storage medium of claim 90, wherein the stored processor-executable software instructions are configured to cause a processor to perform operations such that the predefined user input corresponding to the detected predetermined audio signal is one of the first input, the second input or a confirmation of one of the first and second inputs.

93. The non-transitory computer readable storage medium of claim 82, wherein the stored processor-executable software instructions are configured to cause a processor to perform operations comprising:
   capturing the image with the body mounted camera that is mounted and disposed together with a head mounted display; and
   displaying the virtual object on the head mounted display.

94. The non-transitory computer readable storage medium of claim 93, wherein the stored processor-executable software instructions are configured to cause a processor to perform operations such that the body mounted camera and head mounted display comprise a body mounted device, and wherein the stored processor—executable software instructions are configured to cause a processor to perform operations comprising:
   establishing a wireless data link between the body mounted device and another body mounted device;
   receiving audio data from the second body mounted device via the wireless data link; and
   using the received audio data to output audio to the user.

95. The non-transitory computer readable storage medium of claim 94, wherein the stored processor-executable software instructions are configured to cause a processor to perform operations comprising:
   receiving video data via the wireless data link; and
   using the received video data to output video images on the head mounted display received from the second body mounted device, wherein the video displays an anchored virtual object.

96. The non-transitory computer readable storage medium of claim 95, wherein the stored processor-executable software instructions are configured to cause a processor to perform operations such that receiving video data via the wireless data link comprises receiving one or more of a three dimensional model data for a virtual object, three dimensional data for an anchoring surface, three dimensional data for an anchoring point, three dimensional depth data, and three dimensional distance data.

97. The non-transitory computer readable storage medium of claim 82, wherein the stored processor-executable software instructions are configured to cause a processor to perform operations comprising:
   receiving a third input selecting a standby location for the virtual object, wherein the standby location is different from the first and the second anchor surfaces;
   calculating parameters including distance and orientation with respect to the body mounted camera that corresponds to the standby location; and
   displaying the virtual object at the standby location.

98. The non-transitory computer readable storage medium of claim 97, wherein the stored processor-executable software instructions are configured to cause a processor to perform operations such that the standby location is displayed as free floating on a display, wherein the virtual object appears on the display as movable and unconnected to surfaces in the image as the user turns his/her head and moves.

99. The non-transitory computer readable storage medium of claim 82, wherein the stored processor-executable software instructions are configured to cause a processor to perform operations such that:
   capturing an image with a body mounted camera mounted on a head of a user comprises capturing video data by a full-color video camera; and
   capturing spatial data with a body mounted sensor array comprises capturing spatial data utilizing a distance sensor to determine distances to objects in the image.

100. The non-transitory computer readable storage medium of claim 99, wherein the stored processor-executable software instructions are configured to cause a processor to perform operations such that capturing spatial data with a body mounted sensor array comprises capturing distance information of objects in the image using an infrared laser and an infrared sensor.

101. The non-transitory computer readable storage medium of claim 99, wherein the stored processor-executable software instructions are configured to cause a processor to perform operations comprising building a three dimensional map based on the captured video data and the calculated spatial data.

102. The non-transitory computer readable storage medium of claim 82, wherein the stored processor-executable software instructions are configured to cause a processor to perform operations comprising:
   tracking movements of the user utilizing the body mounted camera;
   applying a detection algorithm to the tracked user movements to detect a predetermined gesture; and
   executing a command corresponding to the predetermined gesture when the predetermined gesture is detected.

103. The non-transitory computer readable storage medium of claim 102, wherein the stored processor-executable software instructions are configured to cause a processor to perform operations such that the detected predetermined gesture is selected from the group consisting of an "OK" sign, a fist, an open hand, pointing with one finger, pointing with two fingers, pointing with three or four fingers, an outstretched hand, a hand rotation, a wave, a movement of one or more fingers, a movement of a body part or a foot, and any combination thereof.

104. The non-transitory computer readable storage medium of claim 102, wherein the stored processor-executable software instructions are configured to cause a processor to perform operations such that applying a detection algorithm to the tracked user movements to detect a predetermined gesture comprises retrieving the predetermined gesture from a gesture dictionary.

105. The non-transitory computer readable storage medium of claim 104, wherein the stored processor-executable software instructions are configured to cause a processor to perform operations such that retrieving the predetermined gesture from a gesture dictionary comprises retrieving the predetermined gesture from a gesture dictionary that defines one or more of:
- a poke gesture, a pat gesture, or a tap gesture for target selection or toggling;
- a push gesture for guiding a screen object across a screen;
- a flick gesture for imparting momentum to the screen object;
- a turn gesture for rotating the screen object;
- a grab gesture or a pull gesture for zoom operations;
- a two hand move gesture for panning operations;
- a drawing hands apart gesture for resizing the screen object; and
- a swipe gesture for horizontal scrolling or shuttling through media.

106. The non-transitory computer readable storage medium of claim 102, wherein the stored processor-executable software instructions are configured to cause a processor to perform operations such that:
receiving the first input selecting a first anchor surface in the captured image comprises detecting a first predetermined gesture made by the wearer corresponding to a command to designate a surface within the captured image as an anchor surface and applying the command; and
receiving the second input to anchor the virtual object in the image comprises
detecting a second predetermined gesture made by the wearer corresponding to a command to move the anchor surface to another surface in the captured image and applying the command.

107. The non-transitory computer readable storage medium of claim 106, wherein the stored processor-executable software instructions are configured to cause a processor to perform operations such that either of the first or second detected predetermined gestures comprises the user pointing to a surface in the captured image.

108. The non-transitory computer readable storage medium of claim 106, wherein the stored processor-executable software instructions are configured to cause a processor to perform operations comprising:
continuing tracking movements of the user after the first input is received;
applying a detection algorithm to the tracked movements to detect a third predetermined gesture corresponding to a user input confirming the first input;
and anchoring the virtual object to the selected anchor surface in response to the third predetermined gesture.

* * * * *